US012551556B2

(12) United States Patent
Nilsson et al.

(10) Patent No.: US 12,551,556 B2
(45) Date of Patent: Feb. 17, 2026

(54) ENDOGENOUS TUMOR-DERIVED CIRCULAR RNA AND PROTEINS THEREOF FOR USE AS VACCINE

(71) Applicants: Rolf Jonas Andreas Nilsson, Umeå (SE); Mattias Forsell, Umeå (SE)

(72) Inventors: Rolf Jonas Andreas Nilsson, Umeå (SE); Mattias Forsell, Umeå (SE)

(73) Assignee: Circular Biotech AB, Umea (SE)

( * ) Notice: Subject to any disclaimer, the term of this patent is extended or adjusted under 35 U.S.C. 154(b) by 788 days.

(21) Appl. No.: 16/960,280

(22) PCT Filed: Dec. 27, 2018

(86) PCT No.: PCT/SE2018/051368
§ 371 (c)(1),
(2) Date: Jul. 6, 2020

(87) PCT Pub. No.: WO2019/135701
PCT Pub. Date: Jul. 11, 2019

(65) Prior Publication Data
US 2021/0069310 A1 Mar. 11, 2021

(30) Foreign Application Priority Data
Jan. 5, 2018 (SE) .................................... 1850013-2
Jan. 5, 2018 (SE) .................................... 1850014-0

(51) Int. Cl.
*A61K 40/11* (2025.01)
*A61K 40/42* (2025.01)
(Continued)

(52) U.S. Cl.
CPC .......... *A61K 40/11* (2025.01); *A61K 40/4201* (2025.01); *A61P 35/00* (2018.01); *A61K 2039/53* (2013.01)

(58) Field of Classification Search
CPC .. A61K 39/0011; A61K 2039/53; A61P 35/00
See application file for complete search history.

(56) References Cited

U.S. PATENT DOCUMENTS 5,853,719 A 12/1998 Nair et al.
8,465,756 B2 6/2013 Liu et al.
(Continued)

FOREIGN PATENT DOCUMENTS

CN 102994515 A 3/2013
CN 106659803 A 5/2017
(Continued)

OTHER PUBLICATIONS

Cuzick ("Preventive therapy for cancer", The Lancet Oncology, vol. 18, Issue 8,2017, pp. 472-482) (Year: 2017).*
(Continued)

*Primary Examiner* — Joanne Hama
*Assistant Examiner* — Hannah Sunshine
(74) *Attorney, Agent, or Firm* — Porter Wright Morris & Arthur LLP

(57) ABSTRACT

The present invention relates to an endogenous tumor-derived circular ribonucleic acid (circ RNA) as well as one or more proteins expressed from said tumor-derived circ RNA. The invention further relates said tumor-derived circ RNA and the protein(s) expressed thereof for use vaccines in the prophylaxis and/or treatment of cancer.

15 Claims, 8 Drawing Sheets

Specification includes a Sequence Listing.

Patient → Tumor → Tumor-derived cRNA isolation and purification

Therapeutic vaccination (personalized)

cRNA injection into patient

(51) Int. Cl.
*A61P 35/00* (2006.01)
*A61K 39/00* (2006.01)

(56) References Cited

U.S. PATENT DOCUMENTS

| | | | |
|---|---|---|---|
| 9,345,754 B2 | 5/2016 | Dobric et al. |
| 2016/0194368 A1 | 7/2016 | Hoge et al. |
| 2016/0331844 A1 | 11/2016 | Fotin-Mleczek et al. |
| 2017/0298347 A1 | 10/2017 | Pandolfi et al. |

FOREIGN PATENT DOCUMENTS

| | | | | |
|---|---|---|---|---|
| TW | 201204386 A1 | 2/2012 | |
| WO | 2005/017102 A2 | 2/2005 | |
| WO | 2015/034925 A1 | 3/2015 | |
| WO | WO-2017222911 A1 * | 12/2017 | ............ A61K 39/39 |

OTHER PUBLICATIONS

Han et al. (Circular RNAs: A novel type of biomarker and genetic tools in cancer. Oncotarget. Jun. 2, 2017;8(38):64551-64563) (Year: 2017).*

Kumai et al. ("Peptide vaccines in cancer—old concept revisited", Current Opinion in Immunology, vol. 45, 2017, pp. 1-7) (Year: 2017).*

Rowe, Raymond C, Paul J Sheskey, and Marian E Quinn. Handbook of Pharmaceutical Excipients. 6th ed. London: Pharmaceutical Press, 2009. Print. (Year: 2009).*

Li L, Goedegebuure SP, Gillanders WE. Preclinical and clinical development of neoantigen vaccines. Ann Oncol. 2017;28(suppl_ 12):xii11-xii17 (Year: 2017).*

Guarnerio J, Bezzi M, Jeong JC, et al. Oncogenic Role of Fusion-circRNAs Derived from Cancer-Associated Chromosomal Translocations [published correction appears in Cell. Aug. 1, 20161;166(4):1055-1056. doi: 10.1016/j.cell.2016.07.035.]. Cell. 2016; 165(2):289-302. (Year: 2016).*

Han YN, Xia SQ, Zhang YY, Zheng JH, Li W. Circular RNAs: A novel type of biomarker and genetic tools in cancer. Oncotarget. 2017;8(38):64551-64563. (Year: 2017).*

Kumai T, Kobayashi H, Harabuchi Y, Celis E. Peptide vaccines in cancer-old concept revisited. Curr Opin Immunol. 2017;45:1-7. (Year: 2017).*

Sahin U, Derhovanessian E, Miller M, et al. Personalized RNA mutanome vaccines mobilize poly-specific therapeutic immunity against cancer. Nature. 2017;547(7662):222-226. (Year: 2017).*

Han, Yi-Neng et al., Circular RNAs: A novel type of biomarker and genetic tools in cancer, Oncotarget, vol. 8, No. 38, pp. 64551-64563 (2017).

Huang, Guanqun et al., Recent progress in circular RNAs in human cancers, Cancer Letters, vol. 404, pp. 8/18 (2017).

Official Action dated Jul. 12, 2018 from corresponding Swedish Application No. 1850013-2.

International Search Report and Written Opinion dated Apr. 3, 2019 from corresponding PCT Application No. SE2018/051368.

Office Action dated Oct. 8, 2024 from corresponding Chinese Application No. 201880090775.9 with English Translation.

Office Action dated Aug. 12, 2023 from corresponding Chinese Application No. 201880090775.9 with English Translation.

Office Action dated Feb. 9, 2023 from corresponding Chinese Application No. 201880090775.9 with English Translation.

Database EMBL, "nc72g12.s1 NCI_CGAP_Pr2 *Homo sapiens* cDNA clone Image:782950, mRNA sequence.", retrieved from EBI accession No. EM_EST:AA468041, Database accession No. AA468041, Jun. 18, 1997.

Database EMBL, "7i59f05.x1 NCI_CGAP_Br16 *Homo sapiens* cDNA clone Image:3339009 3', mRNA sequence.", retrieved from EBI accession No. EM_EST:BF592579, Database accession No. BF592579, Dec. 15, 2000.

Database EMBL, "nf32e04.s1 NCI_CGAP_Pr1 *Homo sapiens* cDNA clone Image:915486 similar to gb:M21895 Prostate Specific Antigen Precursor (Human), mRNA sequence.", retrieved from EBI accession No. EM_EST:AA579289, Database accession No. AA579289, Sep. 11, 1997.

Sahin, Ugur et al., Personalized RNA mutanome vaccines mobilize poly-specific therapeutic immunity against cancer, Nature, vol. 547, pp. 222-226 (Jul. 13, 2017).

* cited by examiner

SEQUENCE LISTING

```
<160> NUMBER OF SEQ ID NOS: 598

<210> SEQ ID NO 1
<211> LENGTH: 177
<212> TYPE: RNA
<213> ORGANISM: Homo sapiens
<220> FEATURE:
<223> OTHER INFORMATION: 1

<400> SEQUENCE: 1

uugcuaggaa aagaaaucag cagacacagg uguagaccag aguguuucuu aaauggugua     60

auuuuguccu cucugugucc uggggaauac uggccaugcc uggagacaua ucacucaauu    120

ucucugagga cacagauagg auggggugucuguguuauuu gugggguaca gagauga       177


<210> SEQ ID NO 2
<211> LENGTH: 114
<212> TYPE: RNA
<213> ORGANISM: Homo sapiens
<220> FEATURE:
<223> OTHER INFORMATION: 2

<400> SEQUENCE: 2

augugcccug cccgaaaggc cuucccugua caccaaggug gugcauuacc ggaaguggau     60

caaggacacc aucguggcca accccugagc accccuauca acccccuauu guag          114


<210> SEQ ID NO 3
<211> LENGTH: 93
<212> TYPE: RNA
<213> ORGANISM: Homo sapiens
<220> FEATURE:
<223> OTHER INFORMATION: 3

<400> SEQUENCE: 3

gugucugugu uauuuguggg guacagagau gaaagagggg ugggauccac acugagagag     60

uggagaguga caugugcugg acacugucca uga                                  93


<210> SEQ ID NO 4
<211> LENGTH: 60
<212> TYPE: RNA
<213> ORGANISM: Homo sapiens
<220> FEATURE:
<223> OTHER INFORMATION: 4

<400> SEQUENCE: 4

uuguccuuag gugugagguc cagggguugcu aggaaaagaa aucagcagac acagguguag     60
```

<210> SEQ ID NO 5
<211> LENGTH: 159
<212> TYPE: RNA
<213> ORGANISM: Homo sapiens
<220> FEATURE:
<223> OTHER INFORMATION: 5

<400> SEQUENCE: 5
guguuucuua aaugguguaa uuuuguccuc ucuguguccu ggggaauacu ggccaugccu 60
ggagacauau cacucaauuu cucugaggac acagauagga uggggugucu guguuauuug 120 uggggguacag agaugaaaga ggggugggau ccacacuga 159

<210> SEQ ID NO 6
<211> LENGTH: 180
<212> TYPE: RNA
<213> ORGANISM: Homo sapiens
<220> FEATURE:
<223> OTHER INFORMATION: 6

<400> SEQUENCE: 6
gugcuggaca cuguccauga agcacugagc agaagcugga ggcacaacgc accagacacu 60
cacagcaagg auggagcuga aaacauaacc cacucugucc uggaggcacu gggaagccua 120
gagaaggcug ugagccaagg agggagggucuuccuuuggc augggauggg gaugaaguaa 180

<210> SEQ ID NO 7
<211> LENGTH: 81
<212> TYPE: RNA
<213> ORGANISM: Homo sapiens
<220> FEATURE:
<223> OTHER INFORMATION: 7

<400> SEQUENCE: 7
uugagcccca agcuuaccac cugcacccgg agagcugugu caccaugugg gucccgguug 60
ucuuccucac ccuguccgug a 81

<210> SEQ ID NO 8
<211> LENGTH: 318
<212> TYPE: RNA
<213> ORGANISM: Homo sapiens
<220> FEATURE:
<223> OTHER INFORMATION: 8

<400> SEQUENCE: 8
gugcugcacc ccucauccug ucucggauug ugggaggcug ggagugcgag aagcauuccc 60
aacccuggca ggugcuugug gccucucgug gcagggcagu cugcggcggu guucuggugc 120
acccccagug gguccucaca gcugcccacu gcaucaggaa gugcugcacc ccucauccug 180
ucucggauug ugggaggcug ggagugcgag aagcauuccc aacccuggca ggugcuugug 240
gccucucgug gcagggcagu cugcggcggu guucuggugc acccccagug gguccucaca 300
gcugcccacu gcaucagg 318

<210> SEQ ID NO 9
<211> LENGTH: 282
<212> TYPE: RNA
<213> ORGANISM: Homo sapiens
<220> FEATURE:
<223> OTHER INFORMATION: 9

<400> SEQUENCE: 9

```
cugggagugc gagaagcauu cccaacccug gcaggugcuu guggccucuc guggcagggc     60

agucugcggc gguguucugg ugcaccccca gugggguccuc acagcugccc acugcaucag   120

gaagugcugc accccucauc cugucucgga uugugggagg cugggagugc gagaagcauu    180

cccaacccug gcaggugcuu guggccucuc guggcagggc agucugcggc gguguucugg    240

ugcaccccca gugggguccuc acagcugccc acugcaucag ga                       282


<210> SEQ ID NO 10
<211> LENGTH: 90
<212> TYPE: RNA
<213> ORGANISM: Homo sapiens
<220> FEATURE:
<223> OTHER INFORMATION: 10

<400> SEQUENCE: 10

gugcuggacg cuggacaggg ggcaaaagca ccugcucguc uugaccccaa agaaacuuca     60

gugugugac cuccauguua uuuccaauga                                       90


<210> SEQ ID NO 11
<211> LENGTH: 219
<212> TYPE: RNA
<213> ORGANISM: Homo sapiens
<220> FEATURE:
<223> OTHER INFORMATION: 11

<400> SEQUENCE: 11

gugugcgcaa guucacccuc agaaggugac caaguucaug cugugugcug gacgcuggac     60

agggggcaaa agcaccugcu cgucuugacc ccaaagaaac uucagugugu ggaccuccau    120

guuauuucca augacgugug ugcgcaaguu cacccucaga aggugaccaa guucaugcug    180

ugugcuggac gcuggacagg gggcaaaagc accugcucg                           219


<210> SEQ ID NO 12
<211> LENGTH: 114
<212> TYPE: RNA
<213> ORGANISM: Homo sapiens
<220> FEATURE:
<223> OTHER INFORMATION: 12

<400> SEQUENCE: 12

augugcccug cccgaaaggc cuucccugua caccaaggug gugcauuacc ggaaguggau     60

caaggacacc aucguggcca accccugagc accccuauca acccccuauu guag          114


<210> SEQ ID NO 13
<211> LENGTH: 258
<212> TYPE: RNA
<213> ORGANISM: Homo sapiens
<220> FEATURE:
<223> OTHER INFORMATION: 13

<400> SEQUENCE: 13

cugauucacu augggggggag guguauugaa guccuccaga caacccucag auuugaugau     60

uuccuaguag aacucacaga aauaaagagc uguuauacug ugggugauuc ugggggccca    120

cuugucugua auggugugcu ucaagguauc acgucauggg gcagugaacc augugcccug    180

cccgaaaggc cuucccugua caccaaggug gugcauuacc ggaaguggau caaggacacc    240

aucguggcca accccuga                                                  258


<210> SEQ ID NO 14
<211> LENGTH: 420
```

<212> TYPE: RNA
<213> ORGANISM: Homo sapiens
<220> FEATURE:
<223> OTHER INFORMATION: 14

<400> SEQUENCE: 14
gugaucuugc ugggucggca cagccuguuu cauccugaag acacaggcca gguauuucag 60
gucagccaca gcuucccaca cccgcucuac gauaugagcc uccugaagaa ucgauuccuc 120
aggccaggug augacuccag ccacgaccuc augcugcucc gccugucaga gccugccgag 180
cucacggaug cugugaaggu cauggaccug cccacccagg agccagcacu ggggaccacc 240
ugcuacgccu caggcugggg cagcauugaa ccagaggagu gugcugcacc ccucauccug 300
ucucggauug ugggaggcug ggagugcgag aagcauuccc aacccuggca ggugcuugug 360
gccucucgug gcagggcagu cugcggcggu guucuggugc acccccagug gguccucaca 420

<210> SEQ ID NO 15
<211> LENGTH: 117
<212> TYPE: RNA
<213> ORGANISM: Homo sapiens
<220> FEATURE:
<223> OTHER INFORMATION: 1

<400> SEQUENCE: 15
cuggcaucag aaaaacagag gggagauuug uguggcugca gccgagggag accaggaaga 60
ucugcauggu gggaaggacc ugaugauaca gaggugagaa auaagaaagg cugcuga 117

<210> SEQ ID NO 16
<211> LENGTH: 150
<212> TYPE: RNA
<213> ORGANISM: Homo sapiens
<220> FEATURE:
<223> OTHER INFORMATION: 2

<400> SEQUENCE: 16
gugccugguc ccgcuuguga gggaaggaca uuagaaaaug aauugaugug uuccuuaaag 60
gaugggcagg aaaacagauc cuguugugga uauuuauuug aacgggauua cagauuugaa 120
augaagucac aaagugagca uuaccaauga 150

<210> SEQ ID NO 17
<211> LENGTH: 87
<212> TYPE: RNA
<213> ORGANISM: Homo sapiens
<220> FEATURE:
<223> OTHER INFORMATION: 3

<400> SEQUENCE: 17
auggaauacu gugaugacau gaggcagcca agcuggggag gagauaacca cggggcagag 60
ggucaggauu cuggcccugc ugccuaa 87

<210> SEQ ID NO 18
<211> LENGTH: 63
<212> TYPE: RNA
<213> ORGANISM: Homo sapiens
<220> FEATURE:
<223> OTHER INFORMATION: 4

<400> SEQUENCE: 18
cugaucucua cgguuccuuc ugggcccaac auucuccaua uauccagcca cacucauuuu 60
uaa 63

<210> SEQ ID NO 19
<211> LENGTH: 72
<212> TYPE: RNA
<213> ORGANISM: Homo sapiens
<220> FEATURE:
<223> OTHER INFORMATION: 5

<400> SEQUENCE: 19
guguucuggc ccaggggauc ugugaacagg cugggaagca ucucaagauc uuuccagggu 60
uauacuuacu ag 72

<210> SEQ ID NO 20
<211> LENGTH: 141
<212> TYPE: RNA
<213> ORGANISM: Homo sapiens
<220> FEATURE:
<223> OTHER INFORMATION: 6

<400> SEQUENCE: 20
gugcccauuc ucaagaccuc aaaaugucau uccauuaaua ucacaggauu aacuuuuuuu 60
uuuaaccugg aagaauucaa uguuacaugc agcuauggga auuuaauuac auauuuuguu 120
uuccagugca aagaugacua a 141

<210> SEQ ID NO 21
<211> LENGTH: 75
<212> TYPE: RNA
<213> ORGANISM: Homo sapiens
<220> FEATURE:
<223> OTHER INFORMATION: 7

<400> SEQUENCE: 21
uugaacaugu caggcauaca uuauuccuuc ugccugagaa gcucuuccuu gucucuuaaa 60
ucuagaauga uguaa 75

<210> SEQ ID NO 22
<211> LENGTH: 75
<212> TYPE: RNA
<213> ORGANISM: Homo sapiens
<220> FEATURE:
<223> OTHER INFORMATION: 8

<400> SEQUENCE: 22
cuggcaauaa agaauuuaca aagagcuacu caggaccagu uguuaagagc ucugugugug 60
ugugugugug uguga 75

<210> SEQ ID NO 23
<211> LENGTH: 153
<212> TYPE: RNA
<213> ORGANISM: Homo sapiens
<220> FEATURE:
<223> OTHER INFORMATION: 9

<400> SEQUENCE: 23
guguacaugc caaagugugc cucucucucu uugacccauu auuucagacu uaaaaacaag 60
cauguuuuca aauggcacua ugagcugcca augauguauc accaccauau cucauuauuc 120
uccaguaaau gugauaauaa ugucaucugu uaa 153

<210> SEQ ID NO 24
<211> LENGTH: 81
<212> TYPE: RNA
<213> ORGANISM: Homo sapiens

<220> FEATURE:
<223> OTHER INFORMATION: 10

<400> SEQUENCE: 24
uugacuucac aaaagcagcu ggaaauggac aaccacaaua ugcauaaaauc uaacuccuac 60 caucagcuac acacugcuug a 81

<210> SEQ ID NO 25
<211> LENGTH: 168
<212> TYPE: RNA
<213> ORGANISM: Homo sapiens
<220> FEATURE:
<223> OTHER INFORMATION: 11

<400> SEQUENCE: 25
cugagcuguc aucgucccca ucucugugag ccacaaccaa cagcaggacc caacgcaugu 60
cugagauccu uaaaucaagg aaaccagugu caugaguuga auucuccuau uauggaugcu 120
agcuucuggc caucucuggc ucuccucuug acacauauua gcuucuag 168

<210> SEQ ID NO 26
<211> LENGTH: 132
<212> TYPE: RNA
<213> ORGANISM: Homo sapiens
<220> FEATURE:
<223> OTHER INFORMATION: 12

<400> SEQUENCE: 26
uugcuuccac gacuuuuauc uuuucuccaa cacaucgcuu accaauccuc ucucugcucu 60
guugcuuugg acuuccccac aagaauuuca acgacucuca agucuuuucu uccaucccca 120
ccacuaaccu ga 132

<210> SEQ ID NO 27
<211> LENGTH: 63
<212> TYPE: RNA
<213> ORGANISM: Homo sapiens
<220> FEATURE:
<223> OTHER INFORMATION: 13

<400> SEQUENCE: 27
augccuagac ccuuauuuuu auuaauuucc aauagaugcu gccuaugggc uauauugcuu 60
uag 63

<210> SEQ ID NO 28
<211> LENGTH: 180
<212> TYPE: RNA
<213> ORGANISM: Homo sapiens
<220> FEATURE:
<223> OTHER INFORMATION: 14

<400> SEQUENCE: 28
augaacauua gauauuuaaa gcucaagagg uucaaaaucc aacucauuau cuucucuuuc 60
uuucaccucc cugcuccucu cccuauauua cugauugcac ugaacagcau gguccccaau 120
guagccaugc aaaugagaaa cccaguggcu ccuuguggua caugcaugca agacugcuga 180

<210> SEQ ID NO 29
<211> LENGTH: 108
<212> TYPE: RNA
<213> ORGANISM: Homo sapiens
<220> FEATURE:
<223> OTHER INFORMATION: 15

<400> SEQUENCE: 29
gugccgagaa gcuggcauca gaaaaacaga ggggagauuu guguggcugc agccgaggga 60
gaccaggaag aucugcaugg ugggaaggac cugaugauac agagguga 108

<210> SEQ ID NO 30
<211> LENGTH: 156
<212> TYPE: RNA
<213> ORGANISM: Homo sapiens
<220> FEATURE:
<223> OTHER INFORMATION: 16

<400> SEQUENCE: 30
auguuuuugc acauuuccag ccccuuuaaa uauccacaca cacaggaagc acaaaaggaa 60
gcacagagau cccugggaga aaugcccggc cgccaucuug ggucaucgau gagccucgcc 120
cugugccugg ucccgcuugu gagggaagga cauuag 156

<210> SEQ ID NO 31
<211> LENGTH: 63
<212> TYPE: RNA
<213> ORGANISM: Homo sapiens
<220> FEATURE:
<223> OTHER INFORMATION: 17

<400> SEQUENCE: 31
augggcagga aaacagaucc uguuguggau auuuauuuga acgggauuac agauuugaaa 60
uga 63

<210> SEQ ID NO 32
<211> LENGTH: 93
<212> TYPE: RNA
<213> ORGANISM: Homo sapiens
<220> FEATURE:
<223> OTHER INFORMATION: 18

<400> SEQUENCE: 32
gugagcauua ccaaugagag gaaaacagac gagaaaaucu ugauggcuuc acaagacaug 60
caacaaacaa aauggaauac ugugaugaca uga 93

<210> SEQ ID NO 33
<211> LENGTH: 117
<212> TYPE: RNA
<213> ORGANISM: Homo sapiens
<220> FEATURE:
<223> OTHER INFORMATION: 19

<400> SEQUENCE: 33
gugaauuauc uaaucaacau cauccucagu gucuuugccc auacugaaau ucauuuccca 60
cuuuugugcc cauucucaag accucaaaau gucauuccau uaauaucaca ggauuaa 117

<210> SEQ ID NO 34
<211> LENGTH: 68
<212> TYPE: RNA
<213> ORGANISM: Homo sapiens
<220> FEATURE:
<223> OTHER INFORMATION: 20

<400> SEQUENCE: 34
uuguuuucca gugcaaagau gacuaagucc uuuaucccuc cccuuuguuu gauuuuuuuu 60
ccaguaua 68

<210> SEQ ID NO 35
<211> LENGTH: 171
<212> TYPE: RNA
<213> ORGANISM: Homo sapiens
<220> FEATURE:
<223> OTHER INFORMATION: 21

<400> SEQUENCE: 35
augcaagagc cacagaggga auguuuaugg ggcacguuug uaagccuggg augugaagca 60
aaggcaggga accucauagu aucuuauaua auauacuuca uuucucuauc ucuaucacaa 120
uauccaacaa gcuuuucaca gaauucaugc agugcaaauc cccaaaggua a 171

<210> SEQ ID NO 36
<211> LENGTH: 117
<212> TYPE: RNA
<213> ORGANISM: Homo sapiens
<220> FEATURE:
<223> OTHER INFORMATION: 22

<400> SEQUENCE: 36
guggguucuc uuaagcaaaa uacuugcauu aggucucagc uggggcugug caucaggcgg 60
uuugagaaau auucaauucu cagcagaagc cagaauuuga auucccucau cuuuuag 117

<210> SEQ ID NO 37
<211> LENGTH: 120
<212> TYPE: RNA
<213> ORGANISM: Homo sapiens
<220> FEATURE:
<223> OTHER INFORMATION: 23

<400> SEQUENCE: 37
cugucccucu uuguguucau ggauagucca auaaauaaug uuaucuuuga acugaugcuc 60
auaggagaga auauaagaac ucugagugau aucaacauua gggauucaaa gaaauauuag 120

<210> SEQ ID NO 38
<211> LENGTH: 69
<212> TYPE: RNA
<213> ORGANISM: Homo sapiens
<220> FEATURE:
<223> OTHER INFORMATION: 24

<400> SEQUENCE: 38
cuguugcuuu ggacuucccc acaagaauuu caacgacucu caagucuuuu cuuccauccc 60
caccacuaa 69

<210> SEQ ID NO 39
<211> LENGTH: 87
<212> TYPE: RNA
<213> ORGANISM: Homo sapiens
<220> FEATURE:
<223> OTHER INFORMATION: 25

<400> SEQUENCE: 39
gugguacaug caugcaagac ugcugaagcc agaaggauga cugauuacgc cucaugggug 60
gaggggacca cuccugggcc uucguga 87

<210> SEQ ID NO 40
<211> LENGTH: 63
<212> TYPE: RNA
<213> ORGANISM: Homo sapiens
<220> FEATURE:
<223> OTHER INFORMATION: 26

<400> SEQUENCE: 40
uugucaggag caagaccuga gaugcucccu gccuucagug uccucugcau cuccccuuuc 60
uaa 63

<210> SEQ ID NO 41
<211> LENGTH: 156
<212> TYPE: RNA
<213> ORGANISM: Homo sapiens
<220> FEATURE:
<223> OTHER INFORMATION: 27

<400> SEQUENCE: 41
uuggcauacu auaucaacuu ugauucuuug uuacaacuuu ucuuacucuu uuaucaccaa 60
aguggcuuuu auucucuuua uuauuauuau uuucuuuuac uacuauauua cguuguuauu 120
auuuuguucu cuauaguauc aauuuauuug auuuag 156

<210> SEQ ID NO 42
<211> LENGTH: 117
<212> TYPE: RNA
<213> ORGANISM: Homo sapiens
<220> FEATURE:
<223> OTHER INFORMATION: 28

<400> SEQUENCE: 42
gugacauguu uuugcacauu uccagccccu uuaaauaucc acacacacag gaagcacaaa 60
aggaagcaca gagaucccug ggagaaaugc ccggccgcca ucuuggguca ucgauga 117

<210> SEQ ID NO 43
<211> LENGTH: 78
<212> TYPE: RNA
<213> ORGANISM: Homo sapiens
<220> FEATURE:
<223> OTHER INFORMATION: 29

<400> SEQUENCE: 43
gugaccuuuc uacacuguag aauaacauua cucauuuugu ucaaagaccc uucguguugc 60
ugccuaauau guagcuga 78

<210> SEQ ID NO 44
<211> LENGTH: 114
<212> TYPE: RNA
<213> ORGANISM: Homo sapiens
<220> FEATURE:
<223> OTHER INFORMATION: 30

<400> SEQUENCE: 44
cuguuuuucc uaaggagugu ucuggcccag gggaucugug aacaggcugg gaagcaucuc 60
aagaucuuuc cagggguuaua cuuacuagca cacagcauga ucauuacgga guga 114

<210> SEQ ID NO 45
<211> LENGTH: 75
<212> TYPE: RNA
<213> ORGANISM: Homo sapiens
<220> FEATURE:
<223> OTHER INFORMATION: 31

<400> SEQUENCE: 45
gugucuuugc ccauacugaa auucauuucc cacuuuugug cccauucuca agaccucaaa 60
augucauucc auuaa 75

<210> SEQ ID NO 46
<211> LENGTH: 96
<212> TYPE: RNA
<213> ORGANISM: Homo sapiens
<220> FEATURE:
<223> OTHER INFORMATION: 32

<400> SEQUENCE: 46
augcuuagcc uuguacugag gcuguauaca gccacagccu cuccccaucc cuccagccuu 60
aucugucauc accaucaacc ccucccaugc accuaa 96

<210> SEQ ID NO 47
<211> LENGTH: 63
<212> TYPE: RNA
<213> ORGANISM: Homo sapiens
<220> FEATURE:
<223> OTHER INFORMATION: 33

<400> SEQUENCE: 47
augcaaagaa gggacacaua ugagauucau caucacauga gacagcaaau acuaaaagug 60
uaa 63

<210> SEQ ID NO 48
<211> LENGTH: 111
<212> TYPE: RNA
<213> ORGANISM: Homo sapiens
<220> FEATURE:
<223> OTHER INFORMATION: 34

<400> SEQUENCE: 48
gugcaaaucc ccaaagguaa ccuuuaucca uuucauggug agugcgcuuu agaauuuugg 60
caaaucauac uggucacuua ucucaacuuu gagauguguu uguccuugua g 111

<210> SEQ ID NO 49
<211> LENGTH: 75
<212> TYPE: RNA
<213> ORGANISM: Homo sapiens
<220> FEATURE:
<223> OTHER INFORMATION: 35

<400> SEQUENCE: 49
gugugugugu gugugugugu gaguguacau gccaaagugu gccucucucu cuuugaccca 60
uuauuucaga cuuaa 75

<210> SEQ ID NO 50
<211> LENGTH: 132
<212> TYPE: RNA
<213> ORGANISM: Homo sapiens
<220> FEATURE:
<223> OTHER INFORMATION: 36

<400> SEQUENCE: 50
uugacauaua uuguuagaag caccucgcau uuguggguuc ucuuaagcaa aauacuugca 60
uuaggucuca gcuggggcug ugcaucaggc gguuugagaa auauucaauu cucagcagaa 120
gccagaauuu ga 132

<210> SEQ ID NO 51
<211> LENGTH: 84
<212> TYPE: RNA
<213> ORGANISM: Homo sapiens
<220> FEATURE:
<223> OTHER INFORMATION: 37

```
<400> SEQUENCE: 51

uuggagagga uucagacagc ucaggugcuu ucacuaaugu cucugaacuu cugucccucu     60

uuguguucau ggauagucca auaa                                            84


<210> SEQ ID NO 52
<211> LENGTH: 108
<212> TYPE: RNA
<213> ORGANISM: Homo sapiens
<220> FEATURE:
<223> OTHER INFORMATION: 38

<400> SEQUENCE: 52

gugauaucaa cauuagggau ucaaagaaau auuagauuua agcucacacu ggucaaaagg     60

aaccaagaua caaagaacuc ugagcuguca ucguccccau cucuguga                 108


<210> SEQ ID NO 53
<211> LENGTH: 87
<212> TYPE: RNA
<213> ORGANISM: Homo sapiens
<220> FEATURE:
<223> OTHER INFORMATION: 39

<400> SEQUENCE: 53

cugcucuguu gcuuuggacu uccccacaag aauuucaacg acucucaagu cuuuucuucc     60

auccccacca cuaaccugaa ugccuag                                         87


<210> SEQ ID NO 54
<211> LENGTH: 123
<212> TYPE: RNA
<213> ORGANISM: Homo sapiens
<220> FEATURE:
<223> OTHER INFORMATION: 40

<400> SEQUENCE: 54

cugauuacgc cucaugggug gaggggacca cuccugggcc uucgugauug ucaggagcaa     60

gaccugagau gcucccugcc uucagugucc ucugcaucuc cccuuucuaa ugaagaucca    120

uag                                                                  123


<210> SEQ ID NO 55
<211> LENGTH: 63
<212> TYPE: RNA
<213> ORGANISM: Homo sapiens
<220> FEATURE:
<223> OTHER INFORMATION: 41

<400> SEQUENCE: 55

uugcuacauu ugagaauucc aauuaggaac ucacauguuu uaucugcccu aucaauuuuu     60

uaa                                                                   63


<210> SEQ ID NO 56
<211> LENGTH: 141
<212> TYPE: RNA
<213> ORGANISM: Homo sapiens
<220> FEATURE:
<223> OTHER INFORMATION: 42

<400> SEQUENCE: 56

gugucuuggc auacuauauc aacuuugauu cuuuguuaca acuuuucuua cucuuuuauc     60

accaaagugg cuuuuauucu cuuuauuauu auuauuuucu uuuacuacua uauuacguug    120

uuauuauuuu guucucuaua g                                              141
```

<210> SEQ ID NO 57
<211> LENGTH: 60
<212> TYPE: RNA
<213> ORGANISM: Homo sapiens
<220> FEATURE:
<223> OTHER INFORMATION: 43

<400> SEQUENCE: 57
uugcugacuu uuaaaaauaag ugauucgggg ggugggagaa caggggaggg agagcauuag 60

<210> SEQ ID NO 58
<211> LENGTH: 81
<212> TYPE: RNA
<213> ORGANISM: Homo sapiens
<220> FEATURE:
<223> OTHER INFORMATION: 44

<400> SEQUENCE: 58
gugcagcaaa ccacuauggc acacguauac cuguguaaca aaccuacaca uucugcacau 60
guaucccaga acguaaagua a 81

<210> SEQ ID NO 59
<211> LENGTH: 72
<212> TYPE: RNA
<213> ORGANISM: Homo sapiens
<220> FEATURE:
<223> OTHER INFORMATION: 45

<400> SEQUENCE: 59
gugcagcaaa gaaagacuac agacaucuca auggcagggg aauuacaaca cauauacuua 60
guguuucaau ga 72

<210> SEQ ID NO 60
<211> LENGTH: 120
<212> TYPE: RNA
<213> ORGANISM: Homo sapiens
<220> FEATURE:
<223> OTHER INFORMATION: 46

<400> SEQUENCE: 60
gugagucucc ucagugacac agggcuggau caccaucgac ggcacuuucu gaguacucag 60
ugcagcaaag aaagacuaca gacaucucaa uggcagggga auuacaacac auauacuuag 120

<210> SEQ ID NO 61
<211> LENGTH: 84
<212> TYPE: RNA
<213> ORGANISM: Homo sapiens
<220> FEATURE:
<223> OTHER INFORMATION: 47

<400> SEQUENCE: 61
gugacauguu uuugcacauu uccagccccu uuaaauaucc acacacacag gaagcacaaa 60
aggaagcaca gaggugagaa auaa 84

<210> SEQ ID NO 62
<211> LENGTH: 72
<212> TYPE: RNA
<213> ORGANISM: Homo sapiens
<220> FEATURE:
<223> OTHER INFORMATION: 48

<400> SEQUENCE: 62
gugcagcaaa gaaagacuac agacaucuca auggcagggg aauuacaaca cauauacuua 60
guguuucaau ga 72

<210> SEQ ID NO 63
<211> LENGTH: 90
<212> TYPE: RNA
<213> ORGANISM: Homo sapiens
<220> FEATURE:
<223> OTHER INFORMATION: 49

<400> SEQUENCE: 63
auguuuuugc acauuuccag ccccuuuaaa uauccacaca cacaggaagc acaaaaggaa 60
gcacagagga auuacaacac auauacuuag 90

<210> SEQ ID NO 64
<211> LENGTH: 126
<212> TYPE: RNA
<213> ORGANISM: Homo sapiens
<220> FEATURE:
<223> OTHER INFORMATION: 50

<400> SEQUENCE: 64
gugacauguu uuugcacauu uccagccccu uuaaauaucc acacacacag gaagcacaaa 60
aggaagcaca gaggaauuac aacacauaua cuuaguguuu caaugaacac caagauaaau 120
aaguga 126

<210> SEQ ID NO 65
<211> LENGTH: 120
<212> TYPE: RNA
<213> ORGANISM: Homo sapiens
<220> FEATURE:
<223> OTHER INFORMATION: 1

<400> SEQUENCE: 65
cugccuuccc caccccgagu gcggagccag agaucaaaag augaaaaggc agucaggucu 60
ucaguagcca aaaaacaaaa caaacaaaaa caaaaaagcc gaaauaaaag aaaaagauaa 120

<210> SEQ ID NO 66
<211> LENGTH: 99
<212> TYPE: RNA
<213> ORGANISM: Homo sapiens
<220> FEATURE:
<223> OTHER INFORMATION: 2

<400> SEQUENCE: 66
uugcaccuac uucaguggac acugaauuug gaagguggag gauuuuguuu uuuucuuuua 60
agaucugggc aucuuuugaa ucuacccuuc aaguauuaa 99

<210> SEQ ID NO 67
<211> LENGTH: 135
<212> TYPE: RNA
<213> ORGANISM: Homo sapiens
<220> FEATURE:
<223> OTHER INFORMATION: 3

<400> SEQUENCE: 67
gugucuucuu cugcacgaga cuuugaggcu gucagagcgc uuuuugcgug guugcucccg 60
caaguuuccu ucucuggagc uucccgcagg ugggcagcua gcugcagcga cuaccgcauc 120
aucacagccu guuga 135

<210> SEQ ID NO 68
<211> LENGTH: 78
<212> TYPE: RNA
<213> ORGANISM: Homo sapiens
<220> FEATURE:
<223> OTHER INFORMATION: 4

<400> SEQUENCE: 68
cugagcaaga gaaggggagg cggggguaagg gaaguaggug gaagauucag ccaagcucaa 60
ggauggaagu gcaguuag 78

<210> SEQ ID NO 69
<211> LENGTH: 249
<212> TYPE: RNA
<213> ORGANISM: Homo sapiens
<220> FEATURE:
<223> OTHER INFORMATION: 5

<400> SEQUENCE: 69
gugaggaugg uucuccccaa gcccaucgua gaggccccac aggcuaccug guccuggaug 60
aggaacagca accuucacag ccgcagucgg cccuggagug ccaccccgag agagguugcg 120
ucccagagcc uggagccgcc guggccgcca gcaaggggcu gccgcagcag cugccagcac 180
cuccggacga ggaugacuca gcugccccau ccacguuguc ccugcugggc cccacuuucc 240
ccggcuuaa 249

<210> SEQ ID NO 70
<211> LENGTH: 75
<212> TYPE: RNA
<213> ORGANISM: Homo sapiens
<220> FEATURE:
<223> OTHER INFORMATION: 6

<400> SEQUENCE: 70
cugacaacgc caaggaguug uguaaggcag ugucggugucc caugggccug ggugugggagg 60 cguuggagca ucuga 75

<210> SEQ ID NO 71
<211> LENGTH: 129
<212> TYPE: RNA
<213> ORGANISM: Homo sapiens
<220> FEATURE:
<223> OTHER INFORMATION: 7

<400> SEQUENCE: 71
gugucaaaag cgaaaugggc cccuggaugg auagcuacuc cggaccuuac ggggacaugc 60
guuuggagac ugccagggac cauguuuugc ccauugacua uuacuuucca ccccagaaga 120
ccugccuga 129

<210> SEQ ID NO 72
<211> LENGTH: 189
<212> TYPE: RNA
<213> ORGANISM: Homo sapiens
<220> FEATURE:
<223> OTHER INFORMATION: 8

<400> SEQUENCE: 72
guggagauga agcuucuggg ugucacuaug gagcucucac auguggaagc ugcaaggucu 60
ucuucaaaag agccgcugaa gggaaacaga aguaccugug cgccagcaga aaugauugca 120
cuauugauaa auuccgaagg aaaaauuguc caucuugucg ucuucggaaa uguuaugaag 180
cagggauga 189

<210> SEQ ID NO 73
<211> LENGTH: 120
<212> TYPE: RNA
<213> ORGANISM: Homo sapiens
<220> FEATURE:
<223> OTHER INFORMATION: 9

<400> SEQUENCE: 73
uugcaugcaa aagaaaaaau cccacauccu gcucaagacg cuucuaccag cucaccaagc 60
uccuggacuc cgugcagccu auugcgagag agcugcauca guucacuuuu gaccugcuaa 120

<210> SEQ ID NO 74
<211> LENGTH: 129
<212> TYPE: RNA
<213> ORGANISM: Homo sapiens
<220> FEATURE:
<223> OTHER INFORMATION: 10

<400> SEQUENCE: 74
cugugcaagu gcccaagauc cuuucuggga aagucaagcc caucuauuuc cacacccagu 60
gaagcauugg aaacccuauu uccccacccc agcucaugcc cccuuucaga ugucuucugc 120
cuguuauaa 129

<210> SEQ ID NO 75
<211> LENGTH: 135
<212> TYPE: RNA
<213> ORGANISM: Homo sapiens
<220> FEATURE:
<223> OTHER INFORMATION: 11

<400> SEQUENCE: 75
auggguuugu augccuuuaa aucugugaug auccucauau ggcccagugu caaguugugc 60
uuguuuacag cacuacucug ugccagccac acaaacguuu acuuaucuua ugccacggga 120
aguuuagaga gcuaa 135

<210> SEQ ID NO 76
<211> LENGTH: 63
<212> TYPE: RNA
<213> ORGANISM: Homo sapiens
<220> FEATURE:
<223> OTHER INFORMATION: 12

<400> SEQUENCE: 76
cuggggaaau caaaacaaaa acaagcaaac aaaaaaaaaa agcaaaaaca aaacaaaaaa 60
uaa 63

<210> SEQ ID NO 77
<211> LENGTH: 114
<212> TYPE: RNA
<213> ORGANISM: Homo sapiens
<220> FEATURE:
<223> OTHER INFORMATION: 13

<400> SEQUENCE: 77
guggagcaau ucauuauacu gaaaaugugc uuguuguuga aaauuugucu gcauguuaau 60
gccucacccc caaacccuuu ucucucucac ucucugccuc caacuucaga uuga 114

<210> SEQ ID NO 78
<211> LENGTH: 201

<212> TYPE: RNA
<213> ORGANISM: Homo sapiens
<220> FEATURE:
<223> OTHER INFORMATION: 14

<400> SEQUENCE: 78
auguucucuu cagccaaaac uuggcgacuu ccacagaaaa gucugaccac ugagaagaag 60
gagagcagag auuuaacccu uuguaaggcc ccauuuggau ccaggucugc uuucucaugu 120
gugagucagg gaggagcugg agccagagga gaagaaaaug auagcuuggc uguucuccug 180
cuuaggacac ugacugaaua g 201

<210> SEQ ID NO 79
<211> LENGTH: 165
<212> TYPE: RNA
<213> ORGANISM: Homo sapiens
<220> FEATURE:
<223> OTHER INFORMATION: 15

<400> SEQUENCE: 79
cugccaaacu ccgugaagcc acaagcaccu uauguccucc cuucaguguu uugugggccu 60
gaauuucauc acacugcauu ucagccaugg ucaucaagcc uguuugcuuc uuuugggcau 120
guucacagau ucucuguuaa gagcccccac caccaagaag guuag 165

<210> SEQ ID NO 80
<211> LENGTH: 114
<212> TYPE: RNA
<213> ORGANISM: Homo sapiens
<220> FEATURE:
<223> OTHER INFORMATION: 16

<400> SEQUENCE: 80
gugggaagaa ugaaggcacu agaaccagaa acccugcaaa ugcucuucuu gucacccagc 60
auauccaccu gcagaaguca ugagaagaga gaaggaacaa agaggagacu cuga 114

<210> SEQ ID NO 81
<211> LENGTH: 75
<212> TYPE: RNA
<213> ORGANISM: Homo sapiens
<220> FEATURE:
<223> OTHER INFORMATION: 17

<400> SEQUENCE: 81
cugacauugc ccauacucac ucagauuccc caccuuuguu gcugccucuu agucagaggg 60
aggccaaacc auuga 75

<210> SEQ ID NO 82
<211> LENGTH: 72
<212> TYPE: RNA
<213> ORGANISM: Homo sapiens
<220> FEATURE:
<223> OTHER INFORMATION: 18

<400> SEQUENCE: 82
augaguaaua ugccaaucca agacugcugg agaaaacuaa agcugacagg uucccuuuuu 60
ggggugggau ag 72

<210> SEQ ID NO 83
<211> LENGTH: 108
<212> TYPE: RNA
<213> ORGANISM: Homo sapiens
<220> FEATURE:

<223> OTHER INFORMATION: 19

<400> SEQUENCE: 83
auguacagga ucacuuuuag cuguuuuaaa cagaaaaaaa uauccaccac ucuuuucagu 60
uacacuaggu uacauuuuaa uagguccuuu acaucuguuu uggaauga 108

<210> SEQ ID NO 84
<211> LENGTH: 165
<212> TYPE: RNA
<213> ORGANISM: Homo sapiens
<220> FEATURE:
<223> OTHER INFORMATION: 20

<400> SEQUENCE: 84
gugauacaca gauugaauua uaucauuuuc auaucucucc uuguaaauac uagaagcucu 60
ccuuuacauu ucucuaucaa auuuuucauc uuuaugguu ucccaauugu gacucuuguc 120
uucaugaaua uauguuuuuc auuugcaaaa gccaaaaauc aguga 165

<210> SEQ ID NO 85
<211> LENGTH: 87
<212> TYPE: RNA
<213> ORGANISM: Homo sapiens
<220> FEATURE:
<223> OTHER INFORMATION: 21

<400> SEQUENCE: 85
augacaaaac uagggaaaaa uagccuacac aagccuuuag gccuacucuu ucugugcuug 60
gguuugagug aacaaaggag auuuuag 87

<210> SEQ ID NO 86
<211> LENGTH: 168
<212> TYPE: RNA
<213> ORGANISM: Homo sapiens
<220> FEATURE:
<223> OTHER INFORMATION: 22

<400> SEQUENCE: 86
cugcucuaca aacagaguug guaugguugg uauacuguac ucaccuguga gggacuggcc 60
acucagaccc acuuagcugg ugagcuagaa gaugaggauc acucacugga aaagucacaa 120
ggaccaucuc caaacaaguu ggcagugcuc gauguggacg aagaguga 168

<210> SEQ ID NO 87
<211> LENGTH: 114
<212> TYPE: RNA
<213> ORGANISM: Homo sapiens
<220> FEATURE:
<223> OTHER INFORMATION: 23

<400> SEQUENCE: 87
cugugcuggg cagcagacag cugccaggau cacgaacucu guagucaaag aaaagagucg 60
uguggcaguu ucagcucucg uucauugggc agcucgccua ggcccagccu cuga 114

<210> SEQ ID NO 88
<211> LENGTH: 159
<212> TYPE: RNA
<213> ORGANISM: Homo sapiens
<220> FEATURE:
<223> OTHER INFORMATION: 24

<400> SEQUENCE: 88
cugagaaagg gauauuuuga aggacuguca uauaucuuug aaaaaagaaa aucuguaaua 60
cauauauuuu uauguauguu cacuggcacu aaaaaauaua gagagcuuca uucuguccuu 120
uggguaguug cugagguaau uguccagguu gaaaaauaa 159

<210> SEQ ID NO 89
<211> LENGTH: 111
<212> TYPE: RNA
<213> ORGANISM: Homo sapiens
<220> FEATURE:
<223> OTHER INFORMATION: 24

<400> SEQUENCE: 89
cugccccuuc ccagcccugc accaaagcug cauuucagga gacucucucc agacagccca 60
guaacuaccc gagcauggcc ccugcauagc ccuggaaaaa uaagaggcug a 111

<210> SEQ ID NO 90
<211> LENGTH: 147
<212> TYPE: RNA
<213> ORGANISM: Homo sapiens
<220> FEATURE:
<223> OTHER INFORMATION: 26

<400> SEQUENCE: 90
cugucuacga auuaucuugu gccaguugcc caggugagag ggcacugggc caagggagug 60
guuuucaugu uugacccacu acaaggggguc augggaauca ggaaugccaa agcaccagau 120
caaauccaaa acuuaaaguc aaaauaa 147

<210> SEQ ID NO 91
<211> LENGTH: 69
<212> TYPE: RNA
<213> ORGANISM: Homo sapiens
<220> FEATURE:
<223> OTHER INFORMATION: 27

<400> SEQUENCE: 91
gugugugugu guguucugau agcuuuaacu uucucugcau cuuuauauuu gguuccagau 60
cacaccuga 69

<210> SEQ ID NO 92
<211> LENGTH: 99
<212> TYPE: RNA
<213> ORGANISM: Homo sapiens
<220> FEATURE:
<223> OTHER INFORMATION: 28

<400> SEQUENCE: 92
gugagagagg augcaguuuu guuuuggaag cucucucaga acaaacaaga caccuggauu 60
gaucaguuaa cuaaaaguuu ucuccccuau uggguuuga 99

<210> SEQ ID NO 93
<211> LENGTH: 102
<212> TYPE: RNA
<213> ORGANISM: Homo sapiens
<220> FEATURE:
<223> OTHER INFORMATION: 29

<400> SEQUENCE: 93
gugaaggagc agagggauaa aaagaguaga ggacaugaua cauuguacuu uacuaguuca 60
agacagauga auguggaaag cauaaaaacu caauggaacu ga 102

<210> SEQ ID NO 94

<211> LENGTH: 84
<212> TYPE: RNA
<213> ORGANISM: Homo sapiens
<220> FEATURE:
<223> OTHER INFORMATION: 30

<400> SEQUENCE: 94
cugagauuua ccacagggaa ggcccaaacu uggggccaaa agccuaccca agugauugac 60
caguggcccc cuaaugggac cuga 84

<210> SEQ ID NO 95
<211> LENGTH: 99
<212> TYPE: RNA
<213> ORGANISM: Homo sapiens
<220> FEATURE:
<223> OTHER INFORMATION: 31

<400> SEQUENCE: 95
cuguuccuug gucuucacca uccuugugag agaagggcag uuuccugcau uggaaccugg 60
agcaagcgcu cuaucuuuca cacaaauucc cucaccuga 99

<210> SEQ ID NO 96
<211> LENGTH: 60
<212> TYPE: RNA
<213> ORGANISM: Homo sapiens
<220> FEATURE:
<223> OTHER INFORMATION: 32

<400> SEQUENCE: 96
cugauuccaa uucaguauag caaggugcua gguuuuuucc uuuccccacc ugucucuuag 60

<210> SEQ ID NO 97
<211> LENGTH: 93
<212> TYPE: RNA
<213> ORGANISM: Homo sapiens
<220> FEATURE:
<223> OTHER INFORMATION: 33

<400> SEQUENCE: 97
cuggugguuc ccucucuggc ugcugccuca caguauggga accuguacuc ugcagaggug 60
acaggccaga uuugcauuau cucacaaccu uag 93

<210> SEQ ID NO 98
<211> LENGTH: 177
<212> TYPE: RNA
<213> ORGANISM: Homo sapiens
<220> FEATURE:
<223> OTHER INFORMATION: 34

<400> SEQUENCE: 98
uugcuugaaa ucucuuuaga uggggcucau uucucacggu ggcacuuggc cuccacuggg 60
cagcaggacc agcuccaagc gcuaguguuc uguucucuuu uuguaaucuu ggaaucuuuu 120
guugcucuaa auacaauuaa aaauggcaga aacuuguuug uuggacuaca uguguga 177

<210> SEQ ID NO 99
<211> LENGTH: 177
<212> TYPE: RNA
<213> ORGANISM: Homo sapiens
<220> FEATURE:
<223> OTHER INFORMATION: 35

<400> SEQUENCE: 99
gugagccuag cagggcagau cuuguccacc gugugucuuc uucugcacga gacuuugagg 60

```
cugucagagc gcuuuuugcg ugguugcucc cgcaaguuuc cuucucugga gcuucccgca    120

ggugggcagc uagcugcagc gacuaccgca ucaucacagc cuguugaacu cuucuga       177
```

<210> SEQ ID NO 100
<211> LENGTH: 273
<212> TYPE: RNA
<213> ORGANISM: Homo sapiens
<220> FEATURE:
<223> OTHER INFORMATION: 36

<400> SEQUENCE: 100

```
guggaagauu cagccaagcu caaggaugga agugcaguua gggcugggaa gggucuaccc     60

ucggccgccg uccaagaccu accgaggagc uuuccagaau cuguuccaga gcgugcgcga    120

agugauccag aacccgggcc ccaggcaccc agaggccgcg agcgcagcac cucccggcgc    180

caguuugcug cugcugcagc agcagcagca gcagcagcag cagcagcagc agcagcagca    240

gcagcagcag cagcagcagc agcaagagac uag                                 273
```

<210> SEQ ID NO 101
<211> LENGTH: 99
<212> TYPE: RNA
<213> ORGANISM: Homo sapiens
<220> FEATURE:
<223> OTHER INFORMATION: 37

<400> SEQUENCE: 101

```
gugccacccc gagagagguu gcgucccaga gccuggagcc gccguggccg ccagcaaggg     60

gcugccgcag cagcugccag caccuccgga cgaggauga                            99
```

<210> SEQ ID NO 102
<211> LENGTH: 114
<212> TYPE: RNA
<213> ORGANISM: Homo sapiens
<220> FEATURE:
<223> OTHER INFORMATION: 38

<400> SEQUENCE: 102

```
uugcauguac gccccacuuu ugggaguucc acccgcugug cgucccacuc cuugugcccc     60

auuggccgaa ugcaaagguu cucugcuaga cgacagcgca ggcaagagca cuga          114
```

<210> SEQ ID NO 103
<211> LENGTH: 309
<212> TYPE: RNA
<213> ORGANISM: Homo sapiens
<220> FEATURE:
<223> OTHER INFORMATION: 39

<400> SEQUENCE: 103

```
cugggcggcu gcggcggcgc agugccgcua uggggaccug gcgagccugc auggcgcggg     60

ugcagcggga cccgguucug ggucacccuc agccgccgcu uccucauccu ggcacacucu    120

cuucacagcc gaagaaggcc aguuguaugg accgugugu gguggugggg gugguggcgg    180

cggcggcggc ggcggcggcg gcggcggcgg cggcggcggc ggcggcgagg cgggagcugu    240

agcccccuac ggcuacacuc ggccccccuca ggggcuggcg ggccaggaaa gcgacuucac    300

cgcaccuga                                                            309
```

<210> SEQ ID NO 104
<211> LENGTH: 84
<212> TYPE: RNA

<213> ORGANISM: Homo sapiens
<220> FEATURE:
<223> OTHER INFORMATION: 40

<400> SEQUENCE: 104
gugguacccu ggcggcaugg ugagcagagu gcccuauccc agucccacuu gugucaaaag 60
cgaaaugggc cccuggaugg auag 84

<210> SEQ ID NO 105
<211> LENGTH: 60
<212> TYPE: RNA
<213> ORGANISM: Homo sapiens
<220> FEATURE:
<223> OTHER INFORMATION: 41

<400> SEQUENCE: 105
gugucacuau ggagcucuca cauguggaag cugcaagguc uucuucaaaa gagccgcuga 60

<210> SEQ ID NO 106
<211> LENGTH: 150
<212> TYPE: RNA
<213> ORGANISM: Homo sapiens
<220> FEATURE:
<223> OTHER INFORMATION: 42

<400> SEQUENCE: 106
gugggccaag gccuugccug gcuuccgcaa cuuacacgug gacgaccaga uggcugucau 60
ucaguacucc uggaugggc ucaugguguu ugccaugggc uggcgauccu ucaccaaugu 120
caacuccagg augcucuacu ucgccccuga 150

<210> SEQ ID NO 107
<211> LENGTH: 135
<212> TYPE: RNA
<213> ORGANISM: Homo sapiens
<220> FEATURE:
<223> OTHER INFORMATION: 43

<400> SEQUENCE: 107
gugucuccga augaggcacc ucucucaaga guuuggaugg cuccaaauca ccccccagga 60
auuccugugc augaaagcac ugcuacucuu cagcauuauu ccaguggaug ggcugaaaaa 120
ucaaaaauuc uuuga 135

<210> SEQ ID NO 108
<211> LENGTH: 108
<212> TYPE: RNA
<213> ORGANISM: Homo sapiens
<220> FEATURE:
<223> OTHER INFORMATION: 44

<400> SEQUENCE: 108
augcaaaaga aaaaaucca cauccugcuc aagacgcuuc uaccagcuca ccaagcuccu 60
ggacuccgug cagccuauug cgagagagcu gcaucaguuc acuuuuga 108

<210> SEQ ID NO 109
<211> LENGTH: 117
<212> TYPE: RNA
<213> ORGANISM: Homo sapiens
<220> FEATURE:
<223> OTHER INFORMATION: 45

<400> SEQUENCE: 109
gugaagcauu ggaaacccua uuuccccacc ccagcucaug cccccuuuca gaugucuucu 60
gccuguuaua acucugcacu acuccucugc agugccuugg ggaauuuccu cuauuga 117

<210> SEQ ID NO 110
<211> LENGTH: 144
<212> TYPE: RNA
<213> ORGANISM: Homo sapiens
<220> FEATURE:
<223> OTHER INFORMATION: 46

<400> SEQUENCE: 110
uugcugggcu uuuuuuuucu cuuucucucc uuucuuuuuc uucuucccuc ccuaucuaac 60
ccucccaugg caccuucaga cuuugcuucc cauuguggcu ccuaucugug uuuugaaugg 120
uguuguaugc cuuuaaaucu guga 144

<210> SEQ ID NO 111
<211> LENGTH: 81
<212> TYPE: RNA
<213> ORGANISM: Homo sapiens
<220> FEATURE:
<223> OTHER INFORMATION: 47

<400> SEQUENCE: 111
gugucaaguu gugcuuguuu acagcacuac ucugugccag ccacacaaac guuuacuuau 60
cuuaugccac gggaaguuua g 81

<210> SEQ ID NO 112
<211> LENGTH: 204
<212> TYPE: RNA
<213> ORGANISM: Homo sapiens
<220> FEATURE:
<223> OTHER INFORMATION: 48

<400> SEQUENCE: 112
gugaaaauug caggcccaug gggaguuacu gauuuuuuca ucuccucccu ccacgggaga 60
cuuuauuuuc ugccaauggc uauugccauu agagggcaga gugaccccag agcugaguug 120
ggcagggggg uggacagaga ggagaggaca aggagggcaa uggagcauca guaccugccc 180
acagccuugg ucccuggggg cuag 204

<210> SEQ ID NO 113
<211> LENGTH: 72
<212> TYPE: RNA
<213> ORGANISM: Homo sapiens
<220> FEATURE:
<223> OTHER INFORMATION: 49

<400> SEQUENCE: 113
auguuaaugc cucaccccca aacccuuuuc ucucucacuc ucugccucca acuucagauu 60
gacuuucaau ag 72

<210> SEQ ID NO 114
<211> LENGTH: 174
<212> TYPE: RNA
<213> ORGANISM: Homo sapiens
<220> FEATURE:
<223> OTHER INFORMATION: 50

<400> SEQUENCE: 114
auguccuccc uucaguguuu ugugggccug aauuucauca cacugcauuu cagccauggu 60
caucaagccu guuugcuucu uuugggcaug uucacagauu cucuguuaag agcccccacc 120
accaagaagg uuagcaggcc aacagcucug acaucuaucu guagaugcca guag 174

<210> SEQ ID NO 115
<211> LENGTH: 141
<212> TYPE: RNA
<213> ORGANISM: Homo sapiens
<220> FEATURE:
<223> OTHER INFORMATION: 51

<400> SEQUENCE: 115
cugggcgucu ugcccuuguc ccccagagau gauacccucc cagcaagugg agaaguucuc 60
acuuccuucu uuagagcagc uaaaggggcu acccagauca ggguugaaga gaaaacucaa 120
uuaccagggu gggaagaaug a 141

<210> SEQ ID NO 116
<211> LENGTH: 201
<212> TYPE: RNA
<213> ORGANISM: Homo sapiens
<220> FEATURE:
<223> OTHER INFORMATION: 52

<400> SEQUENCE: 116
auggcuucuu ucggaaaggu cugguuggug uggcuccaau acuuugccac ccaugaacuc 60
agggugugcc cugggacacu gguuuuauau agucuuuugg cacaccugug uucuguugac 120
uucguucuuc aagcccaagu gcaagggaaa auguccaccu acuuucucau cuuggccucu 180
gccuccuuac uuagcucuua a 201

<210> SEQ ID NO 117
<211> LENGTH: 78
<212> TYPE: RNA
<213> ORGANISM: Homo sapiens
<220> FEATURE:
<223> OTHER INFORMATION: 53

<400> SEQUENCE: 117
cuguugaacu caagaaauca agggccaguc aucaagcugc ccauuuuaau ugauucacuc 60
uguuuguuga gaggauag 78

<210> SEQ ID NO 118
<211> LENGTH: 177
<212> TYPE: RNA
<213> ORGANISM: Homo sapiens
<220> FEATURE:
<223> OTHER INFORMATION: 54

<400> SEQUENCE: 118
uuggggUggg auagacaugu ucugguuuuc uuuauuauua cacaaucugg cucauguaca 60
ggaucacuuu uagcuguuuu aaacagaaaa aaauauccac cacucuuuuc aguuacacua 120
gguuacauuu uaauaggucc uuuacaucug uuuuggaaug auuuucaucu uuuguga 177

<210> SEQ ID NO 119
<211> LENGTH: 132
<212> TYPE: RNA
<213> ORGANISM: Homo sapiens
<220> FEATURE:
<223> OTHER INFORMATION: 55

<400> SEQUENCE: 119
uuggccauug auguucuagc caauguaauu gacagaaguc ucauuuugca ugcgcucugc 60
ucuacaaaca gaguugguau gguugguaua cuguacucac cugugaggga cuggccacuc 120
agacccacuu ag 132

<210> SEQ ID NO 120
<211> LENGTH: 84
<212> TYPE: RNA
<213> ORGANISM: Homo sapiens
<220> FEATURE:
<223> OTHER INFORMATION: 56

<400> SEQUENCE: 120
uuguccaggu ugaaaaauaa ugugcugaug cuagaguccc ucucugucca uacucuacuu 60
cuaaauacau auaggcauac auag 84

<210> SEQ ID NO 121
<211> LENGTH: 96
<212> TYPE: RNA
<213> ORGANISM: Homo sapiens
<220> FEATURE:
<223> OTHER INFORMATION: 57

<400> SEQUENCE: 121
cuggcagggc auaaaggccc aggccacuuc cucugccccu ucccagcccu gcaccaaagc 60
ugcauuucag gagacucucu ccagacagcc caguaa 96

<210> SEQ ID NO 122
<211> LENGTH: 66
<212> TYPE: RNA
<213> ORGANISM: Homo sapiens
<220> FEATURE:
<223> OTHER INFORMATION: 58

<400> SEQUENCE: 122
uugacccacu acaaggggug augggaauca ggaaugccaa agcaccagau caaauccaaa 60
acuuaa 66

<210> SEQ ID NO 123
<211> LENGTH: 210
<212> TYPE: RNA
<213> ORGANISM: Homo sapiens
<220> FEATURE:
<223> OTHER INFORMATION: 59

<400> SEQUENCE: 123
auguucaguu ucuuggaaaa ggaaguuucu accccugaug ccuuuguagg cagaucuguu 60
cucaccauua aucuuuuuga aaaucuuuua aagcaguuuu uaaaaagaga gaugaaagca 120
ucacauuaua uaaccaaaga uuacauugua ccugcuaaga uaccaaaauu cauaagggca 180
gggggggagc aagcauuagu gccucuuuga 210

<210> SEQ ID NO 124
<211> LENGTH: 75
<212> TYPE: RNA
<213> ORGANISM: Homo sapiens
<220> FEATURE:
<223> OTHER INFORMATION: 60

<400> SEQUENCE: 124
uugcugagca aauuguugaa gcuccaucau ugcaugguug gaaauggagc uguucuuagc 60
cacuguguuu gcuag 75

<210> SEQ ID NO 125

<211> LENGTH: 90
<212> TYPE: RNA
<213> ORGANISM: Homo sapiens
<220> FEATURE:
<223> OTHER INFORMATION: 61

<400> SEQUENCE: 125
uugaaauaca uuguaaauga auauuuguau ccauguuuca aaauugaaau auauauauau 60
auauauauau auauauauau auauauauag 90

<210> SEQ ID NO 126
<211> LENGTH: 60
<212> TYPE: RNA
<213> ORGANISM: Homo sapiens
<220> FEATURE:
<223> OTHER INFORMATION: 62

<400> SEQUENCE: 126
augcaguuuu guuuuggaag cucucucaga acaaacaaga caccuggauu gaucaguuaa 60

<210> SEQ ID NO 127
<211> LENGTH: 186
<212> TYPE: RNA
<213> ORGANISM: Homo sapiens
<220> FEATURE:
<223> OTHER INFORMATION: 63

<400> SEQUENCE: 127
uugaccagug gcccccuaau gggaccugag cuguuggaag aagagaacug uuccuugguc 60
uucaccaucc uugugagaga agggcaguuu ccugcauugg aaccuggagc aagcgcucua 120
ucuuucacac aaauucccuc accugagauu gaggugcucu uguuacuggg ugucugugug 180
cuguaa 186

<210> SEQ ID NO 128
<211> LENGTH: 114
<212> TYPE: RNA
<213> ORGANISM: Homo sapiens
<220> FEATURE:
<223> OTHER INFORMATION: 64

<400> SEQUENCE: 128
uugacaaaug aaaauguguu uuucucuguu aaaacuuguc agaguacuag aaguuguauc 60
ucuguaggug cagguccauu ucugcccaca gguagggugu uuuucuuuga uuaa 114

<210> SEQ ID NO 129
<211> LENGTH: 108
<212> TYPE: RNA
<213> ORGANISM: Homo sapiens
<220> FEATURE:
<223> OTHER INFORMATION: 65

<400> SEQUENCE: 129
augagaagcc uuagaauggg uggcccuugu gaccugaaac acuucccaca uaagcuacuu 60
aacaagauug ucauggagcu gcagauucca uugcccacca aagacuag 108

<210> SEQ ID NO 130
<211> LENGTH: 72
<212> TYPE: RNA
<213> ORGANISM: Homo sapiens
<220> FEATURE:
<223> OTHER INFORMATION: 66

<400> SEQUENCE: 130
augcuguuuc ucuggugguu cccucucugg cugcugccuc acaguauggg aaccuguacu 60
cugcagaggu ga 72

<210> SEQ ID NO 131
<211> LENGTH: 171
<212> TYPE: RNA
<213> ORGANISM: Homo sapiens
<220> FEATURE:
<223> OTHER INFORMATION: 67

<400> SEQUENCE: 131
cuguccuaca gugaagugcc ugggggguug uccuauccca uaagccacuu ggaugcugac 60
agcagccacc aucagaauga cccacgcaaa aaaaagaaaa aaaaaauuaa aaaguccccu 120
cacaacccag ugacaccuuu cugcuuuccu cuagacugga acauugauua g 171

<210> SEQ ID NO 132
<211> LENGTH: 66
<212> TYPE: RNA
<213> ORGANISM: Homo sapiens
<220> FEATURE:
<223> OTHER INFORMATION: 68

<400> SEQUENCE: 132
auggggcuca uuucucacgg uggcacuugg ccuccacugg gcagcaggac cagcuccaag 60
cgcuag 66

<210> SEQ ID NO 133
<211> LENGTH: 210
<212> TYPE: RNA
<213> ORGANISM: Homo sapiens
<220> FEATURE:
<223> OTHER INFORMATION: 69

<400> SEQUENCE: 133
auggcagaaa cuuguuuguu ggacuacaug ugugacuuug ggucugucuc ugccucugcu 60
uucagaaaug ucauccauug uguaaaaauau uggcuuacug gucugccagc uaaaacuugg 120
ccacaucccc uguuauggcu gcaggaucga guuauuguua acaaagagac ccaagaaaag 180
cugcuaaugu ccucuuauca uuguuguuaa 210

<210> SEQ ID NO 134
<211> LENGTH: 75
<212> TYPE: RNA
<213> ORGANISM: Homo sapiens
<220> FEATURE:
<223> OTHER INFORMATION: 70

<400> SEQUENCE: 134
cuguuucccc ccacucucuc uccaccuccu ccugccuucc ccaccccgag ugcggagcca 60
gagaucaaaa gauga 75

<210> SEQ ID NO 135
<211> LENGTH: 99
<212> TYPE: RNA
<213> ORGANISM: Homo sapiens
<220> FEATURE:
<223> OTHER INFORMATION: 71

<400> SEQUENCE: 135
guggacacug aauuuggaag guggaggauu uuguuuuuuu cuuuuaagau cugggcaucu 60
uuugaaucua cccuucaagu auuaagagac agacuguga 99

<210> SEQ ID NO 136
<211> LENGTH: 204
<212> TYPE: RNA
<213> ORGANISM: Homo sapiens
<220> FEATURE:
<223> OTHER INFORMATION: 72

<400> SEQUENCE: 136
auggcccagu gucaaguugu gcuuguuuac agcacuacuc ugugccagcc acacaaacgu 60
uuacuuaucu uaugccacgg gaaguuuaga gagcuaagau uaucugggga aaucaaaaca 120
aaaacaagca aacaaaaaaa aaaagcaaaa acaaaacaaa aaauaagcca aaaaaccuug 180
cuaguguuuu uuccucaaaa auaa 204

<210> SEQ ID NO 137
<211> LENGTH: 90
<212> TYPE: RNA
<213> ORGANISM: Homo sapiens
<220> FEATURE:
<223> OTHER INFORMATION: 73

<400> SEQUENCE: 137
uugacuuuca auaguuuuuc uaagaccuuu gaacugaaug uucucuucag ccaaaacuug 60
gcgacuucca cagaaaaguc ugaccacuga 90

<210> SEQ ID NO 138
<211> LENGTH: 72
<212> TYPE: RNA
<213> ORGANISM: Homo sapiens
<220> FEATURE:
<223> OTHER INFORMATION: 74

<400> SEQUENCE: 138
augaaguuuu cugccaaacu ccgugaagcc acaagcaccu uauguccucc cuucaguguu 60
uugugggccu ga 72

<210> SEQ ID NO 139
<211> LENGTH: 108
<212> TYPE: RNA
<213> ORGANISM: Homo sapiens
<220> FEATURE:
<223> OTHER INFORMATION: 75

<400> SEQUENCE: 139
cugcuggaga aaacuaaagc ugacagguuc ccuuuuuggg gugggauaga cauguucugg 60
uuuucuuuau uauuacacaa ucuggcucau guacaggauc acuuuuag 108

<210> SEQ ID NO 140
<211> LENGTH: 69
<212> TYPE: RNA
<213> ORGANISM: Homo sapiens
<220> FEATURE:
<223> OTHER INFORMATION: 76

<400> SEQUENCE: 140
augauuuuca ucuuuuguga uacacagauu gaauuauauc auuuucauau cucuccuugu 60
aaauacuag 69

<210> SEQ ID NO 141
<211> LENGTH: 78

<212> TYPE: RNA
<213> ORGANISM: Homo sapiens
<220> FEATURE:
<223> OTHER INFORMATION: 77

<400> SEQUENCE: 141
uugacagaag ucucauuuug caugcgcucu gcucuacaaa cagaguuggu augguuggua 60
uacuguacuc accuguga 78

<210> SEQ ID NO 142
<211> LENGTH: 87
<212> TYPE: RNA
<213> ORGANISM: Homo sapiens
<220> FEATURE:
<223> OTHER INFORMATION: 78

<400> SEQUENCE: 142
gugaggaaga gaaaaagaag gagcaccagg gagaaggcuc cgucugugcu gggcagcaga 60
cagcugccag gaucacgaac ucuguag 87

<210> SEQ ID NO 143
<211> LENGTH: 78
<212> TYPE: RNA
<213> ORGANISM: Homo sapiens
<220> FEATURE:
<223> OTHER INFORMATION: 79

<400> SEQUENCE: 143
cugacugucu acgaauuauc uugugccagu ugcccaggug agagggcacu gggccaaggg 60
agugguuuuc auguuuga 78

<210> SEQ ID NO 144
<211> LENGTH: 87
<212> TYPE: RNA
<213> ORGANISM: Homo sapiens
<220> FEATURE:
<223> OTHER INFORMATION: 80

<400> SEQUENCE: 144 uugugggguuu uuuuuucccu aauaauauac auguuuagaa gaauugaaaa uaauuucggg 60
aaaaugggau uaugggucc u ucacuaa 87

<210> SEQ ID NO 145
<211> LENGTH: 102
<212> TYPE: RNA
<213> ORGANISM: Homo sapiens
<220> FEATURE:
<223> OTHER INFORMATION: 81

<400> SEQUENCE: 145
uuggaaaugg agcuguucuu agccacugug uuugcuagug cccauguuag cuuaucugaa 60
gaugugaaac ccuugcugau aagggagcau uuaaaguacu ag 102

<210> SEQ ID NO 146
<211> LENGTH: 216
<212> TYPE: RNA
<213> ORGANISM: Homo sapiens
<220> FEATURE:
<223> OTHER INFORMATION: 82

<400> SEQUENCE: 146
augaauauuu guauccaugu uucaaaauug aaauauauau auauauauau auauauauau 60
auauauauau auagugugug ugugugucu gauagcuuua acuuucucug caucuuuaua 120
uuugguucca gaucacaccu gaugccaugu acuugugaga gaggaugcag uuuuguuuug 180
gaagcucucu cagaacaaac aagacaccug gauuga 216

<210> SEQ ID NO 147
<211> LENGTH: 69
<212> TYPE: RNA
<213> ORGANISM: Homo sapiens
<220> FEATURE:
<223> OTHER INFORMATION: 83

<400> SEQUENCE: 147
auggaacuga cugagauuua ccacagggaa ggcccaaacu uggggccaaa agccuaccca 60
agugauuga 69

<210> SEQ ID NO 148
<211> LENGTH: 120
<212> TYPE: RNA
<213> ORGANISM: Homo sapiens
<220> FEATURE:
<223> OTHER INFORMATION: 84

<400> SEQUENCE: 148
cugcauugga accuggagca agcgcucuau cuuucacaca aauucccuca ccugagauug 60
aggugcucuu guuacugggu gucugugugc uguaauucug guuuuggaua uguucuguaa 120

<210> SEQ ID NO 149
<211> LENGTH: 60
<212> TYPE: RNA
<213> ORGANISM: Homo sapiens
<220> FEATURE:
<223> OTHER INFORMATION: 85

<400> SEQUENCE: 149
augaaaaugu guuuuucucu guuaaaacuu gucagaguac uagaaguugu aucucuguag 60

<210> SEQ ID NO 150
<211> LENGTH: 96
<212> TYPE: RNA
<213> ORGANISM: Homo sapiens
<220> FEATURE:
<223> OTHER INFORMATION: 86

<400> SEQUENCE: 150
gugcaggucc auuucugccc acagguaggg uguuuuucuu ugauuaagag auugacacuu 60
cuguugccua ggaccuccca acucaaccau uucuag 96

<210> SEQ ID NO 151
<211> LENGTH: 243
<212> TYPE: RNA
<213> ORGANISM: Homo sapiens
<220> FEATURE:
<223> OTHER INFORMATION: 87

<400> SEQUENCE: 151
uugucaugga gcugcagauu ccauugccca ccaaagacua gaacacacac auauccauac 60
accaaaggaa agacaauucu gaaaugcugu uucucuggug guucccucuc uggcugcugc 120
cucacaguau gggaaccugu acucugcaga ggugacaggc cagauuugca uuaucucaca 180
accuuagccc uuggugcuaa cuguccuaca gugaagugcc ugggggguug uccuauccca 240
uaa 243

<210> SEQ ID NO 152
<211> LENGTH: 81
<212> TYPE: RNA
<213> ORGANISM: Homo sapiens
<220> FEATURE:
<223> OTHER INFORMATION: 88

<400> SEQUENCE: 152
augcugacag cagccaccau cagaaugacc cacgcaaaaa aaagaaaaaa aaaauuaaaa 60
aguccccuca caacccagug a 81

<210> SEQ ID NO 153
<211> LENGTH: 99
<212> TYPE: RNA
<213> ORGANISM: Homo sapiens
<220> FEATURE:
<223> OTHER INFORMATION: 89

<400> SEQUENCE: 153
uugauuaggg agugccucag acaugacauu cuugugcugu ccuuggaauu aaucuggcag 60
caggagggag cagacuaugu aaacagagau aaaaauuaa 99

<210> SEQ ID NO 154
<211> LENGTH: 81
<212> TYPE: RNA
<213> ORGANISM: Homo sapiens
<220> FEATURE:
<223> OTHER INFORMATION: 90

<400> SEQUENCE: 154
uugaaggaaa aaagaaauaa gaagagagag agaaagaaag caucacacaa agauuuucuu 60
aaaagaaaca auuuugcuug a 81

<210> SEQ ID NO 155
<211> LENGTH: 102
<212> TYPE: RNA
<213> ORGANISM: Homo sapiens
<220> FEATURE:
<223> OTHER INFORMATION: 91

<400> SEQUENCE: 155
guggcacuug gccuccacug ggcagcagga ccagcuccaa gcgcuagugu ucuguucucu 60
uuuuguaauc uuggaaucuu uuguugcucu aaauacaauu aa 102

<210> SEQ ID NO 156
<211> LENGTH: 90
<212> TYPE: RNA
<213> ORGANISM: Homo sapiens
<220> FEATURE:
<223> OTHER INFORMATION: 92

<400> SEQUENCE: 156
cuggucugcc agcuaaaacu uggccacauc cccuguuaug gcugcaggau cgaguuauug 60
uuaacaaaga gacccaagaa aagcugcuaa 90

<210> SEQ ID NO 157
<211> LENGTH: 60
<212> TYPE: RNA
<213> ORGANISM: Homo sapiens
<220> FEATURE:
<223> OTHER INFORMATION: 93

<400> SEQUENCE: 157
gugucacuau ggagcucuca cauguggaag cugcaagguc uucuucaaaa gagccgcuga 60

<210> SEQ ID NO 158
<211> LENGTH: 60
<212> TYPE: RNA
<213> ORGANISM: Homo sapiens
<220> FEATURE:
<223> OTHER INFORMATION: 94

<400> SEQUENCE: 158
cugccaggga ccauguuuug cccauugacu auuacuuucc accccagaag accugccuga 60

<210> SEQ ID NO 159
<211> LENGTH: 81
<212> TYPE: RNA
<213> ORGANISM: Homo sapiens
<220> FEATURE:
<223> OTHER INFORMATION: 95

<400> SEQUENCE: 159
guggagauga agcuucuggg ugucacuaug gagcucucac auguggaagc ugcaaggucu 60
ucuucaaaag agccgcugaa g 81

<210> SEQ ID NO 160
<211> LENGTH: 219
<212> TYPE: RNA
<213> ORGANISM: Homo sapiens
<220> FEATURE:
<223> OTHER INFORMATION: 96

<400> SEQUENCE: 160
uuggagacug ccagggacca uguuuugccc auugacuauu acuuuccacc ccagaagacc 60
ugccugaucu guggagauga agcuucuggg ugucacuaug gagcucucac auguggaagc 120
ugcaaggucu ucuucaaaag agccgcugaa guuuggagac ugccagggac cauguuuugc 180
ccauugacua uuacuuucca ccccagaaga ccugccuga 219

<210> SEQ ID NO 161
<211> LENGTH: 117
<212> TYPE: RNA
<213> ORGANISM: Homo sapiens
<220> FEATURE:
<223> OTHER INFORMATION: 97

<400> SEQUENCE: 161
guggagauga agcuucuggg ugucacuaug gagcucucac auguggaagc ugcaaggucu 60
ucuucaaaag agccgcugaa guuuggagac ugccagggac cauguuuugc ccauuga 117

<210> SEQ ID NO 162
<211> LENGTH: 171
<212> TYPE: RNA
<213> ORGANISM: Homo sapiens
<220> FEATURE:
<223> OTHER INFORMATION: 98

<400> SEQUENCE: 162
cugugcgcca gcagaaauga uugcacuauu gauaaauucc gaaggaaaaa uuguccaucu 60
ugucgucuuc ggaaauguua ugaagcaggg augacucugg gaguuuggag acugccaggg 120
accauguuuu gcccauugac uauuacuuuc caccccagaa gaccugccug a 171

<210> SEQ ID NO 163
<211> LENGTH: 267
<212> TYPE: RNA
<213> ORGANISM: Homo sapiens
<220> FEATURE:
<223> OTHER INFORMATION: 99

<400> SEQUENCE: 163
augcacaagu cccggaugua cagccagugu guccgaauga ggcaccucuc ucaagaguuu 60
ggauggcucc aaaucacccc ccaggaauuc cugugcauga aagcacugcu acucuucagc 120
auuagcuucc gcaacuuaca cguggacgac cagauggcug ucauucagua cuccuggaug 180
gggcucaugg uguuugccau gggcuggcga uccuucacca augucaacuc caggaugcuc 240
uacuucgccc cugaucuggu uuucaau 267

<210> SEQ ID NO 164
<211> LENGTH: 210
<212> TYPE: RNA
<213> ORGANISM: Homo sapiens
<220> FEATURE:
<223> OTHER INFORMATION: 100

<400> SEQUENCE: 164
uugcaugcaa aagaaaaaau cccacauccu gcucaagacg cuucuaccag cucaccaagc 60
uccuggacuc cgugcagccu gcuuccgcaa cuuacacgug gacgaccaga uggcugucau 120
ucaguacucc uggauggggc ucaugguguu ugccaugggc uggcgauccu ucaccaaugu 180
caacuccagg augcucuacu ucgccccuga 210

<210> SEQ ID NO 165
<211> LENGTH: 219
<212> TYPE: RNA
<213> ORGANISM: Homo sapiens
<220> FEATURE:
<223> OTHER INFORMATION: 101

<400> SEQUENCE: 165
augcaaaaga aaaaauccca cauccugcuc aagacgcuuc uaccagcuca ccaagcuccu 60
ggacuccgug cagccugcuu ccgcaacuua cacguggacg accagauggc ugucauucag 120
uacuccugga uggggcucau gguguuugcc augggcuggc gauccuucac caaugucaac 180
uccaggaugc ucuacuucgc cccugaucug guuuucaau 219

<210> SEQ ID NO 166
<211> LENGTH: 297
<212> TYPE: RNA
<213> ORGANISM: Homo sapiens
<220> FEATURE:
<223> OTHER INFORMATION: 102

<400> SEQUENCE: 166
guggaugggc ugaaaaauca aaaauucuuu gaugaacuuc gaaugaacua caucaaggaa 60
cucgaucgua ucauugcaug caaaagaaaa aaucccacau ccugcucaag acgcuucuac 120
cagcucacca agcuccugga cuccgugcag ccugcuuccg caacuuacac guggacgacc 180
agauggcugu cauucaguac uccuggaugg ggcucauggu guuugccaug ggcuggcgau 240
ccuucaccaa ugucaacucc aggaugcucu acuucgcccc ugaucugguu uucaaug 297

<210> SEQ ID NO 167
<211> LENGTH: 228
<212> TYPE: RNA

<213> ORGANISM: Homo sapiens
<220> FEATURE:
<223> OTHER INFORMATION: 1

<400> SEQUENCE: 167
gugguauguc acucagaaag aaucguaaug gguauauuga uaaauuuuaa aauugguaua 60
uuugaaauaa aguugaauau uauauauagu uaugugagug uuuauauaug ugugugguuua 120 uauuguuuau cuucucccua uggauuaaaa cugaauuuca uaauuauaag agguuauucu 180
gaaguggaaa aauuuaacuc aguauuaaau cuaaggagaa uggccuaa 228

<210> SEQ ID NO 168
<211> LENGTH: 186
<212> TYPE: RNA
<213> ORGANISM: Homo sapiens
<220> FEATURE:
<223> OTHER INFORMATION: 2

<400> SEQUENCE: 168
augucacuuc acacagaaga aaacaucagu augucagaga gcacacuggg gaauaugcac 60
aagauuaucc caagccagag gccucacggc cuaccuggcc agccugggcu gagaggauca 120
cuaucucagc acacuauuug ggaaauggau caaaucacac uuuuaguaaa uguuaucacu 180
cuauag 186

<210> SEQ ID NO 169
<211> LENGTH: 102
<212> TYPE: RNA
<213> ORGANISM: Homo sapiens
<220> FEATURE:
<223> OTHER INFORMATION: 3

<400> SEQUENCE: 169
augaacacuu gugaaccuaa uagccauaug aagaaaauaa cauuucuaau aucuuuggau 60
gccccaugua cuaaugacag uuaugcuuuu gcauuuucuu ga 102

<210> SEQ ID NO 170
<211> LENGTH: 69
<212> TYPE: RNA
<213> ORGANISM: Homo sapiens
<220> FEATURE:
<223> OTHER INFORMATION: 4

<400> SEQUENCE: 170
cugucauuau uuauaauuuu aucacacaug gcuguauccu uuacauguuu uggcauuaug 60
uauuuuuga 69

<210> SEQ ID NO 171
<211> LENGTH: 177
<212> TYPE: RNA
<213> ORGANISM: Homo sapiens
<220> FEATURE:
<223> OTHER INFORMATION: 5

<400> SEQUENCE: 171
uugacacuuc agaacucccc agaaacuugu cuucugggcc aauguguaaa gcuguuuaug 60
aagaaauguc aagccagagg ggcucuacua caaauuuggc aaaggacaau uucaggagaa 120
gcucuuggcc gcuggguucu ccuggccacc augaacuuca ggaagugggu gccauag 177

<210> SEQ ID NO 172
<211> LENGTH: 237

<212> TYPE: RNA
<213> ORGANISM: Homo sapiens
<220> FEATURE:
<223> OTHER INFORMATION: 6

<400> SEQUENCE: 172
cugggcacug guguagcucu guaugcccuc cgugucagau gcuggagaug ucauuugcau 60
ugccagaguu ugccaagggu gcacacagaa agcagauuga aaagcacccu cuuggaacau 120
cucuccaaug ccuucuacuc acaaaguuua acaucauuaa cacgugacaa agaagaacua 180
uuuaaugggc ccagaucuau uuaugaagac aaucaagugg gaguuuggag uggauaa 237

<210> SEQ ID NO 173
<211> LENGTH: 84
<212> TYPE: RNA
<213> ORGANISM: Homo sapiens
<220> FEATURE:
<223> OTHER INFORMATION: 7

<400> SEQUENCE: 173
augccccaug uacuaaugac aguuaugcuu uugcauuuuc uugaauuuua uguuuauuua 60
ucuuuccucu gucauuauuu auaa 84

<210> SEQ ID NO 174
<211> LENGTH: 105
<212> TYPE: RNA
<213> ORGANISM: Homo sapiens
<220> FEATURE:
<223> OTHER INFORMATION: 8

<400> SEQUENCE: 174
cuguauccuu uacauguuuu ggcauuaugu auuuuugaac uuuuuguaaa gacaaucaua 60
ccauguguaa uuuucaggga cuugauuuuu uucauugacu uuuaa 105

<210> SEQ ID NO 175
<211> LENGTH: 105
<212> TYPE: RNA
<213> ORGANISM: Homo sapiens
<220> FEATURE:
<223> OTHER INFORMATION: 9

<400> SEQUENCE: 175
auggugaauu uggagcagcc aaugaagagu ccccucacau uguggccucg cucaaaguua 60
agaagucgcu guaguguugc ccuugaagaa ucugcuucaa auuga 105

<210> SEQ ID NO 176
<211> LENGTH: 78
<212> TYPE: RNA
<213> ORGANISM: Homo sapiens
<220> FEATURE:
<223> OTHER INFORMATION: 10

<400> SEQUENCE: 176
augcccuccg ugucagaugc uggagauguc auuugcauug ccagaguuug ccaagggugc 60
acacagaaag cagauuga 78

<210> SEQ ID NO 177
<211> LENGTH: 96
<212> TYPE: RNA
<213> ORGANISM: Homo sapiens
<220> FEATURE:
<223> OTHER INFORMATION: 11

<400> SEQUENCE: 177
gugacaaaga agaacuauuu aaugggccca gaucuauuua ugaagacaau caagugggag 60
uuuggagugg auaacccaaa uuuggauaac ugguga 96

<210> SEQ ID NO 178
<211> LENGTH: 60
<212> TYPE: RNA
<213> ORGANISM: Homo sapiens
<220> FEATURE:
<223> OTHER INFORMATION: 12

<400> SEQUENCE: 178
uugaauuugu gugguauguc acucagaaag aaucguaaug gguauauuga uaaauuuuaa 60

<210> SEQ ID NO 179
<211> LENGTH: 75
<212> TYPE: RNA
<213> ORGANISM: Homo sapiens
<220> FEATURE:
<223> OTHER INFORMATION: 13

<400> SEQUENCE: 179
augugugugu uuauauuguu uaucuucucc cuauggauua aaacugaauu ucauaaauau 60
aagagguuau ucuga 75

<210> SEQ ID NO 180
<211> LENGTH: 108
<212> TYPE: RNA
<213> ORGANISM: Homo sapiens
<220> FEATURE:
<223> OTHER INFORMATION: 14

<400> SEQUENCE: 180
uugaauuuua uguuuauuua ucuuuccucu gucauuauuu auaauuuuau cacacauggc 60
uguauccuuu acauguuuug gcauuaugua uuuuugaacu uuuuguaa 108

<210> SEQ ID NO 181
<211> LENGTH: 87
<212> TYPE: RNA
<213> ORGANISM: Homo sapiens
<220> FEATURE:
<223> OTHER INFORMATION: 15

<400> SEQUENCE: 181
augaaauauu gucuaguaau auguaaagag aagucucaag aauaugugau gagcagaugu 60
aaggaauugc ucuugucucc augguga 87

<210> SEQ ID NO 182
<211> LENGTH: 216
<212> TYPE: RNA
<213> ORGANISM: Homo sapiens
<220> FEATURE:
<223> OTHER INFORMATION: 16

<400> SEQUENCE: 182
guguugcccu ugaagaaucu gcuucaaauu gacacuucag aacuccccag aaacuugucu 60
ucugggccaa uguguaaagc uguuuaugaa gaaaugucaa gccagagggg cucuacuaca 120
aauuuggcaa aggacaauuu caggagaagc ucuuggccgc uggguucucc uggccaccau 180
gaacuucagg aagugggugc cauagcagca gccuga 216

<210> SEQ ID NO 183
<211> LENGTH: 129
<212> TYPE: RNA
<213> ORGANISM: Homo sapiens
<220> FEATURE:
<223> OTHER INFORMATION: 17

<400> SEQUENCE: 183
augcuggaga ugucauuugc auugccagag uuugccaagg gugcacacag aaagcagauu 60
gaaaagcacc cucuuggaac aucucuccaa ugccuucuac ucacaaaguu uaacaucauu 120
aacacguga 129

<210> SEQ ID NO 184
<211> LENGTH: 165
<212> TYPE: RNA
<213> ORGANISM: Homo sapiens
<220> FEATURE:
<223> OTHER INFORMATION: 18

<400> SEQUENCE: 184
cugaauggug caggagaccc ucucacacca gguuacccag caaaugaaua ugcuuauagg 60
cguggaauug cagaggcugu uggucuucca aguauuccug uucauccaau uggauacuau 120
gaugcacaga agcuccuaga ggugguuuau aaaaauccucc aauga 165

<210> SEQ ID NO 185
<211> LENGTH: 129
<212> TYPE: RNA
<213> ORGANISM: Homo sapiens
<220> FEATURE:
<223> OTHER INFORMATION: 19

<400> SEQUENCE: 185
cugagaacau caagaaguuc uuauaggugg uuuauaaaau ccuccaauga agcuacuaac 60
auuacuccaa agcauaauau gaaagcauuu uuggaugaau ugaaagcuga gaacaucaag 120
aaguucuua 129

<210> SEQ ID NO 186
<211> LENGTH: 183
<212> TYPE: RNA
<213> ORGANISM: Homo sapiens
<220> FEATURE:
<223> OTHER INFORMATION: 20

<400> SEQUENCE: 186
uugaaccacc uccuccagga uaugaaaaug uuucggauau uguaccaccu uucagugcuu 60
ucucuccuca aggaaugcca gagauuuuca acacaucauu auuugaacca ccuccuccag 120
gauaugaaaa uguuucggau auuguaccac cuuucagugc uuucucuccu caaggaaugc 180
cag 183

<210> SEQ ID NO 187
<211> LENGTH: 66
<212> TYPE: RNA
<213> ORGANISM: Homo sapiens
<220> FEATURE:
<223> OTHER INFORMATION: 1

<400> SEQUENCE: 187
gugugcacac caaagcuauu ggagauuugc guggaaaucu cagauucuuc acuggugaga 60
caauga 66

<210> SEQ ID NO 188
<211> LENGTH: 150
<212> TYPE: RNA
<213> ORGANISM: Homo sapiens
<220> FEATURE:
<223> OTHER INFORMATION: 2

<400> SEQUENCE: 188
augguaugcc aacuuaagua uuuacagggu ggcccaaaua gaacaagaug cacucgcugu 60
gauuuuaaga caagcuguau aaacagaacu ccacugcaag aggggggcc gggccaggag 120 aaucuccgcu uguccaagac aggggccuaa 150

<210> SEQ ID NO 189
<211> LENGTH: 63
<212> TYPE: RNA
<213> ORGANISM: Homo sapiens
<220> FEATURE:
<223> OTHER INFORMATION: 3

<400> SEQUENCE: 189
augagcagag agcaaaggag aaaucuggcu guccuuccau uuucauucug uuaucucagg 60
uga 63

<210> SEQ ID NO 190
<211> LENGTH: 120
<212> TYPE: RNA
<213> ORGANISM: Homo sapiens
<220> FEATURE:
<223> OTHER INFORMATION: 4

<400> SEQUENCE: 190
uugggcucca cauugcaaug uucaaugcca cgugcugcug acaccgaccg gaguacuagc 60
cagcacaaaa ggcaggguag ccugaauugc uuucugcucu uuacauuucu uuuaaaauaa 120

<210> SEQ ID NO 191
<211> LENGTH: 123
<212> TYPE: RNA
<213> ORGANISM: Homo sapiens
<220> FEATURE:
<223> OTHER INFORMATION: 5

<400> SEQUENCE: 191
cugaguacuc uuucucuccc cuccucugaa uuuaauucuu ucaacuugca auuugcaagg 60
auuacacauu ucacugugau guauauugug uugcaaaaaa aaaaaaaaag ugucuuuguu 120
uaa 123

<210> SEQ ID NO 192
<211> LENGTH: 66
<212> TYPE: RNA
<213> ORGANISM: Homo sapiens
<220> FEATURE:
<223> OTHER INFORMATION: 6

<400> SEQUENCE: 192
cugacaggug aauuggaugg uucucagaac cauuucaccc agacagccug uuucuauccu 60
guuuaa 66

<210> SEQ ID NO 193
<211> LENGTH: 93
<212> TYPE: RNA
<213> ORGANISM: Homo sapiens

<220> FEATURE:
<223> OTHER INFORMATION: 7

<400> SEQUENCE: 193
cugaaaacac uucaggcgcc cuuccaaggc uuccccaaac cccuaagcag ccgcagaagc 60
gcucccgagc ugccuucucc cacacucagg uga 93

<210> SEQ ID NO 194
<211> LENGTH: 117
<212> TYPE: RNA
<213> ORGANISM: Homo sapiens
<220> FEATURE:
<223> OTHER INFORMATION: 8

<400> SEQUENCE: 194
cugccuuccc cagggugucu cuaugaaaag cacaaggggc caaggucagg gagcaagagg 60
ugugcacacc aaagcuauug gagauuugcg uggaaaucuc agauucuuca cugguga 117

<210> SEQ ID NO 195
<211> LENGTH: 129
<212> TYPE: RNA
<213> ORGANISM: Homo sapiens
<220> FEATURE:
<223> OTHER INFORMATION: 9

<400> SEQUENCE: 195
cuguuugaag ggagagaggg gaaaaucaag ugguauuuuc cagcacuuug uaugauuuug 60
gaugaguugu acacccaagg auucuguucu gcaacuccau ccuccugugu cacugaauau 120
caacucuga 129

<210> SEQ ID NO 196
<211> LENGTH: 255
<212> TYPE: RNA
<213> ORGANISM: Homo sapiens
<220> FEATURE:
<223> OTHER INFORMATION: 10

<400> SEQUENCE: 196
cuguuggccu uggaauaugg ccaaggcucu cucugucccu guaaaagaga ggggcaaaua 60
gagagucucc aagagaacgc ccucaugcuc agcacauauu ugcaugggag ggggagaugg 120
gugggaggag augaaaauau cagcuuuucu uauuccuuuu uauuccuuuu aaaaugguau 180
gccaacuuaa guauuuacag gguggcccaa auagaacaag augcacucgc ugugauuuua 240
agacaagcug uauaa 255

<210> SEQ ID NO 197
<211> LENGTH: 63
<212> TYPE: RNA
<213> ORGANISM: Homo sapiens
<220> FEATURE:
<223> OTHER INFORMATION: 11

<400> SEQUENCE: 197
cuggagaauu uagaaucaga aguuuccugg aguuuucagg cuaucauaua uacuguaucc 60
uga 63

<210> SEQ ID NO 198
<211> LENGTH: 72
<212> TYPE: RNA
<213> ORGANISM: Homo sapiens
<220> FEATURE:

<223> OTHER INFORMATION: 12

<400> SEQUENCE: 198
uugggggcag auucugaauu ggcuaaaaga caugcauuuu uaaaacuagc aacucuuauu 60
ucuuuccuuu aa 72

<210> SEQ ID NO 199
<211> LENGTH: 72
<212> TYPE: RNA
<213> ORGANISM: Homo sapiens
<220> FEATURE:
<223> OTHER INFORMATION: 13

<400> SEQUENCE: 199
uugagaaucu uugcaugcag aggagguaag agguauugga uuuucacaga ggaagaacac 60
agcgcagaau ga 72

<210> SEQ ID NO 200
<211> LENGTH: 90
<212> TYPE: RNA
<213> ORGANISM: Homo sapiens
<220> FEATURE:
<223> OTHER INFORMATION: 14

<400> SEQUENCE: 200
cuguccagug gagggcucau gggugggaca uggaaaagaa ggcagccuag gcccugggga 60
gcccagucca cugagcaagc aagggacuga 90

<210> SEQ ID NO 201
<211> LENGTH: 120
<212> TYPE: RNA
<213> ORGANISM: Homo sapiens
<220> FEATURE:
<223> OTHER INFORMATION: 15

<400> SEQUENCE: 201
gugagccuuu ugcaggaaaa ggcuaagaaa aaggaaaacc auucuaaaac acaacaagaa 60
acuguccaaa ugcuuuggga acuguguuua uugccuauaa ugggucccca aaaugggguaa 120

<210> SEQ ID NO 202
<211> LENGTH: 114
<212> TYPE: RNA
<213> ORGANISM: Homo sapiens
<220> FEATURE:
<223> OTHER INFORMATION: 16

<400> SEQUENCE: 202
uuggccaauu ucaccccauu uucugugguu ugggcuccac auugcaaugu ucaaugccac 60
gugcugcuga caccgaccgg aguacuagcc agcacaaaag gcaggguagc cuga 114

<210> SEQ ID NO 203
<211> LENGTH: 93
<212> TYPE: RNA
<213> ORGANISM: Homo sapiens
<220> FEATURE:
<223> OTHER INFORMATION: 17

<400> SEQUENCE: 203
uuguguugca aaaaaaaaaa aaaagugucu uuguuuaaaa uuacuugguu ugugaaucca 60
ucuugcuuuu uccccauugg aacuagucau uaa 93

<210> SEQ ID NO 204
<211> LENGTH: 126
<212> TYPE: RNA
<213> ORGANISM: Homo sapiens
<220> FEATURE:
<223> OTHER INFORMATION: 18

<400> SEQUENCE: 204
gugaauugga ugguucucag aaccauuuca cccagacagc cuguuucuau ccuguuuaau 60
aaauuaguuu ggguucucua caugcauaac aaacccugcu ccaaucuguc acauaaaagu 120
cuguga 126

<210> SEQ ID NO 205
<211> LENGTH: 210
<212> TYPE: RNA
<213> ORGANISM: Homo sapiens
<220> FEATURE:
<223> OTHER INFORMATION: 19

<400> SEQUENCE: 205
cugcgugggc agcuggagcc cagcuuuuug guaaugccag cucaggugac aaccauuaug 60
aucaaaaacu gccuucccca gggugucucu augaaaagca caaggggcca aggucaggga 120
gcaagaggug ugcacaccaa agcuauugga gauuugcgug gaaaucucag auucuucacu 180
ggugagacaa ugaaacaaca gagacaguga 210

<210> SEQ ID NO 206
<211> LENGTH: 69
<212> TYPE: RNA
<213> ORGANISM: Homo sapiens
<220> FEATURE:
<223> OTHER INFORMATION: 20

<400> SEQUENCE: 206
uugcuucugg cuaccuguuu gaaggggaga gagggaaaau caagugguau uuuccagcac 60
uuuguauga 69

<210> SEQ ID NO 207
<211> LENGTH: 69
<212> TYPE: RNA
<213> ORGANISM: Homo sapiens
<220> FEATURE:
<223> OTHER INFORMATION: 21

<400> SEQUENCE: 207
augggagggg gagaugggug ggaggagaug aaaauaucag cuuuucuuau uccuuuuuau 60
uccuuuuaa 69

<210> SEQ ID NO 208
<211> LENGTH: 123
<212> TYPE: RNA
<213> ORGANISM: Homo sapiens
<220> FEATURE:
<223> OTHER INFORMATION: 22

<400> SEQUENCE: 208
cuguauaaac agaacuccac ugcaagaggg ggggccgggc caggagaauc uccgcuuguc 60
caagacaggg gccuaaggag ggucuccaca cugcugcuag ggcuguugc auuuuuuuau 120 uag 123

<210> SEQ ID NO 209

<211> LENGTH: 108
<212> TYPE: RNA
<213> ORGANISM: Homo sapiens
<220> FEATURE:
<223> OTHER INFORMATION: 23

<400> SEQUENCE: 209
cuguauccug aaaggcaaca uaauucuucc uucccuccuu uuaaaauuuu guguuccuuu 60
uugcagcaau uacucacuaa agggcuucau uuuaguccag auuuuuag 108

<210> SEQ ID NO 210
<211> LENGTH: 87
<212> TYPE: RNA
<213> ORGANISM: Homo sapiens
<220> FEATURE:
<223> OTHER INFORMATION: 24

<400> SEQUENCE: 210
augccucgcu uauuuagccc gagaucuggu cuuuuuuuuu uuuuuuuuuu uuuuuuuucc 60
gucuccccaa agcuuuaucu gucuuga 87

<210> SEQ ID NO 211
<211> LENGTH: 174
<212> TYPE: RNA
<213> ORGANISM: Homo sapiens
<220> FEATURE:
<223> OTHER INFORMATION: 25

<400> SEQUENCE: 211
uugcaugcag aggagguaag agguauugga uuuucacaga ggaagaacac agcgcagaau 60
gaagggccag gcuuacugag cuguccagug gagggcucau gggugggaca uggaaaagaa 120
ggcagccuag gcccugggga gcccagucca cugagcaagc aagggacuga guga 174

<210> SEQ ID NO 212
<211> LENGTH: 96
<212> TYPE: RNA
<213> ORGANISM: Homo sapiens
<220> FEATURE:
<223> OTHER INFORMATION: 26

<400> SEQUENCE: 212
auggguaacc uagacuucag agagaaugag cagagagcaa aggagaaauc uggcuguccu 60
uccauuuuca uucuguuauc ucaggugagc ugguag 96

<210> SEQ ID NO 213
<211> LENGTH: 102
<212> TYPE: RNA
<213> ORGANISM: Homo sapiens
<220> FEATURE:
<223> OTHER INFORMATION: 27

<400> SEQUENCE: 213
uugaaguuua gucagcaccc ccaccaaacu uuauuuuucu auguguuuuu ugcaacauau 60
gaguguuuug aaaauaaagu acccaugucu uuauuagauu ua 102

<210> SEQ ID NO 214
<211> LENGTH: 663
<212> TYPE: RNA
<213> ORGANISM: Homo sapiens
<220> FEATURE:
<223> OTHER INFORMATION: 28

<400> SEQUENCE: 214

```
gugcgggccg ggcgggugca uucaggccaa ggcggggccg ccgggaugcu caggguuccg     60

gagccgcggc ccggggaggc gaaagcggag ggggccgcgc cgccgacccc guccaagccg    120

cucacguccu uccucaucca ggacauccug cgggacggcg cgcagcggca aggcggccgc    180

acgagcagcc agagacagcg cgacccggag ccggagccag agccagagcc agagggagga    240

cgcagccgcg ccggggcgca gaacgaccag cugagcaccg ggccccgcgc cgcgccggag    300

gaggccgaga cgcuggcaga gaccgagcca ggcggugcgg gccgggcggg ugcauucagg    360

ccaaggcggg gccgccggga ugcucagggu uccggagccg cggcccgggg aggcgaaagc    420

ggagggggcc gcgccgccga ccccguccaa gccgcucacg uccuuccuca uccaggacau    480

ccugcgggac ggcgcgcagc ggcaaggcgg ccgcacgagc agccagagac agcgcgaccc    540

ggagccggag ccagagccag agccagaggg aggacgcagc cgcgccgggg cgcagaacga    600

ccagcugagc accgggcccc gcgccgcgcc ggaggaggcc gagacgcugg cagagaccga    660

gcc                                                                  663
```

<210> SEQ ID NO 215
<211> LENGTH: 87
<212> TYPE: RNA
<213> ORGANISM: Homo sapiens
<220> FEATURE:
<223> OTHER INFORMATION: 1

<400> SEQUENCE: 215

```
cuggcucuca ccccucggag acgcucgccc gacagcauag uacuugccgc ccagccacgc     60

ccgcgcgcca gccaccaugc uagguaa                                         87
```

<210> SEQ ID NO 216
<211> LENGTH: 216
<212> TYPE: RNA
<213> ORGANISM: Homo sapiens
<220> FEATURE:
<223> OTHER INFORMATION: 2

<400> SEQUENCE: 216

```
gugccugggu gcgcuggccg aggcguaccc cuccaagccg gacaacccgg gcgaggacgc     60

accagcggag gacauggcca gauacuacuc ggcgcugcga cacuacauca accucaucac    120

caggcagaga uauggaaaac gauccagccc agagacacug auuucagacc ucuugaugag    180

agaaagcaca gaaaauguuc ccagaacucg gcuuga                              216
```

<210> SEQ ID NO 217
<211> LENGTH: 186
<212> TYPE: RNA
<213> ORGANISM: Homo sapiens
<220> FEATURE:
<223> OTHER INFORMATION: 3

<400> SEQUENCE: 217

```
guggugaugg gaaaugagac uugcucucug gccuuuuccu auuuucagcc cauauuucau     60

cguguaaaac gagaauccac ccauccuacc aaugcaugca gccacugugc ugaauucugc    120

aauguuuucc uuugucauca uuguauauau guguguuuaa auaaaguauc augcauucaa    180

aaguga                                                               186
```

<210> SEQ ID NO 218
<211> LENGTH: 69
<212> TYPE: RNA

<213> ORGANISM: Homo sapiens
<220> FEATURE:
<223> OTHER INFORMATION: 4

<400> SEQUENCE: 218
augcaugcag ccacugugcu gaauucugca auguuuuccu uugucaucau uguauauaug 60
uguguuuaa 69

<210> SEQ ID NO 219
<211> LENGTH: 153
<212> TYPE: RNA
<213> ORGANISM: Homo sapiens
<220> FEATURE:
<223> OTHER INFORMATION: 5

<400> SEQUENCE: 219
gugcgcuggc cgaggcguac cccuccaagc cggacaaccc gggcgaggac gcaccagcgg 60
aggacauggc cagauacuac ucggcgcugc gacacuacau caaccucauc accaggcaga 120
gauauggaaa acgauccagc ccagagacac uga 153

<210> SEQ ID NO 220
<211> LENGTH: 93
<212> TYPE: RNA
<213> ORGANISM: Homo sapiens
<220> FEATURE:
<223> OTHER INFORMATION: 6

<400> SEQUENCE: 220
uugcucucug gccuuuuccu auuuucagcc cauauuucau cguguaaaac gagaauccac 60
ccauccuacc aaugcaugca gccacugugc uga 93

<210> SEQ ID NO 221
<211> LENGTH: 132
<212> TYPE: RNA
<213> ORGANISM: Homo sapiens
<220> FEATURE:
<223> OTHER INFORMATION: 7

<400> SEQUENCE: 221
cugauuucag accucuugau gagagaaagc acagaaaaug uucccagaac ucgauaugga 60
aaacgaucca gcccagagac acugauuuca gaccucuuga ugagagaaag cacagaaaau 120
guucccagaa cu 132

<210> SEQ ID NO 222
<211> LENGTH: 315
<212> TYPE: RNA
<213> ORGANISM: Homo sapiens
<220> FEATURE:
<223> OTHER INFORMATION: 8

<400> SEQUENCE: 222
gugccugggu gcgcuggccg aggcguaccc cuccaagccg gacaacccgg gcgaggacgc 60
accagcggag gacauggcca gauacuacuc ggcgcugcga cacuacauca accucaucac 120
caggcagaga ugcuagguaa caagcgacug ggcuguccg gacugacccu cgcccugucc 180
cugcucgugu gccugggugc gcuggccgag gcguaccccu ccaagccgga caacccgggc 240
gaggacgcac cagcggagga cauggccaga uacuacucgg cgcugcgaca cuacaucaac 300
cucaucacca ggcag 315

<210> SEQ ID NO 223
<211> LENGTH: 174
<212> TYPE: RNA
<213> ORGANISM: Homo sapiens
<220> FEATURE:
<223> OTHER INFORMATION: 1

<400> SEQUENCE: 223
cugacuuccu cccagcacau uccugcacuc ugccgugucc acacugcccc acagacccag 60
uccuccaagc cugcugccag cucccugcaa gccccucagg uugggccuug ccacggugcc 120
agcaggcagc ccugggcugg ggguagggga cucccuacag gcacgcagcc cuga 174

<210> SEQ ID NO 224
<211> LENGTH: 81
<212> TYPE: RNA
<213> ORGANISM: Homo sapiens
<220> FEATURE:
<223> OTHER INFORMATION: 2

<400> SEQUENCE: 224
guggccucag cugcccacac cucuucccgg ccccugaagu uggcacugca gcagacagcu 60
cccugggcac caggcagcua a 81

<210> SEQ ID NO 225
<211> LENGTH: 150
<212> TYPE: RNA
<213> ORGANISM: Homo sapiens
<220> FEATURE:
<223> OTHER INFORMATION: 3

<400> SEQUENCE: 225
uugacaugcu guacccugag gacagcagcu gggcagccaa ggccccuggg gccagcaguc 60
gggaggagcc accugaggag ccugagcagu gcccggucau ugacagccaa gccccagcgg 120
gcagccugga cuuggugccc ggcgggcuga 150

<210> SEQ ID NO 226
<211> LENGTH: 186
<212> TYPE: RNA
<213> ORGANISM: Homo sapiens
<220> FEATURE:
<223> OTHER INFORMATION: 4

<400> SEQUENCE: 226
augugcagaa guggcuccug uggacagagc accaauaccg gcugcccccc augggcaagg 60
ccuuccagga gcuggcgggc aaggagcugu gcgccauguc ggaggagcag uuccgccagc 120
gcucgccccu gggugggau gugcugcacg cccaccugga caucuggaag ucagcggccu 180
ggauga 186

<210> SEQ ID NO 227
<211> LENGTH: 240
<212> TYPE: RNA
<213> ORGANISM: Homo sapiens
<220> FEATURE:
<223> OTHER INFORMATION: 5

<400> SEQUENCE: 227
cuggggcgau ucacuacugu gccucgacca gugaggagag cuggaccgac agcgaggugg 60
acucaucaug cuccgggcag cccauccacc uguggcaguu ccucaaggag uugcuacuca 120
agccccacag cuauggccgc uucauuaggu ggcucaacaa ggagaagggc aucuucaaaa 180
uugaggacuc agcccaggug gcccggcugu ggggcauccg caagaaccgu cccgccauga 240

<210> SEQ ID NO 228
<211> LENGTH: 69
<212> TYPE: RNA
<213> ORGANISM: Homo sapiens
<220> FEATURE:
<223> OTHER INFORMATION: 6

<400> SEQUENCE: 228
cuggcccagg gccugaaacc cgcccucagg ggccucucuc cugccugccc ugccucagcc 60
aggcccuga 69

<210> SEQ ID NO 229
<211> LENGTH: 207
<212> TYPE: RNA
<213> ORGANISM: Homo sapiens
<220> FEATURE:
<223> OTHER INFORMATION: 7

<400> SEQUENCE: 229
cugaccuucc agagcccaag gucagggagg ggcaaccaac ugccccaggg ggauaugggu 60
ccucuggggc cuucgggacc cuggggcagg ggugcuuccu ccucaggccc agcugcuccc 120
cuggaggaca gagggagaca gggcugcucc ccaacaccug ccucugaccc cagcauuucc 180
agagcagagc cuacagaagg gcaguga 207

<210> SEQ ID NO 230
<211> LENGTH: 84
<212> TYPE: RNA
<213> ORGANISM: Homo sapiens
<220> FEATURE:
<223> OTHER INFORMATION: 8

<400> SEQUENCE: 230
auggugcagg gagacaucug caccccugag uugggcagcc aggagugccc ccgggaaugg 60
auaauaaaga uacuagagaa cuga 84

<210> SEQ ID NO 231
<211> LENGTH: 315
<212> TYPE: RNA
<213> ORGANISM: Homo sapiens
<220> FEATURE:
<223> OTHER INFORMATION: 9

<400> SEQUENCE: 231
cugcacucug ccguguccac acugccccac agacccaguc cuccaagccu gcugccagcu 60
cccugcaagc cccucagguu gggccuugcc acggugccag caggcagccc ugggcugggg 120
guaggggacu cccuacaggc acgcagcccu gagaccucag agggccaccc cuugagggug 180
gccaggcccc caguggccaa ccugagugcu gccucugcca ccagcccugc uggccccugg 240
uuccgcuggc cccccagaug ccuggcugag acacgccagu ggccucagcu gcccacaccu 300
cuucccggcc ccuga 315

<210> SEQ ID NO 232
<211> LENGTH: 66
<212> TYPE: RNA
<213> ORGANISM: Homo sapiens
<220> FEATURE:
<223> OTHER INFORMATION: 10

<400> SEQUENCE: 232

```
cuggaguccc aguccacccg ccacgcccga gcagggccug uccgccuucu accucuccua     60

cuuuga                                                                66


<210> SEQ ID NO 233
<211> LENGTH: 285
<212> TYPE: RNA
<213> ORGANISM: Homo sapiens
<220> FEATURE:
<223> OTHER INFORMATION: 11

<400> SEQUENCE: 233

cugcaagcug cucaacauca ccgcagaucc cauggacugg agccccagca augugcagaa     60

guggcuccug uggacagagc accaauaccg gcugcccccc augggcaagg ccuuccagga    120

gcuggcgggc aaggagcugu gcgccauguc ggaggagcag uuccgccagc gcucgccccu    180

gggugggggau gugcugcacg cccaccugga caucuggaag ucagcggccu ggaugaaaga    240

gcggacuuca ccuggggcga uucacuacug ugccucgacc aguga                    285


<210> SEQ ID NO 234
<211> LENGTH: 108
<212> TYPE: RNA
<213> ORGANISM: Homo sapiens
<220> FEATURE:
<223> OTHER INFORMATION: 12

<400> SEQUENCE: 234

cuggaccgac agcgaggugg acucaucaug cuccgggcag cccauccacc uguggcaguu     60

ccucaaggag uugcuacuca agccccacag cuauggccgc uucauuag                 108


<210> SEQ ID NO 235
<211> LENGTH: 159
<212> TYPE: RNA
<213> ORGANISM: Homo sapiens
<220> FEATURE:
<223> OTHER INFORMATION: 13

<400> SEQUENCE: 235

guggggcauc cgcaagaacc gucccgccau gaacuacgac aagcugagcc gcuccauccg     60

ccaguauuac aagaagggca ucauccggaa gccagacauc ucccagcgcc ucgucuacca    120

guucgugcac cccaucugag ugccuggccc agggccuga                           159


<210> SEQ ID NO 236
<211> LENGTH: 66
<212> TYPE: RNA
<213> ORGANISM: Homo sapiens
<220> FEATURE:
<223> OTHER INFORMATION: 14

<400> SEQUENCE: 236

cugccugccc ugccucagcc aggcccugag augggggaaa acgggcaguc ugcucugcug     60

cucuga                                                                66


<210> SEQ ID NO 237
<211> LENGTH: 255
<212> TYPE: RNA
<213> ORGANISM: Homo sapiens
<220> FEATURE:
<223> OTHER INFORMATION: 15

<400> SEQUENCE: 237
```

gugcuuccuc cucaggccca gcugcucccc uggaggacag agggagacag ggcugcuccc 60
caacaccugc cucugacccc agcauuucca gagcagagcc uacagaaggg cagugacucg 120
acaaaggcca caggcagucc aggccucucu cugcuccauc ccccugccuc ccauucugca 180
ccacaccugg cauggugcag ggagacaucu gcaccccuga guugggcagc caggagugcc 240
cccgggaaug gauaa 255

<210> SEQ ID NO 238
<211> LENGTH: 150
<212> TYPE: RNA
<213> ORGANISM: Homo sapiens
<220> FEATURE:
<223> OTHER INFORMATION: 16

<400> SEQUENCE: 238
cugucugacu uccucccagc acauuccugc acucugccgu guccacacug ccccacagac 60
ccaguccucc aagccugcug ccagcucccu gcaagccccu cagguugggc cuugccacgg 120
ugccagcagg cagcccuggg cugggguag 150

<210> SEQ ID NO 239
<211> LENGTH: 273
<212> TYPE: RNA
<213> ORGANISM: Homo sapiens
<220> FEATURE:
<223> OTHER INFORMATION: 17

<400> SEQUENCE: 239
gugccuggcc cagggccuga aacccgcccu caggggccuc ucuccugccu gcccugccuc 60
agccaggccc ugagaugggg gaaaacgggc agucugcucu gcugcucuga ccuuccagag 120
cccaagguca gggaggggca accaacugcc ccagggggau augggucuc ugggggccuuc 180 gggacccugg ggcaggggug cuuccuccuc aggcccagcu gcucccccugg aggacagagg 240 gagacagggc ugcuccccaa caccugccuc uga 273

<210> SEQ ID NO 240
<211> LENGTH: 108
<212> TYPE: RNA
<213> ORGANISM: Homo sapiens
<220> FEATURE:
<223> OTHER INFORMATION: 18

<400> SEQUENCE: 240
gugacucgac aaaggccaca ggcaguccag gccucucucu gcuccauccc ccugccuccc 60
auucugcacc acaccuggca uggugcaggg agacaucugc accccuga 108

<210> SEQ ID NO 241
<211> LENGTH: 231
<212> TYPE: RNA
<213> ORGANISM: Homo sapiens
<220> FEATURE:
<223> OTHER INFORMATION: 1

<400> SEQUENCE: 241
cugacauucu ccacuucuug uuccccacug acagccuccc acccccaucu cucccucccc 60
ugccauuuug gguuuugggu cuuugaaccc uugcuugcaa uaggugugcg ucagaagcac 120
ccaggacuuc cauuugcuuu gucccggggc uccacugaac aaguuggccu gcacuggugu 180
uuuguugugg ggaggaggau ggggaguagg acauaccagc uuagauuuua a 231

<210> SEQ ID NO 242
<211> LENGTH: 78
<212> TYPE: RNA
<213> ORGANISM: Homo sapiens
<220> FEATURE:
<223> OTHER INFORMATION: 2

<400> SEQUENCE: 242
uugggcagcu gguuagguag agggaguugu caagucucug cuggcccagc caaacccugu 60
cugacaaccu cuuggug a 78

<210> SEQ ID NO 243
<211> LENGTH: 72
<212> TYPE: RNA
<213> ORGANISM: Homo sapiens
<220> FEATURE:
<223> OTHER INFORMATION: 3

<400> SEQUENCE: 243
augggauugg gguuuucccc ucccaugugc ucaagacugg cgcuaaaagu uuugagcuuc 60
ucaaaagucu ag 72

<210> SEQ ID NO 244
<211> LENGTH: 60
<212> TYPE: RNA
<213> ORGANISM: Homo sapiens
<220> FEATURE:
<223> OTHER INFORMATION: 4

<400> SEQUENCE: 244
uuguucccuc ucccuguugg ucggugggu u gguaguuucu acaguugggc agcugguuag 60

<210> SEQ ID NO 245
<211> LENGTH: 96
<212> TYPE: RNA
<213> ORGANISM: Homo sapiens
<220> FEATURE:
<223> OTHER INFORMATION: 5

<400> SEQUENCE: 245
cugacucaga cugacauucu ccacuucuug uuccccacug acagccuccc acccccaucu 60
cuccucuccc ugccauuuug gguuuugggu cuuuga 96

<210> SEQ ID NO 246
<211> LENGTH: 96
<212> TYPE: RNA
<213> ORGANISM: Homo sapiens
<220> FEATURE:
<223> OTHER INFORMATION: 6

<400> SEQUENCE: 246 cuguccccuca cuguugaauu uucucuaacu ucaaggccca uaucugugaa augcuggcau 60
uugcaccuac cucacagagu gcauugugag gguuaa 96

<210> SEQ ID NO 247
<211> LENGTH: 123
<212> TYPE: RNA
<213> ORGANISM: Homo sapiens
<220> FEATURE:
<223> OTHER INFORMATION: 7

<400> SEQUENCE: 247
cuggccuuga aaccaccuuu uauuacaugg ggucuagaac uugacccccu ugagggugcu 60
uguucccucu cccuguuggu cgguggguug guaguuucua caguugggca gcugguuagg 120
uag 123

<210> SEQ ID NO 248
<211> LENGTH: 66
<212> TYPE: RNA
<213> ORGANISM: Homo sapiens
<220> FEATURE:
<223> OTHER INFORMATION: 8

<400> SEQUENCE: 248
uugucaaguc ucugcuggcc cagccaaacc cugucugaca accucuuggu gaaccuuagu 60
accuaa 66

<210> SEQ ID NO 249
<211> LENGTH: 78
<212> TYPE: RNA
<213> ORGANISM: Homo sapiens
<220> FEATURE:
<223> OTHER INFORMATION: 9

<400> SEQUENCE: 249
cuggauccac caagacuugu uuuaugcuca gggucaauuu cuuuuuucuu uuuuuuuuuu 60
uuuuuucuuu uucuuuga 78

<210> SEQ ID NO 250
<211> LENGTH: 84
<212> TYPE: RNA
<213> ORGANISM: Homo sapiens
<220> FEATURE:
<223> OTHER INFORMATION: 10

<400> SEQUENCE: 250
guguugccca ggcuggucuc aaacuccugg gcucaggcga uccaccuguc ucagccuccc 60
agagugcugg gauuacaauu guga 84

<210> SEQ ID NO 251
<211> LENGTH: 75
<212> TYPE: RNA
<213> ORGANISM: Homo sapiens
<220> FEATURE:
<223> OTHER INFORMATION: 1

<400> SEQUENCE: 251
cuggaccggu cacggccacc ccacgcccca gucgaaagcu gcucaaccau cuccuuccac 60
agugcccaaa acuga 75

<210> SEQ ID NO 252
<211> LENGTH: 153
<212> TYPE: RNA
<213> ORGANISM: Homo sapiens
<220> FEATURE:
<223> OTHER INFORMATION: 2

<400> SEQUENCE: 252
uuggcaguuc cuccuggagc uccugucgga cagcuccaac uccagcugca ucaccuggga 60
aggcaccaac ggggaguuca agaugacgga ucccgacgag guggcccggc gcuggggaga 120
gcggaagagc aaacccaaca ugaacuacga uaa 153

<210> SEQ ID NO 253
<211> LENGTH: 198

<212> TYPE: RNA
<213> ORGANISM: Homo sapiens
<220> FEATURE:
<223> OTHER INFORMATION: 3

<400> SEQUENCE: 253
guggcccauc aacagacguu gauaugcaac ugcauggcau gugcuguuuu gguugaaauc 60
aaauacauuc cguuugaugg acagcuguca gcuuucucaa acugugaaga ugacccaaag 120
uuuccaacuc cuuuacagua uuaccgggac uaugaacuaa aaggugggac ugaggaugug 180
uauagaguga gcguguga 198

<210> SEQ ID NO 254
<211> LENGTH: 108
<212> TYPE: RNA
<213> ORGANISM: Homo sapiens
<220> FEATURE:
<223> OTHER INFORMATION: 4

<400> SEQUENCE: 254
cuggacucag gacauuuggg gacuguguac aaugaguuau ggagacucga ggguucaugc 60
agucaguguu auaccaaacc caguguuagg agaaaggaca cagcguaa 108

<210> SEQ ID NO 255
<211> LENGTH: 72
<212> TYPE: RNA
<213> ORGANISM: Homo sapiens
<220> FEATURE:
<223> OTHER INFORMATION: 5

<400> SEQUENCE: 255
auggccuucu uggcugccac aaucagaaau cacgcaggca uuuuggguag gcggccucca 60
guuuuccuuu ga 72

<210> SEQ ID NO 256
<211> LENGTH: 75
<212> TYPE: RNA
<213> ORGANISM: Homo sapiens
<220> FEATURE:
<223> OTHER INFORMATION: 6

<400> SEQUENCE: 256
augcuuaaug uuuacaauau gaaguuauua guucuuagaa ugcagaaugu auguaauaaa 60
auaagcuugg ccuag 75

<210> SEQ ID NO 257
<211> LENGTH: 72
<212> TYPE: RNA
<213> ORGANISM: Homo sapiens
<220> FEATURE:
<223> OTHER INFORMATION: 7

<400> SEQUENCE: 257
uugggauuca cuagcccuga gccugauguu gcuggcuauc ccuugaagac aauguuuauu 60
uccauaaucu ag 72

<210> SEQ ID NO 258
<211> LENGTH: 75
<212> TYPE: RNA
<213> ORGANISM: Homo sapiens
<220> FEATURE:
<223> OTHER INFORMATION: 8

<400> SEQUENCE: 258
auguuuucca uuagaucccu caacccucca cccccagucc agguuauuag caagucuuau 60
gagcaacugg gauaa 75

<210> SEQ ID NO 259
<211> LENGTH: 204
<212> TYPE: RNA
<213> ORGANISM: Homo sapiens
<220> FEATURE:
<223> OTHER INFORMATION: 9

<400> SEQUENCE: 259
guggcaccug caacccagga gcaggagccg gaggagcugc ccucugacag caggugcagc 60
agagauggcu acagcucagg agcugggaag gugauggggc acagggaaag cacagauguu 120
cugcagcgcc ccaaagugac ccauugccug gagaaagaga agaaaauauu uuuuaaaaag 180
cuaguuuauu uagcuucuca uuaa 204

<210> SEQ ID NO 260
<211> LENGTH: 168
<212> TYPE: RNA
<213> ORGANISM: Homo sapiens
<220> FEATURE:
<223> OTHER INFORMATION: 10

<400> SEQUENCE: 260
augaaucaaa agugccucaa gaggaaugaa aaaagcuuua cuggggcugg ggaaggaagc 60
cggggaagag auccaaagac ucuugggagg gaguuacuga agucuuacua cagaaaugag 120
gaggaugcua aaaaugucac gaauauggac auaucaucug uggacuga 168

<210> SEQ ID NO 261
<211> LENGTH: 120
<212> TYPE: RNA
<213> ORGANISM: Homo sapiens
<220> FEATURE:
<223> OTHER INFORMATION: 11

<400> SEQUENCE: 261
gugcuguuuu gguugaaauc aaauacauuc cguuugaugg acagcuguca gcuuucucaa 60
acugugaaga ugacccaaag uuuccaacuc cuuuacagua uuaccgggac uaugaacuaa 120

<210> SEQ ID NO 262
<211> LENGTH: 153
<212> TYPE: RNA
<213> ORGANISM: Homo sapiens
<220> FEATURE:
<223> OTHER INFORMATION: 12

<400> SEQUENCE: 262
cuguguacaa ugaguuaugg agacucgagg guucaugcag ucaguguuau accaaaccca 60
guguuaggag aaaggacaca gcguaaugga gaaaggggaa guaguagaau ucagaaacaa 120
aaaugcgcau cucuuucuuu guuugucaaa uga 153

<210> SEQ ID NO 263
<211> LENGTH: 174
<212> TYPE: RNA
<213> ORGANISM: Homo sapiens
<220> FEATURE:
<223> OTHER INFORMATION: 13

<400> SEQUENCE: 263
gugggggcuu uguucuccac agggucaggu aagagauggc cuucuuggcu gccacaauca 60
gaaaucacgc aggcauuuug gguaggcggc cuccaguuuu ccuuugaguc gcgaacgcug 120
ugcguuuguc agaaugaagu auacaaguca auguuuuucc cccuuuuuau auaa 174

<210> SEQ ID NO 264
<211> LENGTH: 156
<212> TYPE: RNA
<213> ORGANISM: Homo sapiens
<220> FEATURE:
<223> OTHER INFORMATION: 14

<400> SEQUENCE: 264
augaaaacau gugcugaaug uuguggauuu uguguuauaa uuuacuuugu ccaggaacuu 60
gugcaaggga gagccaagga aauaggaugu uuggcaccca aauggcguca gccucuccag 120
guccuucuug ccucccccucc ugucuuuuau uucuag 156

<210> SEQ ID NO 265
<211> LENGTH: 72
<212> TYPE: RNA
<213> ORGANISM: Homo sapiens
<220> FEATURE:
<223> OTHER INFORMATION: 15

<400> SEQUENCE: 265
uuggaacaga aggaccccgg guuucacauu ggagccucca uauuuaugcc uggaauggaa 60
agaggccuau ga 72

<210> SEQ ID NO 266
<211> LENGTH: 105
<212> TYPE: RNA
<213> ORGANISM: Homo sapiens
<220> FEATURE:
<223> OTHER INFORMATION: 16

<400> SEQUENCE: 266
gugaacaagc uaccacucgu aaggcaaacu guauuauuac uggcaaauaa agcgucaugg 60
auagcugcaa uuucucacuu uacagaaaca agggauaacg ucuag 105

<210> SEQ ID NO 267
<211> LENGTH: 78
<212> TYPE: RNA
<213> ORGANISM: Homo sapiens
<220> FEATURE:
<223> OTHER INFORMATION: 17

<400> SEQUENCE: 267
cugcuacauc agaguuaccu gggcacugug gcuugggauu cacuagcccu gagccugaug 60
uugcuggcua ucccuuga 78

<210> SEQ ID NO 268
<211> LENGTH: 87
<212> TYPE: RNA
<213> ORGANISM: Homo sapiens
<220> FEATURE:
<223> OTHER INFORMATION: 18

<400> SEQUENCE: 268
augcugccaa ccuuggucca ggugaaggca acucaaaagg ugaaaauaca aggugaccgu 60
gcgaaggcgc uagccgaaac aucuuag 87

<210> SEQ ID NO 269
<211> LENGTH: 63
<212> TYPE: RNA
<213> ORGANISM: Homo sapiens
<220> FEATURE:
<223> OTHER INFORMATION: 19

<400> SEQUENCE: 269
gugcugugga uguuuuggca gugggcuuug aagucggcag gacacgauua ccaaugcucc 60
uga 63

<210> SEQ ID NO 270
<211> LENGTH: 84
<212> TYPE: RNA
<213> ORGANISM: Homo sapiens
<220> FEATURE:
<223> OTHER INFORMATION: 20

<400> SEQUENCE: 270
gugucauuug gauuagacgg agcccaacca uccaucauuu ugcagcagcc ugggaaggcc 60
cacaaagugc ccguaucucc uuag 84

<210> SEQ ID NO 271
<211> LENGTH: 111
<212> TYPE: RNA
<213> ORGANISM: Homo sapiens
<220> FEATURE:
<223> OTHER INFORMATION: 21

<400> SEQUENCE: 271
augauuauca uauucaauuu uaacagaugu uuuccauuag aucccucaac ccuccacccc 60
caguccaggu uauuagcaag ucuuaugagc aacugggaua auuuuggaua a 111

<210> SEQ ID NO 272
<211> LENGTH: 81
<212> TYPE: RNA
<213> ORGANISM: Homo sapiens
<220> FEATURE:
<223> OTHER INFORMATION: 22

<400> SEQUENCE: 272
cuguacaauc uuacuccugc uggcaagaga uuugucuucu uuucuugucu ucaauuggcu 60
uucgggccuu guauguggua a 81

<210> SEQ ID NO 273
<211> LENGTH: 96
<212> TYPE: RNA
<213> ORGANISM: Homo sapiens
<220> FEATURE:
<223> OTHER INFORMATION: 23

<400> SEQUENCE: 273
auguggcacc ugcaacccag gagcaggagc cggaggagcu gcccucugac agcaggugca 60
gcagagaugg cuacagcuca ggagcuggga agguga 96

<210> SEQ ID NO 274
<211> LENGTH: 63
<212> TYPE: RNA
<213> ORGANISM: Homo sapiens
<220> FEATURE:
<223> OTHER INFORMATION: 24

<400> SEQUENCE: 274
gugaggacca gucguuguuu gagugugccu acggaacgcc acaccuggcu aagacagaga 60
uga 63

<210> SEQ ID NO 275
<211> LENGTH: 81
<212> TYPE: RNA
<213> ORGANISM: Homo sapiens
<220> FEATURE:
<223> OTHER INFORMATION: 25

<400> SEQUENCE: 275
auggcucaag gaacucuccu gaugaaugca guguggccaa aggcgggaag augguggca 60 gcccagacac cguugggaug a 81

<210> SEQ ID NO 276
<211> LENGTH: 66
<212> TYPE: RNA
<213> ORGANISM: Homo sapiens
<220> FEATURE:
<223> OTHER INFORMATION: 26

<400> SEQUENCE: 276
auggccuucc agacgucaac aucuuguuau uccagaacau cgaugggaag gaacugugca 60
agauga 66

<210> SEQ ID NO 277
<211> LENGTH: 213
<212> TYPE: RNA
<213> ORGANISM: Homo sapiens
<220> FEATURE:
<223> OTHER INFORMATION: 27

<400> SEQUENCE: 277
augcuagaaa cacagggggu gcagcuuuua uuuucccaaa uacuucagua uauccugaag 60
cuacgcaaag aauuacaacu aggccagauu uaccauauga gcccccccagg agaucagccu 120 ggaccgguca cggccacccc acgccccagu cgaaagcugc ucaaccaucu ccuuccacag 180
ugcccaaaac ugaagaccag cguccucagu uag 213

<210> SEQ ID NO 278
<211> LENGTH: 138
<212> TYPE: RNA
<213> ORGANISM: Homo sapiens
<220> FEATURE:
<223> OTHER INFORMATION: 28

<400> SEQUENCE: 278
uuggaccaac aaguagccgc cuugcaaauc caggcagugg ccagauccag cuuuggcagu 60
uccuccugga gcuccugucg gacagcucca acuccagcug caucaccugg gaaggcacca 120
acggggaguu caagauga 138

<210> SEQ ID NO 279
<211> LENGTH: 141
<212> TYPE: RNA
<213> ORGANISM: Homo sapiens
<220> FEATURE:
<223> OTHER INFORMATION: 29

<400> SEQUENCE: 279
augggaagcg cuacgccuac aaguucgacu uccacgggau cgcccaggcc cuccagcccc 60

```
acccccccgga gucaucucug uacaaguacc ccucagaccu cccguacaug ggcuccuauc    120

acgcccaccc acagaagaug a                                               141


<210> SEQ ID NO 280
<211> LENGTH: 177
<212> TYPE: RNA
<213> ORGANISM: Homo sapiens
<220> FEATURE:
<223> OTHER INFORMATION: 30

<400> SEQUENCE: 280

uugcugcccc aaacccauac uggaauucac caacuggggg uauauacccc aacacuaggc     60

uccccaccag ccauaugccu ucucaucugg gcacuuacua cuaaagaccu ggcggaggcu    120

uuucccauca gcgugcauuc accagcccau cgccacaaac ucuaucggag aacauga       177


<210> SEQ ID NO 281
<211> LENGTH: 75
<212> TYPE: RNA
<213> ORGANISM: Homo sapiens
<220> FEATURE:
<223> OTHER INFORMATION: 31

<400> SEQUENCE: 281

augaaaaaag cuuuacuggg gcuggggaag gaagccgggg aagagaucca aagacucuug     60

ggagggaguu acuga                                                      75


<210> SEQ ID NO 282
<211> LENGTH: 93
<212> TYPE: RNA
<213> ORGANISM: Homo sapiens
<220> FEATURE:
<223> OTHER INFORMATION: 32

<400> SEQUENCE: 282

augaggagga ugcuaaaaau gucacgaaua uggacauauc aucuguggac ugaccuugua     60

aaagacagug uauguagaag caugaagucu uaa                                  93


<210> SEQ ID NO 283
<211> LENGTH: 111
<212> TYPE: RNA
<213> ORGANISM: Homo sapiens
<220> FEATURE:
<223> OTHER INFORMATION: 33

<400> SEQUENCE: 283

cuguauuuaa aaauagaaac auaucaaaaa caagagaaaa gacacgagag agacuguggc     60

ccaucaacag acguugauau gcaacugcau ggcaugugcu guuuugguug a             111


<210> SEQ ID NO 284
<211> LENGTH: 126
<212> TYPE: RNA
<213> ORGANISM: Homo sapiens
<220> FEATURE:
<223> OTHER INFORMATION: 34

<400> SEQUENCE: 284

gugauuguag acagaggggu gaagaaggag gaggaagagg cagagaagga ggagaccagg     60

gcugggaaag aaacuucuca agcaaugaag acuggacuca ggacauuugg ggacugugua    120

caauga                                                               126
```

<210> SEQ ID NO 285
<211> LENGTH: 210
<212> TYPE: RNA
<213> ORGANISM: Homo sapiens
<220> FEATURE:
<223> OTHER INFORMATION: 35

<400> SEQUENCE: 285
auggagaaag gggaaguagu agaauucaga aacaaaaaug cgcaucucuu ucuuuguuug 60
ucaaaugaaa auuuuaacug gaauugucug auauuuaaga gaaacauuca ggaccucauc 120
auuaugaggg ggcuuuguuc uccacagggu cagguaagag auggccuucu uggcugccac 180
aaucagaaau cacgcaggca uuuuggguag 210

<210> SEQ ID NO 286
<211> LENGTH: 165
<212> TYPE: RNA
<213> ORGANISM: Homo sapiens
<220> FEATURE:
<223> OTHER INFORMATION: 36

<400> SEQUENCE: 286
uugagucgcg aacgcugugc guuugucaga augaaguaua caagucaaug uuuuuccccc 60
uuuuuauaua auaauuauau aacuuaugca uuuauacacu acgaguugau cucggccagc 120
caaagacaca cgacaaaaga gacaaucgau auaauguggc cuuga 165

<210> SEQ ID NO 287
<211> LENGTH: 135
<212> TYPE: RNA
<213> ORGANISM: Homo sapiens
<220> FEATURE:
<223> OTHER INFORMATION: 37

<400> SEQUENCE: 287
uugccucccc uccugucuuu uauuucuagc cccuuuugga acagaaggac cccggguuuc 60
acauuggagc cuccauauuu augccuggaa uggaaagagg ccuaugaagc ugggguuguc 120
auugagaaau ucuag 135

<210> SEQ ID NO 288
<211> LENGTH: 93
<212> TYPE: RNA
<213> ORGANISM: Homo sapiens
<220> FEATURE:
<223> OTHER INFORMATION: 38

<400> SEQUENCE: 288
cugcaauuuc ucacuuuaca gaaacaaggg auaacgucua gauuugcugc gggguuucuc 60
uuucaggagc ucucacuagg uagacagcuu uag 93

<210> SEQ ID NO 289
<211> LENGTH: 174
<212> TYPE: RNA
<213> ORGANISM: Homo sapiens
<220> FEATURE:
<223> OTHER INFORMATION: 39

<400> SEQUENCE: 289
cuggcaguua ggcugaccca aacugugcua auggaaaaga ucagucauuu uuauuuugga 60
augcaaaguc aagacacacc uacauucuuc auagaaauac acauuuacuu ggauaaucac 120
ucaguucucu cuucaagacu gucucaugag caagaucaua aaaacaagac auga 174

<210> SEQ ID NO 290
<211> LENGTH: 87
<212> TYPE: RNA
<213> ORGANISM: Homo sapiens
<220> FEATURE:
<223> OTHER INFORMATION: 40

<400> SEQUENCE: 290
uuggauaaca ugauaaauacu gaguuccuuc aaauacauaa uucuuaaauu guuucaaaau 60
ggcauuaacu cucuguuacu guuguaa 87

<210> SEQ ID NO 291
<211> LENGTH: 186
<212> TYPE: RNA
<213> ORGANISM: Homo sapiens
<220> FEATURE:
<223> OTHER INFORMATION: 41

<400> SEQUENCE: 291
uugcaugaac cuuuucucuc uguuuguccc ugucucuugg cuugcccuga uguauacuca 60
gacuccugua caaucuuacu ccugcuggca agagauuugu cuucuuuucu ugucuucaau 120
uggcuuucgg gccuuguaug ugguaaaauc accaaaucac agucaagacu guguuuuugu 180
uccuag 186

<210> SEQ ID NO 292
<211> LENGTH: 132
<212> TYPE: RNA
<213> ORGANISM: Homo sapiens
<220> FEATURE:
<223> OTHER INFORMATION: 42

<400> SEQUENCE: 292
augucccgga gggguucaca aagugcuuug ucaggacugc ugcaguuaga aggcucacug 60
cuucuccuaa gccuucugca cagauguggc accugcaacc caggagcagg agccggagga 120
gcugcccucu ga 132

<210> SEQ ID NO 293
<211> LENGTH: 123
<212> TYPE: RNA
<213> ORGANISM: Homo sapiens
<220> FEATURE:
<223> OTHER INFORMATION: 43

<400> SEQUENCE: 293
gugcagcaga gauggcuaca gcucaggagc ugggaaggug auggggcaca gggaaagcac 60
agauguucug cagcgcccca aagugaccca uugccuggag aaagagaaga aaauauuuuu 120
uaa 123

<210> SEQ ID NO 294
<211> LENGTH: 288
<212> TYPE: RNA
<213> ORGANISM: Homo sapiens
<220> FEATURE:
<223> OTHER INFORMATION: 44

<400> SEQUENCE: 294
augcagugug gccaaaggcg ggaagauggu gggcagccca gacaccguug ggaugaacua 60
cggcagcuac auggaggaga agcacaugcc acccccaaac augaccacga acgagcgcag 120
aguuaucgug ccagcaggaa cucuccugau gaaugcagug uggccaaagg cgggaagaug 180

```
gugggcagcc cagacaccgu ugggaugaac uacggcagcu acauggagga gaagcacaug    240

ccaccccccaa acaugaccac gaacgagcgc agaguuaucg ugccagca                288


<210> SEQ ID NO 295
<211> LENGTH: 201
<212> TYPE: RNA
<213> ORGANISM: Homo sapiens
<220> FEATURE:
<223> OTHER INFORMATION: 45

<400> SEQUENCE: 295

guggccaaag gcgggaagau ggugggcagc ccagacaccg uugggaugaa cuacggcagc     60

uacauggagg agaagcacau gccacccccca aacaugacca cgaacgagcg cagaguuauc    120

gugccagcag gaacucuccu gaugaaugca guguggccaa aggcgggaag auggugggca    180

gcccagacac cguugggaug a                                              201


<210> SEQ ID NO 296
<211> LENGTH: 396
<212> TYPE: RNA
<213> ORGANISM: Homo sapiens
<220> FEATURE:
<223> OTHER INFORMATION: 46

<400> SEQUENCE: 296

auggaguaca gaccaugugc ggcaguggcu ggagugggcg gugaaagaau auggccuucc     60

agacgucaac aucuuguuau uccagaacau cgaugggaag gaacugugca agaugaccaa    120

ggacgacuuc cagaggcuca cccccagcua caacgccgac auccuucucu cacaucucca    180

cuaccucaga gagaauccua cgcuauggag uacagaccau gugcggcagu ggcuggagug    240

ggcggugaaa gaauauggcc uuccagacgu caacaucuug uuauuccaga acaucgaugg    300

gaaggaacug ugcaagauga ccaaggacga cuuccagagg cucaccccca gcuacaacgc    360

cgacauccuu cucucacauc uccacuaccu cagaga                              396


<210> SEQ ID NO 297
<211> LENGTH: 381
<212> TYPE: RNA
<213> ORGANISM: Homo sapiens
<220> FEATURE:
<223> OTHER INFORMATION: 47

<400> SEQUENCE: 297

gugcggcagu ggcuggagug ggcggugaaa gaauauggcc uuccagacgu caacaucuug     60

uuauuccaga acaucgaugg gaaggaacug ugcaagauga ccaaggacga cuuccagagg    120

cucaccccca gcuacaacgc cgacauccuu cucucacauc uccacuaccu cagagagaau    180

ccuacgcuau ggaguacaga ccaugugcgg caguggcugg agugggcggu gaaagaauau    240

ggccuuccag acgucaacau cuuguuauuc cagaacaucg augggaagga acugugcaag    300

augaccaagg acgacuucca gaggcucacc cccagcuaca acgccgacau ccuucucuca    360

caucuccacu accucagaga g                                              381


<210> SEQ ID NO 298
<211> LENGTH: 147
<212> TYPE: RNA
<213> ORGANISM: Homo sapiens
<220> FEATURE:
<223> OTHER INFORMATION: 48
```

<400> SEQUENCE: 298
uugacuucag augauguuga uaaagccuua caaaacucuc cacgguuaau gcaugcuaga 60
aacacagcuc cucuuccaca uuugacuuca gaugauguug auaaagccuu acaaaacucu 120
ccacgguuaa ugcaugcuag aaacaca 147

<210> SEQ ID NO 299
<211> LENGTH: 141
<212> TYPE: RNA
<213> ORGANISM: Homo sapiens
<220> FEATURE:
<223> OTHER INFORMATION: 49

<400> SEQUENCE: 299
gugcagcuuu uauuuuccca aauacuucag uauauccuga agcuacgcaa agaauuacaa 60
cuaggccagg gggugcagcu uuuauuuucc caaauacuuc aguauauccu gaagcuacgc 120
aaagaauuac aacuaggcca g 141

<210> SEQ ID NO 300
<211> LENGTH: 58
<212> TYPE: PRT
<213> ORGANISM: Homo sapiens
<220> FEATURE:
<223> OTHER INFORMATION: 1

<400> SEQUENCE: 300

Leu Leu Gly Lys Glu Ile Ser Arg His Arg Cys Arg Pro Glu Cys Phe
1 5 10 15

Leu Asn Gly Val Ile Leu Ser Ser Leu Cys Pro Gly Glu Tyr Trp Pro
20 25 30

Cys Leu Glu Thr Tyr His Ser Ile Ser Leu Arg Thr Gln Ile Gly Trp
35 40 45

Gly Val Cys Val Ile Cys Gly Val Gln Arg
50 55

<210> SEQ ID NO 301
<211> LENGTH: 37
<212> TYPE: PRT
<213> ORGANISM: Homo sapiens
<220> FEATURE:
<223> OTHER INFORMATION: 2

<400> SEQUENCE: 301

Met Cys Pro Ala Arg Lys Ala Phe Pro Val His Gln Gly Gly Ala Leu
1 5 10 15

Pro Glu Val Asp Gln Gly His His Arg Gly Gln Pro Leu Ser Thr Pro
20 25 30

Ile Asn Pro Leu Leu
35

<210> SEQ ID NO 302
<211> LENGTH: 30
<212> TYPE: PRT
<213> ORGANISM: Homo sapiens
<220> FEATURE:
<223> OTHER INFORMATION: 3

<400> SEQUENCE: 302

Val Ser Val Leu Phe Val Gly Tyr Arg Asp Glu Arg Gly Val Gly Ser
1 5 10 15

Thr Leu Arg Glu Trp Arg Val Thr Cys Ala Gly His Cys Pro

```
            20                  25                  30


<210> SEQ ID NO 303
<211> LENGTH: 19
<212> TYPE: PRT
<213> ORGANISM: Homo sapiens
<220> FEATURE:
<223> OTHER INFORMATION: 4

<400> SEQUENCE: 303

Leu Ser Leu Gly Val Arg Ser Arg Val Ala Arg Lys Arg Asn Gln Gln
1               5                   10                  15

Thr Gln Val


<210> SEQ ID NO 304
<211> LENGTH: 52
<212> TYPE: PRT
<213> ORGANISM: Homo sapiens
<220> FEATURE:
<223> OTHER INFORMATION: 5

<400> SEQUENCE: 304

Val Phe Leu Lys Trp Cys Asn Phe Val Leu Ser Val Ser Trp Gly Ile
1               5                   10                  15

Leu Ala Met Pro Gly Asp Ile Ser Leu Asn Phe Ser Glu Asp Thr Asp
            20                  25                  30

Arg Met Gly Cys Leu Cys Tyr Leu Trp Gly Thr Glu Met Lys Glu Gly
        35                  40                  45

Trp Asp Pro His
    50


<210> SEQ ID NO 305
<211> LENGTH: 59
<212> TYPE: PRT
<213> ORGANISM: Homo sapiens
<220> FEATURE:
<223> OTHER INFORMATION: 6

<400> SEQUENCE: 305

Val Leu Asp Thr Val His Glu Ala Leu Ser Arg Ser Trp Arg His Asn
1               5                   10                  15

Ala Pro Asp Thr His Ser Lys Asp Gly Ala Glu Asn Ile Thr His Ser
            20                  25                  30

Val Leu Glu Ala Leu Gly Ser Leu Glu Lys Ala Val Ser Gln Gly Gly
        35                  40                  45

Arg Val Phe Leu Trp His Gly Met Gly Met Lys
    50                  55


<210> SEQ ID NO 306
<211> LENGTH: 26
<212> TYPE: PRT
<213> ORGANISM: Homo sapiens
<220> FEATURE:
<223> OTHER INFORMATION: 7

<400> SEQUENCE: 306

Leu Ser Pro Lys Leu Thr Thr Cys Thr Arg Arg Ala Val Ser Pro Cys
1               5                   10                  15

Gly Ser Arg Leu Ser Ser Ser Pro Cys Pro
            20                  25


<210> SEQ ID NO 307
```

<211> LENGTH: 106
<212> TYPE: PRT
<213> ORGANISM: Homo sapiens
<220> FEATURE:
<223> OTHER INFORMATION: 8

<400> SEQUENCE: 307

Val Leu His Pro Ser Ser Cys Leu Gly Leu Trp Glu Ala Gly Ser Ala
1 5 10 15

Arg Ser Ile Pro Asn Pro Gly Arg Cys Leu Trp Pro Leu Val Ala Gly
20 25 30

Gln Ser Ala Ala Val Phe Trp Cys Thr Pro Ser Gly Ser Ser Gln Leu
35 40 45

Pro Thr Ala Ser Gly Ser Ala Ala Pro Leu Ile Leu Ser Arg Ile Val
50 55 60

Gly Gly Trp Glu Cys Glu Lys His Ser Gln Pro Trp Gln Val Leu Val
65 70 75 80

Ala Ser Arg Gly Arg Ala Val Cys Gly Gly Val Leu Val His Pro Gln
85 90 95

Trp Val Leu Thr Ala Ala His Cys Ile Arg
100 105

<210> SEQ ID NO 308
<211> LENGTH: 94
<212> TYPE: PRT
<213> ORGANISM: Homo sapiens
<220> FEATURE:
<223> OTHER INFORMATION: 9

<400> SEQUENCE: 308

Leu Gly Val Arg Glu Ala Phe Pro Thr Leu Ala Gly Ala Cys Gly Leu
1 5 10 15

Ser Trp Gln Gly Ser Leu Arg Arg Cys Ser Gly Ala Pro Pro Val Gly
20 25 30

Pro His Ser Cys Pro Leu His Gln Glu Val Leu His Pro Ser Ser Cys
35 40 45

Leu Gly Leu Trp Glu Ala Gly Ser Ala Arg Ser Ile Pro Asn Pro Gly
50 55 60

Arg Cys Leu Trp Pro Leu Val Ala Gly Gln Ser Ala Ala Val Phe Trp
65 70 75 80

Cys Thr Pro Ser Gly Ser Ser Gln Leu Pro Thr Ala Ser Gly
85 90

<210> SEQ ID NO 309
<211> LENGTH: 29
<212> TYPE: PRT
<213> ORGANISM: Homo sapiens
<220> FEATURE:
<223> OTHER INFORMATION: 10

<400> SEQUENCE: 309

Val Leu Asp Ala Gly Gln Gly Ala Lys Ala Pro Ala Arg Leu Asp Pro
1 5 10 15

Lys Glu Thr Ser Val Cys Gly Pro Pro Cys Tyr Phe Gln
20 25

<210> SEQ ID NO 310
<211> LENGTH: 73
<212> TYPE: PRT
<213> ORGANISM: Homo sapiens
<220> FEATURE:

<223> OTHER INFORMATION: 11

<400> SEQUENCE: 310

```
Val Cys Ala Ser Ser Pro Ser Glu Gly Asp Gln Val His Ala Val Cys
1               5                   10                  15

Trp Thr Leu Asp Arg Gly Gln Lys His Leu Leu Val Leu Thr Pro Lys
            20                  25                  30

Lys Leu Gln Cys Val Asp Leu His Val Ile Ser Asn Asp Val Cys Ala
        35                  40                  45

Gln Val His Pro Gln Lys Val Thr Lys Phe Met Leu Cys Ala Gly Arg
    50                  55                  60

Trp Thr Gly Gly Lys Ser Thr Cys Ser
65                  70
```

<210> SEQ ID NO 311
<211> LENGTH: 37
<212> TYPE: PRT
<213> ORGANISM: Homo sapiens
<220> FEATURE:
<223> OTHER INFORMATION: 12

<400> SEQUENCE: 311

```
Met Cys Pro Ala Arg Lys Ala Phe Pro Val His Gln Gly Gly Ala Leu
1               5                   10                  15

Pro Glu Val Asp Gln Gly His His Arg Gly Gln Pro Leu Ser Thr Pro
            20                  25                  30

Ile Asn Pro Leu Leu
        35
```

<210> SEQ ID NO 312
<211> LENGTH: 85
<212> TYPE: PRT
<213> ORGANISM: Homo sapiens
<220> FEATURE:
<223> OTHER INFORMATION: 13

<400> SEQUENCE: 312

```
Leu Ile His Tyr Gly Gly Arg Cys Ile Glu Val Leu Gln Thr Thr Leu
1               5                   10                  15

Arg Phe Asp Asp Phe Leu Val Glu Leu Thr Glu Ile Lys Ser Cys Tyr
            20                  25                  30

Thr Val Gly Asp Ser Gly Gly Pro Leu Val Cys Asn Gly Val Leu Gln
        35                  40                  45

Gly Ile Thr Ser Trp Gly Ser Glu Pro Cys Ala Leu Pro Glu Arg Pro
    50                  55                  60

Ser Leu Tyr Thr Lys Val Val His Tyr Arg Lys Trp Ile Lys Asp Thr
65                  70                  75                  80

Ile Val Ala Asn Pro
                85
```

<210> SEQ ID NO 313
<211> LENGTH: 146
<212> TYPE: PRT
<213> ORGANISM: Homo sapiens
<220> FEATURE:
<223> OTHER INFORMATION: 14

<400> SEQUENCE: 313

```
Val Ile Leu Leu Gly Arg His Ser Leu Phe His Pro Glu Asp Thr Gly
1               5                   10                  15
```

```
Gln Val Phe Gln Val Ser His Ser Phe Pro His Pro Leu Tyr Asp Met
            20                  25                  30

Ser Leu Leu Lys Asn Arg Phe Leu Arg Pro Gly Asp Asp Ser Ser His
        35                  40                  45

Asp Leu Met Leu Leu Arg Leu Ser Glu Pro Ala Glu Leu Thr Asp Ala
    50                  55                  60

Val Lys Val Met Asp Leu Pro Thr Gln Glu Pro Ala Leu Gly Thr Thr
65                  70                  75                  80

Cys Tyr Ala Ser Gly Trp Gly Ser Ile Glu Pro Glu Glu Cys Ala Ala
                85                  90                  95

Pro Leu Ile Leu Ser Arg Ile Val Gly Gly Trp Glu Cys Glu Lys His
            100                 105                 110

Ser Gln Pro Trp Gln Val Leu Val Ala Ser Arg Gly Arg Ala Val Cys
        115                 120                 125

Gly Gly Val Leu Val His Pro Gln Trp Val Leu Thr Ala Ala His Cys
    130                 135                 140

Ile Arg
145


<210> SEQ ID NO 314
<211> LENGTH: 38
<212> TYPE: PRT
<213> ORGANISM: Homo sapiens
<220> FEATURE:
<223> OTHER INFORMATION: 15

<400> SEQUENCE: 314

Leu Ala Ser Glu Lys Gln Arg Gly Asp Leu Cys Gly Cys Ser Arg Gly
1               5                   10                  15

Arg Pro Gly Arg Ser Ala Trp Trp Glu Gly Pro Asp Asp Thr Glu Val
            20                  25                  30

Arg Asn Lys Lys Gly Cys
        35


<210> SEQ ID NO 315
<211> LENGTH: 49
<212> TYPE: PRT
<213> ORGANISM: Homo sapiens
<220> FEATURE:
<223> OTHER INFORMATION: 16

<400> SEQUENCE: 315

Val Pro Gly Pro Ala Cys Glu Gly Arg Thr Leu Glu Asn Glu Leu Met
1               5                   10                  15

Cys Ser Leu Lys Asp Gly Gln Glu Asn Arg Ser Cys Cys Gly Tyr Leu
            20                  25                  30

Phe Glu Arg Asp Tyr Arg Phe Glu Met Lys Ser Gln Ser Glu His Tyr
        35                  40                  45

Gln


<210> SEQ ID NO 316
<211> LENGTH: 28
<212> TYPE: PRT
<213> ORGANISM: Homo sapiens
<220> FEATURE:
<223> OTHER INFORMATION: 17

<400> SEQUENCE: 316

Met Glu Tyr Cys Asp Asp Met Arg Gln Pro Ser Trp Gly Gly Asp Asn
1               5                   10                  15
```

```
His Gly Ala Glu Gly Gln Asp Ser Gly Pro Ala Ala
            20                  25


<210> SEQ ID NO 317
<211> LENGTH: 20
<212> TYPE: PRT
<213> ORGANISM: Homo sapiens
<220> FEATURE:
<223> OTHER INFORMATION: 18

<400> SEQUENCE: 317

Leu Ile Ser Thr Val Pro Ser Gly Pro Asn Ile Leu His Ile Ser Ser
1               5                   10                  15

His Thr His Phe
            20


<210> SEQ ID NO 318
<211> LENGTH: 23
<212> TYPE: PRT
<213> ORGANISM: Homo sapiens
<220> FEATURE:
<223> OTHER INFORMATION: 19

<400> SEQUENCE: 318

Val Phe Trp Pro Arg Gly Ser Val Asn Arg Leu Gly Ser Ile Ser Arg
1               5                   10                  15

Ser Phe Gln Gly Tyr Thr Tyr
            20


<210> SEQ ID NO 319
<211> LENGTH: 46
<212> TYPE: PRT
<213> ORGANISM: Homo sapiens
<220> FEATURE:
<223> OTHER INFORMATION: 20

<400> SEQUENCE: 319

Val Pro Ile Leu Lys Thr Ser Lys Cys His Ser Ile Asn Ile Thr Gly
1               5                   10                  15

Leu Thr Phe Phe Phe Asn Leu Glu Glu Phe Asn Val Thr Cys Ser Tyr
            20                  25                  30

Gly Asn Leu Ile Thr Tyr Phe Val Phe Gln Cys Lys Asp Asp
        35                  40                  45


<210> SEQ ID NO 320
<211> LENGTH: 24
<212> TYPE: PRT
<213> ORGANISM: Homo sapiens
<220> FEATURE:
<223> OTHER INFORMATION: 21

<400> SEQUENCE: 320

Leu Asn Met Ser Gly Ile His Tyr Ser Phe Cys Leu Arg Ser Ser Ser
1               5                   10                  15

Leu Ser Leu Lys Ser Arg Met Met
            20


<210> SEQ ID NO 321
<211> LENGTH: 24
<212> TYPE: PRT
<213> ORGANISM: Homo sapiens
<220> FEATURE:
<223> OTHER INFORMATION: 22
```

<400> SEQUENCE: 321

Leu Ala Ile Lys Asn Leu Gln Arg Ala Thr Gln Asp Gln Leu Leu Arg
1 5 10 15

Ala Leu Cys Val Cys Val Cys Val
20

<210> SEQ ID NO 322
<211> LENGTH: 50
<212> TYPE: PRT
<213> ORGANISM: Homo sapiens
<220> FEATURE:
<223> OTHER INFORMATION: 23

<400> SEQUENCE: 322

Val Tyr Met Pro Lys Cys Ala Ser Leu Ser Leu Thr His Tyr Phe Arg
1 5 10 15

Leu Lys Asn Lys His Val Phe Lys Trp His Tyr Glu Leu Pro Met Met
20 25 30

Tyr His His His Ile Ser Leu Phe Ser Ser Lys Cys Asp Asn Asn Val
35 40 45

Ile Cys
50

<210> SEQ ID NO 323
<211> LENGTH: 26
<212> TYPE: PRT
<213> ORGANISM: Homo sapiens
<220> FEATURE:
<223> OTHER INFORMATION: 24

<400> SEQUENCE: 323

Leu Thr Ser Gln Lys Gln Leu Glu Met Asp Asn His Asn Met His Lys
1 5 10 15

Ser Asn Ser Tyr His Gln Leu His Thr Ala
20 25

<210> SEQ ID NO 324
<211> LENGTH: 55
<212> TYPE: PRT
<213> ORGANISM: Homo sapiens
<220> FEATURE:
<223> OTHER INFORMATION: 25

<400> SEQUENCE: 324

Leu Ser Cys His Arg Pro His Leu Cys Glu Pro Gln Pro Thr Ala Gly
1 5 10 15

Pro Asn Ala Cys Leu Arg Ser Leu Asn Gln Gly Asn Gln Cys His Glu
20 25 30

Leu Asn Ser Pro Ile Met Asp Ala Ser Phe Trp Pro Ser Leu Ala Leu
35 40 45

Leu Leu Thr His Ile Ser Phe
50 55

<210> SEQ ID NO 325
<211> LENGTH: 43
<212> TYPE: PRT
<213> ORGANISM: Homo sapiens
<220> FEATURE:
<223> OTHER INFORMATION: 26

<400> SEQUENCE: 325

Leu Leu Pro Arg Leu Leu Ser Phe Leu Gln His Ile Ala Tyr Gln Ser

```
1               5                   10                  15

Ser Leu Cys Ser Val Ala Leu Asp Phe Pro Thr Arg Ile Ser Thr Thr
            20                  25                  30

Leu Lys Ser Phe Leu Pro Ser Pro Pro Leu Thr
        35                  40


<210> SEQ ID NO 326
<211> LENGTH: 20
<212> TYPE: PRT
<213> ORGANISM: Homo sapiens
<220> FEATURE:
<223> OTHER INFORMATION: 27

<400> SEQUENCE: 326

Met Pro Arg Pro Leu Phe Leu Leu Ile Ser Asn Arg Cys Cys Leu Trp
1               5                   10                  15

Ala Ile Leu Leu
            20


<210> SEQ ID NO 327
<211> LENGTH: 59
<212> TYPE: PRT
<213> ORGANISM: Homo sapiens
<220> FEATURE:
<223> OTHER INFORMATION: 28

<400> SEQUENCE: 327

Met Asn Ile Arg Tyr Leu Lys Leu Lys Arg Phe Lys Ile Gln Leu Ile
1               5                   10                  15

Ile Phe Ser Phe Phe His Leu Pro Ala Pro Leu Pro Ile Leu Leu Ile
            20                  25                  30

Ala Leu Asn Ser Met Val Pro Asn Val Ala Met Gln Met Arg Asn Pro
        35                  40                  45

Val Ala Pro Cys Gly Thr Cys Met Gln Asp Cys
    50                  55


<210> SEQ ID NO 328
<211> LENGTH: 35
<212> TYPE: PRT
<213> ORGANISM: Homo sapiens
<220> FEATURE:
<223> OTHER INFORMATION: 29

<400> SEQUENCE: 328

Val Pro Arg Ser Trp His Gln Lys Asn Arg Gly Glu Ile Cys Val Ala
1               5                   10                  15

Ala Ala Glu Gly Asp Gln Glu Asp Leu His Gly Gly Lys Asp Leu Met
            20                  25                  30

Ile Gln Arg
        35


<210> SEQ ID NO 329
<211> LENGTH: 51
<212> TYPE: PRT
<213> ORGANISM: Homo sapiens
<220> FEATURE:
<223> OTHER INFORMATION: 30

<400> SEQUENCE: 329

Met Phe Leu His Ile Ser Ser Pro Phe Lys Tyr Pro His Thr Gln Glu
1               5                   10                  15

Ala Gln Lys Glu Ala Gln Arg Ser Leu Gly Glu Met Pro Gly Arg His
```

```
            20                  25                  30

Leu Gly Ser Ser Met Ser Leu Ala Leu Cys Leu Val Pro Leu Val Arg
        35                  40                  45

Glu Gly His
    50
```

<210> SEQ ID NO 330
<211> LENGTH: 20
<212> TYPE: PRT
<213> ORGANISM: Homo sapiens
<220> FEATURE:
<223> OTHER INFORMATION: 31

<400> SEQUENCE: 330

```
Met Gly Arg Lys Thr Asp Pro Val Val Asp Ile Tyr Leu Asn Gly Ile
1               5                   10                  15

Thr Asp Leu Lys
            20
```

<210> SEQ ID NO 331
<211> LENGTH: 30
<212> TYPE: PRT
<213> ORGANISM: Homo sapiens
<220> FEATURE:
<223> OTHER INFORMATION: 32

<400> SEQUENCE: 331

```
Val Ser Ile Thr Asn Glu Arg Lys Thr Asp Glu Lys Ile Leu Met Ala
1               5                   10                  15

Ser Gln Asp Met Gln Gln Thr Lys Trp Asn Thr Val Met Thr
            20                  25                  30
```

<210> SEQ ID NO 332
<211> LENGTH: 38
<212> TYPE: PRT
<213> ORGANISM: Homo sapiens
<220> FEATURE:
<223> OTHER INFORMATION: 33

<400> SEQUENCE: 332

```
Val Asn Tyr Leu Ile Asn Ile Ile Leu Ser Val Phe Ala His Thr Glu
1               5                   10                  15

Ile His Phe Pro Leu Leu Cys Pro Phe Ser Arg Pro Gln Asn Val Ile
            20                  25                  30

Pro Leu Ile Ser Gln Asp
        35
```

<210> SEQ ID NO 333
<211> LENGTH: 22
<212> TYPE: PRT
<213> ORGANISM: Homo sapiens
<220> FEATURE:
<223> OTHER INFORMATION: 34

<400> SEQUENCE: 333

```
Leu Phe Ser Ser Ala Lys Met Thr Lys Ser Phe Ile Pro Pro Leu Cys
1               5                   10                  15

Leu Ile Phe Phe Pro Val
            20
```

<210> SEQ ID NO 334
<211> LENGTH: 56
<212> TYPE: PRT

<213> ORGANISM: Homo sapiens
<220> FEATURE:
<223> OTHER INFORMATION: 35

<400> SEQUENCE: 334

Met Gln Glu Pro Gln Arg Glu Cys Leu Trp Gly Thr Phe Val Ser Leu
1               5                   10                  15

Gly Cys Glu Ala Lys Ala Gly Asn Leu Ile Val Ser Tyr Ile Ile Tyr
            20                  25                  30

Phe Ile Ser Leu Ser Leu Ser Gln Tyr Pro Thr Ser Phe Ser Gln Asn
        35                  40                  45

Ser Cys Ser Ala Asn Pro Gln Arg
    50                  55

<210> SEQ ID NO 335
<211> LENGTH: 38
<212> TYPE: PRT
<213> ORGANISM: Homo sapiens
<220> FEATURE:
<223> OTHER INFORMATION: 36

<400> SEQUENCE: 335

Val Gly Ser Leu Lys Gln Asn Thr Cys Ile Arg Ser Gln Leu Gly Leu
1               5                   10                  15

Cys Ile Arg Arg Phe Glu Lys Tyr Ser Ile Leu Ser Arg Ser Gln Asn
            20                  25                  30

Leu Asn Ser Leu Ile Phe
        35

<210> SEQ ID NO 336
<211> LENGTH: 39
<212> TYPE: PRT
<213> ORGANISM: Homo sapiens
<220> FEATURE:
<223> OTHER INFORMATION: 37

<400> SEQUENCE: 336

Leu Ser Leu Phe Val Phe Met Asp Ser Pro Ile Asn Asn Val Ile Phe
1               5                   10                  15

Glu Leu Met Leu Ile Gly Glu Asn Ile Arg Thr Leu Ser Asp Ile Asn
            20                  25                  30

Ile Arg Asp Ser Lys Lys Tyr
        35

<210> SEQ ID NO 337
<211> LENGTH: 22
<212> TYPE: PRT
<213> ORGANISM: Homo sapiens
<220> FEATURE:
<223> OTHER INFORMATION: 38

<400> SEQUENCE: 337

Leu Leu Leu Trp Thr Ser Pro Gln Glu Phe Gln Arg Leu Ser Ser Leu
1               5                   10                  15

Phe Phe His Pro His His
            20

<210> SEQ ID NO 338
<211> LENGTH: 28
<212> TYPE: PRT
<213> ORGANISM: Homo sapiens
<220> FEATURE:
<223> OTHER INFORMATION: 39

<400> SEQUENCE: 338

```
Val Val His Ala Cys Lys Thr Ala Glu Ala Arg Arg Met Thr Asp Tyr
1               5                   10                  15

Ala Ser Trp Val Glu Gly Thr Thr Pro Gly Pro Ser
            20                  25
```

<210> SEQ ID NO 339
<211> LENGTH: 20
<212> TYPE: PRT
<213> ORGANISM: Homo sapiens
<220> FEATURE:
<223> OTHER INFORMATION: 40

<400> SEQUENCE: 339

```
Leu Ser Gly Ala Arg Pro Glu Met Leu Pro Ala Phe Ser Val Leu Cys
1               5                   10                  15

Ile Ser Pro Phe
            20
```

<210> SEQ ID NO 340
<211> LENGTH: 51
<212> TYPE: PRT
<213> ORGANISM: Homo sapiens
<220> FEATURE:
<223> OTHER INFORMATION: 41

<400> SEQUENCE: 340

```
Leu Ala Tyr Tyr Ile Asn Phe Asp Ser Leu Leu Gln Leu Phe Leu Leu
1               5                   10                  15

Phe Tyr His Gln Ser Gly Phe Tyr Ser Leu Tyr Tyr Tyr Tyr Phe Leu
            20                  25                  30

Leu Leu Leu Tyr Tyr Val Val Ile Ile Leu Phe Ser Ile Val Ser Ile
        35                  40                  45

Tyr Leu Ile
    50
```

<210> SEQ ID NO 341
<211> LENGTH: 38
<212> TYPE: PRT
<213> ORGANISM: Homo sapiens
<220> FEATURE:
<223> OTHER INFORMATION: 42

<400> SEQUENCE: 341

```
Val Thr Cys Phe Cys Thr Phe Pro Ala Pro Leu Asn Ile His Thr His
1               5                   10                  15

Arg Lys His Lys Arg Lys His Arg Asp Pro Trp Glu Lys Cys Pro Ala
            20                  25                  30

Ala Ile Leu Gly His Arg
        35
```

<210> SEQ ID NO 342
<211> LENGTH: 25
<212> TYPE: PRT
<213> ORGANISM: Homo sapiens
<220> FEATURE:
<223> OTHER INFORMATION: 43

<400> SEQUENCE: 342

```
Val Thr Phe Leu His Cys Arg Ile Thr Leu Leu Ile Leu Phe Lys Asp
1               5                   10                  15
```

```
Pro Ser Cys Cys Cys Leu Ile Cys Ser
            20                  25


<210> SEQ ID NO 343
<211> LENGTH: 37
<212> TYPE: PRT
<213> ORGANISM: Homo sapiens
<220> FEATURE:
<223> OTHER INFORMATION: 44

<400> SEQUENCE: 343

Leu Phe Phe Leu Arg Ser Val Leu Ala Gln Gly Ile Cys Glu Gln Ala
1               5                   10                  15

Gly Lys His Leu Lys Ile Phe Pro Gly Leu Tyr Leu Leu Ala His Ser
            20                  25                  30

Met Ile Ile Thr Glu
        35


<210> SEQ ID NO 344
<211> LENGTH: 24
<212> TYPE: PRT
<213> ORGANISM: Homo sapiens
<220> FEATURE:
<223> OTHER INFORMATION: 45

<400> SEQUENCE: 344

Val Ser Leu Pro Ile Leu Lys Phe Ile Ser His Phe Cys Ala His Ser
1               5                   10                  15

Gln Asp Leu Lys Met Ser Phe His
            20


<210> SEQ ID NO 345
<211> LENGTH: 31
<212> TYPE: PRT
<213> ORGANISM: Homo sapiens
<220> FEATURE:
<223> OTHER INFORMATION: 46

<400> SEQUENCE: 345

Met Leu Ser Leu Val Leu Arg Leu Tyr Thr Ala Thr Ala Ser Pro His
1               5                   10                  15

Pro Ser Ser Leu Ile Cys His His His Gln Pro Leu Pro Cys Thr
            20                  25                  30


<210> SEQ ID NO 346
<211> LENGTH: 20
<212> TYPE: PRT
<213> ORGANISM: Homo sapiens
<220> FEATURE:
<223> OTHER INFORMATION: 47

<400> SEQUENCE: 346

Met Gln Arg Arg Asp Thr Tyr Glu Ile His His His Met Arg Gln Gln
1               5                   10                  15

Ile Leu Lys Val
            20


<210> SEQ ID NO 347
<211> LENGTH: 36
<212> TYPE: PRT
<213> ORGANISM: Homo sapiens
<220> FEATURE:
<223> OTHER INFORMATION: 48

<400> SEQUENCE: 347
```

```
Val Gln Ile Pro Lys Gly Asn Leu Tyr Pro Phe His Gly Glu Cys Ala
1               5                   10                  15

Leu Glu Phe Trp Gln Ile Ile Leu Val Thr Tyr Leu Asn Phe Glu Met
            20                  25                  30

Cys Leu Ser Leu
        35


<210> SEQ ID NO 348
<211> LENGTH: 24
<212> TYPE: PRT
<213> ORGANISM: Homo sapiens
<220> FEATURE:
<223> OTHER INFORMATION: 49

<400> SEQUENCE: 348

Val Cys Val Cys Val Cys Val Ser Val His Ala Lys Val Cys Leu Ser
1               5                   10                  15

Leu Phe Asp Pro Leu Phe Gln Thr
            20


<210> SEQ ID NO 349
<211> LENGTH: 43
<212> TYPE: PRT
<213> ORGANISM: Homo sapiens
<220> FEATURE:
<223> OTHER INFORMATION: 50

<400> SEQUENCE: 349

Leu Thr Tyr Ile Val Arg Ser Thr Ser His Leu Trp Val Leu Leu Ser
1               5                   10                  15

Lys Ile Leu Ala Leu Gly Leu Ser Trp Gly Cys Ala Ser Gly Gly Leu
            20                  25                  30

Arg Asn Ile Gln Phe Ser Ala Glu Ala Arg Ile
        35                  40


<210> SEQ ID NO 350
<211> LENGTH: 27
<212> TYPE: PRT
<213> ORGANISM: Homo sapiens
<220> FEATURE:
<223> OTHER INFORMATION: 51

<400> SEQUENCE: 350

Leu Glu Arg Ile Gln Thr Ala Gln Val Leu Ser Leu Met Ser Leu Asn
1               5                   10                  15

Phe Cys Pro Ser Leu Cys Ser Trp Ile Val Gln
            20                  25


<210> SEQ ID NO 351
<211> LENGTH: 35
<212> TYPE: PRT
<213> ORGANISM: Homo sapiens
<220> FEATURE:
<223> OTHER INFORMATION: 52

<400> SEQUENCE: 351

Val Ile Ser Thr Leu Gly Ile Gln Arg Asn Ile Arg Phe Lys Leu Thr
1               5                   10                  15

Leu Val Lys Arg Asn Gln Asp Thr Lys Asn Ser Glu Leu Ser Ser Ser
            20                  25                  30

Pro Ser Leu
        35
```

<210> SEQ ID NO 352
<211> LENGTH: 28
<212> TYPE: PRT
<213> ORGANISM: Homo sapiens
<220> FEATURE:
<223> OTHER INFORMATION: 53

<400> SEQUENCE: 352

```
Leu Leu Cys Cys Phe Gly Leu Pro His Lys Asn Phe Asn Asp Ser Gln
1               5                   10                  15

Val Phe Ser Ser Ile Pro Thr Thr Asn Leu Asn Ala
            20                  25
```

<210> SEQ ID NO 353
<211> LENGTH: 39
<212> TYPE: PRT
<213> ORGANISM: Homo sapiens
<220> FEATURE:
<223> OTHER INFORMATION: 54

<400> SEQUENCE: 353

```
Ile Thr Pro His Gly Trp Arg Gly Pro Leu Leu Gly Leu Arg Asp Cys
1               5                   10                  15

Gln Glu Gln Asp Leu Arg Cys Ser Leu Pro Ser Val Ser Ser Ala Ser
            20                  25                  30

Pro Leu Ser Asn Glu Asp Pro
        35
```

<210> SEQ ID NO 354
<211> LENGTH: 20
<212> TYPE: PRT
<213> ORGANISM: Homo sapiens
<220> FEATURE:
<223> OTHER INFORMATION: 55

<400> SEQUENCE: 354

```
Leu Leu His Leu Arg Ile Pro Ile Arg Asn Ser His Val Leu Ser Ala
1               5                   10                  15

Leu Ser Ile Phe
            20
```

<210> SEQ ID NO 355
<211> LENGTH: 46
<212> TYPE: PRT
<213> ORGANISM: Homo sapiens
<220> FEATURE:
<223> OTHER INFORMATION: 56

<400> SEQUENCE: 355

```
Val Ser Trp His Thr Ile Ser Thr Leu Ile Leu Cys Tyr Asn Phe Ser
1               5                   10                  15

Tyr Ser Phe Ile Thr Lys Val Ala Phe Ile Leu Phe Ile Ile Ile Ile
            20                  25                  30

Phe Phe Tyr Tyr Tyr Ile Thr Leu Leu Leu Phe Cys Ser Leu
        35                  40                  45
```

<210> SEQ ID NO 356
<211> LENGTH: 19
<212> TYPE: PRT
<213> ORGANISM: Homo sapiens
<220> FEATURE:
<223> OTHER INFORMATION: 57

<400> SEQUENCE: 356

Leu Leu Thr Phe Lys Ile Ser Asp Ser Gly Gly Gly Arg Thr Gly Glu
1 5 10 15

Gly Glu His

<210> SEQ ID NO 357
<211> LENGTH: 26
<212> TYPE: PRT
<213> ORGANISM: Homo sapiens
<220> FEATURE:
<223> OTHER INFORMATION: 58

<400> SEQUENCE: 357

Val Gln Gln Thr Thr Met Ala His Val Tyr Leu Cys Asn Lys Pro Thr
1 5 10 15

His Ser Ala His Val Ser Gln Asn Val Lys
20 25

<210> SEQ ID NO 358
<211> LENGTH: 23
<212> TYPE: PRT
<213> ORGANISM: Homo sapiens
<220> FEATURE:
<223> OTHER INFORMATION: 59

<400> SEQUENCE: 358

Val Gln Gln Arg Lys Thr Thr Asp Ile Ser Met Ala Gly Glu Leu Gln
1 5 10 15

His Ile Tyr Leu Val Phe Gln
20

<210> SEQ ID NO 359
<211> LENGTH: 39
<212> TYPE: PRT
<213> ORGANISM: Homo sapiens
<220> FEATURE:
<223> OTHER INFORMATION: 60

<400> SEQUENCE: 359

Val Ser Leu Leu Ser Asp Thr Gly Leu Asp His His Arg Arg His Phe
1 5 10 15

Leu Ser Thr Gln Cys Ser Lys Glu Arg Leu Gln Thr Ser Gln Trp Gln
20 25 30

Gly Asn Tyr Asn Thr Tyr Thr
35

<210> SEQ ID NO 360
<211> LENGTH: 27
<212> TYPE: PRT
<213> ORGANISM: Homo sapiens
<220> FEATURE:
<223> OTHER INFORMATION: 61

<400> SEQUENCE: 360

Val Thr Cys Phe Cys Thr Phe Pro Ala Pro Leu Asn Ile His Thr His
1 5 10 15

Arg Lys His Lys Arg Lys His Arg Gly Glu Lys
20 25

<210> SEQ ID NO 361
<211> LENGTH: 23
<212> TYPE: PRT
<213> ORGANISM: Homo sapiens

<220> FEATURE:
<223> OTHER INFORMATION: 62

<400> SEQUENCE: 361

```
Val Gln Gln Arg Lys Thr Thr Asp Ile Ser Met Ala Gly Glu Leu Gln
1               5                   10                  15

His Ile Tyr Leu Val Phe Gln
            20
```

<210> SEQ ID NO 362
<211> LENGTH: 29
<212> TYPE: PRT
<213> ORGANISM: Homo sapiens
<220> FEATURE:
<223> OTHER INFORMATION: 63

<400> SEQUENCE: 362

```
Met Phe Leu His Ile Ser Ser Pro Phe Lys Tyr Pro His Thr Gln Glu
1               5                   10                  15

Ala Gln Lys Glu Ala Gln Arg Asn Tyr Asn Thr Tyr Thr
            20                  25
```

<210> SEQ ID NO 363
<211> LENGTH: 41
<212> TYPE: PRT
<213> ORGANISM: Homo sapiens
<220> FEATURE:
<223> OTHER INFORMATION: 64

<400> SEQUENCE: 363

```
Val Thr Cys Phe Cys Thr Phe Pro Ala Pro Leu Asn Ile His Thr His
1               5                   10                  15

Arg Lys His Lys Arg Lys His Arg Gly Ile Thr Thr His Ile Leu Ser
            20                  25                  30

Val Ser Met Asn Thr Lys Ile Asn Lys
        35                  40
```

<210> SEQ ID NO 364
<211> LENGTH: 39
<212> TYPE: PRT
<213> ORGANISM: Homo sapiens
<220> FEATURE:
<223> OTHER INFORMATION: 1

<400> SEQUENCE: 364

```
Leu Pro Ser Pro Pro Arg Val Arg Ser Gln Arg Ser Lys Asp Glu Lys
1               5                   10                  15

Ala Val Arg Ser Ser Val Ala Lys Lys Gln Asn Lys Gln Lys Gln Lys
            20                  25                  30

Ser Arg Asn Lys Arg Lys Arg
        35
```

<210> SEQ ID NO 365
<211> LENGTH: 32
<212> TYPE: PRT
<213> ORGANISM: Homo sapiens
<220> FEATURE:
<223> OTHER INFORMATION: 2

<400> SEQUENCE: 365

```
Leu His Leu Leu Gln Trp Thr Leu Asn Leu Glu Gly Gly Gly Phe Cys
1               5                   10                  15

Phe Phe Leu Leu Arg Ser Gly His Leu Leu Asn Leu Pro Phe Lys Tyr
```

```
            20                  25                  30


<210> SEQ ID NO 366
<211> LENGTH: 44
<212> TYPE: PRT
<213> ORGANISM: Homo sapiens
<220> FEATURE:
<223> OTHER INFORMATION: 3

<400> SEQUENCE: 366

Val Ser Ser Ser Ala Arg Asp Phe Glu Ala Val Arg Ala Leu Phe Ala
1               5                   10                  15

Trp Leu Leu Pro Gln Val Ser Phe Ser Gly Ala Ser Arg Arg Trp Ala
            20                  25                  30

Ala Ser Cys Ser Asp Tyr Arg Ile Ile Thr Ala Cys
        35                  40


<210> SEQ ID NO 367
<211> LENGTH: 25
<212> TYPE: PRT
<213> ORGANISM: Homo sapiens
<220> FEATURE:
<223> OTHER INFORMATION: 4

<400> SEQUENCE: 367

Leu Ser Lys Arg Arg Gly Gly Gly Val Arg Glu Val Gly Gly Arg Phe
1               5                   10                  15

Ser Gln Ala Gln Gly Trp Lys Cys Ser
            20                  25


<210> SEQ ID NO 368
<211> LENGTH: 82
<212> TYPE: PRT
<213> ORGANISM: Homo sapiens
<220> FEATURE:
<223> OTHER INFORMATION: 5

<400> SEQUENCE: 368

Val Arg Met Val Leu Pro Lys Pro Ile Val Glu Ala Pro Gln Ala Thr
1               5                   10                  15

Trp Ser Trp Met Arg Asn Ser Asn Leu His Ser Arg Ser Arg Pro Trp
            20                  25                  30

Ser Ala Thr Pro Arg Glu Val Ala Ser Gln Ser Leu Glu Pro Pro Trp
        35                  40                  45

Pro Pro Ala Arg Gly Cys Arg Ser Ser Cys Gln His Leu Arg Thr Arg
    50                  55                  60

Met Thr Gln Leu Pro His Pro Arg Cys Pro Cys Trp Ala Pro Leu Ser
65                  70                  75                  80

Pro Ala


<210> SEQ ID NO 369
<211> LENGTH: 24
<212> TYPE: PRT
<213> ORGANISM: Homo sapiens
<220> FEATURE:
<223> OTHER INFORMATION: 6

<400> SEQUENCE: 369

Leu Thr Thr Pro Arg Ser Cys Val Arg Gln Cys Arg Cys Pro Trp Ala
1               5                   10                  15

Trp Val Trp Arg Arg Trp Ser Ile
            20
```

<210> SEQ ID NO 370
<211> LENGTH: 42
<212> TYPE: PRT
<213> ORGANISM: Homo sapiens
<220> FEATURE:
<223> OTHER INFORMATION: 7

<400> SEQUENCE: 370

```
Val Ser Lys Ala Lys Trp Ala Pro Gly Trp Ile Ala Thr Pro Asp Leu
1               5                   10                  15

Thr Gly Thr Cys Val Trp Arg Leu Pro Gly Thr Met Phe Cys Pro Leu
            20                  25                  30

Thr Ile Thr Phe His Pro Arg Arg Pro Ala
        35                  40
```

<210> SEQ ID NO 371
<211> LENGTH: 62
<212> TYPE: PRT
<213> ORGANISM: Homo sapiens
<220> FEATURE:
<223> OTHER INFORMATION: 8

<400> SEQUENCE: 371

```
Val Glu Met Lys Leu Leu Gly Val Thr Met Glu Leu Ser His Val Glu
1               5                   10                  15

Ala Ala Arg Ser Ser Ser Lys Glu Pro Leu Lys Gly Asn Arg Ser Thr
            20                  25                  30

Cys Ala Pro Ala Glu Met Ile Ala Leu Leu Ile Asn Ser Glu Gly Lys
        35                  40                  45

Ile Val His Leu Val Val Phe Gly Asn Val Met Lys Gln Gly
    50                  55                  60
```

<210> SEQ ID NO 372
<211> LENGTH: 39
<212> TYPE: PRT
<213> ORGANISM: Homo sapiens
<220> FEATURE:
<223> OTHER INFORMATION: 9

<400> SEQUENCE: 372

```
Leu His Ala Lys Glu Lys Ile Pro His Pro Ala Gln Asp Ala Ser Thr
1               5                   10                  15

Ser Ser Pro Ser Ser Trp Thr Pro Cys Ser Leu Leu Arg Glu Ser Cys
            20                  25                  30

Ile Ser Ser Leu Leu Thr Cys
        35
```

<210> SEQ ID NO 373
<211> LENGTH: 42
<212> TYPE: PRT
<213> ORGANISM: Homo sapiens
<220> FEATURE:
<223> OTHER INFORMATION: 10

<400> SEQUENCE: 373

```
Leu Cys Lys Cys Pro Arg Ser Phe Leu Gly Lys Ser Ser Pro Ser Ile
1               5                   10                  15

Ser Thr Pro Ser Glu Ala Leu Glu Thr Leu Phe Pro His Pro Ser Ser
            20                  25                  30

Cys Pro Leu Ser Asp Val Phe Cys Leu Leu
        35                  40
```

<210> SEQ ID NO 374
<211> LENGTH: 44
<212> TYPE: PRT
<213> ORGANISM: Homo sapiens
<220> FEATURE:
<223> OTHER INFORMATION: 11

<400> SEQUENCE: 374

```
Met Val Leu Tyr Ala Phe Lys Ser Val Met Ile Leu Ile Trp Pro Ser
1               5                   10                  15

Val Lys Leu Cys Leu Phe Thr Ala Leu Leu Cys Ala Ser His Thr Asn
            20                  25                  30

Val Tyr Leu Ser Tyr Ala Thr Gly Ser Leu Glu Ser
        35                  40
```

<210> SEQ ID NO 375
<211> LENGTH: 20
<212> TYPE: PRT
<213> ORGANISM: Homo sapiens
<220> FEATURE:
<223> OTHER INFORMATION: 12

<400> SEQUENCE: 375

```
Leu Gly Lys Ser Lys Gln Lys Gln Ala Asn Lys Lys Lys Lys Gln Lys
1               5                   10                  15

Gln Asn Lys Lys
            20
```

<210> SEQ ID NO 376
<211> LENGTH: 37
<212> TYPE: PRT
<213> ORGANISM: Homo sapiens
<220> FEATURE:
<223> OTHER INFORMATION: 13

<400> SEQUENCE: 376

```
Val Glu Gln Phe Ile Ile Leu Lys Met Cys Leu Leu Leu Lys Ile Cys
1               5                   10                  15

Leu His Val Asn Ala Ser Pro Pro Asn Pro Phe Leu Ser His Ser Leu
            20                  25                  30

Pro Pro Thr Ser Asp
        35
```

<210> SEQ ID NO 377
<211> LENGTH: 66
<212> TYPE: PRT
<213> ORGANISM: Homo sapiens
<220> FEATURE:
<223> OTHER INFORMATION: 14

<400> SEQUENCE: 377

```
Met Phe Ser Ser Ala Lys Thr Trp Arg Leu Pro Gln Lys Ser Leu Thr
1               5                   10                  15

Thr Glu Lys Lys Glu Ser Arg Asp Leu Thr Leu Cys Lys Ala Pro Phe
            20                  25                  30

Gly Ser Arg Ser Ala Phe Ser Cys Val Ser Gln Gly Gly Ala Gly Ala
        35                  40                  45

Arg Gly Glu Glu Asn Asp Ser Leu Ala Val Leu Leu Leu Arg Thr Leu
    50                  55                  60

Thr Glu
65
```

<210> SEQ ID NO 378
<211> LENGTH: 54
<212> TYPE: PRT
<213> ORGANISM: Homo sapiens
<220> FEATURE:
<223> OTHER INFORMATION: 15

<400> SEQUENCE: 378

```
Leu Pro Asn Ser Val Lys Pro Gln Ala Pro Tyr Val Leu Pro Ser Val
1               5                   10                  15

Phe Cys Gly Pro Glu Phe His His Thr Ala Phe Gln Pro Trp Ser Ser
            20                  25                  30

Ser Leu Phe Ala Ser Phe Gly His Val His Arg Phe Ser Val Lys Ser
        35                  40                  45

Pro His His Gln Glu Gly
    50
```

<210> SEQ ID NO 379
<211> LENGTH: 37
<212> TYPE: PRT
<213> ORGANISM: Homo sapiens
<220> FEATURE:
<223> OTHER INFORMATION: 16

<400> SEQUENCE: 379

```
Val Gly Arg Met Lys Ala Leu Glu Pro Glu Thr Leu Gln Met Leu Phe
1               5                   10                  15

Leu Ser Pro Ser Ile Ser Thr Cys Arg Ser His Glu Lys Arg Glu Gly
            20                  25                  30

Thr Lys Arg Arg Leu
        35
```

<210> SEQ ID NO 380
<211> LENGTH: 24
<212> TYPE: PRT
<213> ORGANISM: Homo sapiens
<220> FEATURE:
<223> OTHER INFORMATION: 17

<400> SEQUENCE: 380

```
Leu Thr Leu Pro Ile Leu Thr Gln Ile Pro His Leu Cys Cys Cys Leu
1               5                   10                  15

Leu Val Arg Gly Arg Pro Asn His
            20
```

<210> SEQ ID NO 381
<211> LENGTH: 23
<212> TYPE: PRT
<213> ORGANISM: Homo sapiens
<220> FEATURE:
<223> OTHER INFORMATION: 18

<400> SEQUENCE: 381

```
Met Ser Asn Met Pro Ile Gln Asp Cys Trp Arg Lys Leu Lys Leu Thr
1               5                   10                  15

Gly Ser Leu Phe Gly Val Gly
            20
```

<210> SEQ ID NO 382
<211> LENGTH: 35
<212> TYPE: PRT
<213> ORGANISM: Homo sapiens

```
<220> FEATURE:
<223> OTHER INFORMATION: 19

<400> SEQUENCE: 382

Met Tyr Arg Ile Thr Phe Ser Cys Phe Lys Gln Lys Lys Ile Ser Thr
1               5                   10                  15

Thr Leu Phe Ser Tyr Thr Arg Leu His Phe Asn Arg Ser Phe Thr Ser
            20                  25                  30

Val Leu Glu
        35


<210> SEQ ID NO 383
<211> LENGTH: 54
<212> TYPE: PRT
<213> ORGANISM: Homo sapiens
<220> FEATURE:
<223> OTHER INFORMATION: 20

<400> SEQUENCE: 383

Val Ile His Arg Leu Asn Tyr Ile Ile Phe Ile Ser Leu Leu Val Asn
1               5                   10                  15

Thr Arg Ser Ser Pro Leu His Phe Ser Ile Lys Phe Phe Ile Phe Met
            20                  25                  30

Gly Phe Pro Ile Val Thr Leu Val Phe Met Asn Ile Cys Phe Ser Phe
        35                  40                  45

Ala Lys Ala Lys Asn Gln
    50


<210> SEQ ID NO 384
<211> LENGTH: 28
<212> TYPE: PRT
<213> ORGANISM: Homo sapiens
<220> FEATURE:
<223> OTHER INFORMATION: 21

<400> SEQUENCE: 384

Met Thr Lys Leu Gly Lys Asn Ser Leu His Lys Pro Leu Gly Leu Leu
1               5                   10                  15

Phe Leu Cys Leu Gly Leu Ser Glu Gln Arg Arg Phe
            20                  25


<210> SEQ ID NO 385
<211> LENGTH: 55
<212> TYPE: PRT
<213> ORGANISM: Homo sapiens
<220> FEATURE:
<223> OTHER INFORMATION: 22

<400> SEQUENCE: 385

Leu Leu Tyr Lys Gln Ser Trp Tyr Gly Trp Tyr Thr Val Leu Thr Cys
1               5                   10                  15

Glu Gly Leu Ala Thr Gln Thr His Leu Ala Gly Glu Leu Glu Asp Glu
            20                  25                  30

Asp His Ser Leu Glu Lys Ser Gln Gly Pro Ser Pro Asn Lys Leu Ala
        35                  40                  45

Val Leu Asp Val Asp Glu Glu
    50                  55


<210> SEQ ID NO 386
<211> LENGTH: 37
<212> TYPE: PRT
<213> ORGANISM: Homo sapiens
```

<220> FEATURE:
<223> OTHER INFORMATION: 23

<400> SEQUENCE: 386

```
Leu Cys Trp Ala Ala Asp Ser Cys Gln Asp His Glu Leu Cys Ser Gln
1               5                   10                  15

Arg Lys Glu Ser Cys Gly Ser Phe Ser Ser Arg Ser Leu Gly Ser Ser
            20                  25                  30

Pro Arg Pro Ser Leu
        35
```

<210> SEQ ID NO 387
<211> LENGTH: 52
<212> TYPE: PRT
<213> ORGANISM: Homo sapiens
<220> FEATURE:
<223> OTHER INFORMATION: 24

<400> SEQUENCE: 387

```
Leu Arg Lys Gly Tyr Phe Glu Gly Leu Ser Tyr Ile Phe Glu Lys Arg
1               5                   10                  15

Lys Ser Val Ile His Ile Phe Leu Cys Met Phe Thr Gly Thr Lys Lys
            20                  25                  30

Tyr Arg Glu Leu His Ser Val Leu Trp Val Val Ala Glu Val Ile Val
        35                  40                  45

Gln Val Glu Lys
    50
```

<210> SEQ ID NO 388
<211> LENGTH: 36
<212> TYPE: PRT
<213> ORGANISM: Homo sapiens
<220> FEATURE:
<223> OTHER INFORMATION: 25

<400> SEQUENCE: 388

```
Leu Pro Leu Pro Ser Pro Ala Pro Lys Leu His Phe Arg Arg Leu Ser
1               5                   10                  15

Pro Asp Ser Pro Val Thr Thr Arg Ala Trp Pro Leu His Ser Pro Gly
            20                  25                  30

Lys Ile Arg Gly
        35
```

<210> SEQ ID NO 389
<211> LENGTH: 48
<212> TYPE: PRT
<213> ORGANISM: Homo sapiens
<220> FEATURE:
<223> OTHER INFORMATION: 26

<400> SEQUENCE: 389

```
Leu Ser Thr Asn Tyr Leu Val Pro Val Ala Gln Val Arg Gly His Trp
1               5                   10                  15

Ala Lys Gly Val Val Phe Met Phe Asp Pro Leu Gln Gly Val Met Gly
            20                  25                  30

Ile Arg Asn Ala Lys Ala Pro Asp Gln Ile Gln Asn Leu Lys Ser Lys
        35                  40                  45
```

<210> SEQ ID NO 390
<211> LENGTH: 22
<212> TYPE: PRT
<213> ORGANISM: Homo sapiens

<220> FEATURE:
<223> OTHER INFORMATION: 27

<400> SEQUENCE: 390

Val Cys Val Cys Val Leu Ile Ala Leu Thr Phe Ser Ala Ser Leu Tyr
1 5 10 15

Leu Val Pro Asp His Thr
20

<210> SEQ ID NO 391
<211> LENGTH: 32
<212> TYPE: PRT
<213> ORGANISM: Homo sapiens
<220> FEATURE:
<223> OTHER INFORMATION: 28

<400> SEQUENCE: 391

Val Arg Glu Asp Ala Val Leu Phe Trp Lys Leu Ser Gln Asn Lys Gln
1 5 10 15

Asp Thr Trp Ile Asp Gln Leu Thr Lys Ser Phe Leu Pro Tyr Trp Val
20 25 30

<210> SEQ ID NO 392
<211> LENGTH: 33
<212> TYPE: PRT
<213> ORGANISM: Homo sapiens
<220> FEATURE:
<223> OTHER INFORMATION: 29

<400> SEQUENCE: 392

Val Lys Glu Gln Arg Asp Lys Lys Ser Arg Gly His Asp Thr Leu Tyr
1 5 10 15

Phe Thr Ser Ser Arg Gln Met Asn Val Glu Ser Ile Lys Thr Gln Trp
20 25 30

Asn

<210> SEQ ID NO 393
<211> LENGTH: 27
<212> TYPE: PRT
<213> ORGANISM: Homo sapiens
<220> FEATURE:
<223> OTHER INFORMATION: 30

<400> SEQUENCE: 393

Leu Arg Phe Thr Thr Gly Lys Ala Gln Thr Trp Gly Gln Lys Pro Thr
1 5 10 15

Gln Val Ile Asp Gln Trp Pro Pro Asn Gly Thr
20 25

<210> SEQ ID NO 394
<211> LENGTH: 32
<212> TYPE: PRT
<213> ORGANISM: Homo sapiens
<220> FEATURE:
<223> OTHER INFORMATION: 31

<400> SEQUENCE: 394

Leu Phe Leu Gly Leu His His Pro Cys Glu Arg Arg Ala Val Ser Cys
1 5 10 15

Ile Gly Thr Trp Ser Lys Arg Ser Ile Phe His Thr Asn Ser Leu Thr
20 25 30

<210> SEQ ID NO 395

<211> LENGTH: 19
<212> TYPE: PRT
<213> ORGANISM: Homo sapiens
<220> FEATURE:
<223> OTHER INFORMATION: 32

<400> SEQUENCE: 395

Leu Ile Pro Ile Gln Tyr Ser Lys Val Leu Gly Phe Phe Leu Ser Pro
1 5 10 15

Pro Val Ser

<210> SEQ ID NO 396
<211> LENGTH: 30
<212> TYPE: PRT
<213> ORGANISM: Homo sapiens
<220> FEATURE:
<223> OTHER INFORMATION: 33

<400> SEQUENCE: 396

Leu Val Val Pro Ser Leu Ala Ala Ala Ser Gln Tyr Gly Asn Leu Tyr
1 5 10 15

Ser Ala Glu Val Thr Gly Gln Ile Cys Ile Ile Ser Gln Pro
20 25 30

<210> SEQ ID NO 397
<211> LENGTH: 58
<212> TYPE: PRT
<213> ORGANISM: Homo sapiens
<220> FEATURE:
<223> OTHER INFORMATION: 34

<400> SEQUENCE: 397

Leu Leu Glu Ile Ser Leu Asp Gly Ala His Phe Ser Arg Trp His Leu
1 5 10 15

Ala Ser Thr Gly Gln Gln Asp Gln Leu Gln Ala Leu Val Phe Cys Ser
20 25 30

Leu Phe Val Ile Leu Glu Ser Phe Val Ala Leu Asn Thr Ile Lys Asn
35 40 45

Gly Arg Asn Leu Phe Val Gly Leu His Val
50 55

<210> SEQ ID NO 398
<211> LENGTH: 58
<212> TYPE: PRT
<213> ORGANISM: Homo sapiens
<220> FEATURE:
<223> OTHER INFORMATION: 35

<400> SEQUENCE: 398

Val Ser Leu Ala Gly Gln Ile Leu Ser Thr Val Cys Leu Leu Leu His
1 5 10 15

Glu Thr Leu Arg Leu Ser Glu Arg Phe Leu Arg Gly Cys Ser Arg Lys
20 25 30

Phe Pro Ser Leu Glu Leu Pro Ala Gly Gly Gln Leu Ala Ala Ala Thr
35 40 45

Thr Ala Ser Ser Gln Pro Val Glu Leu Phe
50 55

<210> SEQ ID NO 399
<211> LENGTH: 90
<212> TYPE: PRT
<213> ORGANISM: Homo sapiens
<220> FEATURE:

<223> OTHER INFORMATION: 36

<400> SEQUENCE: 399

```
Val Glu Asp Ser Ala Lys Leu Lys Asp Gly Ser Ala Val Arg Ala Gly
1               5                   10                  15

Lys Gly Leu Pro Ser Ala Ala Val Gln Asp Leu Pro Arg Ser Phe Pro
            20                  25                  30

Glu Ser Val Pro Glu Arg Ala Arg Ser Asp Pro Glu Pro Gly Pro Gln
        35                  40                  45

Ala Pro Arg Gly Arg Glu Arg Ser Thr Ser Arg Arg Gln Phe Ala Ala
    50                  55                  60

Ala Ala Ala Ala Ala Ala Ala Ala Ala Ala Ala Ala Ala Ala Ala Ala
65                  70                  75                  80

Ala Ala Ala Ala Ala Ala Ala Ala Arg Asp
                85                  90
```

<210> SEQ ID NO 400
<211> LENGTH: 32
<212> TYPE: PRT
<213> ORGANISM: Homo sapiens
<220> FEATURE:
<223> OTHER INFORMATION: 37

<400> SEQUENCE: 400

```
Val Pro Pro Arg Glu Arg Leu Arg Pro Arg Ala Trp Ser Arg Arg Gly
1               5                   10                  15

Arg Gln Gln Gly Ala Ala Ala Ala Ala Ala Ser Thr Ser Gly Arg Gly
            20                  25                  30
```

<210> SEQ ID NO 401
<211> LENGTH: 37
<212> TYPE: PRT
<213> ORGANISM: Homo sapiens
<220> FEATURE:
<223> OTHER INFORMATION: 38

<400> SEQUENCE: 401

```
Leu His Val Arg Pro Thr Phe Gly Ser Ser Thr Arg Cys Ala Ser His
1               5                   10                  15

Ser Leu Cys Pro Ile Gly Arg Met Gln Arg Phe Ser Ala Arg Arg Gln
            20                  25                  30

Arg Arg Gln Glu His
        35
```

<210> SEQ ID NO 402
<211> LENGTH: 102
<212> TYPE: PRT
<213> ORGANISM: Homo sapiens
<220> FEATURE:
<223> OTHER INFORMATION: 39

<400> SEQUENCE: 402

```
Leu Gly Gly Cys Gly Gly Ala Val Pro Leu Trp Gly Pro Gly Glu Pro
1               5                   10                  15

Ala Trp Arg Gly Cys Ser Gly Thr Arg Phe Trp Val Thr Leu Ser Arg
            20                  25                  30

Arg Phe Leu Ile Leu Ala His Ser Leu His Ser Arg Arg Arg Pro Val
        35                  40                  45

Val Trp Thr Val Trp Trp Trp Trp Gly Trp Trp Arg Arg Arg Arg Arg
    50                  55                  60
```

```
Arg Arg Arg Arg Arg Arg Arg Arg Arg Arg Arg Arg Gly Gly Ser Cys
65                  70                  75                  80

Ser Pro Leu Arg Leu His Ser Ala Pro Ser Gly Ala Gly Gly Pro Gly
                85                  90                  95

Lys Arg Leu His Arg Thr
            100


<210> SEQ ID NO 403
<211> LENGTH: 27
<212> TYPE: PRT
<213> ORGANISM: Homo sapiens
<220> FEATURE:
<223> OTHER INFORMATION: 40

<400> SEQUENCE: 403

Val Val Pro Trp Arg His Gly Glu Gln Ser Ala Leu Ser Gln Ser His
1               5                   10                  15

Leu Cys Gln Lys Arg Asn Gly Pro Leu Asp Gly
            20                  25


<210> SEQ ID NO 404
<211> LENGTH: 19
<212> TYPE: PRT
<213> ORGANISM: Homo sapiens
<220> FEATURE:
<223> OTHER INFORMATION: 41

<400> SEQUENCE: 404

Val Ser Leu Trp Ser Ser His Met Trp Lys Leu Gln Gly Leu Leu Gln
1               5                   10                  15

Lys Ser Arg


<210> SEQ ID NO 405
<211> LENGTH: 49
<212> TYPE: PRT
<213> ORGANISM: Homo sapiens
<220> FEATURE:
<223> OTHER INFORMATION: 42

<400> SEQUENCE: 405

Val Gly Gln Gly Leu Ala Trp Leu Pro Gln Leu Thr Arg Gly Arg Pro
1               5                   10                  15

Asp Gly Cys His Ser Val Leu Leu Asp Gly Ala His Gly Val Cys His
            20                  25                  30

Gly Leu Ala Ile Leu His Gln Cys Gln Leu Gln Asp Ala Leu Leu Arg
        35                  40                  45

Pro


<210> SEQ ID NO 406
<211> LENGTH: 44
<212> TYPE: PRT
<213> ORGANISM: Homo sapiens
<220> FEATURE:
<223> OTHER INFORMATION: 43

<400> SEQUENCE: 406

Val Cys Pro Asn Glu Ala Pro Leu Ser Arg Val Trp Met Ala Pro Asn
1               5                   10                  15

His Pro Pro Gly Ile Pro Val His Glu Ser Thr Ala Thr Leu Gln His
            20                  25                  30

Tyr Ser Ser Gly Trp Ala Glu Lys Ser Lys Ile Leu
        35                  40
```

<210> SEQ ID NO 407
<211> LENGTH: 35
<212> TYPE: PRT
<213> ORGANISM: Homo sapiens
<220> FEATURE:
<223> OTHER INFORMATION: 44

<400> SEQUENCE: 407

```
Met Gln Lys Lys Lys Ser His Ile Leu Leu Lys Thr Leu Leu Pro Ala
1               5                   10                  15

His Gln Ala Pro Gly Leu Arg Ala Ala Tyr Cys Glu Arg Ala Ala Ser
            20                  25                  30

Val His Phe
        35
```

<210> SEQ ID NO 408
<211> LENGTH: 38
<212> TYPE: PRT
<213> ORGANISM: Homo sapiens
<220> FEATURE:
<223> OTHER INFORMATION: 45

<400> SEQUENCE: 408

```
Val Lys His Trp Lys Pro Tyr Phe Pro Thr Pro Ala His Ala Pro Phe
1               5                   10                  15

Gln Met Ser Ser Ala Cys Tyr Asn Ser Ala Leu Leu Leu Cys Ser Ala
            20                  25                  30

Leu Gly Asn Phe Leu Tyr
        35
```

<210> SEQ ID NO 409
<211> LENGTH: 47
<212> TYPE: PRT
<213> ORGANISM: Homo sapiens
<220> FEATURE:
<223> OTHER INFORMATION: 46

<400> SEQUENCE: 409

```
Leu Leu Gly Phe Phe Phe Leu Phe Leu Ser Phe Leu Phe Leu Leu Pro
1               5                   10                  15

Ser Leu Ser Asn Pro Pro Met Ala Pro Ser Asp Phe Ala Ser His Cys
            20                  25                  30

Gly Ser Tyr Leu Cys Phe Glu Trp Cys Cys Met Pro Leu Asn Leu
        35                  40                  45
```

<210> SEQ ID NO 410
<211> LENGTH: 26
<212> TYPE: PRT
<213> ORGANISM: Homo sapiens
<220> FEATURE:
<223> OTHER INFORMATION: 47

<400> SEQUENCE: 410

```
Val Ser Ser Cys Ala Cys Leu Gln His Tyr Ser Val Pro Ala Thr Gln
1               5                   10                  15

Thr Phe Thr Tyr Leu Met Pro Arg Glu Val
            20                  25
```

<210> SEQ ID NO 411
<211> LENGTH: 67
<212> TYPE: PRT
<213> ORGANISM: Homo sapiens

<220> FEATURE:
<223> OTHER INFORMATION: 48

<400> SEQUENCE: 411

```
Val Lys Ile Ala Gly Pro Trp Gly Val Thr Asp Phe Phe Ile Ser Ser
1               5                   10                  15

Leu His Gly Arg Leu Tyr Phe Leu Pro Met Ala Ile Ala Ile Arg Gly
            20                  25                  30

Gln Ser Asp Pro Arg Ala Glu Leu Gly Arg Gly Val Asp Arg Glu Glu
        35                  40                  45

Arg Thr Arg Arg Ala Met Glu His Gln Tyr Leu Pro Thr Ala Leu Val
    50                  55                  60

Pro Gly Gly
65
```

<210> SEQ ID NO 412
<211> LENGTH: 23
<212> TYPE: PRT
<213> ORGANISM: Homo sapiens
<220> FEATURE:
<223> OTHER INFORMATION: 49

<400> SEQUENCE: 412

```
Met Leu Met Pro His Pro Gln Thr Leu Phe Ser Leu Thr Leu Cys Leu
1               5                   10                  15

Gln Leu Gln Ile Asp Phe Gln
            20
```

<210> SEQ ID NO 413
<211> LENGTH: 57
<212> TYPE: PRT
<213> ORGANISM: Homo sapiens
<220> FEATURE:
<223> OTHER INFORMATION: 50

<400> SEQUENCE: 413

```
Met Ser Ser Leu Gln Cys Phe Val Gly Leu Asn Phe Ile Thr Leu His
1               5                   10                  15

Phe Ser His Gly His Gln Ala Cys Leu Leu Leu Leu Gly Met Phe Thr
            20                  25                  30

Asp Ser Leu Leu Arg Ala Pro Thr Thr Lys Lys Val Ser Arg Pro Thr
        35                  40                  45

Ala Leu Thr Ser Ile Cys Arg Cys Gln
    50                  55
```

<210> SEQ ID NO 414
<211> LENGTH: 46
<212> TYPE: PRT
<213> ORGANISM: Homo sapiens
<220> FEATURE:
<223> OTHER INFORMATION: 51

<400> SEQUENCE: 414

```
Leu Gly Val Leu Pro Leu Ser Pro Arg Asp Asp Thr Leu Pro Ala Ser
1               5                   10                  15

Gly Glu Val Leu Thr Ser Phe Phe Arg Ala Ala Lys Gly Ala Thr Gln
            20                  25                  30

Ile Arg Val Glu Glu Lys Thr Gln Leu Pro Gly Trp Glu Glu
        35                  40                  45
```

<210> SEQ ID NO 415

<211> LENGTH: 66
<212> TYPE: PRT
<213> ORGANISM: Homo sapiens
<220> FEATURE:
<223> OTHER INFORMATION: 52

<400> SEQUENCE: 415

```
Met Ala Ser Phe Gly Lys Val Trp Leu Val Trp Leu Gln Tyr Phe Ala
1               5                   10                  15

Thr His Glu Leu Arg Val Cys Pro Gly Thr Leu Val Leu Tyr Ser Leu
            20                  25                  30

Leu Ala His Leu Cys Ser Val Asp Phe Val Leu Gln Ala Gln Val Gln
        35                  40                  45

Gly Lys Met Ser Thr Tyr Phe Leu Ile Leu Ala Ser Ala Ser Leu Leu
    50                  55                  60

Ser Ser
65
```

<210> SEQ ID NO 416
<211> LENGTH: 25
<212> TYPE: PRT
<213> ORGANISM: Homo sapiens
<220> FEATURE:
<223> OTHER INFORMATION: 53

<400> SEQUENCE: 416

```
Leu Leu Asn Ser Arg Asn Gln Gly Pro Val Ile Lys Leu Pro Ile Leu
1               5                   10                  15

Ile Asp Ser Leu Cys Leu Leu Arg Gly
            20                  25
```

<210> SEQ ID NO 417
<211> LENGTH: 58
<212> TYPE: PRT
<213> ORGANISM: Homo sapiens
<220> FEATURE:
<223> OTHER INFORMATION: 54

<400> SEQUENCE: 417

```
Leu Gly Trp Asp Arg His Val Leu Val Phe Phe Ile Ile Thr Gln Ser
1               5                   10                  15

Gly Ser Cys Thr Gly Ser Leu Leu Ala Val Leu Asn Arg Lys Lys Tyr
            20                  25                  30

Pro Pro Leu Phe Ser Val Thr Leu Gly Tyr Ile Leu Ile Gly Pro Leu
        35                  40                  45

His Leu Phe Trp Asn Asp Phe His Leu Leu
    50                  55
```

<210> SEQ ID NO 418
<211> LENGTH: 43
<212> TYPE: PRT
<213> ORGANISM: Homo sapiens
<220> FEATURE:
<223> OTHER INFORMATION: 55

<400> SEQUENCE: 418

```
Leu Ala Ile Asp Val Leu Ala Asn Val Ile Asp Arg Ser Leu Ile Leu
1               5                   10                  15

His Ala Leu Cys Ser Thr Asn Arg Val Gly Met Val Gly Ile Leu Tyr
            20                  25                  30

Ser Pro Val Arg Asp Trp Pro Leu Arg Pro Thr
        35                  40
```

<210> SEQ ID NO 419
<211> LENGTH: 27
<212> TYPE: PRT
<213> ORGANISM: Homo sapiens
<220> FEATURE:
<223> OTHER INFORMATION: 56

<400> SEQUENCE: 419

```
Leu Ser Arg Leu Lys Asn Asn Val Leu Met Leu Glu Ser Leu Ser Val
1               5                   10                  15

His Thr Leu Leu Leu Asn Thr Tyr Arg His Thr
            20                  25
```

<210> SEQ ID NO 420
<211> LENGTH: 31
<212> TYPE: PRT
<213> ORGANISM: Homo sapiens
<220> FEATURE:
<223> OTHER INFORMATION: 57

<400> SEQUENCE: 420

```
Leu Ala Gly His Lys Gly Pro Gly His Phe Leu Cys Pro Phe Pro Ala
1               5                   10                  15

Leu His Gln Ser Cys Ile Ser Gly Asp Ser Leu Gln Thr Ala Gln
            20                  25                  30
```

<210> SEQ ID NO 421
<211> LENGTH: 21
<212> TYPE: PRT
<213> ORGANISM: Homo sapiens
<220> FEATURE:
<223> OTHER INFORMATION: 58

<400> SEQUENCE: 421

```
Leu Thr His Tyr Lys Gly Ser Trp Glu Ser Gly Met Pro Lys His Gln
1               5                   10                  15

Ile Lys Ser Lys Thr
            20
```

<210> SEQ ID NO 422
<211> LENGTH: 69
<212> TYPE: PRT
<213> ORGANISM: Homo sapiens
<220> FEATURE:
<223> OTHER INFORMATION: 59

<400> SEQUENCE: 422

```
Met Phe Ser Phe Leu Glu Lys Glu Val Ser Thr Pro Asp Ala Phe Val
1               5                   10                  15

Gly Arg Ser Val Leu Thr Ile Asn Leu Phe Glu Asn Leu Leu Lys Gln
            20                  25                  30

Phe Leu Lys Arg Glu Met Lys Ala Ser His Tyr Ile Thr Lys Asp Tyr
        35                  40                  45

Ile Val Pro Ala Lys Ile Pro Lys Phe Ile Arg Ala Gly Gly Glu Gln
    50                  55                  60

Ala Leu Val Pro Leu
65
```

<210> SEQ ID NO 423
<211> LENGTH: 24
<212> TYPE: PRT
<213> ORGANISM: Homo sapiens

<220> FEATURE:
<223> OTHER INFORMATION: 60

<400> SEQUENCE: 423

Leu Leu Ser Lys Leu Leu Lys Leu His His Cys Met Val Gly Asn Gly
1               5                   10                  15

Ala Val Leu Ser His Cys Val Cys
            20

<210> SEQ ID NO 424
<211> LENGTH: 29
<212> TYPE: PRT
<213> ORGANISM: Homo sapiens
<220> FEATURE:
<223> OTHER INFORMATION: 61

<400> SEQUENCE: 424

Leu Lys Tyr Ile Val Asn Glu Tyr Leu Tyr Pro Cys Phe Lys Ile Glu
1               5                   10                  15

Ile Tyr Ile Tyr Ile Tyr Ile Tyr Ile Tyr Ile Tyr Ile
            20                  25

<210> SEQ ID NO 425
<211> LENGTH: 19
<212> TYPE: PRT
<213> ORGANISM: Homo sapiens
<220> FEATURE:
<223> OTHER INFORMATION: 62

<400> SEQUENCE: 425

Met Gln Phe Cys Phe Gly Ser Ser Leu Arg Thr Asn Lys Thr Pro Gly
1               5                   10                  15

Leu Ile Ser

<210> SEQ ID NO 426
<211> LENGTH: 61
<212> TYPE: PRT
<213> ORGANISM: Homo sapiens
<220> FEATURE:
<223> OTHER INFORMATION: 63

<400> SEQUENCE: 426

Leu Thr Ser Gly Pro Leu Met Gly Pro Glu Leu Leu Glu Glu Glu Asn
1               5                   10                  15

Cys Ser Leu Val Phe Thr Ile Leu Val Arg Glu Gly Gln Phe Pro Ala
            20                  25                  30

Leu Glu Pro Gly Ala Ser Ala Leu Ser Phe Thr Gln Ile Pro Ser Pro
        35                  40                  45

Glu Ile Glu Val Leu Leu Leu Leu Gly Val Cys Val Leu
    50                  55                  60

<210> SEQ ID NO 427
<211> LENGTH: 37
<212> TYPE: PRT
<213> ORGANISM: Homo sapiens
<220> FEATURE:
<223> OTHER INFORMATION: 64

<400> SEQUENCE: 427

Leu Thr Asn Glu Asn Val Phe Phe Ser Val Lys Thr Cys Gln Ser Thr
1               5                   10                  15

Arg Ser Cys Ile Ser Val Gly Ala Gly Pro Phe Leu Pro Thr Gly Arg
            20                  25                  30

```
Val Phe Phe Phe Asp
        35


<210> SEQ ID NO 428
<211> LENGTH: 35
<212> TYPE: PRT
<213> ORGANISM: Homo sapiens
<220> FEATURE:
<223> OTHER INFORMATION: 65

<400> SEQUENCE: 428

Met Arg Ser Leu Arg Met Gly Gly Pro Cys Asp Leu Lys His Phe Pro
1               5                   10                  15

His Lys Leu Leu Asn Lys Ile Val Met Glu Leu Gln Ile Pro Leu Pro
            20                  25                  30

Thr Lys Asp
        35


<210> SEQ ID NO 429
<211> LENGTH: 23
<212> TYPE: PRT
<213> ORGANISM: Homo sapiens
<220> FEATURE:
<223> OTHER INFORMATION: 66

<400> SEQUENCE: 429

Met Leu Phe Leu Trp Trp Phe Pro Leu Trp Leu Leu Pro His Ser Met
1               5                   10                  15

Gly Thr Cys Thr Leu Gln Arg
            20


<210> SEQ ID NO 430
<211> LENGTH: 56
<212> TYPE: PRT
<213> ORGANISM: Homo sapiens
<220> FEATURE:
<223> OTHER INFORMATION: 67

<400> SEQUENCE: 430

Leu Ser Tyr Ser Glu Val Pro Gly Gly Leu Ser Tyr Pro Ile Ser His
1               5                   10                  15

Leu Asp Ala Asp Ser Ser His His Gln Asn Asp Pro Arg Lys Lys Lys
            20                  25                  30

Lys Lys Lys Ile Lys Lys Ser Pro His Asn Pro Val Thr Pro Phe Cys
        35                  40                  45

Phe Pro Leu Asp Trp Asn Ile Asp
    50                  55


<210> SEQ ID NO 431
<211> LENGTH: 21
<212> TYPE: PRT
<213> ORGANISM: Homo sapiens
<220> FEATURE:
<223> OTHER INFORMATION: 68

<400> SEQUENCE: 431

Met Gly Leu Ile Ser His Gly Gly Thr Trp Pro Pro Leu Gly Ser Arg
1               5                   10                  15

Thr Ser Ser Lys Arg
            20


<210> SEQ ID NO 432
```

<211> LENGTH: 69
<212> TYPE: PRT
<213> ORGANISM: Homo sapiens
<220> FEATURE:
<223> OTHER INFORMATION: 69

<400> SEQUENCE: 432

Met Ala Glu Thr Cys Leu Leu Asp Tyr Met Cys Asp Phe Gly Ser Val
1 5 10 15

Ser Ala Ser Ala Phe Arg Asn Val Ile His Cys Val Lys Tyr Trp Leu
20 25 30

Thr Gly Leu Pro Ala Lys Thr Trp Pro His Pro Leu Leu Trp Leu Gln
35 40 45

Asp Arg Val Ile Val Asn Lys Glu Thr Gln Glu Lys Leu Leu Met Ser
50 55 60

Ser Tyr His Cys Cys
65

<210> SEQ ID NO 433
<211> LENGTH: 24
<212> TYPE: PRT
<213> ORGANISM: Homo sapiens
<220> FEATURE:
<223> OTHER INFORMATION: 70

<400> SEQUENCE: 433

Leu Phe Ser Pro Thr Leu Ser Pro Pro Pro Pro Ala Phe Pro Thr Pro
1 5 10 15

Ser Ala Glu Pro Glu Ile Lys Arg
20

<210> SEQ ID NO 434
<211> LENGTH: 32
<212> TYPE: PRT
<213> ORGANISM: Homo sapiens
<220> FEATURE:
<223> OTHER INFORMATION: 71

<400> SEQUENCE: 434

Val Asp Thr Glu Phe Gly Arg Trp Arg Ile Leu Phe Phe Ser Phe Lys
1 5 10 15

Ile Trp Ala Ser Phe Glu Ser Thr Leu Gln Val Leu Arg Asp Arg Leu
20 25 30

<210> SEQ ID NO 435
<211> LENGTH: 67
<212> TYPE: PRT
<213> ORGANISM: Homo sapiens
<220> FEATURE:
<223> OTHER INFORMATION: 72

<400> SEQUENCE: 435

Met Ala Gln Cys Gln Val Val Leu Val Tyr Ser Thr Thr Leu Cys Gln
1 5 10 15

Pro His Lys Arg Leu Leu Ile Leu Cys His Gly Lys Phe Arg Glu Leu
20 25 30

Arg Leu Ser Gly Glu Ile Lys Thr Lys Thr Ser Lys Gln Lys Lys Lys
35 40 45

Ala Lys Thr Lys Gln Lys Ile Ser Gln Lys Thr Leu Leu Val Phe Phe
50 55 60

Pro Gln Lys
65

<210> SEQ ID NO 436
<211> LENGTH: 29
<212> TYPE: PRT
<213> ORGANISM: Homo sapiens
<220> FEATURE:
<223> OTHER INFORMATION: 73

<400> SEQUENCE: 436

```
Leu Thr Phe Asn Ser Phe Ser Lys Thr Phe Glu Leu Asn Val Leu Phe
1               5                   10                  15

Ser Gln Asn Leu Ala Thr Ser Thr Glu Lys Ser Asp His
            20                  25
```

<210> SEQ ID NO 437
<211> LENGTH: 23
<212> TYPE: PRT
<213> ORGANISM: Homo sapiens
<220> FEATURE:
<223> OTHER INFORMATION: 74

<400> SEQUENCE: 437

```
Met Lys Phe Ser Ala Lys Leu Arg Glu Ala Thr Ser Thr Leu Cys Pro
1               5                   10                  15

Pro Phe Ser Val Leu Trp Ala
            20
```

<210> SEQ ID NO 438
<211> LENGTH: 35
<212> TYPE: PRT
<213> ORGANISM: Homo sapiens
<220> FEATURE:
<223> OTHER INFORMATION: 75

<400> SEQUENCE: 438

```
Leu Leu Glu Lys Thr Lys Ala Asp Arg Phe Pro Phe Trp Gly Gly Ile
1               5                   10                  15

Asp Met Phe Trp Phe Ser Leu Leu Leu His Asn Leu Ala His Val Gln
            20                  25                  30

Asp His Phe
        35
```

<210> SEQ ID NO 439
<211> LENGTH: 22
<212> TYPE: PRT
<213> ORGANISM: Homo sapiens
<220> FEATURE:
<223> OTHER INFORMATION: 76

<400> SEQUENCE: 439

```
Met Ile Phe Ile Phe Cys Asp Thr Gln Ile Glu Leu Tyr His Phe His
1               5                   10                  15

Ile Ser Pro Cys Lys Tyr
            20
```

<210> SEQ ID NO 440
<211> LENGTH: 25
<212> TYPE: PRT
<213> ORGANISM: Homo sapiens
<220> FEATURE:
<223> OTHER INFORMATION: 77

<400> SEQUENCE: 440

```
Leu Thr Glu Val Ser Phe Cys Met Arg Ser Ala Leu Gln Thr Glu Leu
```

```
1               5                   10                  15

Val Trp Leu Val Tyr Cys Thr His Leu
            20                  25


<210> SEQ ID NO 441
<211> LENGTH: 28
<212> TYPE: PRT
<213> ORGANISM: Homo sapiens
<220> FEATURE:
<223> OTHER INFORMATION: 78

<400> SEQUENCE: 441

Val Arg Lys Arg Lys Arg Arg Ser Thr Arg Glu Lys Ala Pro Ser Val
1               5                   10                  15

Leu Gly Ser Arg Gln Leu Pro Gly Ser Arg Thr Leu
            20                  25


<210> SEQ ID NO 442
<211> LENGTH: 25
<212> TYPE: PRT
<213> ORGANISM: Homo sapiens
<220> FEATURE:
<223> OTHER INFORMATION: 79

<400> SEQUENCE: 442

Leu Thr Val Tyr Glu Leu Ser Cys Ala Ser Cys Pro Gly Glu Arg Ala
1               5                   10                  15

Leu Gly Gln Gly Ser Gly Phe His Val
            20                  25


<210> SEQ ID NO 443
<211> LENGTH: 28
<212> TYPE: PRT
<213> ORGANISM: Homo sapiens
<220> FEATURE:
<223> OTHER INFORMATION: 80

<400> SEQUENCE: 443

Leu Trp Val Phe Phe Ser Leu Ile Ile Tyr Met Phe Arg Arg Ile Glu
1               5                   10                  15

Asn Asn Phe Gly Lys Met Gly Leu Trp Val Leu His
            20                  25


<210> SEQ ID NO 444
<211> LENGTH: 33
<212> TYPE: PRT
<213> ORGANISM: Homo sapiens
<220> FEATURE:
<223> OTHER INFORMATION: 81

<400> SEQUENCE: 444

Leu Glu Met Glu Leu Phe Leu Ala Thr Val Phe Ala Ser Ala His Val
1               5                   10                  15

Ser Leu Ser Glu Asp Val Lys Pro Leu Leu Ile Arg Glu His Leu Lys
            20                  25                  30

Tyr


<210> SEQ ID NO 445
<211> LENGTH: 71
<212> TYPE: PRT
<213> ORGANISM: Homo sapiens
<220> FEATURE:
<223> OTHER INFORMATION: 82
```

<400> SEQUENCE: 445

Met Asn Ile Cys Ile His Val Ser Lys Leu Lys Tyr Ile Tyr Ile Tyr
1 5 10 15

Ile Tyr Ile Tyr Ile Tyr Ile Tyr Ser Val Cys Val Cys Ser Asp Ser
20 25 30

Phe Asn Phe Leu Cys Ile Phe Ile Phe Gly Ser Arg Ser His Leu Met
35 40 45

Pro Cys Thr Cys Glu Arg Gly Cys Ser Phe Val Leu Glu Ala Leu Ser
50 55 60

Glu Gln Thr Arg His Leu Asp
65 70

<210> SEQ ID NO 446
<211> LENGTH: 22
<212> TYPE: PRT
<213> ORGANISM: Homo sapiens
<220> FEATURE:
<223> OTHER INFORMATION: 83

<400> SEQUENCE: 446

Met Glu Leu Thr Glu Ile Tyr His Arg Glu Gly Pro Asn Leu Gly Pro
1 5 10 15

Lys Ala Tyr Pro Ser Asp
20

<210> SEQ ID NO 447
<211> LENGTH: 39
<212> TYPE: PRT
<213> ORGANISM: Homo sapiens
<220> FEATURE:
<223> OTHER INFORMATION: 84

<400> SEQUENCE: 447

Leu His Trp Asn Leu Glu Gln Ala Leu Tyr Leu Ser His Lys Phe Pro
1 5 10 15

His Leu Arg Leu Arg Cys Ser Cys Tyr Trp Val Ser Val Cys Cys Asn
20 25 30

Ser Gly Phe Gly Tyr Val Leu
35

<210> SEQ ID NO 448
<211> LENGTH: 19
<212> TYPE: PRT
<213> ORGANISM: Homo sapiens
<220> FEATURE:
<223> OTHER INFORMATION: 85

<400> SEQUENCE: 448

Met Lys Met Cys Phe Ser Leu Leu Lys Leu Val Arg Val Leu Glu Val
1 5 10 15

Val Ser Leu

<210> SEQ ID NO 449
<211> LENGTH: 31
<212> TYPE: PRT
<213> ORGANISM: Homo sapiens
<220> FEATURE:
<223> OTHER INFORMATION: 86

<400> SEQUENCE: 449

Val Gln Val His Phe Cys Pro Gln Val Gly Cys Phe Ser Leu Ile Lys
1 5 10 15

```
Arg Leu Thr Leu Leu Leu Pro Arg Thr Ser Gln Leu Asn His Phe
            20                  25                  30
```

<210> SEQ ID NO 450
<211> LENGTH: 80
<212> TYPE: PRT
<213> ORGANISM: Homo sapiens
<220> FEATURE:
<223> OTHER INFORMATION: 87

<400> SEQUENCE: 450

```
Leu Ser Trp Ser Cys Arg Phe His Cys Pro Pro Lys Thr Arg Thr His
1               5                   10                  15

Thr Tyr Pro Tyr Thr Lys Gly Lys Thr Ile Leu Lys Cys Cys Phe Ser
            20                  25                  30

Gly Gly Ser Leu Ser Gly Cys Cys Leu Thr Val Trp Glu Pro Val Leu
        35                  40                  45

Cys Arg Gly Asp Arg Pro Asp Leu His Tyr Leu Thr Thr Leu Ala Leu
    50                  55                  60

Gly Ala Asn Cys Pro Thr Val Lys Cys Leu Gly Gly Cys Pro Ile Pro
65                  70                  75                  80
```

<210> SEQ ID NO 451
<211> LENGTH: 26
<212> TYPE: PRT
<213> ORGANISM: Homo sapiens
<220> FEATURE:
<223> OTHER INFORMATION: 88

<400> SEQUENCE: 451

```
Met Leu Thr Ala Ala Thr Ile Arg Met Thr His Ala Lys Lys Arg Lys
1               5                   10                  15

Lys Lys Leu Lys Ser Pro Leu Thr Thr Gln
            20                  25
```

<210> SEQ ID NO 452
<211> LENGTH: 32
<212> TYPE: PRT
<213> ORGANISM: Homo sapiens
<220> FEATURE:
<223> OTHER INFORMATION: 89

<400> SEQUENCE: 452

```
Leu Ile Arg Glu Cys Leu Arg His Asp Ile Leu Val Leu Ser Leu Glu
1               5                   10                  15

Leu Ile Trp Gln Gln Glu Gly Ala Asp Tyr Val Asn Arg Asp Lys Asn
            20                  25                  30
```

<210> SEQ ID NO 453
<211> LENGTH: 26
<212> TYPE: PRT
<213> ORGANISM: Homo sapiens
<220> FEATURE:
<223> OTHER INFORMATION: 90

<400> SEQUENCE: 453

```
Leu Lys Glu Lys Arg Asn Lys Lys Arg Glu Arg Lys Lys Ala Ser His
1               5                   10                  15

Lys Asp Phe Leu Lys Arg Asn Asn Phe Ala
            20                  25
```

<210> SEQ ID NO 454

<211> LENGTH: 33
<212> TYPE: PRT
<213> ORGANISM: Homo sapiens
<220> FEATURE:
<223> OTHER INFORMATION: 91

<400> SEQUENCE: 454

```
Val Ala Leu Gly Leu His Trp Ala Ala Gly Pro Ala Pro Ser Ala Ser
1               5                   10                  15

Val Leu Phe Ser Phe Cys Asn Leu Gly Ile Phe Cys Cys Ser Lys Tyr
            20                  25                  30

Asn
```

<210> SEQ ID NO 455
<211> LENGTH: 29
<212> TYPE: PRT
<213> ORGANISM: Homo sapiens
<220> FEATURE:
<223> OTHER INFORMATION: 92

<400> SEQUENCE: 455

```
Leu Val Cys Gln Leu Lys Leu Gly His Ile Pro Cys Tyr Gly Cys Arg
1               5                   10                  15

Ile Glu Leu Leu Leu Thr Lys Arg Pro Lys Lys Ser Cys
            20                  25
```

<210> SEQ ID NO 456
<211> LENGTH: 19
<212> TYPE: PRT
<213> ORGANISM: Homo sapiens
<220> FEATURE:
<223> OTHER INFORMATION: 93

<400> SEQUENCE: 456

```
Val Ser Leu Trp Ser Ser His Met Trp Lys Leu Gln Gly Leu Leu Gln
1               5                   10                  15

Lys Ser Arg
```

<210> SEQ ID NO 457
<211> LENGTH: 19
<212> TYPE: PRT
<213> ORGANISM: Homo sapiens
<220> FEATURE:
<223> OTHER INFORMATION: 94

<400> SEQUENCE: 457

```
Leu Pro Gly Thr Met Phe Cys Pro Leu Thr Ile Thr Phe His Pro Arg
1               5                   10                  15

Arg Pro Ala
```

<210> SEQ ID NO 458
<211> LENGTH: 27
<212> TYPE: PRT
<213> ORGANISM: Homo sapiens
<220> FEATURE:
<223> OTHER INFORMATION: 95

<400> SEQUENCE: 458

```
Val Glu Met Lys Leu Leu Gly Val Thr Met Glu Leu Ser His Val Glu
1               5                   10                  15

Ala Ala Arg Ser Ser Ser Lys Glu Pro Leu Lys
            20                  25
```

<210> SEQ ID NO 459
<211> LENGTH: 72
<212> TYPE: PRT
<213> ORGANISM: Homo sapiens
<220> FEATURE:
<223> OTHER INFORMATION: 96

<400> SEQUENCE: 459

Leu Glu Thr Ala Arg Asp His Val Leu Pro Ile Asp Tyr Tyr Phe Pro
1 5 10 15

Pro Gln Lys Thr Cys Leu Ile Cys Gly Asp Glu Ala Ser Gly Cys His
20 25 30

Tyr Gly Ala Leu Thr Cys Gly Ser Cys Lys Val Phe Phe Lys Arg Ala
35 40 45

Ala Glu Val Trp Arg Leu Pro Gly Thr Met Phe Cys Pro Leu Thr Ile
50 55 60

Thr Phe His Pro Arg Arg Pro Ala
65 70

<210> SEQ ID NO 460
<211> LENGTH: 38
<212> TYPE: PRT
<213> ORGANISM: Homo sapiens
<220> FEATURE:
<223> OTHER INFORMATION: 97

<400> SEQUENCE: 460

Val Glu Met Lys Leu Leu Gly Val Thr Met Glu Leu Ser His Val Glu
1 5 10 15

Ala Ala Arg Ser Ser Ser Lys Glu Pro Leu Lys Phe Gly Asp Cys Gln
20 25 30

Gly Pro Cys Phe Ala His
35

<210> SEQ ID NO 461
<211> LENGTH: 56
<212> TYPE: PRT
<213> ORGANISM: Homo sapiens
<220> FEATURE:
<223> OTHER INFORMATION: 98

<400> SEQUENCE: 461

Leu Cys Ala Ser Arg Asn Asp Cys Thr Ile Asp Lys Phe Arg Arg Lys
1 5 10 15

Asn Cys Pro Ser Cys Arg Leu Arg Lys Cys Tyr Glu Ala Gly Met Thr
20 25 30

Leu Gly Val Trp Arg Leu Pro Gly Thr Met Phe Cys Pro Leu Thr Ile
35 40 45

Thr Phe His Pro Arg Arg Pro Ala
50 55

<210> SEQ ID NO 462
<211> LENGTH: 89
<212> TYPE: PRT
<213> ORGANISM: Homo sapiens
<220> FEATURE:
<223> OTHER INFORMATION: 99

<400> SEQUENCE: 462

Met His Lys Ser Arg Met Tyr Ser Gln Cys Val Arg Met Arg His Leu
1 5 10 15

Ser Gln Glu Phe Gly Trp Leu Gln Ile Thr Pro Gln Glu Phe Leu Cys

```
            20                  25                  30

Met Lys Ala Leu Leu Leu Phe Ser Ile Ser Phe Arg Asn Leu His Val
        35                  40                  45

Asp Asp Gln Met Ala Val Ile Gln Tyr Ser Trp Met Gly Leu Met Val
    50                  55                  60

Phe Ala Met Gly Trp Arg Ser Phe Thr Asn Val Asn Ser Arg Met Leu
65                  70                  75                  80

Tyr Phe Ala Pro Asp Leu Val Phe Asn
                85


<210> SEQ ID NO 463
<211> LENGTH: 69
<212> TYPE: PRT
<213> ORGANISM: Homo sapiens
<220> FEATURE:
<223> OTHER INFORMATION: 100

<400> SEQUENCE: 463

Leu His Ala Lys Glu Lys Ile Pro His Pro Ala Gln Asp Ala Ser Thr
1               5                   10                  15

Ser Ser Pro Ser Ser Trp Thr Pro Cys Ser Leu Leu Pro Gln Leu Thr
            20                  25                  30

Arg Gly Arg Pro Asp Gly Cys His Ser Val Leu Leu Asp Gly Ala His
        35                  40                  45

Gly Val Cys His Gly Leu Ala Ile Leu His Gln Cys Gln Leu Gln Asp
    50                  55                  60

Ala Leu Leu Arg Pro
65


<210> SEQ ID NO 464
<211> LENGTH: 73
<212> TYPE: PRT
<213> ORGANISM: Homo sapiens
<220> FEATURE:
<223> OTHER INFORMATION: 101

<400> SEQUENCE: 464

Met Gln Lys Lys Lys Ser His Ile Leu Leu Lys Thr Leu Leu Pro Ala
1               5                   10                  15

His Gln Ala Pro Gly Leu Arg Ala Ala Cys Phe Arg Asn Leu His Val
            20                  25                  30

Asp Asp Gln Met Ala Val Ile Gln Tyr Ser Trp Met Gly Leu Met Val
        35                  40                  45

Phe Ala Met Gly Trp Arg Ser Phe Thr Asn Val Asn Ser Arg Met Leu
    50                  55                  60

Tyr Phe Ala Pro Asp Leu Val Phe Asn
65                  70


<210> SEQ ID NO 465
<211> LENGTH: 99
<212> TYPE: PRT
<213> ORGANISM: Homo sapiens
<220> FEATURE:
<223> OTHER INFORMATION: 102

<400> SEQUENCE: 465

Val Asp Gly Leu Lys Asn Gln Lys Phe Phe Asp Glu Leu Arg Met Asn
1               5                   10                  15

Tyr Ile Lys Glu Leu Asp Arg Ile Ile Ala Cys Lys Arg Lys Asn Pro
            20                  25                  30
```

```
Thr Ser Cys Ser Arg Arg Phe Tyr Gln Leu Thr Lys Leu Leu Asp Ser
        35                  40                  45

Val Gln Pro Ala Ser Ala Thr Tyr Thr Trp Thr Thr Arg Trp Leu Ser
    50                  55                  60

Phe Ser Thr Pro Gly Trp Gly Ser Trp Cys Leu Pro Trp Ala Gly Asp
65                  70                  75                  80

Pro Ser Pro Met Ser Thr Pro Gly Cys Ser Thr Ser Pro Leu Ile Trp
                85                  90                  95

Phe Ser Met


<210> SEQ ID NO 466
<211> LENGTH: 75
<212> TYPE: PRT
<213> ORGANISM: Homo sapiens
<220> FEATURE:
<223> OTHER INFORMATION: 1

<400> SEQUENCE: 466

Val Val Cys His Ser Glu Arg Ile Val Met Gly Ile Leu Ile Asn Phe
1               5                   10                  15

Lys Ile Gly Ile Phe Glu Ile Lys Leu Asn Ile Ile Tyr Ser Tyr Val
            20                  25                  30

Ser Val Tyr Ile Cys Val Cys Leu Tyr Cys Leu Ser Ser Pro Tyr Gly
        35                  40                  45

Leu Lys Leu Asn Phe Ile Ile Ile Arg Gly Tyr Ser Glu Val Glu Lys
    50                  55                  60

Phe Asn Ser Val Leu Asn Leu Arg Arg Met Ala
65                  70                  75


<210> SEQ ID NO 467
<211> LENGTH: 61
<212> TYPE: PRT
<213> ORGANISM: Homo sapiens
<220> FEATURE:
<223> OTHER INFORMATION: 2

<400> SEQUENCE: 467

Met Ser Leu His Thr Glu Glu Asn Ile Ser Met Ser Glu Ser Thr Leu
1               5                   10                  15

Gly Asn Met His Lys Ile Ile Pro Ser Gln Arg Pro His Gly Leu Pro
            20                  25                  30

Gly Gln Pro Gly Leu Arg Gly Ser Leu Ser Gln His Thr Ile Trp Glu
        35                  40                  45

Met Asp Gln Ile Thr Leu Leu Val Asn Val Ile Thr Leu
    50                  55                  60


<210> SEQ ID NO 468
<211> LENGTH: 33
<212> TYPE: PRT
<213> ORGANISM: Homo sapiens
<220> FEATURE:
<223> OTHER INFORMATION: 3

<400> SEQUENCE: 468

Met Asn Thr Cys Glu Pro Asn Ser His Met Lys Lys Ile Thr Phe Leu
1               5                   10                  15

Ile Ser Leu Asp Ala Pro Cys Thr Asn Asp Ser Tyr Ala Phe Ala Phe
            20                  25                  30

Ser
```

<210> SEQ ID NO 469
<211> LENGTH: 22
<212> TYPE: PRT
<213> ORGANISM: Homo sapiens
<220> FEATURE:
<223> OTHER INFORMATION: 4

<400> SEQUENCE: 469

```
Leu Ser Leu Phe Ile Ile Leu Ser His Met Ala Val Ser Phe Thr Cys
1               5                   10                  15

Phe Gly Ile Met Tyr Phe
            20
```

<210> SEQ ID NO 470
<211> LENGTH: 58
<212> TYPE: PRT
<213> ORGANISM: Homo sapiens
<220> FEATURE:
<223> OTHER INFORMATION: 5

<400> SEQUENCE: 470

```
Leu Thr Leu Gln Asn Ser Pro Glu Thr Cys Leu Leu Gly Gln Cys Val
1               5                   10                  15

Lys Leu Phe Met Lys Lys Cys Gln Ala Arg Gly Ala Leu Leu Gln Ile
            20                  25                  30

Trp Gln Arg Thr Ile Ser Gly Glu Ala Leu Gly Arg Trp Val Leu Leu
        35                  40                  45

Ala Thr Met Asn Phe Arg Lys Trp Val Pro
    50                  55
```

<210> SEQ ID NO 471
<211> LENGTH: 78
<212> TYPE: PRT
<213> ORGANISM: Homo sapiens
<220> FEATURE:
<223> OTHER INFORMATION: 6

<400> SEQUENCE: 471

```
Leu Gly Thr Gly Val Ala Leu Tyr Ala Leu Arg Val Arg Cys Trp Arg
1               5                   10                  15

Cys His Leu His Cys Gln Ser Leu Pro Arg Val His Thr Glu Ser Arg
            20                  25                  30

Leu Lys Ser Thr Leu Leu Glu His Leu Ser Asn Ala Phe Tyr Ser Gln
        35                  40                  45

Ser Leu Thr Ser Leu Thr Arg Asp Lys Glu Glu Leu Phe Asn Gly Pro
    50                  55                  60

Arg Ser Ile Tyr Glu Asp Asn Gln Val Gly Val Trp Ser Gly
65                  70                  75
```

<210> SEQ ID NO 472
<211> LENGTH: 27
<212> TYPE: PRT
<213> ORGANISM: Homo sapiens
<220> FEATURE:
<223> OTHER INFORMATION: 7

<400> SEQUENCE: 472

```
Met Pro His Val Leu Met Thr Val Met Leu Leu His Phe Leu Glu Phe
1               5                   10                  15

Tyr Val Tyr Leu Ser Phe Leu Cys His Tyr Leu
            20                  25
```

<210> SEQ ID NO 473
<211> LENGTH: 34
<212> TYPE: PRT
<213> ORGANISM: Homo sapiens
<220> FEATURE:
<223> OTHER INFORMATION: 8

<400> SEQUENCE: 473

Leu Tyr Pro Leu His Val Leu Ala Leu Cys Ile Phe Glu Leu Phe Val
1               5                   10                  15

Lys Thr Ile Ile Pro Cys Val Ile Phe Arg Asp Leu Ile Phe Phe Ile
            20                  25                  30

Asp Phe

<210> SEQ ID NO 474
<211> LENGTH: 34
<212> TYPE: PRT
<213> ORGANISM: Homo sapiens
<220> FEATURE:
<223> OTHER INFORMATION: 9

<400> SEQUENCE: 474

Met Val Asn Leu Glu Gln Pro Met Lys Ser Pro Leu Thr Leu Trp Pro
1               5                   10                  15

Arg Ser Lys Leu Arg Ser Arg Cys Ser Val Ala Leu Glu Glu Ser Ala
            20                  25                  30

Ser Asn

<210> SEQ ID NO 475
<211> LENGTH: 25
<212> TYPE: PRT
<213> ORGANISM: Homo sapiens
<220> FEATURE:
<223> OTHER INFORMATION: 10

<400> SEQUENCE: 475

Met Pro Ser Val Ser Asp Ala Gly Asp Val Ile Cys Ile Ala Arg Val
1               5                   10                  15

Cys Gln Gly Cys Thr Gln Lys Ala Asp
            20                  25

<210> SEQ ID NO 476
<211> LENGTH: 31
<212> TYPE: PRT
<213> ORGANISM: Homo sapiens
<220> FEATURE:
<223> OTHER INFORMATION: 11

<400> SEQUENCE: 476

Val Thr Lys Lys Asn Tyr Leu Met Gly Pro Asp Leu Phe Met Lys Thr
1               5                   10                  15

Ile Lys Trp Glu Phe Gly Val Asp Asn Pro Asn Leu Asp Asn Trp
            20                  25                  30

<210> SEQ ID NO 477
<211> LENGTH: 19
<212> TYPE: PRT
<213> ORGANISM: Homo sapiens
<220> FEATURE:
<223> OTHER INFORMATION: 12

<400> SEQUENCE: 477

Leu Asn Leu Cys Gly Met Ser Leu Arg Lys Asn Arg Asn Gly Tyr Ile
1 5 10 15

Asp Lys Phe

<210> SEQ ID NO 478
<211> LENGTH: 24
<212> TYPE: PRT
<213> ORGANISM: Homo sapiens
<220> FEATURE:
<223> OTHER INFORMATION: 13

<400> SEQUENCE: 478

Met Cys Val Phe Ile Leu Phe Ile Phe Ser Leu Trp Ile Lys Thr Glu
1 5 10 15

Phe His Asn Tyr Lys Arg Leu Phe
20

<210> SEQ ID NO 479
<211> LENGTH: 35
<212> TYPE: PRT
<213> ORGANISM: Homo sapiens
<220> FEATURE:
<223> OTHER INFORMATION: 14

<400> SEQUENCE: 479

Leu Asn Phe Met Phe Ile Tyr Leu Ser Ser Val Ile Ile Tyr Asn Phe
1 5 10 15

Ile Thr His Gly Cys Ile Leu Tyr Met Phe Trp His Tyr Val Phe Leu
20 25 30

Asn Phe Leu
35

<210> SEQ ID NO 480
<211> LENGTH: 28
<212> TYPE: PRT
<213> ORGANISM: Homo sapiens
<220> FEATURE:
<223> OTHER INFORMATION: 15

<400> SEQUENCE: 480

Met Lys Tyr Cys Leu Val Ile Cys Lys Glu Lys Ser Gln Glu Tyr Val
1 5 10 15

Met Ser Arg Cys Lys Glu Leu Leu Leu Ser Pro Trp
20 25

<210> SEQ ID NO 481
<211> LENGTH: 71
<212> TYPE: PRT
<213> ORGANISM: Homo sapiens
<220> FEATURE:
<223> OTHER INFORMATION: 16

<400> SEQUENCE: 481

Val Leu Pro Leu Lys Asn Leu Leu Gln Ile Asp Thr Ser Glu Leu Pro
1 5 10 15

Arg Asn Leu Ser Ser Gly Pro Met Cys Lys Ala Val Tyr Glu Glu Met
20 25 30

Ser Ser Gln Arg Gly Ser Thr Thr Asn Leu Ala Lys Asp Asn Phe Arg
35 40 45

Arg Ser Ser Trp Pro Leu Gly Ser Pro Gly His His Glu Leu Gln Glu
50 55 60

Val Gly Ala Ile Ala Ala Ala 65 70

<210> SEQ ID NO 482
<211> LENGTH: 42
<212> TYPE: PRT
<213> ORGANISM: Homo sapiens
<220> FEATURE:
<223> OTHER INFORMATION: 17

<400> SEQUENCE: 482

Met Leu Glu Met Ser Phe Ala Leu Pro Glu Phe Ala Lys Gly Ala His
1 5 10 15

Arg Lys Gln Ile Glu Lys His Pro Leu Gly Thr Ser Leu Gln Cys Leu
20 25 30

Leu Leu Thr Lys Phe Asn Ile Ile Asn Thr
35 40

<210> SEQ ID NO 483
<211> LENGTH: 54
<212> TYPE: PRT
<213> ORGANISM: Homo sapiens
<220> FEATURE:
<223> OTHER INFORMATION: 18

<400> SEQUENCE: 483

Leu Asn Gly Ala Gly Asp Pro Leu Thr Pro Gly Tyr Pro Ala Asn Glu
1 5 10 15

Tyr Ala Tyr Arg Arg Gly Ile Ala Glu Ala Val Gly Leu Pro Ser Ile
20 25 30

Pro Val His Pro Ile Gly Tyr Tyr Asp Ala Gln Lys Leu Leu Glu Val
35 40 45

Val Tyr Lys Ile Leu Gln
50

<210> SEQ ID NO 484
<211> LENGTH: 43
<212> TYPE: PRT
<213> ORGANISM: Homo sapiens
<220> FEATURE:
<223> OTHER INFORMATION: 19

<400> SEQUENCE: 484

Leu Arg Thr Ser Arg Ser Ser Tyr Arg Trp Phe Ile Lys Ser Ser Asn
1 5 10 15

Glu Ala Thr Asn Ile Thr Pro Lys His Asn Met Lys Ala Phe Leu Asp
20 25 30

Glu Leu Lys Ala Glu Asn Ile Lys Lys Phe Leu
35 40

<210> SEQ ID NO 485
<211> LENGTH: 61
<212> TYPE: PRT
<213> ORGANISM: Homo sapiens
<220> FEATURE:
<223> OTHER INFORMATION: 20

<400> SEQUENCE: 485

Leu Asn His Leu Leu Gln Asp Met Lys Met Phe Arg Ile Leu Tyr His
1 5 10 15

Leu Ser Val Leu Ser Leu Leu Lys Glu Cys Gln Arg Phe Ser Thr His
20 25 30

His Tyr Leu Asn His Leu Leu Gln Asp Met Lys Met Phe Arg Ile Leu

```
        35                  40                  45

Tyr His Leu Ser Val Leu Ser Leu Leu Lys Glu Cys Gln
    50                  55                  60


<210> SEQ ID NO 486
<211> LENGTH: 21
<212> TYPE: PRT
<213> ORGANISM: Homo sapiens
<220> FEATURE:
<223> OTHER INFORMATION: 1

<400> SEQUENCE: 486

Val Cys Thr Pro Lys Leu Leu Glu Ile Cys Val Glu Ile Ser Asp Ser
1               5                   10                  15

Ser Leu Val Arg Gln
            20


<210> SEQ ID NO 487
<211> LENGTH: 49
<212> TYPE: PRT
<213> ORGANISM: Homo sapiens
<220> FEATURE:
<223> OTHER INFORMATION: 2

<400> SEQUENCE: 487

Met Val Cys Gln Leu Lys Tyr Leu Gln Gly Gly Pro Asn Arg Thr Arg
1               5                   10                  15

Cys Thr Arg Cys Asp Phe Lys Thr Ser Cys Ile Asn Arg Thr Pro Leu
            20                  25                  30

Gln Glu Gly Gly Pro Gly Gln Glu Asn Leu Arg Leu Ser Lys Thr Gly
        35                  40                  45

Ala


<210> SEQ ID NO 488
<211> LENGTH: 20
<212> TYPE: PRT
<213> ORGANISM: Homo sapiens
<220> FEATURE:
<223> OTHER INFORMATION: 3

<400> SEQUENCE: 488

Met Ser Arg Glu Gln Arg Arg Asn Leu Ala Val Leu Pro Phe Ser Phe
1               5                   10                  15

Cys Tyr Leu Arg
            20


<210> SEQ ID NO 489
<211> LENGTH: 39
<212> TYPE: PRT
<213> ORGANISM: Homo sapiens
<220> FEATURE:
<223> OTHER INFORMATION: 4

<400> SEQUENCE: 489

Leu Gly Ser Thr Leu Gln Cys Ser Met Pro Arg Ala Ala Asp Thr Asp
1               5                   10                  15

Arg Ser Thr Ser Gln His Lys Arg Gln Gly Ser Leu Asn Cys Phe Leu
            20                  25                  30

Leu Phe Thr Phe Leu Leu Lys
        35


<210> SEQ ID NO 490
```

```
<211> LENGTH: 40
<212> TYPE: PRT
<213> ORGANISM: Homo sapiens
<220> FEATURE:
<223> OTHER INFORMATION: 5

<400> SEQUENCE: 490

Leu Ser Thr Leu Ser Leu Pro Ser Ser Glu Phe Asn Ser Phe Asn Leu
1               5                   10                  15

Gln Phe Ala Arg Ile Thr His Phe Thr Val Met Tyr Ile Val Leu Gln
            20                  25                  30

Lys Lys Lys Lys Ser Val Phe Val
        35                  40


<210> SEQ ID NO 491
<211> LENGTH: 21
<212> TYPE: PRT
<213> ORGANISM: Homo sapiens
<220> FEATURE:
<223> OTHER INFORMATION: 6

<400> SEQUENCE: 491

Leu Thr Gly Glu Leu Asp Gly Ser Gln Asn His Phe Thr Gln Thr Ala
1               5                   10                  15

Cys Phe Tyr Pro Val
            20


<210> SEQ ID NO 492
<211> LENGTH: 30
<212> TYPE: PRT
<213> ORGANISM: Homo sapiens
<220> FEATURE:
<223> OTHER INFORMATION: 7

<400> SEQUENCE: 492

Leu Lys Thr Leu Gln Ala Pro Phe Gln Gly Phe Pro Lys Pro Leu Ser
1               5                   10                  15

Ser Arg Arg Ser Ala Pro Glu Leu Pro Ser Pro Thr Leu Arg
            20                  25                  30


<210> SEQ ID NO 493
<211> LENGTH: 38
<212> TYPE: PRT
<213> ORGANISM: Homo sapiens
<220> FEATURE:
<223> OTHER INFORMATION: 8

<400> SEQUENCE: 493

Leu Pro Ser Pro Gly Cys Leu Tyr Glu Lys His Lys Gly Pro Arg Ser
1               5                   10                  15

Gly Ser Lys Arg Cys Ala His Gln Ser Tyr Trp Arg Phe Ala Trp Lys
            20                  25                  30

Ser Gln Ile Leu His Trp
        35


<210> SEQ ID NO 494
<211> LENGTH: 42
<212> TYPE: PRT
<213> ORGANISM: Homo sapiens
<220> FEATURE:
<223> OTHER INFORMATION: 9

<400> SEQUENCE: 494

Leu Phe Glu Gly Glu Arg Gly Lys Ile Lys Trp Tyr Phe Pro Ala Leu
```

```
1               5                   10                  15

Cys Met Ile Leu Asp Glu Leu Tyr Thr Gln Gly Phe Cys Ser Ala Thr
            20                  25                  30

Pro Ser Ser Cys Val Thr Glu Tyr Gln Leu
        35                  40


<210> SEQ ID NO 495
<211> LENGTH: 84
<212> TYPE: PRT
<213> ORGANISM: Homo sapiens
<220> FEATURE:
<223> OTHER INFORMATION: 10

<400> SEQUENCE: 495

Leu Leu Ala Leu Glu Tyr Gly Gln Gly Ser Leu Cys Pro Cys Lys Arg
1               5                   10                  15

Glu Gly Gln Ile Glu Ser Leu Gln Glu Asn Ala Leu Met Leu Ser Thr
            20                  25                  30

Tyr Leu His Gly Arg Gly Arg Trp Val Gly Gly Asp Glu Asn Ile Ser
        35                  40                  45

Phe Ser Tyr Ser Phe Leu Phe Leu Leu Lys Trp Tyr Ala Asn Leu Ser
    50                  55                  60

Ile Tyr Arg Val Ala Gln Ile Glu Gln Asp Ala Leu Ala Val Ile Leu
65                  70                  75                  80

Arg Gln Ala Val


<210> SEQ ID NO 496
<211> LENGTH: 20
<212> TYPE: PRT
<213> ORGANISM: Homo sapiens
<220> FEATURE:
<223> OTHER INFORMATION: 11

<400> SEQUENCE: 496

Leu Glu Asn Leu Glu Ser Glu Val Ser Trp Ser Phe Gln Ala Ile Ile
1               5                   10                  15

Tyr Thr Val Ser
            20


<210> SEQ ID NO 497
<211> LENGTH: 23
<212> TYPE: PRT
<213> ORGANISM: Homo sapiens
<220> FEATURE:
<223> OTHER INFORMATION: 12

<400> SEQUENCE: 497

Leu Gly Ala Asp Ser Glu Leu Ala Lys Arg His Ala Phe Leu Lys Leu
1               5                   10                  15

Ala Thr Leu Ile Ser Phe Leu
            20


<210> SEQ ID NO 498
<211> LENGTH: 23
<212> TYPE: PRT
<213> ORGANISM: Homo sapiens
<220> FEATURE:
<223> OTHER INFORMATION: 13

<400> SEQUENCE: 498

Leu Arg Ile Phe Ala Cys Arg Gly Gly Lys Arg Tyr Trp Ile Phe Thr
1               5                   10                  15
```

```
Glu Glu Glu His Ser Ala Glu
            20


<210> SEQ ID NO 499
<211> LENGTH: 29
<212> TYPE: PRT
<213> ORGANISM: Homo sapiens
<220> FEATURE:
<223> OTHER INFORMATION: 14

<400> SEQUENCE: 499

Leu Ser Ser Gly Gly Leu Met Gly Gly Thr Trp Lys Arg Arg Gln Pro
1               5                   10                  15

Arg Pro Trp Gly Ala Gln Ser Thr Glu Gln Ala Arg Asp
            20                  25


<210> SEQ ID NO 500
<211> LENGTH: 39
<212> TYPE: PRT
<213> ORGANISM: Homo sapiens
<220> FEATURE:
<223> OTHER INFORMATION: 15

<400> SEQUENCE: 500

Val Ser Leu Leu Gln Glu Lys Ala Lys Lys Lys Glu Asn His Ser Lys
1               5                   10                  15

Thr Gln Gln Glu Thr Val Gln Met Leu Trp Glu Leu Cys Leu Leu Pro
            20                  25                  30

Ile Met Gly Pro Gln Asn Gly
        35


<210> SEQ ID NO 501
<211> LENGTH: 37
<212> TYPE: PRT
<213> ORGANISM: Homo sapiens
<220> FEATURE:
<223> OTHER INFORMATION: 16

<400> SEQUENCE: 501

Leu Ala Asn Phe Thr Pro Phe Ser Val Val Trp Ala Pro His Cys Asn
1               5                   10                  15

Val Gln Cys His Val Leu Leu Thr Pro Thr Gly Val Leu Ala Ser Thr
            20                  25                  30

Lys Gly Arg Val Ala
        35


<210> SEQ ID NO 502
<211> LENGTH: 30
<212> TYPE: PRT
<213> ORGANISM: Homo sapiens
<220> FEATURE:
<223> OTHER INFORMATION: 17

<400> SEQUENCE: 502

Leu Cys Cys Lys Lys Lys Lys Lys Val Ser Leu Phe Lys Ile Thr Trp
1               5                   10                  15

Phe Val Asn Pro Ser Cys Phe Phe Pro Ile Gly Thr Ser His
            20                  25                  30


<210> SEQ ID NO 503
<211> LENGTH: 41
<212> TYPE: PRT
<213> ORGANISM: Homo sapiens
```

<220> FEATURE:
<223> OTHER INFORMATION: 18

<400> SEQUENCE: 503

```
Val Asn Trp Met Val Leu Arg Thr Ile Ser Pro Arg Gln Pro Val Ser
1               5                   10                  15

Ile Leu Phe Asn Lys Leu Val Trp Val Leu Tyr Met His Asn Lys Pro
            20                  25                  30

Cys Ser Asn Leu Ser His Lys Ser Leu
        35                  40
```

<210> SEQ ID NO 504
<211> LENGTH: 69
<212> TYPE: PRT
<213> ORGANISM: Homo sapiens
<220> FEATURE:
<223> OTHER INFORMATION: 19

<400> SEQUENCE: 504

```
Leu Arg Gly Gln Leu Glu Pro Ser Phe Leu Val Met Pro Ala Gln Val
1               5                   10                  15

Thr Thr Ile Met Ile Lys Asn Cys Leu Pro Gln Gly Val Ser Met Lys
            20                  25                  30

Ser Thr Arg Gly Gln Gly Gln Gly Ala Arg Gly Val His Thr Lys Ala
        35                  40                  45

Ile Gly Asp Leu Arg Gly Asn Leu Arg Phe Phe Thr Gly Glu Thr Met
    50                  55                  60

Lys Gln Gln Arg Gln
65
```

<210> SEQ ID NO 505
<211> LENGTH: 22
<212> TYPE: PRT
<213> ORGANISM: Homo sapiens
<220> FEATURE:
<223> OTHER INFORMATION: 20

<400> SEQUENCE: 505

```
Leu Leu Leu Ala Thr Cys Leu Lys Gly Arg Glu Gly Lys Ser Ser Gly
1               5                   10                  15

Ile Phe Gln His Phe Val
            20
```

<210> SEQ ID NO 506
<211> LENGTH: 22
<212> TYPE: PRT
<213> ORGANISM: Homo sapiens
<220> FEATURE:
<223> OTHER INFORMATION: 21

<400> SEQUENCE: 506

```
Met Gly Gly Gly Asp Gly Trp Glu Glu Met Lys Ile Ser Ala Phe Leu
1               5                   10                  15

Ile Pro Phe Tyr Ser Phe
            20
```

<210> SEQ ID NO 507
<211> LENGTH: 40
<212> TYPE: PRT
<213> ORGANISM: Homo sapiens
<220> FEATURE:
<223> OTHER INFORMATION: 22

<400> SEQUENCE: 507

```
Leu Tyr Lys Gln Asn Ser Thr Ala Arg Gly Gly Ala Gly Pro Gly Glu
1               5                   10                  15

Ser Pro Leu Val Gln Asp Arg Gly Leu Arg Arg Val Ser Thr Leu Leu
            20                  25                  30

Leu Gly Ala Val Ala Phe Phe Tyr
        35                  40
```

<210> SEQ ID NO 508
<211> LENGTH: 35
<212> TYPE: PRT
<213> ORGANISM: Homo sapiens
<220> FEATURE:
<223> OTHER INFORMATION: 23

<400> SEQUENCE: 508

```
Leu Tyr Pro Glu Arg Gln His Asn Ser Ser Phe Pro Pro Phe Lys Ile
1               5                   10                  15

Leu Cys Ser Phe Leu Gln Gln Leu Leu Thr Lys Gly Leu His Phe Ser
            20                  25                  30

Pro Asp Phe
        35
```

<210> SEQ ID NO 509
<211> LENGTH: 28
<212> TYPE: PRT
<213> ORGANISM: Homo sapiens
<220> FEATURE:
<223> OTHER INFORMATION: 24

<400> SEQUENCE: 509

```
Met Pro Arg Leu Phe Ser Pro Arg Ser Gly Leu Phe Phe Phe Phe Phe
1               5                   10                  15

Phe Phe Phe Ser Val Ser Pro Lys Leu Tyr Leu Ser
            20                  25
```

<210> SEQ ID NO 510
<211> LENGTH: 57
<212> TYPE: PRT
<213> ORGANISM: Homo sapiens
<220> FEATURE:
<223> OTHER INFORMATION: 25

<400> SEQUENCE: 510

```
Leu His Ala Glu Glu Val Arg Gly Ile Gly Phe Ser Gln Arg Lys Asn
1               5                   10                  15

Thr Ala Gln Asn Glu Gly Pro Gly Leu Leu Ser Cys Pro Val Glu Gly
            20                  25                  30

Ser Trp Val Gly His Gly Lys Glu Gly Ser Leu Gly Pro Gly Glu Pro
        35                  40                  45

Ser Pro Leu Ser Lys Gln Gly Thr Glu
    50                  55
```

<210> SEQ ID NO 511
<211> LENGTH: 31
<212> TYPE: PRT
<213> ORGANISM: Homo sapiens
<220> FEATURE:
<223> OTHER INFORMATION: 26

<400> SEQUENCE: 511

```
Met Gly Asn Leu Asp Phe Arg Glu Asn Glu Gln Arg Ala Lys Glu Lys
```

```
1               5                   10                  15

Ser Gly Cys Pro Ser Ile Phe Ile Leu Leu Ser Gln Val Ser Trp
            20                  25                  30


<210> SEQ ID NO 512
<211> LENGTH: 34
<212> TYPE: PRT
<213> ORGANISM: Homo sapiens
<220> FEATURE:
<223> OTHER INFORMATION: 27

<400> SEQUENCE: 512

Leu Lys Phe Ser Gln His Pro His Gln Thr Leu Phe Phe Tyr Val Phe
1               5                   10                  15

Phe Ala Thr Tyr Glu Cys Phe Glu Asn Lys Val Pro Met Ser Leu Leu
            20                  25                  30

Asp Leu


<210> SEQ ID NO 513
<211> LENGTH: 221
<212> TYPE: PRT
<213> ORGANISM: Homo sapiens
<220> FEATURE:
<223> OTHER INFORMATION: 28

<400> SEQUENCE: 513

Val Arg Ala Gly Arg Val His Ser Gly Gln Gly Gly Ala Ala Gly Met
1               5                   10                  15

Leu Arg Val Pro Glu Pro Arg Pro Gly Glu Ala Lys Ala Glu Gly Ala
            20                  25                  30

Ala Pro Pro Thr Pro Ser Lys Pro Leu Thr Ser Phe Leu Ile Gln Asp
        35                  40                  45

Ile Leu Arg Asp Gly Ala Gln Arg Gln Gly Gly Arg Thr Ser Ser Gln
    50                  55                  60

Arg Gln Arg Asp Pro Glu Pro Glu Pro Glu Pro Glu Pro Glu Gly Gly
65                  70                  75                  80

Arg Ser Arg Ala Gly Ala Gln Asn Asp Gln Leu Ser Thr Gly Pro Arg
                85                  90                  95

Ala Ala Pro Glu Glu Ala Glu Thr Leu Ala Glu Thr Glu Pro Gly Gly
            100                 105                 110

Ala Gly Arg Ala Gly Ala Phe Arg Pro Arg Arg Gly Arg Arg Asp Ala
        115                 120                 125

Gln Gly Ser Gly Ala Ala Ala Arg Gly Gly Glu Ser Gly Gly Gly Arg
    130                 135                 140

Ala Ala Asp Pro Val Gln Ala Ala His Val Leu Pro His Pro Gly His
145                 150                 155                 160

Pro Ala Gly Arg Arg Ala Ala Ala Arg Arg Pro His Glu Gln Pro Glu
                165                 170                 175

Thr Ala Arg Pro Gly Ala Gly Ala Arg Ala Arg Ala Arg Gly Arg Thr
            180                 185                 190

Gln Pro Arg Arg Gly Ala Glu Arg Pro Ala Glu His Arg Ala Pro Arg
        195                 200                 205

Arg Ala Gly Gly Gly Arg Asp Ala Gly Arg Asp Arg Ala
    210                 215                 220


<210> SEQ ID NO 514
<211> LENGTH: 28
<212> TYPE: PRT
```

<213> ORGANISM: Homo sapiens
<220> FEATURE:
<223> OTHER INFORMATION: 1

<400> SEQUENCE: 514

```
Leu Ala Leu Thr Pro Arg Arg Arg Ser Pro Asp Ser Ile Val Leu Ala
1               5                   10                  15

Ala Gln Pro Arg Pro Arg Ala Ser His His Ala Arg
            20                  25
```

<210> SEQ ID NO 515
<211> LENGTH: 71
<212> TYPE: PRT
<213> ORGANISM: Homo sapiens
<220> FEATURE:
<223> OTHER INFORMATION: 2

<400> SEQUENCE: 515

```
Val Pro Gly Cys Ala Gly Arg Gly Val Pro Leu Gln Ala Gly Gln Pro
1               5                   10                  15

Gly Arg Gly Arg Thr Ser Gly Gly His Gly Gln Ile Leu Leu Gly Ala
            20                  25                  30

Ala Thr Leu His Gln Pro His His Gln Ala Glu Ile Trp Lys Thr Ile
        35                  40                  45

Gln Pro Arg Asp Thr Asp Phe Arg Pro Leu Asp Glu Arg Lys His Arg
    50                  55                  60

Lys Cys Ser Gln Asn Ser Ala
65                  70
```

<210> SEQ ID NO 516
<211> LENGTH: 61
<212> TYPE: PRT
<213> ORGANISM: Homo sapiens
<220> FEATURE:
<223> OTHER INFORMATION: 3

<400> SEQUENCE: 516

```
Val Val Met Gly Asn Glu Thr Cys Ser Leu Ala Phe Ser Tyr Phe Gln
1               5                   10                  15

Pro Ile Phe His Arg Val Lys Arg Glu Ser Thr His Pro Thr Asn Ala
            20                  25                  30

Cys Ser His Cys Ala Glu Phe Cys Asn Val Phe Leu Cys His His Cys
        35                  40                  45

Ile Tyr Val Cys Leu Asn Lys Val Ser Cys Ile Gln Lys
    50                  55                  60
```

<210> SEQ ID NO 517
<211> LENGTH: 22
<212> TYPE: PRT
<213> ORGANISM: Homo sapiens
<220> FEATURE:
<223> OTHER INFORMATION: 4

<400> SEQUENCE: 517

```
Met His Ala Ala Thr Val Leu Asn Ser Ala Met Phe Ser Phe Val Ile
1               5                   10                  15

Ile Val Tyr Met Cys Val
            20
```

<210> SEQ ID NO 518
<211> LENGTH: 50
<212> TYPE: PRT

<213> ORGANISM: Homo sapiens
<220> FEATURE:
<223> OTHER INFORMATION: 5

<400> SEQUENCE: 518

Val Arg Trp Pro Arg Arg Thr Pro Pro Ser Arg Thr Thr Arg Ala Arg
1               5                   10                  15

Thr His Gln Arg Arg Thr Trp Pro Asp Thr Thr Arg Arg Cys Asp Thr
            20                  25                  30

Thr Ser Thr Ser Ser Pro Gly Arg Asp Met Glu Asn Asp Pro Ala Gln
        35                  40                  45

Arg His
    50

<210> SEQ ID NO 519
<211> LENGTH: 30
<212> TYPE: PRT
<213> ORGANISM: Homo sapiens
<220> FEATURE:
<223> OTHER INFORMATION: 6

<400> SEQUENCE: 519

Leu Leu Ser Gly Leu Phe Leu Phe Ser Ala His Ile Ser Ser Cys Lys
1               5                   10                  15

Thr Arg Ile His Pro Ser Tyr Gln Cys Met Gln Pro Leu Cys
            20                  25                  30

<210> SEQ ID NO 520
<211> LENGTH: 44
<212> TYPE: PRT
<213> ORGANISM: Homo sapiens
<220> FEATURE:
<223> OTHER INFORMATION: 7

<400> SEQUENCE: 520

Leu Ile Ser Asp Leu Leu Met Arg Glu Ser Thr Glu Asn Val Pro Arg
1               5                   10                  15

Thr Arg Tyr Gly Lys Arg Ser Ser Pro Glu Thr Leu Ile Ser Asp Leu
            20                  25                  30

Leu Met Arg Glu Ser Thr Glu Asn Val Pro Arg Thr
        35                  40

<210> SEQ ID NO 521
<211> LENGTH: 103
<212> TYPE: PRT
<213> ORGANISM: Homo sapiens
<220> FEATURE:
<223> OTHER INFORMATION: 8

<400> SEQUENCE: 521

Val Pro Gly Cys Ala Gly Arg Gly Val Pro Leu Gln Ala Gly Gln Pro
1               5                   10                  15

Gly Arg Gly Arg Thr Ser Gly Gly His Gly Gln Ile Leu Leu Gly Ala
            20                  25                  30

Ala Thr Leu His Gln Pro His His Gln Ala Glu Met Leu Gly Asn Lys
        35                  40                  45

Arg Leu Gly Leu Ser Gly Leu Thr Leu Ala Leu Ser Leu Leu Val Cys
    50                  55                  60

Leu Gly Ala Glu Ala Tyr Pro Ser Lys Pro Asp Asn Pro Gly Glu Asp
65                  70                  75                  80

Ala Pro Ala Glu Asp Met Ala Arg Tyr Tyr Ser Ala Leu Arg His Tyr

```
                85                  90                  95

Ile Asn Leu Ile Thr Arg Gln
            100


<210> SEQ ID NO 522
<211> LENGTH: 57
<212> TYPE: PRT
<213> ORGANISM: Homo sapiens
<220> FEATURE:
<223> OTHER INFORMATION: 1

<400> SEQUENCE: 522

Leu Thr Ser Ser Gln His Ile Pro Ala Leu Cys Arg Val His Thr Ala
1               5                   10                  15

Pro Gln Thr Gln Ser Ser Lys Pro Ala Ala Ser Ser Leu Gln Ala Pro
            20                  25                  30

Gln Val Gly Pro Cys His Gly Ala Ser Arg Gln Pro Trp Ala Gly Gly
        35                  40                  45

Arg Gly Leu Pro Thr Gly Thr Gln Pro
    50                  55


<210> SEQ ID NO 523
<211> LENGTH: 26
<212> TYPE: PRT
<213> ORGANISM: Homo sapiens
<220> FEATURE:
<223> OTHER INFORMATION: 2

<400> SEQUENCE: 523

Val Ala Ser Ala Ala His Thr Ser Ser Arg Pro Leu Lys Leu Ala Leu
1               5                   10                  15

Gln Gln Thr Ala Pro Trp Ala Pro Gly Ser
            20                  25


<210> SEQ ID NO 524
<211> LENGTH: 49
<212> TYPE: PRT
<213> ORGANISM: Homo sapiens
<220> FEATURE:
<223> OTHER INFORMATION: 3

<400> SEQUENCE: 524

Leu Thr Cys Cys Thr Leu Arg Thr Ala Ala Gly Gln Pro Arg Pro Leu
1               5                   10                  15

Gly Pro Ala Val Gly Arg Ser His Leu Arg Ser Leu Ser Ser Ala Arg
            20                  25                  30

Ser Leu Thr Ala Lys Pro Gln Arg Ala Ala Trp Thr Trp Cys Pro Ala
        35                  40                  45

Gly


<210> SEQ ID NO 525
<211> LENGTH: 61
<212> TYPE: PRT
<213> ORGANISM: Homo sapiens
<220> FEATURE:
<223> OTHER INFORMATION: 4

<400> SEQUENCE: 525

Met Cys Arg Ser Gly Ser Cys Gly Gln Ser Thr Asn Thr Gly Cys Pro
1               5                   10                  15

Pro Trp Ala Arg Pro Ser Arg Ser Trp Arg Ala Arg Ser Cys Ala Pro
            20                  25                  30
```

```
Cys Arg Arg Ser Ser Ser Ala Ser Ala Arg Pro Trp Val Gly Met Cys
        35                  40                  45

Cys Thr Pro Thr Trp Thr Ser Gly Ser Gln Arg Pro Gly
    50                  55                  60


<210> SEQ ID NO 526
<211> LENGTH: 79
<212> TYPE: PRT
<213> ORGANISM: Homo sapiens
<220> FEATURE:
<223> OTHER INFORMATION: 5

<400> SEQUENCE: 526

Leu Gly Arg Phe Thr Thr Val Pro Arg Pro Val Arg Arg Ala Gly Pro
1               5                   10                  15

Thr Ala Arg Trp Thr His His Ala Pro Gly Ser Pro Ser Thr Cys Gly
            20                  25                  30

Ser Ser Ser Arg Ser Cys Tyr Ser Ser Pro Thr Ala Met Ala Ala Ser
        35                  40                  45

Leu Gly Gly Ser Thr Arg Arg Arg Ala Ser Ser Lys Leu Arg Thr Gln
    50                  55                  60

Pro Arg Trp Pro Gly Cys Gly Ala Ser Ala Arg Thr Val Pro Pro
65                  70                  75


<210> SEQ ID NO 527
<211> LENGTH: 22
<212> TYPE: PRT
<213> ORGANISM: Homo sapiens
<220> FEATURE:
<223> OTHER INFORMATION: 6

<400> SEQUENCE: 527

Leu Ala Gln Gly Leu Lys Pro Ala Leu Arg Gly Leu Ser Pro Ala Cys
1               5                   10                  15

Pro Ala Ser Ala Arg Pro
            20


<210> SEQ ID NO 528
<211> LENGTH: 68
<212> TYPE: PRT
<213> ORGANISM: Homo sapiens
<220> FEATURE:
<223> OTHER INFORMATION: 7

<400> SEQUENCE: 528

Leu Thr Phe Gln Ser Pro Arg Ser Gly Arg Gly Asn Gln Leu Pro Gln
1               5                   10                  15

Gly Asp Met Gly Pro Leu Gly Pro Ser Gly Pro Trp Gly Arg Gly Ala
            20                  25                  30

Ser Ser Ser Gly Pro Ala Ala Pro Leu Glu Asp Arg Gly Arg Gln Gly
        35                  40                  45

Cys Ser Pro Thr Pro Ala Ser Asp Pro Ser Ile Ser Arg Ala Glu Pro
    50                  55                  60

Thr Glu Gly Gln
65


<210> SEQ ID NO 529
<211> LENGTH: 27
<212> TYPE: PRT
<213> ORGANISM: Homo sapiens
<220> FEATURE:
```

<223> OTHER INFORMATION: 8

<400> SEQUENCE: 529

Met Val Gln Gly Asp Ile Cys Thr Pro Glu Leu Gly Ser Gln Glu Cys
1 5 10 15

Pro Arg Glu Trp Ile Ile Lys Ile Leu Glu Asn
20 25

<210> SEQ ID NO 530
<211> LENGTH: 104
<212> TYPE: PRT
<213> ORGANISM: Homo sapiens
<220> FEATURE:
<223> OTHER INFORMATION: 9

<400> SEQUENCE: 530

Leu His Ser Ala Val Ser Thr Leu Pro His Arg Pro Ser Pro Pro Ser
1 5 10 15

Leu Leu Pro Ala Pro Cys Lys Pro Leu Arg Leu Gly Leu Ala Thr Val
20 25 30

Pro Ala Gly Ser Pro Gly Leu Gly Val Gly Asp Ser Leu Gln Ala Arg
35 40 45

Ser Pro Glu Thr Ser Glu Gly His Pro Leu Arg Val Ala Arg Pro Pro
50 55 60

Val Ala Asn Leu Ser Ala Ala Ser Ala Thr Ser Pro Ala Gly Pro Trp
65 70 75 80

Phe Arg Trp Pro Pro Arg Cys Leu Ala Glu Thr Arg Gln Trp Pro Gln
85 90 95

Leu Pro Thr Pro Leu Pro Gly Pro
100

<210> SEQ ID NO 531
<211> LENGTH: 21
<212> TYPE: PRT
<213> ORGANISM: Homo sapiens
<220> FEATURE:
<223> OTHER INFORMATION: 10

<400> SEQUENCE: 531

Leu Glu Ser Gln Ser Thr Arg His Ala Arg Ala Gly Pro Val Arg Leu
1 5 10 15

Leu Pro Leu Leu Leu
20

<210> SEQ ID NO 532
<211> LENGTH: 94
<212> TYPE: PRT
<213> ORGANISM: Homo sapiens
<220> FEATURE:
<223> OTHER INFORMATION: 11

<400> SEQUENCE: 532

Leu Gln Ala Ala Gln His His Arg Arg Ser His Gly Leu Glu Pro Gln
1 5 10 15

Gln Cys Ala Glu Val Ala Pro Val Asp Arg Ala Pro Ile Pro Ala Ala
20 25 30

Pro His Gly Gln Gly Leu Pro Gly Ala Gly Gly Gln Gly Ala Val Arg
35 40 45

His Val Gly Gly Ala Val Pro Pro Ala Leu Ala Pro Gly Trp Gly Cys
50 55 60

```
Ala Ala Arg Pro Pro Gly His Leu Glu Val Ser Gly Leu Asp Glu Arg
65                  70                  75                  80

Ala Asp Phe Thr Trp Gly Asp Ser Leu Leu Cys Leu Asp Gln
                85                  90


<210> SEQ ID NO 533
<211> LENGTH: 35
<212> TYPE: PRT
<213> ORGANISM: Homo sapiens
<220> FEATURE:
<223> OTHER INFORMATION: 12

<400> SEQUENCE: 533

Leu Asp Arg Gln Arg Gly Gly Leu Ile Met Leu Arg Ala Ala His Pro
1               5                   10                  15

Pro Val Ala Val Pro Gln Gly Val Ala Thr Gln Ala Pro Gln Leu Trp
            20                  25                  30

Pro Leu His
        35


<210> SEQ ID NO 534
<211> LENGTH: 52
<212> TYPE: PRT
<213> ORGANISM: Homo sapiens
<220> FEATURE:
<223> OTHER INFORMATION: 13

<400> SEQUENCE: 534

Val Gly His Pro Gln Glu Pro Ser Arg His Glu Leu Arg Gln Ala Glu
1               5                   10                  15

Pro Leu His Pro Pro Val Leu Gln Glu Gly His His Pro Glu Ala Arg
            20                  25                  30

His Leu Pro Ala Pro Arg Leu Pro Val Arg Ala Pro His Leu Ser Ala
        35                  40                  45

Trp Pro Arg Ala
    50


<210> SEQ ID NO 535
<211> LENGTH: 21
<212> TYPE: PRT
<213> ORGANISM: Homo sapiens
<220> FEATURE:
<223> OTHER INFORMATION: 14

<400> SEQUENCE: 535

Leu Pro Ala Leu Pro Gln Pro Gly Pro Glu Met Gly Glu Asn Gly Gln
1               5                   10                  15

Ser Ala Leu Leu Leu
            20


<210> SEQ ID NO 536
<211> LENGTH: 84
<212> TYPE: PRT
<213> ORGANISM: Homo sapiens
<220> FEATURE:
<223> OTHER INFORMATION: 15

<400> SEQUENCE: 536

Val Leu Pro Pro Gln Ala Gln Leu Leu Pro Trp Arg Thr Glu Gly Asp
1               5                   10                  15

Arg Ala Ala Pro Gln His Leu Pro Leu Thr Pro Ala Phe Pro Glu Gln
            20                  25                  30
```

```
Ser Leu Gln Lys Gly Ser Asp Ser Thr Lys Ala Thr Gly Ser Pro Gly
        35                  40                  45

Leu Ser Leu Leu His Pro Pro Ala Ser His Ser Ala Pro His Leu Ala
    50                  55                  60

Trp Cys Arg Glu Thr Ser Ala Pro Leu Ser Trp Ala Ala Arg Ser Ala
65                  70                  75                  80

Pro Gly Asn Gly
```

```
<210> SEQ ID NO 537
<211> LENGTH: 49
<212> TYPE: PRT
<213> ORGANISM: Homo sapiens
<220> FEATURE:
<223> OTHER INFORMATION: 16

<400> SEQUENCE: 537

Leu Ser Asp Phe Leu Pro Ala His Ser Cys Thr Leu Pro Cys Pro His
1               5                   10                  15

Cys Pro Thr Asp Pro Val Leu Gln Ala Cys Cys Gln Leu Pro Ala Ser
            20                  25                  30

Pro Ser Gly Trp Ala Leu Pro Arg Cys Gln Gln Ala Ala Leu Gly Trp
        35                  40                  45

Gly
```

```
<210> SEQ ID NO 538
<211> LENGTH: 90
<212> TYPE: PRT
<213> ORGANISM: Homo sapiens
<220> FEATURE:
<223> OTHER INFORMATION: 17

<400> SEQUENCE: 538

Val Pro Gly Pro Gly Pro Glu Thr Arg Pro Gln Gly Pro Leu Ser Cys
1               5                   10                  15

Leu Pro Cys Leu Ser Gln Ala Leu Arg Trp Gly Lys Thr Gly Ser Leu
            20                  25                  30

Leu Cys Cys Ser Asp Leu Pro Glu Pro Lys Val Arg Glu Gly Gln Pro
        35                  40                  45

Thr Ala Pro Gly Gly Tyr Gly Ser Ser Gly Ala Phe Gly Thr Leu Gly
    50                  55                  60

Gln Gly Cys Phe Leu Leu Arg Pro Ser Cys Ser Pro Gly Gly Gln Arg
65                  70                  75                  80

Glu Thr Gly Leu Leu Pro Asn Thr Cys Leu
                85                  90
```

```
<210> SEQ ID NO 539
<211> LENGTH: 35
<212> TYPE: PRT
<213> ORGANISM: Homo sapiens
<220> FEATURE:
<223> OTHER INFORMATION: 18

<400> SEQUENCE: 539

Val Thr Arg Gln Arg Pro Gln Ala Val Gln Ala Ser Leu Cys Ser Ile
1               5                   10                  15

Pro Leu Pro Pro Ile Leu His His Thr Trp His Gly Ala Gly Arg His
            20                  25                  30

Leu His Pro
        35
```

<210> SEQ ID NO 540
<211> LENGTH: 76
<212> TYPE: PRT
<213> ORGANISM: Homo sapiens
<220> FEATURE:
<223> OTHER INFORMATION: 1

<400> SEQUENCE: 540

```
Leu Thr Phe Ser Thr Ser Cys Ser Pro Leu Thr Ala Ser His Pro His
1               5                   10                  15

Leu Ser Leu Pro Cys His Phe Gly Phe Trp Val Phe Glu Pro Leu Leu
            20                  25                  30

Ala Ile Gly Val Arg Gln Lys His Pro Gly Leu Pro Phe Ala Leu Ser
        35                  40                  45

Arg Gly Ser Thr Glu Gln Val Gly Leu His Trp Cys Phe Val Val Gly
    50                  55                  60

Arg Arg Met Gly Ser Arg Thr Tyr Gln Leu Arg Phe
65                  70                  75
```

<210> SEQ ID NO 541
<211> LENGTH: 25
<212> TYPE: PRT
<213> ORGANISM: Homo sapiens
<220> FEATURE:
<223> OTHER INFORMATION: 2

<400> SEQUENCE: 541

```
Leu Gly Ser Trp Leu Gly Arg Gly Ser Cys Gln Val Ser Ala Gly Pro
1               5                   10                  15

Ala Lys Pro Cys Leu Thr Thr Ser Trp
            20                  25
```

<210> SEQ ID NO 542
<211> LENGTH: 23
<212> TYPE: PRT
<213> ORGANISM: Homo sapiens
<220> FEATURE:
<223> OTHER INFORMATION: 3

<400> SEQUENCE: 542

```
Met Gly Leu Gly Phe Ser Pro Pro Met Cys Ser Arg Leu Ala Leu Lys
1               5                   10                  15

Val Leu Ser Phe Ser Lys Val
            20
```

<210> SEQ ID NO 543
<211> LENGTH: 19
<212> TYPE: PRT
<213> ORGANISM: Homo sapiens
<220> FEATURE:
<223> OTHER INFORMATION: 4

<400> SEQUENCE: 543

```
Leu Phe Pro Leu Pro Val Gly Arg Trp Val Gly Ser Phe Tyr Ser Trp
1               5                   10                  15

Ala Ala Gly
```

<210> SEQ ID NO 544
<211> LENGTH: 31
<212> TYPE: PRT
<213> ORGANISM: Homo sapiens
<220> FEATURE:
<223> OTHER INFORMATION: 5

<400> SEQUENCE: 544

```
Leu Thr Gln Thr Asp Ile Leu His Phe Leu Phe Pro Thr Asp Ser Leu
1               5                   10                  15

Pro Pro Pro Ser Leu Pro Pro Leu Pro Phe Trp Val Leu Gly Leu
            20                  25                  30
```

<210> SEQ ID NO 545
<211> LENGTH: 31
<212> TYPE: PRT
<213> ORGANISM: Homo sapiens
<220> FEATURE:
<223> OTHER INFORMATION: 6

<400> SEQUENCE: 545

```
Leu Ser Leu Thr Val Glu Phe Ser Leu Thr Ser Arg Pro Ile Ser Val
1               5                   10                  15

Lys Cys Trp His Leu His Leu Pro His Arg Val His Cys Glu Gly
            20                  25                  30
```

<210> SEQ ID NO 546
<211> LENGTH: 40
<212> TYPE: PRT
<213> ORGANISM: Homo sapiens
<220> FEATURE:
<223> OTHER INFORMATION: 7

<400> SEQUENCE: 546

```
Leu Ala Leu Lys Pro Pro Phe Ile Thr Trp Gly Leu Glu Leu Asp Pro
1               5                   10                  15

Leu Glu Gly Ala Cys Ser Leu Ser Leu Leu Val Gly Gly Leu Val Val
            20                  25                  30

Ser Thr Val Gly Gln Leu Val Arg
        35                  40
```

<210> SEQ ID NO 547
<211> LENGTH: 21
<212> TYPE: PRT
<213> ORGANISM: Homo sapiens
<220> FEATURE:
<223> OTHER INFORMATION: 8

<400> SEQUENCE: 547

```
Leu Ser Ser Leu Cys Trp Pro Ser Gln Thr Leu Ser Asp Asn Leu Leu
1               5                   10                  15

Val Asn Leu Ser Thr
            20
```

<210> SEQ ID NO 548
<211> LENGTH: 25
<212> TYPE: PRT
<213> ORGANISM: Homo sapiens
<220> FEATURE:
<223> OTHER INFORMATION: 9

<400> SEQUENCE: 548

```
Leu Asp Pro Pro Arg Leu Val Leu Cys Ser Gly Ser Ile Ser Phe Phe
1               5                   10                  15

Phe Phe Phe Phe Phe Phe Leu Phe Leu
            20                  25
```

<210> SEQ ID NO 549
<211> LENGTH: 27

<212> TYPE: PRT
<213> ORGANISM: Homo sapiens
<220> FEATURE:
<223> OTHER INFORMATION: 10

<400> SEQUENCE: 549

```
Val Leu Pro Arg Leu Val Ser Asn Ser Trp Ala Gln Ala Ile His Leu
1               5                   10                  15

Ser Gln Pro Pro Arg Val Leu Gly Leu Gln Leu
            20                  25
```

<210> SEQ ID NO 550
<211> LENGTH: 24
<212> TYPE: PRT
<213> ORGANISM: Homo sapiens
<220> FEATURE:
<223> OTHER INFORMATION: 1

<400> SEQUENCE: 550

```
Leu Asp Arg Ser Arg Pro Pro His Ala Pro Val Glu Ser Cys Ser Thr
1               5                   10                  15

Ile Ser Phe His Ser Ala Gln Asn
            20
```

<210> SEQ ID NO 551
<211> LENGTH: 50
<212> TYPE: PRT
<213> ORGANISM: Homo sapiens
<220> FEATURE:
<223> OTHER INFORMATION: 2

<400> SEQUENCE: 551

```
Leu Ala Val Pro Pro Gly Ala Pro Val Gly Gln Leu Gln Leu Gln Leu
1               5                   10                  15

His His Leu Gly Arg His Gln Arg Gly Val Gln Asp Asp Gly Ser Arg
            20                  25                  30

Arg Gly Gly Pro Ala Leu Gly Arg Ala Glu Glu Gln Thr Gln His Glu
        35                  40                  45

Leu Arg
    50
```

<210> SEQ ID NO 552
<211> LENGTH: 65
<212> TYPE: PRT
<213> ORGANISM: Homo sapiens
<220> FEATURE:
<223> OTHER INFORMATION: 3

<400> SEQUENCE: 552

```
Val Ala His Gln Gln Thr Leu Ile Cys Asn Cys Met Ala Cys Ala Val
1               5                   10                  15

Leu Val Glu Ile Lys Tyr Ile Pro Phe Asp Gly Gln Leu Ser Ala Phe
            20                  25                  30

Ser Asn Cys Glu Asp Asp Pro Lys Phe Pro Thr Pro Leu Gln Tyr Tyr
        35                  40                  45

Arg Asp Tyr Glu Leu Lys Gly Gly Thr Glu Asp Val Tyr Arg Val Ser
    50                  55                  60

Val
65
```

<210> SEQ ID NO 553
<211> LENGTH: 35

<212> TYPE: PRT
<213> ORGANISM: Homo sapiens
<220> FEATURE:
<223> OTHER INFORMATION: 4

<400> SEQUENCE: 553

Leu Asp Ser Gly His Leu Gly Thr Val Tyr Asn Glu Leu Trp Arg Leu
1 5 10 15

Glu Gly Ser Cys Ser Gln Cys Tyr Thr Lys Pro Ser Val Arg Arg Lys
20 25 30

Asp Thr Ala
35

<210> SEQ ID NO 554
<211> LENGTH: 23
<212> TYPE: PRT
<213> ORGANISM: Homo sapiens
<220> FEATURE:
<223> OTHER INFORMATION: 5

<400> SEQUENCE: 554

Met Ala Phe Leu Ala Ala Thr Ile Arg Asn His Ala Gly Ile Leu Gly
1 5 10 15

Arg Arg Pro Pro Val Phe Leu
20

<210> SEQ ID NO 555
<211> LENGTH: 24
<212> TYPE: PRT
<213> ORGANISM: Homo sapiens
<220> FEATURE:
<223> OTHER INFORMATION: 6

<400> SEQUENCE: 555

Met Leu Asn Val Tyr Asn Met Lys Leu Leu Val Leu Arg Met Gln Asn
1 5 10 15

Val Cys Asn Lys Ile Ser Leu Ala
20

<210> SEQ ID NO 556
<211> LENGTH: 23
<212> TYPE: PRT
<213> ORGANISM: Homo sapiens
<220> FEATURE:
<223> OTHER INFORMATION: 7

<400> SEQUENCE: 556

Leu Gly Phe Thr Ser Pro Glu Pro Asp Val Ala Gly Tyr Pro Leu Lys
1 5 10 15

Thr Met Phe Ile Ser Ile Ile
20

<210> SEQ ID NO 557
<211> LENGTH: 24
<212> TYPE: PRT
<213> ORGANISM: Homo sapiens
<220> FEATURE:
<223> OTHER INFORMATION: 8

<400> SEQUENCE: 557

Met Phe Ser Ile Arg Ser Leu Asn Pro Pro Pro Pro Val Gln Val Ile
1 5 10 15

Ser Lys Ser Tyr Glu Gln Leu Gly
20

<210> SEQ ID NO 558
<211> LENGTH: 67
<212> TYPE: PRT
<213> ORGANISM: Homo sapiens
<220> FEATURE:
<223> OTHER INFORMATION: 9

<400> SEQUENCE: 558

```
Val Ala Pro Ala Thr Gln Glu Gln Glu Pro Glu Glu Leu Pro Ser Asp
1               5                   10                  15

Ser Arg Cys Ser Arg Asp Gly Tyr Ser Ser Gly Ala Gly Lys Val Met
            20                  25                  30

Gly His Arg Glu Ser Thr Asp Val Leu Gln Arg Pro Lys Val Thr His
        35                  40                  45

Cys Leu Glu Lys Glu Lys Lys Ile Phe Phe Lys Lys Leu Val Tyr Leu
    50                  55                  60

Ala Ser His
65
```

<210> SEQ ID NO 559
<211> LENGTH: 55
<212> TYPE: PRT
<213> ORGANISM: Homo sapiens
<220> FEATURE:
<223> OTHER INFORMATION: 10

<400> SEQUENCE: 559

```
Met Asn Gln Lys Cys Leu Lys Arg Asn Glu Lys Ser Phe Thr Gly Ala
1               5                   10                  15

Gly Glu Gly Ser Arg Gly Arg Asp Pro Lys Thr Leu Gly Arg Glu Leu
            20                  25                  30

Leu Lys Ser Tyr Tyr Arg Asn Glu Glu Asp Ala Lys Asn Val Thr Asn
        35                  40                  45

Met Asp Ile Ser Ser Val Asp
    50                  55
```

<210> SEQ ID NO 560
<211> LENGTH: 39
<212> TYPE: PRT
<213> ORGANISM: Homo sapiens
<220> FEATURE:
<223> OTHER INFORMATION: 11

<400> SEQUENCE: 560

```
Val Leu Phe Trp Leu Lys Ser Asn Thr Phe Arg Leu Met Asp Ser Cys
1               5                   10                  15

Gln Leu Ser Gln Thr Val Lys Met Thr Gln Ser Phe Gln Leu Leu Tyr
            20                  25                  30

Ser Ile Thr Gly Thr Met Asn
        35
```

<210> SEQ ID NO 561
<211> LENGTH: 50
<212> TYPE: PRT
<213> ORGANISM: Homo sapiens
<220> FEATURE:
<223> OTHER INFORMATION: 12

<400> SEQUENCE: 561

```
Leu Cys Thr Met Ser Tyr Gly Asp Ser Arg Val His Ala Val Ser Val
1               5                   10                  15
```

```
Ile Pro Asn Pro Val Leu Gly Glu Arg Thr Gln Arg Asn Gly Glu Arg
            20                  25                  30

Gly Ser Ser Arg Ile Gln Lys Gln Lys Cys Ala Ser Leu Ser Leu Phe
        35                  40                  45

Val Lys
    50


<210> SEQ ID NO 562
<211> LENGTH: 57
<212> TYPE: PRT
<213> ORGANISM: Homo sapiens
<220> FEATURE:
<223> OTHER INFORMATION: 13

<400> SEQUENCE: 562

Val Gly Ala Leu Phe Ser Thr Gly Ser Gly Lys Arg Trp Pro Ser Trp
1               5                   10                  15

Leu Pro Gln Ser Glu Ile Thr Gln Ala Phe Trp Val Gly Gly Leu Gln
            20                  25                  30

Phe Ser Phe Glu Ser Arg Thr Leu Cys Val Cys Gln Asn Glu Val Tyr
        35                  40                  45

Lys Ser Met Phe Phe Pro Leu Phe Ile
    50                  55


<210> SEQ ID NO 563
<211> LENGTH: 51
<212> TYPE: PRT
<213> ORGANISM: Homo sapiens
<220> FEATURE:
<223> OTHER INFORMATION: 14

<400> SEQUENCE: 563

Met Lys Thr Cys Ala Glu Cys Cys Gly Phe Cys Val Ile Ile Tyr Phe
1               5                   10                  15

Val Gln Glu Leu Val Gln Gly Arg Ala Lys Glu Ile Gly Cys Leu Ala
            20                  25                  30

Pro Lys Trp Arg Gln Pro Leu Gln Val Leu Leu Ala Ser Pro Pro Val
        35                  40                  45

Phe Tyr Phe
    50


<210> SEQ ID NO 564
<211> LENGTH: 23
<212> TYPE: PRT
<213> ORGANISM: Homo sapiens
<220> FEATURE:
<223> OTHER INFORMATION: 15

<400> SEQUENCE: 564

Leu Glu Gln Lys Asp Pro Gly Phe His Ile Gly Ala Ser Ile Phe Met
1               5                   10                  15

Pro Gly Met Glu Arg Gly Leu
            20


<210> SEQ ID NO 565
<211> LENGTH: 34
<212> TYPE: PRT
<213> ORGANISM: Homo sapiens
<220> FEATURE:
<223> OTHER INFORMATION: 16

<400> SEQUENCE: 565
```

```
Val Asn Lys Leu Pro Leu Val Arg Gln Thr Val Leu Leu Leu Ala Asn
1               5                   10                  15

Lys Ala Ser Trp Ile Ala Ala Ile Ser His Phe Thr Glu Thr Arg Asp
            20                  25                  30

Asn Val


<210> SEQ ID NO 566
<211> LENGTH: 25
<212> TYPE: PRT
<213> ORGANISM: Homo sapiens
<220> FEATURE:
<223> OTHER INFORMATION: 17

<400> SEQUENCE: 566

Leu Leu His Gln Ser Tyr Leu Gly Thr Val Ala Trp Asp Ser Leu Ala
1               5                   10                  15

Leu Ser Leu Met Leu Leu Ala Ile Pro
            20                  25


<210> SEQ ID NO 567
<211> LENGTH: 28
<212> TYPE: PRT
<213> ORGANISM: Homo sapiens
<220> FEATURE:
<223> OTHER INFORMATION: 18

<400> SEQUENCE: 567

Met Leu Pro Thr Leu Val Gln Val Lys Ala Thr Gln Lys Val Lys Ile
1               5                   10                  15

Gln Gly Asp Arg Ala Lys Ala Leu Ala Glu Thr Ser
            20                  25


<210> SEQ ID NO 568
<211> LENGTH: 20
<212> TYPE: PRT
<213> ORGANISM: Homo sapiens
<220> FEATURE:
<223> OTHER INFORMATION: 19

<400> SEQUENCE: 568

Val Leu Trp Met Phe Trp Gln Trp Ala Leu Lys Ser Ala Gly His Asp
1               5                   10                  15

Tyr Gln Cys Ser
            20


<210> SEQ ID NO 569
<211> LENGTH: 27
<212> TYPE: PRT
<213> ORGANISM: Homo sapiens
<220> FEATURE:
<223> OTHER INFORMATION: 20

<400> SEQUENCE: 569

Val Ser Phe Gly Leu Asp Gly Ala Gln Pro Ser Ile Ile Leu Gln Gln
1               5                   10                  15

Pro Gly Lys Ala His Lys Val Pro Val Ser Pro
            20                  25


<210> SEQ ID NO 570
<211> LENGTH: 36
<212> TYPE: PRT
<213> ORGANISM: Homo sapiens
<220> FEATURE:
```

<223> OTHER INFORMATION: 21

<400> SEQUENCE: 570

Met Ile Ile Ile Phe Asn Phe Asn Arg Cys Phe Pro Leu Asp Pro Ser
1 5 10 15

Thr Leu His Pro Gln Ser Arg Leu Leu Ala Ser Leu Met Ser Asn Trp
20 25 30

Asp Asn Phe Gly
35

<210> SEQ ID NO 571
<211> LENGTH: 26
<212> TYPE: PRT
<213> ORGANISM: Homo sapiens
<220> FEATURE:
<223> OTHER INFORMATION: 22

<400> SEQUENCE: 571

Leu Tyr Asn Leu Thr Pro Ala Gly Lys Arg Phe Val Phe Phe Ser Cys
1 5 10 15

Leu Gln Leu Ala Phe Gly Pro Cys Met Trp
20 25

<210> SEQ ID NO 572
<211> LENGTH: 31
<212> TYPE: PRT
<213> ORGANISM: Homo sapiens
<220> FEATURE:
<223> OTHER INFORMATION: 23

<400> SEQUENCE: 572

Met Trp His Leu Gln Pro Arg Ser Arg Ser Arg Arg Ser Cys Pro Leu
1 5 10 15

Thr Ala Gly Ala Ala Glu Met Ala Thr Ala Gln Glu Leu Gly Arg
20 25 30

<210> SEQ ID NO 573
<211> LENGTH: 20
<212> TYPE: PRT
<213> ORGANISM: Homo sapiens
<220> FEATURE:
<223> OTHER INFORMATION: 24

<400> SEQUENCE: 573

Val Arg Thr Ser Arg Cys Leu Ser Val Pro Thr Glu Arg His Thr Trp
1 5 10 15

Leu Arg Gln Arg
20

<210> SEQ ID NO 574
<211> LENGTH: 26
<212> TYPE: PRT
<213> ORGANISM: Homo sapiens
<220> FEATURE:
<223> OTHER INFORMATION: 25

<400> SEQUENCE: 574

Met Ala Gln Gly Thr Leu Leu Met Asn Ala Val Trp Pro Lys Ala Gly
1 5 10 15

Arg Trp Trp Ala Ala Gln Thr Pro Leu Gly
20 25

<210> SEQ ID NO 575

```
<211> LENGTH: 21
<212> TYPE: PRT
<213> ORGANISM: Homo sapiens
<220> FEATURE:
<223> OTHER INFORMATION: 26

<400> SEQUENCE: 575

Met Ala Phe Gln Thr Ser Thr Ser Cys Tyr Ser Arg Thr Ser Met Gly
1               5                   10                  15

Arg Asn Cys Ala Arg
            20


<210> SEQ ID NO 576
<211> LENGTH: 70
<212> TYPE: PRT
<213> ORGANISM: Homo sapiens
<220> FEATURE:
<223> OTHER INFORMATION: 27

<400> SEQUENCE: 576

Met Leu Glu Thr Gln Gly Val Gln Leu Leu Phe Ser Gln Ile Leu Gln
1               5                   10                  15

Tyr Ile Leu Lys Leu Arg Lys Glu Leu Gln Leu Gly Gln Ile Tyr His
            20                  25                  30

Met Ser Pro Pro Gly Asp Gln Pro Gly Pro Val Thr Ala Thr Pro Arg
        35                  40                  45

Pro Ser Arg Lys Leu Leu Asn His Leu Leu Pro Gln Cys Pro Lys Leu
    50                  55                  60

Lys Thr Ser Val Leu Ser
65                  70


<210> SEQ ID NO 577
<211> LENGTH: 45
<212> TYPE: PRT
<213> ORGANISM: Homo sapiens
<220> FEATURE:
<223> OTHER INFORMATION: 28

<400> SEQUENCE: 577

Leu Asp Gln Gln Val Ala Ala Leu Gln Ile Gln Ala Val Ala Arg Ser
1               5                   10                  15

Ser Phe Gly Ser Ser Ser Trp Ser Ser Cys Arg Thr Ala Pro Thr Pro
            20                  25                  30

Ala Ala Ser Pro Gly Lys Ala Pro Thr Gly Ser Ser Arg
        35                  40                  45


<210> SEQ ID NO 578
<211> LENGTH: 46
<212> TYPE: PRT
<213> ORGANISM: Homo sapiens
<220> FEATURE:
<223> OTHER INFORMATION: 29

<400> SEQUENCE: 578

Met Gly Ser Ala Thr Pro Thr Ser Ser Thr Ser Thr Gly Ser Pro Arg
1               5                   10                  15

Pro Ser Ser Pro Thr Pro Arg Ser His Leu Cys Thr Ser Thr Pro Gln
            20                  25                  30

Thr Ser Arg Thr Trp Ala Pro Ile Thr Pro Thr His Arg Arg
        35                  40                  45


<210> SEQ ID NO 579
```

<211> LENGTH: 58
<212> TYPE: PRT
<213> ORGANISM: Homo sapiens
<220> FEATURE:
<223> OTHER INFORMATION: 30

<400> SEQUENCE: 579

Leu Leu Pro Gln Thr His Thr Gly Ile His Gln Leu Gly Val Tyr Thr
1 5 10 15

Pro Thr Leu Gly Ser Pro Pro Ala Ile Cys Leu Leu Ile Trp Ala Leu
20 25 30

Thr Thr Lys Asp Leu Ala Glu Ala Phe Pro Ile Ser Val His Ser Pro
35 40 45

Ala His Arg His Lys Leu Tyr Arg Arg Thr
50 55

<210> SEQ ID NO 580
<211> LENGTH: 24
<212> TYPE: PRT
<213> ORGANISM: Homo sapiens
<220> FEATURE:
<223> OTHER INFORMATION: 31

<400> SEQUENCE: 580

Met Lys Lys Ala Leu Leu Gly Leu Gly Lys Glu Ala Gly Glu Glu Ile
1 5 10 15

Gln Arg Leu Leu Gly Gly Ser Tyr
20

<210> SEQ ID NO 581
<211> LENGTH: 30
<212> TYPE: PRT
<213> ORGANISM: Homo sapiens
<220> FEATURE:
<223> OTHER INFORMATION: 32

<400> SEQUENCE: 581

Met Arg Arg Met Leu Lys Met Ser Arg Ile Trp Thr Tyr His Leu Trp
1 5 10 15

Thr Asp Leu Val Lys Asp Ser Val Cys Arg Ser Met Lys Ser
20 25 30

<210> SEQ ID NO 582
<211> LENGTH: 36
<212> TYPE: PRT
<213> ORGANISM: Homo sapiens
<220> FEATURE:
<223> OTHER INFORMATION: 33

<400> SEQUENCE: 582

Leu Tyr Leu Lys Ile Glu Thr Tyr Gln Lys Gln Glu Lys Arg His Glu
1 5 10 15

Arg Asp Cys Gly Pro Ser Thr Asp Val Asp Met Gln Leu His Gly Met
20 25 30

Cys Cys Phe Gly
35

<210> SEQ ID NO 583
<211> LENGTH: 41
<212> TYPE: PRT
<213> ORGANISM: Homo sapiens
<220> FEATURE:
<223> OTHER INFORMATION: 34

<400> SEQUENCE: 583

Val Ile Val Asp Arg Gly Val Lys Lys Glu Glu Glu Glu Ala Glu Lys
1               5                   10                  15

Glu Glu Thr Arg Ala Gly Lys Glu Thr Ser Gln Ala Met Lys Thr Gly
            20                  25                  30

Leu Arg Thr Phe Gly Asp Cys Val Gln
        35                  40

<210> SEQ ID NO 584
<211> LENGTH: 69
<212> TYPE: PRT
<213> ORGANISM: Homo sapiens
<220> FEATURE:
<223> OTHER INFORMATION: 35

<400> SEQUENCE: 584

Met Glu Lys Gly Glu Val Val Glu Phe Arg Asn Lys Asn Ala His Leu
1               5                   10                  15

Phe Leu Cys Leu Ser Asn Glu Asn Phe Asn Trp Asn Cys Leu Ile Phe
            20                  25                  30

Lys Arg Asn Ile Gln Asp Leu Ile Ile Met Trp Gly Leu Cys Ser Pro
        35                  40                  45

Gln Gly Gln Val Arg Asp Gly Leu Leu Gly Cys His Asn Gln Lys Ser
    50                  55                  60

Arg Arg His Phe Gly
65

<210> SEQ ID NO 585
<211> LENGTH: 54
<212> TYPE: PRT
<213> ORGANISM: Homo sapiens
<220> FEATURE:
<223> OTHER INFORMATION: 36

<400> SEQUENCE: 585

Leu Ser Arg Glu Arg Cys Ala Phe Val Arg Met Lys Tyr Thr Ser Gln
1               5                   10                  15

Cys Phe Ser Pro Phe Leu Tyr Asn Asn Tyr Ile Thr Tyr Ala Phe Ile
            20                  25                  30

His Tyr Glu Leu Ile Ser Ala Ser Gln Arg His Thr Thr Lys Glu Thr
        35                  40                  45

Ile Asp Ile Met Trp Pro
    50

<210> SEQ ID NO 586
<211> LENGTH: 44
<212> TYPE: PRT
<213> ORGANISM: Homo sapiens
<220> FEATURE:
<223> OTHER INFORMATION: 37

<400> SEQUENCE: 586

Leu Pro Pro Leu Leu Ser Phe Ile Ser Ser Pro Phe Trp Asn Arg Arg
1               5                   10                  15

Thr Pro Gly Phe Thr Leu Glu Pro Pro Tyr Leu Cys Leu Glu Trp Lys
            20                  25                  30

Glu Ala Tyr Glu Ala Gly Val Val Ile Glu Lys Phe
        35                  40

<210> SEQ ID NO 587

```
<211> LENGTH: 30
<212> TYPE: PRT
<213> ORGANISM: Homo sapiens
<220> FEATURE:
<223> OTHER INFORMATION: 38

<400> SEQUENCE: 587

Leu Gln Phe Leu Thr Leu Gln Lys Gln Gly Ile Thr Ser Arg Phe Ala
1               5                   10                  15

Ala Gly Phe Leu Phe Gln Glu Leu Ser Leu Gly Arg Gln Leu
            20                  25                  30


<210> SEQ ID NO 588
<211> LENGTH: 57
<212> TYPE: PRT
<213> ORGANISM: Homo sapiens
<220> FEATURE:
<223> OTHER INFORMATION: 39

<400> SEQUENCE: 588

Leu Ala Val Arg Leu Thr Gln Thr Val Leu Met Glu Lys Ile Ser His
1               5                   10                  15

Phe Tyr Phe Gly Met Gln Ser Gln Asp Thr Pro Thr Phe Phe Ile Glu
            20                  25                  30

Ile His Ile Tyr Leu Asp Asn His Ser Val Leu Ser Ser Arg Leu Ser
        35                  40                  45

His Glu Gln Asp His Lys Asn Lys Thr
    50                  55


<210> SEQ ID NO 589
<211> LENGTH: 28
<212> TYPE: PRT
<213> ORGANISM: Homo sapiens
<220> FEATURE:
<223> OTHER INFORMATION: 40

<400> SEQUENCE: 589

Leu Asp Asn Met Ile Ile Leu Ser Ser Phe Lys Tyr Ile Ile Leu Lys
1               5                   10                  15

Leu Phe Gln Asn Gly Ile Asn Ser Leu Leu Leu Leu
            20                  25


<210> SEQ ID NO 590
<211> LENGTH: 61
<212> TYPE: PRT
<213> ORGANISM: Homo sapiens
<220> FEATURE:
<223> OTHER INFORMATION: 41

<400> SEQUENCE: 590

Leu His Glu Pro Phe Leu Ser Val Cys Pro Cys Leu Leu Ala Cys Pro
1               5                   10                  15

Asp Val Tyr Ser Asp Ser Cys Thr Ile Leu Leu Leu Leu Ala Arg Asp
            20                  25                  30

Leu Ser Ser Phe Leu Val Phe Asn Trp Leu Ser Gly Leu Val Cys Gly
        35                  40                  45

Lys Ile Thr Lys Ser Gln Ser Arg Leu Cys Phe Cys Ser
    50                  55                  60


<210> SEQ ID NO 591
<211> LENGTH: 43
<212> TYPE: PRT
<213> ORGANISM: Homo sapiens
```

<220> FEATURE:
<223> OTHER INFORMATION: 42

<400> SEQUENCE: 591

```
Met Ser Arg Arg Gly Ser Gln Ser Ala Leu Ser Gly Leu Leu Gln Leu
1               5                   10                  15

Glu Gly Ser Leu Leu Leu Leu Ser Leu Leu His Arg Cys Gly Thr Cys
            20                  25                  30

Asn Pro Gly Ala Gly Ala Gly Gly Ala Ala Leu
        35                  40
```

<210> SEQ ID NO 592
<211> LENGTH: 40
<212> TYPE: PRT
<213> ORGANISM: Homo sapiens
<220> FEATURE:
<223> OTHER INFORMATION: 43

<400> SEQUENCE: 592

```
Val Gln Gln Arg Trp Leu Gln Leu Arg Ser Trp Glu Gly Asp Gly Ala
1               5                   10                  15

Gln Gly Lys His Arg Cys Ser Ala Ala Pro Gln Ser Asp Pro Leu Pro
            20                  25                  30

Gly Glu Arg Glu Glu Asn Ile Phe
        35                  40
```

<210> SEQ ID NO 593
<211> LENGTH: 96
<212> TYPE: PRT
<213> ORGANISM: Homo sapiens
<220> FEATURE:
<223> OTHER INFORMATION: 44

<400> SEQUENCE: 593

```
Met Gln Cys Gly Gln Arg Arg Glu Asp Gly Gly Gln Pro Arg His Arg
1               5                   10                  15

Trp Asp Glu Leu Arg Gln Leu His Gly Gly Glu Ala His Ala Thr Pro
            20                  25                  30

Lys His Asp His Glu Arg Ala Gln Ser Tyr Arg Ala Ser Arg Asn Ser
        35                  40                  45

Pro Asp Glu Cys Ser Val Ala Lys Gly Gly Lys Met Val Gly Ser Pro
    50                  55                  60

Asp Thr Val Gly Met Asn Tyr Gly Ser Tyr Met Glu Glu Lys His Met
65                  70                  75                  80

Pro Pro Pro Asn Met Thr Thr Asn Glu Arg Arg Val Ile Val Pro Ala
                85                  90                  95
```

<210> SEQ ID NO 594
<211> LENGTH: 66
<212> TYPE: PRT
<213> ORGANISM: Homo sapiens
<220> FEATURE:
<223> OTHER INFORMATION: 45

<400> SEQUENCE: 594

```
Val Ala Lys Gly Gly Lys Met Val Gly Ser Pro Asp Thr Val Gly Met
1               5                   10                  15

Asn Tyr Gly Ser Tyr Met Glu Glu Lys His Met Pro Pro Pro Asn Met
            20                  25                  30

Thr Thr Asn Glu Arg Arg Val Ile Val Pro Ala Gly Thr Leu Leu Met
        35                  40                  45
```

```
Asn Ala Val Trp Pro Lys Ala Gly Arg Trp Trp Ala Ala Gln Thr Pro
    50                  55                  60

Leu Gly
65


<210> SEQ ID NO 595
<211> LENGTH: 132
<212> TYPE: PRT
<213> ORGANISM: Homo sapiens
<220> FEATURE:
<223> OTHER INFORMATION: 46

<400> SEQUENCE: 595

Met Glu Tyr Arg Pro Cys Ala Ala Val Ala Gly Val Gly Gly Glu Arg
1               5                   10                  15

Ile Trp Pro Ser Arg Arg Gln His Leu Val Ile Pro Glu His Arg Trp
            20                  25                  30

Glu Gly Thr Val Gln Asp Asp Gln Gly Arg Leu Pro Glu Ala His Pro
        35                  40                  45

Gln Leu Gln Arg Arg His Pro Ser Leu Thr Ser Pro Leu Pro Gln Arg
    50                  55                  60

Glu Ser Tyr Ala Met Glu Tyr Arg Pro Cys Ala Ala Val Ala Gly Val
65                  70                  75                  80

Gly Gly Glu Arg Ile Trp Pro Ser Arg Arg Gln His Leu Val Ile Pro
                85                  90                  95

Glu His Arg Trp Glu Gly Thr Val Gln Asp Asp Gln Gly Arg Leu Pro
            100                 105                 110

Glu Ala His Pro Gln Leu Gln Arg Arg His Pro Ser Leu Thr Ser Pro
        115                 120                 125

Leu Pro Gln Arg
    130


<210> SEQ ID NO 596
<211> LENGTH: 127
<212> TYPE: PRT
<213> ORGANISM: Homo sapiens
<220> FEATURE:
<223> OTHER INFORMATION: 47

<400> SEQUENCE: 596

Val Arg Gln Trp Leu Glu Trp Ala Val Lys Glu Tyr Gly Leu Pro Asp
1               5                   10                  15

Val Asn Ile Leu Leu Phe Gln Asn Ile Asp Gly Lys Glu Leu Cys Lys
            20                  25                  30

Met Thr Lys Asp Asp Phe Gln Arg Leu Thr Pro Ser Tyr Asn Ala Asp
        35                  40                  45

Ile Leu Leu Ser His Leu His Tyr Leu Arg Glu Asn Pro Thr Leu Trp
    50                  55                  60

Ser Thr Asp His Val Arg Gln Trp Leu Glu Trp Ala Val Lys Glu Tyr
65                  70                  75                  80

Gly Leu Pro Asp Val Asn Ile Leu Leu Phe Gln Asn Ile Asp Gly Lys
                85                  90                  95

Glu Leu Cys Lys Met Thr Lys Asp Asp Phe Gln Arg Leu Thr Pro Ser
            100                 105                 110

Tyr Asn Ala Asp Ile Leu Leu Ser His Leu His Tyr Leu Arg Glu
        115                 120                 125
```

```
<210> SEQ ID NO 597
<211> LENGTH: 49
<212> TYPE: PRT
<213> ORGANISM: Homo sapiens
<220> FEATURE:
<223> OTHER INFORMATION: 48

<400> SEQUENCE: 597

Leu Thr Ser Asp Asp Val Asp Lys Ala Leu Gln Asn Ser Pro Arg Leu
1               5                   10                  15

Met His Ala Arg Asn Thr Ala Pro Leu Pro His Leu Thr Ser Asp Asp
            20                  25                  30

Val Asp Lys Ala Leu Gln Asn Ser Pro Arg Leu Met His Ala Arg Asn
        35                  40                  45

Thr


<210> SEQ ID NO 598
<211> LENGTH: 47
<212> TYPE: PRT
<213> ORGANISM: Homo sapiens
<220> FEATURE:
<223> OTHER INFORMATION: 49

<400> SEQUENCE: 598

Val Gln Leu Leu Phe Ser Gln Ile Leu Gln Tyr Ile Leu Lys Leu Arg
1               5                   10                  15

Lys Glu Leu Gln Leu Gly Gln Gly Val Gln Leu Leu Phe Ser Gln Ile
            20                  25                  30

Leu Gln Tyr Ile Leu Lys Leu Arg Lys Glu Leu Gln Leu Gly Gln
        35                  40                  45
```

ENDOGENOUS TUMOR-DERIVED CIRCULAR RNA AND PROTEINS THEREOF FOR USE AS VACCINE

SEQUENCE LISTING

The Sequence Listing submitted herewith, entitled "20181227_sequence-listing.txt", created Jul. 2, 2020, and having a size of 218,587 bytes, is incorporated herein by reference.

TECHNICAL FIELD

The present invention relates to a tumor-derived circular ribonucleic acid (circRNA) as well as one or more proteins expressed from said tumor-derived circRNA for use as vaccine. The invention further relates said tumor-derived circRNA and the protein(s) expressed thereof for use as vaccine in the prophylaxis and/or treatment of cancer.

BACKGROUND OF THE INVENTION

Cancer is a generic term for a large group of diseases characterized by the growth of abnormal cells beyond their usual boundaries that can then invade adjoining parts of the body and/or spread to other organs [1]. Other common terms used are malignant tumors and neoplasms. Cancer can affect almost any part of the body and has many anatomic and molecular subtypes that each require specific management strategies.

Cancer is the second leading cause of death globally and accounted for 8.8 million deaths in 2015. Lung, prostate, colorectal, stomach and liver cancer are the most common types of cancer in men, while breast, colorectal, lung, cervix and stomach cancer are the most common among women. Cancer can be treated by surgery, chemotherapy, radiation therapy, hormonal therapy, targeted therapy (including immunotherapy such as monoclonal antibody therapy) and synthetic lethality. US$1.16 trillion is the estimated total annual economic cost of cancer in 2010. Hence, there is a need for more effective and cost-efficient pharmaceuticals for use in the prophylaxis and treatment of cancer.

The adaptive immune response, mediated by antibody-producing B cells and cytotoxic T cells, protects us from disease by the killing of invading pathogens and performs immune surveillance to eliminate tumors prior to metastasis. Antibody-based and T-cell based therapy has been used with success to treat a number of malignancies. However, it would be advantageous, both for patients and for public health, to develop prophylaxis, such as vaccines, against different cancers, and to activate the immune system against the cancer.

To avoid killing of "self" and induction of severe auto-immunity, cells of the adaptive immune system undergo a stringent selection process during their development, where self-reactive cells are eliminated. With few exceptions (mutations changing the structure or gene fusions), cancer cells express proteins that will be considered "self" to the immune system. Effectively, this means that the frequency of circulating B cells and T cells that have a potential to recognize cancer cells are exceedingly low. This is true even in the form of fusion proteins, and mutations, where both proteins retain much of their original structure. However, even though small changes induced by mutations they have been used to elicit an immune response against the tumor [2,3].

Messenger RNA (mRNA) based vaccines for the treatment of tumors are described in US2008171711. The use of mRNA and peptides as vaccines is safer than using DNA-based vaccines and gene therapeutics since there is no risk of RNA and peptides being integrated into the genome. However, the instability of mRNA or of RNA for example due to RNA-degrading enzymes is a problem in using RNA in pharmaceutical compositions.

Hence, there is a need for vaccine which are not degraded by RNA-degrading enzymes.

Personalized RNA and peptide vaccines for the prophylaxis of cancer have been reported in the art [2,3]. However, the reported personalized peptide vaccines were not fully effective, the time to develop treatment is time consuming, and the treatment had to be combined with other immunotherapies [2]. Moreover, one of the patients had a late relapse when a personalized RNA vaccine was used [3]. Hence, there is a need for more effective and rapid vaccine development for the treatment of cancer. The use of circular RNAs (circRNA or cRNA) could potentially overcome these obstacles.

Recently, it was shown that circular RNAs (circRNA or cRNA) can form during RNA processing (e.g. back splicing) within cancer cells as well as normal cells [4-6]. During the formation of the circular RNA, the back-splicing process will introduce a unique fusion of two RNA nucleotides stretches. The function of circRNA is not well understood, but it has been shown that protein peptides can be generated from (open reading frames) ORFs [7,8].

Depending on the circRNA, proteins can be expressed from the RNA template, and the ORFs may overlap with the 'true mRNA' sequence and produce parts of the 'true protein', there is also a chance that the circRNA allow new ORFs to be expressed that is 'out of frame' and therefore contain a new composition of amino acids that will be recognized as "non-self", and potentially reactive to the immune system. Another possible outcome of the circulation is that the ORF will cover the back-splicing site (BSS) and translate a protein that is 'in-frame' until the fusion site and then becomes 'out of frame' when it passes the BSS.

US2017298347 relates to fusion-circular RNAs (f-circRNAs) for diagnosis of cancer. Additionally, US2017298347 discloses a f-circRNA inhibiting agent which binds to f-circRNAs and said inhibiting agent is used for treating cancer. However, said inhibiting agent is neither a circRNA nor a protein derived from circRNA (paragraph 145; claims 15 and 26). Consequently, US2017298347 is silent about circRNAs and peptide products thereof being used for the treatment of cancer.

CN107384909 relates to the use of circRNA in a screening of gastric cancer. However, CN107384909 is altogether silent about using circRNA as a vaccine.

CN106480033 relates to a kit for detecting the circRNA-005365 gene. However, CN106480033 is altogether silent about using circRNA as a vaccine.

US20160194368 relates to synthetically produced circRNA. However, the circRNA are neither tumor-derived nor endogenous. More importantly, circRNA of US20160194368 does not comprise at least one open reading frame (ORF) not expressed in non-tumorous healthy cells.

OBJECT OF THE INVENTION

The object of the invention is to provide a vaccine for the prophylaxis and treatment of cancer.

The object of the invention is to provide an RNA-based vaccine for the prophylaxis and treatment of cancer.

The object of the invention is to provide an RNA-based vaccine for the prophylaxis and treatment of cancer wherein the RNA is not degraded by RNA-degrading enzymes and nucleases.

The object of the invention is to provide a peptide-based vaccine for the prophylaxis and treatment of cancer.

The object of the invention is to overcome the disadvantages of DNA-based vaccines and immunotherapies.

The object of the invention is to overcome the disadvantages of mRNA-based vaccines and immunotherapies.

SUMMARY OF THE INVENTION

The objects of the present invention are solved by the subject-matter disclosed in the claims.

The present invention relates to a plurality of interrelated products listed below and therefore discloses a single inventive concept:

- DNA
- RNA
- protein (RNA product)
- vaccine (DNA, RNA or protein for use in prophylaxis or treatment of cancer),
- methods of preparing said RNA and protein, and
- diagnostics (protein for the use in screening of disease)

Tumor-derived circRNA

In the preferred embodiment of the invention, the objects of the invention are solved by an endogenous tumor-derived circRNA for use as a vaccine in the prophylaxis and/or treatment of cancer. Preferably said circRNA comprises at least one open reading frame (ORF) not expressed in non-tumorous cells.

In one embodiment of the invention, the tumor-derived circRNA comprises a nucleotide sequence selected from SEQ ID No: 1 to 299 or homologous nucleotide sequences thereof having at least 80% homology.

In a further embodiment of the invention, the tumor-derived circRNA is for use as vaccine in the prophylaxis and/or treatment of prostate cancer, breast cancer, colon cancer, lung cancer and/or pancreatic cancer.

In a further embodiment of the invention, the tumor-derived circRNA is for use as a prophylactic vaccine.

In a further embodiment of the invention, the tumor-derived circRNA is for use as a therapeutic vaccine.

In a further embodiment of the invention, the tumor-derived circRNA is administered (i) to the lymphatic system or proximity of the lymphatic system, preferably to at least one lymph node or proximity of lymph node, or (ii) ex-vivo for immune cell stimulation and cell-based therapy.

The invention also relates to a method of prophylaxis and/or treatment of cancer by using a tumor-derived circRNA. The circRNA may comprise a nucleotide sequence selected from SEQ ID No: 1 to 299 or homologous nucleotide sequences thereof having at least 80% homology.

The invention also relates to a method of preparing a tumor-derived circRNA. The circRNA may comprise a nucleotide sequence selected from SEQ ID No: 1 to 299 or homologous nucleotide sequences thereof having at least 80% homology, comprising the steps of:

a. Extracting total RNA content from tumor cells, and
a. Enriching circRNA by enzyme digestion of linear RNA and
b. Return circRNA to antigen presenting cells in vivo or ex vivo.

The invention also relates to a vaccine comprising a tumor-derived circRNA. The circRNA may comprise a nucleotide sequence selected from SEQ ID No: 1 to 299 or homologous nucleotide sequences thereof having at least 80% homology.

Proteins from Tumor-Derived circRNA

In the preferred embodiment of the invention, the objects of the invention are solved by a protein derived from a tumor-derived circRNA.

In a further embodiment of the invention, the protein is derived from a tumor-derived circRNA comprising a nucleotide sequence selected from SEQ ID No: 1 to 299 or homologous nucleotide sequences thereof having at least 80% homology, wherein said protein comprise an amino acid sequence selected from SEQ ID No: 300 to 598 or homologous amino acid sequences thereof having at least 80% homology.

In a further embodiment of the invention, the protein comprise an amino acid sequence selected from SEQ ID No: 301 to 598 or homologous amino acid sequences thereof having at least 80% homology.

In a further embodiment of the invention, the protein comprises an amino acid selected from SEQ ID No: 301 to 598.

In a further embodiment of the invention, the protein is for use in the prophylaxis and/or treatment of cancer.

In a further embodiment of the invention, the protein is for use in the prophylaxis and/or treatment of prostate cancer, breast cancer, colon cancer, lung cancer and pancreatic cancer.

In a further embodiment of the invention, the protein is for use as a prophylactic vaccine.

In a further embodiment of the invention, the protein is for use as a therapeutic vaccine.

In a further embodiment of the invention, the protein is administered (i) to the lymphatic system or proximity of the lymphatic system, preferably to at least one lymph node or proximity of lymph node, or (ii) ex-vivo for immune cell stimulation and cell-based therapy.

The invention also relates to a method of prophylaxis and/or treatment of cancer by using a protein derived from tumor-derived circRNA. The protein may comprise a protein sequence selected from SEQ ID No: 300 to 598 or homologous nucleotide sequences thereof having at least 80% homology.

The invention also relates to a method of preparing the protein, comprising the steps of:

c. Extracting total RNA content from tumor cells,
d. Enriching circRNA by enzyme digestion of linear RNA,
e. Identifying proteins:
   i. RNA sequencing,
   ii. protein mass-spectrometry,
   iii. In vitro translation, and/or
   iv. Prediction of MHC class I/II-binding
f. identification of personalized/general potential of the protein as immunogen by:
   v. In vitro stimulation of T-cells from patients with neoantigens, and/or
   vi. Determination of B cell-responses to neoantigen The invention also relates to vaccine comprising the protein derived from a tumor-derived circRNA.

The invention also relates to a pharmaceutical composition comprising the protein derived from a tumor-derived circRNA.

DNA Expressing (or Encoding) RNA and/or Proteins

The invention also relates to DNA which encodes for a circRNA discussed above.

The invention is also related to DNA which encodes for a protein discussed above.

The DNA may have a DNA sequence disclosed in Table 1.

In a further embodiment, said DNA is administered (i) to the lymphatic system or proximity of the lymphatic system, preferably to at least one lymph node or proximity of lymph node, or (ii) ex-vivo for immune cell stimulation and cell-based therapy.

The invention also relates to a vaccine vector or genetic vector which comprises DNA as discussed above.

The invention also relates to a vaccine vector or genetic vector which comprises DNA or RNA that express a protein (described above) corresponding to a protein encoded by a tumor-derived circRNA

DETAILED DESCRIPTION

Figure 1:
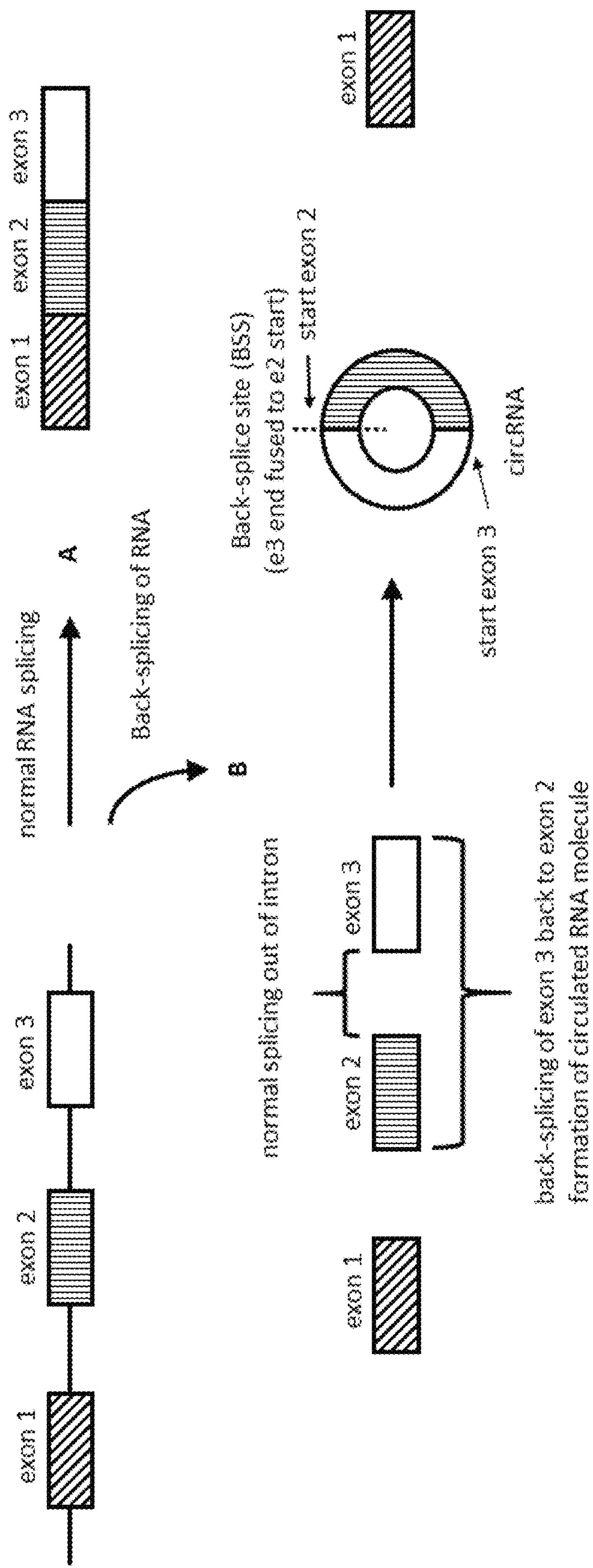
FIG. 1A illustrates RNA splicing and FIG. 1B illustrates circRNA splicing.

Splicing is the editing of the nascent precursor messenger RNA (pre-mRNA) transcript into a mature mRNA. As illustrated in FIG. 1A, after splicing (i.e. normal RNA splicing), introns are removed and exons are joined together (ligated). The splicing of the tumor-derived circRNA of the present invention differs from normal RNA splicing in that, during the formation of the circular RNA, the back-splicing process will introduce a unique fusion of two RNA nucleotides stretches as illustrated in FIG. 1B.

Figure 2:
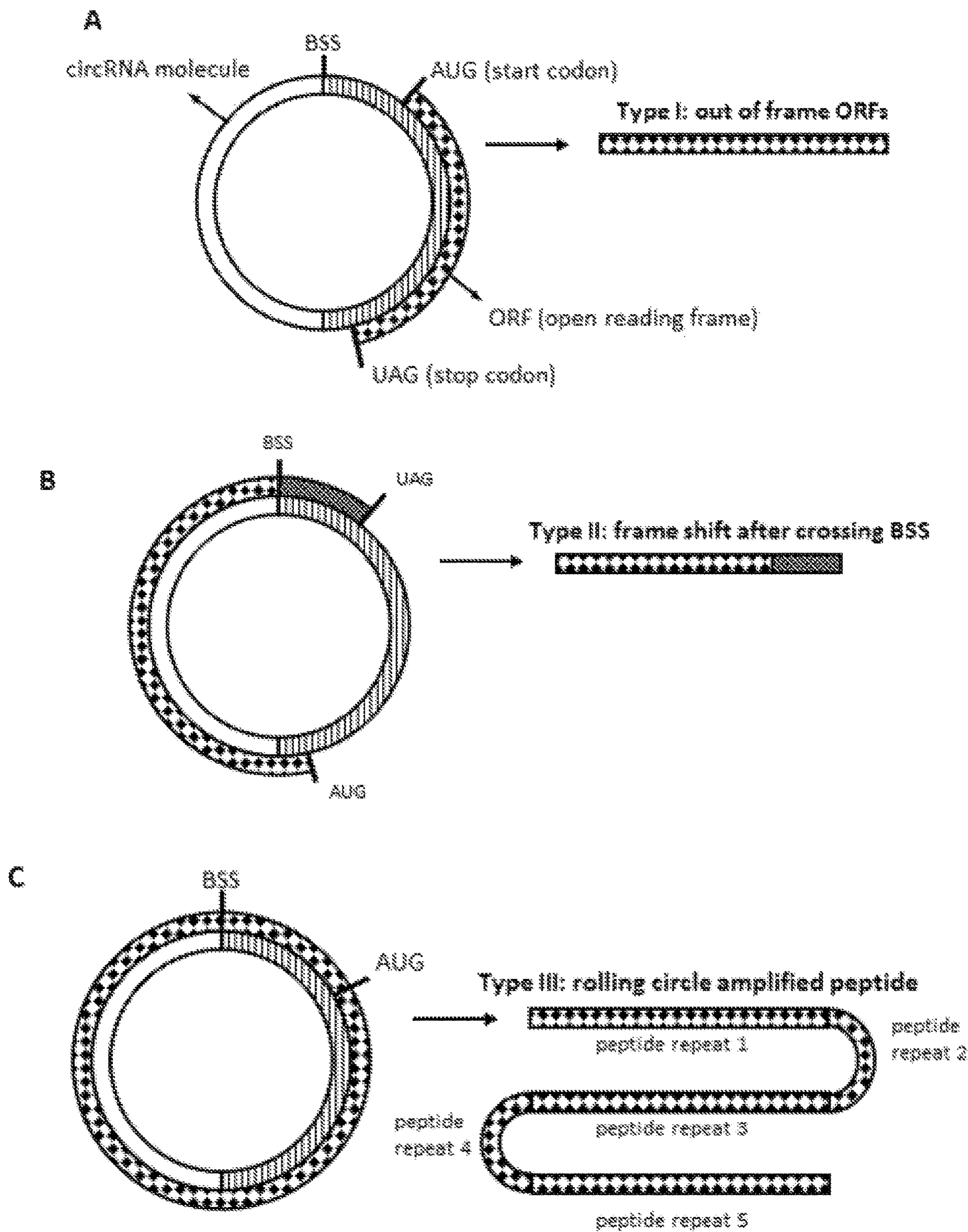
FIG. 2 illustrates the translation of circRNA into proteins.

The tumor-derived circRNA of the present invention can be translated into proteins by at least the three types of processes as illustrated in FIG. 2. Both the circRNA and the resulting proteins can be used for use in the prophylaxis and treatment of cancer.

In the Type-I process illustrated in FIG. 2A, the ORF is out of frame and the RNA is translated into a (neo-antigen) protein from an alternative read frame compared to the normal gene product.

The type-II process which is illustrated in FIG. 2B differs from the Type-I process in that, the Type-II process the translation of the (neo-antigen) protein cross a back-splicing site (BSS), and therefore, in the type-II process novel (neo-antigen) proteins can be produced by out-of-frame (from the normal gene product) translation of the ORF both before and/or after the BSS. In the type-II process the fusion site at the BSS can as well generate neo-antigen peptides.

The type III process which is illustrated in FIG. 2C involves a rolling circle amplified protein. The circRNA has an ORF that only contains a start codon (AUG) and produce a peptide that is in-frame with itself after passing the start codon and protein can continue to be translated in a rolling circle amplification manner. This leads to a rolling circle amplification of the generated peptide and potentiate the neo-antigen production, which leads to an enhanced immune response to the antigen.

Delivering RNA to subjects and induction of an adaptive immune response against said RNA is known in the art. This approach has previously been used in eliciting an immune response to RNA. Hence, full-length mRNAs or short oligonucleotide repeats against mutated regions have been selected and amplified in prior art techniques.

The present invention differs from prior art techniques in that tumor tissue is used and total RNA is extracted from the tumor cells. Within the total pool of tumor derived RNA molecules there is a fraction that consist of circularized RNA molecules (due to back-splicing events). The tumor-derived circRNA pool contains tumor specific circRNA with unique open-reading frames (ORFs) not normally expressed. ORFs that can be translated into peptides as novel proteins and hence be presented as novel neo-antigens that can stimulate immune responses toward the neo-antigens.

The strength of the present invention is that it is totally new protein sequence that compose the epitopes that are inducing the immune response, compared to mutations that only change a single or a few amino acids or full proteins over expressed in cancer that already have had a negative selection against their epitopes. Another aspect is that circRNAs are very diverse in their composition and that cancer induced changes have big impact on the repertoire of expressed circRNAs, thus a wide range of neo-antigens can be present at the same time within a tumor. Moreover, circRNAs are nuclease resistant by their circular structure and much more resistant against degradation than linear RNA molecules once injected in the patient enhancing the delivering potential.

The circRNA extracted from the patient will contain the multiplicity of unique tumor-derived circRNAs that have the potential to via antigen presenting cells present novel neo-antigens for the immune system.

In the present invention, tumor-derived circRNA from the patient will be prepared and divided into vaccination batches and booster batches, and administered either by injection in-vivo at sites of immune presentation (like adjacent to lymph nodes, within lymph nodes) or ex-vivo for immune cell stimulation and cell based therapy.

In the present invention, tumor-derived circRNA are isolated and sequenced from subjects (i.e. patients) with well-defined tumor types. The invention is not limited to a certain cancer type and is therefore applicable for all types of cancer. Subsequently, a database with identified and potential unique open reading frames within circRNA are built that are not present within normal cell transcription within the patients. This will:

1. Allow for the identification of potential neo-antigens within (back-spliced) circRNA that are common for a certain tumor type, and
2. Allow for the identification of potential neo-antigens within (back-spliced) circRNA that are unique for a single patient Importantly, results from (1) will identify circRNA neo-antigens that are suitable for prophylactic vaccination (i.e. to vaccinate healthy individuals against a particular cancer) and therapeutic vaccination (i.e. patients with corresponding cancer). Results from (2) will identify circRNA neo-antigens that can be rapidly introduced into a delivery vector for personalized therapeutic vaccination against pre-existing tumors in a cancer patient.

The pharmaceutical compositions and vaccines of the present invention may comprise pharmaceutically acceptable excipients used in the art. Preservatives, adjuvants, stabilizers and buffers are examples excipients which may be used but the present invention is not restricted to these examples.

Preservatives are used to prevent growth of bacteria or fungi that may be introduced into the vaccine during its use, for example by repeated puncture of a multi-dose vaccine vial with a needle.

Adjuvants helping stimulate a stronger immune response of vaccinated individuals.

Aluminum salts may be incorporated into a vaccine formulation as an adjuvant. Examples of aluminum salts are aluminum hydroxide, aluminum phosphate, alum (potassium aluminum sulfate), or mixed aluminum salts. Organic compounds such as squalene or oil-based compounds may also be used as adjuvant.

Stabilizers keep vaccines potent during transportation and storage. They help protect the vaccine from adverse conditions such as the freeze-drying process, for those vaccines that are freeze dried. Some examples of stabilizers which may be added to vaccines include: sugars such as sucrose and lactose, amino acids such as glycine or the monosodium salt of glutamic acid and proteins such as human serum albumin or gelatin.

In the present invention, the term "protein" is defined as a molecule which comprises one or more chains of amino acid residues. The terms peptide, oligopeptide and polypeptide are in the present invention also included in the definition of protein.

In the present invention, the expression "tumor-derived circRNA" is defined as "tumor-isolated circRNA" (or alternatively "circRNA isolated from tumor").

In the present invention, the expression "protein derived from a tumor-derived circRNA" is defined as "protein encoded by tumor-derived circRNA" (or alternatively "protein expressed from tumor-derived circRNA".

EXAMPLES

Example 1—Tumor-derived circRNA

Figure 3:
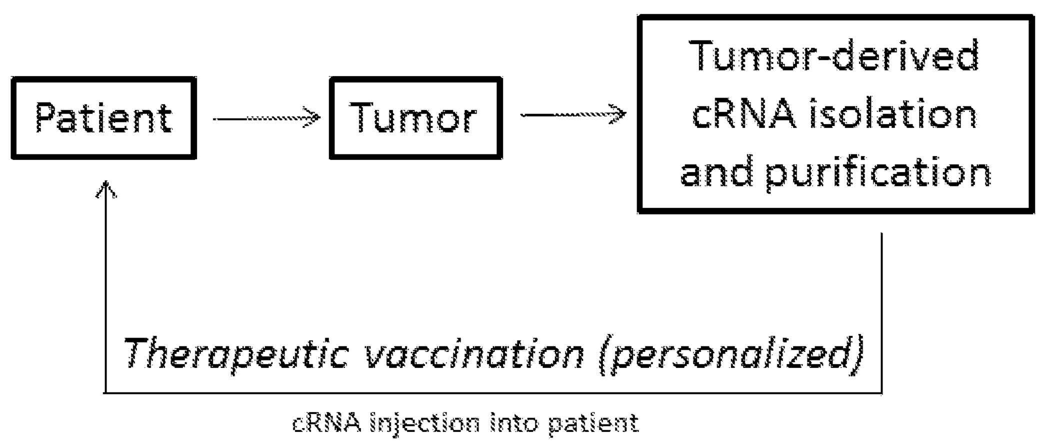
FIG. 3 illustrates the process for manufacturing circRNA-based vaccines.

The method described in Example 1 is briefly illustrated in FIG. 3.

Tumor tissue is harvested from the patient and the total RNA content in the tumor cells are extracted with RNA isolation methodology used in the art. The circular RNA fraction is further enriched by for example enzyme digestion of linear RNA (by for example using RNAse R).

RNA quality control and content may be monitored by a combination of Bioanalyser (Agilent) and Qubit (Thermofisher) measurements or by similar instruments. circRNA is aliquoted and may be stored at −80° C. (or at other suitable temperatures) in different batches (e.g. vaccination and booster) ready to be administered to the patient after reconstituting the frozen batches with physiological buffer (such as Hanks Buffers Saline Solution/NaCl).

The endogenous tumor-derived circRNA prepared according to Example 1 comprises a nucleotide sequence selected from SEQ ID No: 1 to 299 (which are disclosed in Table 1 and the sequence listing) or homologous nucleotide sequences thereof having at least 80% homology. However, the present invention is not restricted to these specific sequences, and therefore, tumor-derived circRNA having other RNA sequences may be used for prophylaxis and/or treatment of disease.

The resulting vaccine is a therapeutic vaccine which is personalized for the patient from whom the tumor tissue has been harvested.

The personalized vaccine described in Example 1 is advantageous since it can be produced in 1-2 days. As a contrast, it takes several months, if not longer, to produce the vaccines described in the prior art.

The usability of the method described has been demonstrated in a pilot experiment where personalized therapeutic vaccination led to an increased immune activation against prostate cancer cells in two animal models (the Dunning Rat prostate cancer model and the TRAMP-C1 prostate cancer mouse model).

Example 2—Proteins from Tumor-Derived Circular RNA

Figure 4:
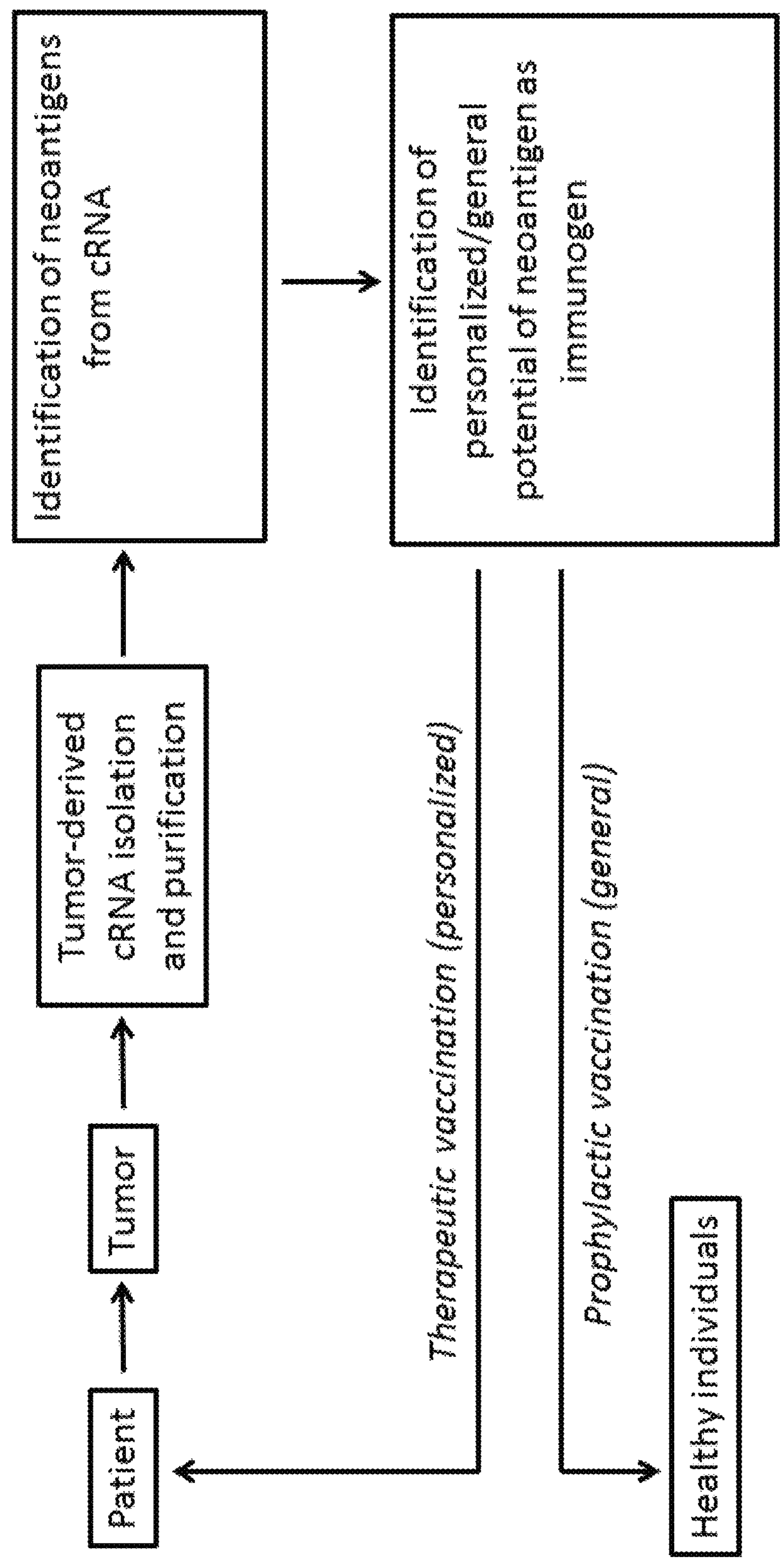
FIG. 4 illustrates the process for manufacturing vaccines comprising proteins derived from circRNA.

The method described in Example 2 is briefly illustrated in FIG. 4.

Tumor tissue is harvested from the patient and the total RNA content in the tumor cells are extracted with RNA isolation methodology used in the art. The circular RNA fraction is further enriched by for example enzyme digestion of linear RNA (by for example using RNAse R).

RNA quality control and content may be monitored by a combination of Bioanalyser (Agilent) and Qubit (Thermofisher) measurements or by similar instruments. circRNA is aliquoted and may be stored at −80° C. (or at other suitable temperatures) in different batches.

The neoantigen proteins which can be expressed by circRNA are identified by using one or more of the following methods:

- RNA sequencing
- protein mass-spectrometry
- In vitro translation
- Prediction of MHC class I/II-binding The next step in the method involves the identification of personalized/general potential of the neoantigen protein as immunogen by using one or more of the following methods:

- In vitro stimulation of T-cells from patients with neoantigens and detection of specific T cell responses by standard immunological assays, such as immune cell proliferation of cytokine production by Flow cytometry or ELISpot Determination of B cell-responses to neoantigen by standard immunological assays (such as ELISA/ELISpot)

The proteins derived from the tumor-derived circRNA isolated according to the method described in Example 2 comprise a protein sequence selected from SEQ ID No: 300 to 598 (which are disclosed in Table 1 and the sequence listing). However, the present invention is not restricted to these specific sequences, and therefore, proteins derived from tumor-derived circRNA having other protein sequences may be used for prophylaxis and/or treatment of disease.

The proteins can be extracted from tumor cells. Moreover, the proteins can also be prepared by liquid-phase synthesis [11,13], solid-phase synthesis [11,13] or by an expression vector [12,13], or by any other method known in the art.

The proteins can also be synthesized by the patient's cell by genetic vaccination or gene therapy with DNA or RNA vectors coding for neoantigen sequences corresponding to a tumor-derived circRNA sequence.

EXPERIMENTS

Figure 5:
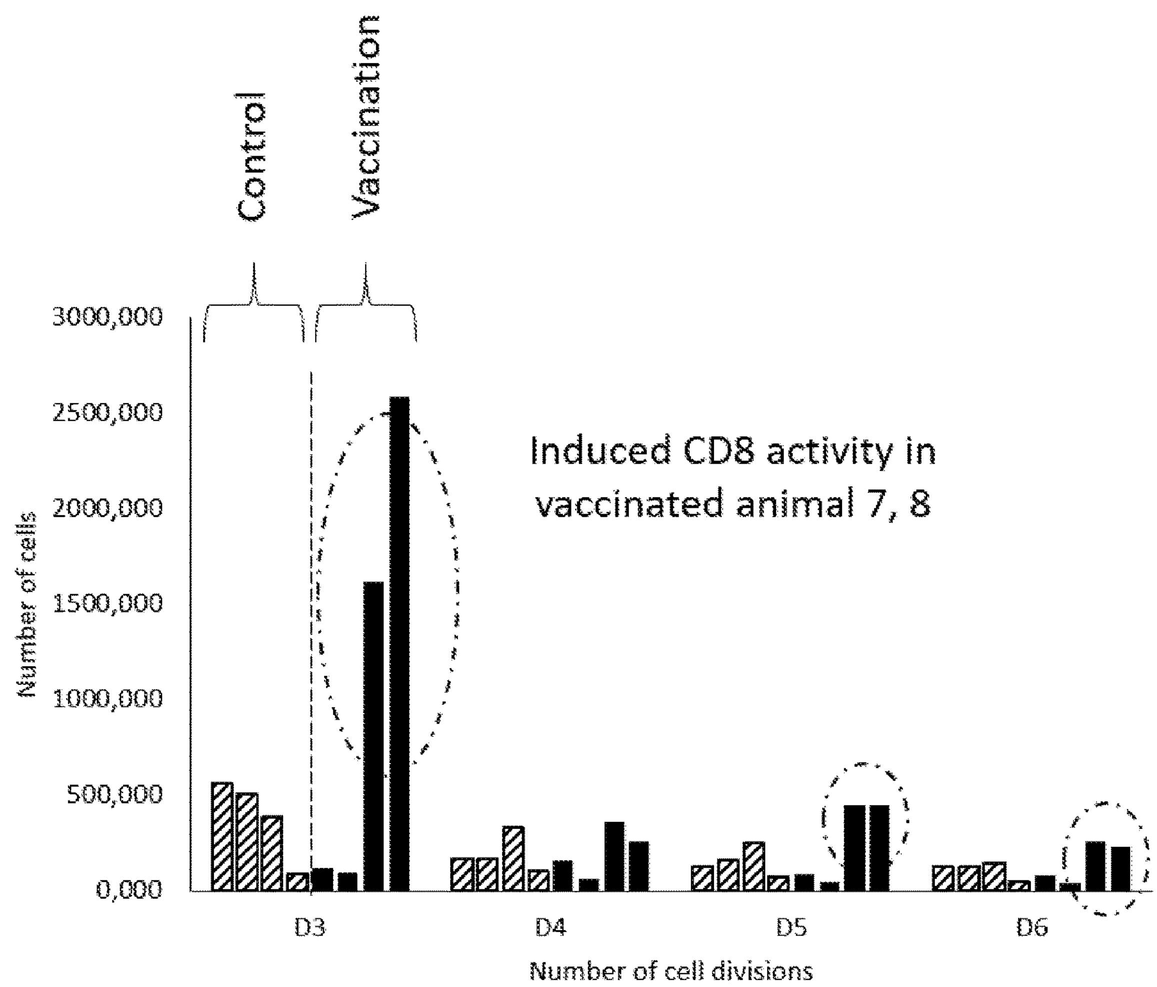
FIGS. 5 and 6 show experimental results from circRNA vaccination of rats. There is increased proliferation of CD8+ T cells in vaccinated rats compared to a control rat group.
Figure 6:
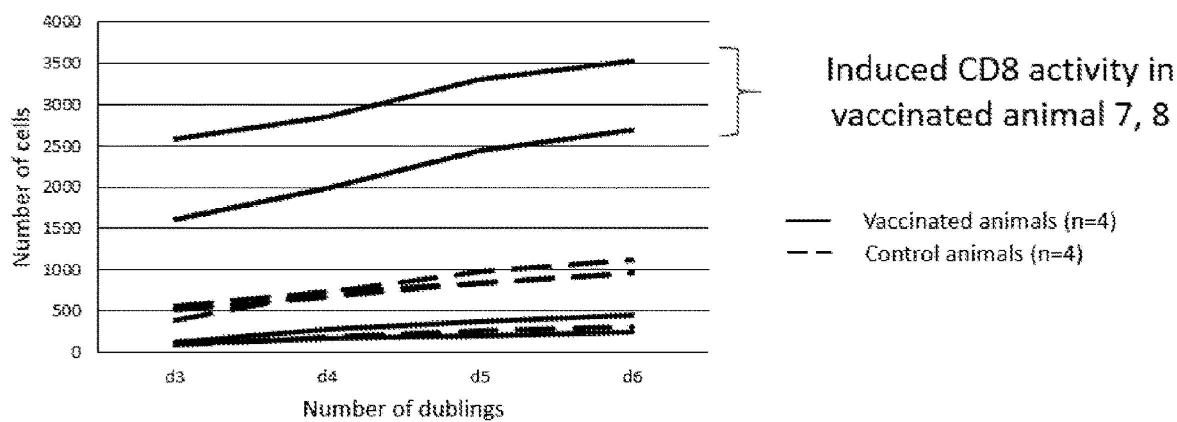
Figure 7:
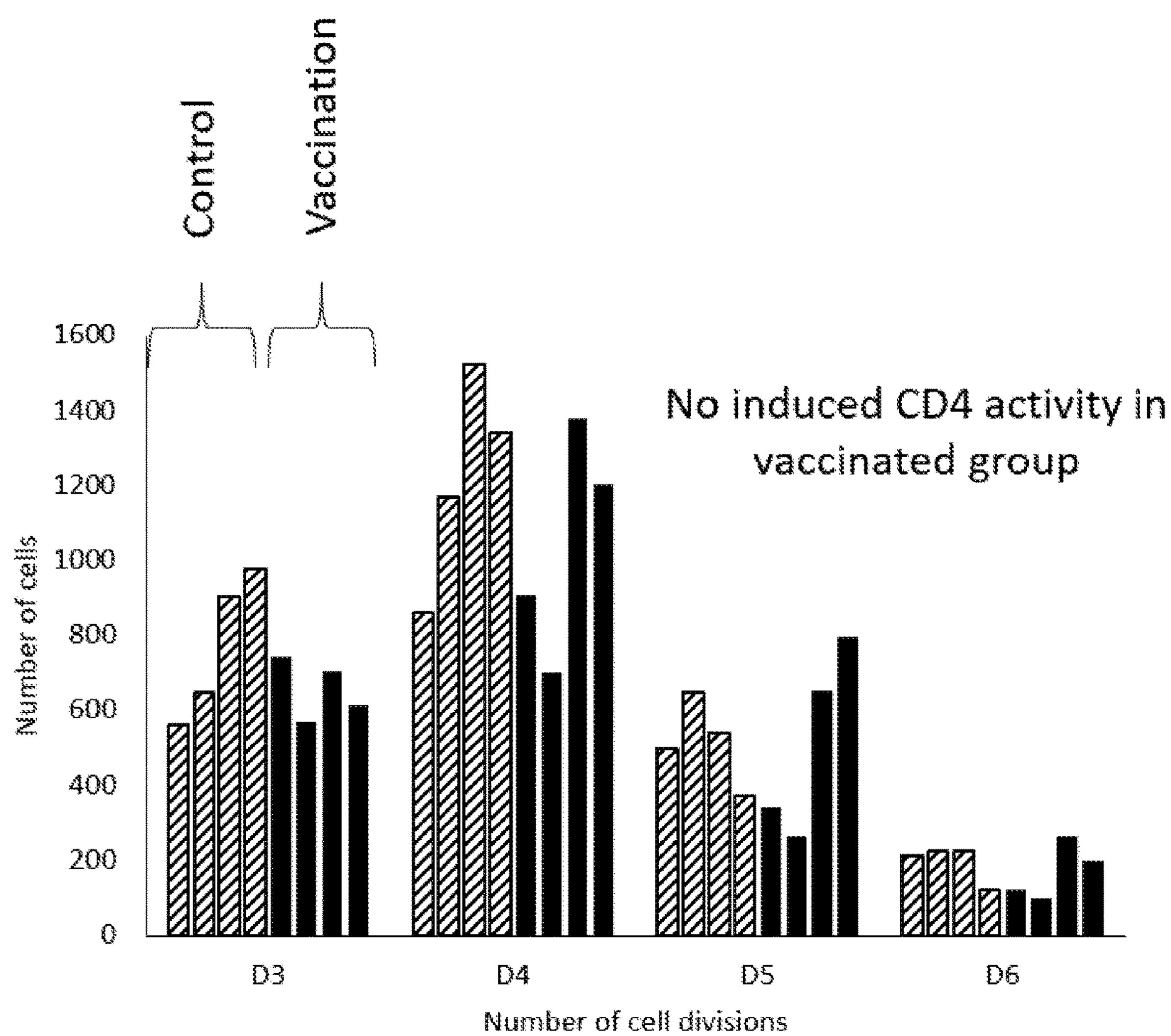
FIG. 7 show experimental results from circRNA vaccination of rats. There is no difference in proliferation of CD4+ T cells between vaccinated rats and a control rat group.
Figure 8:
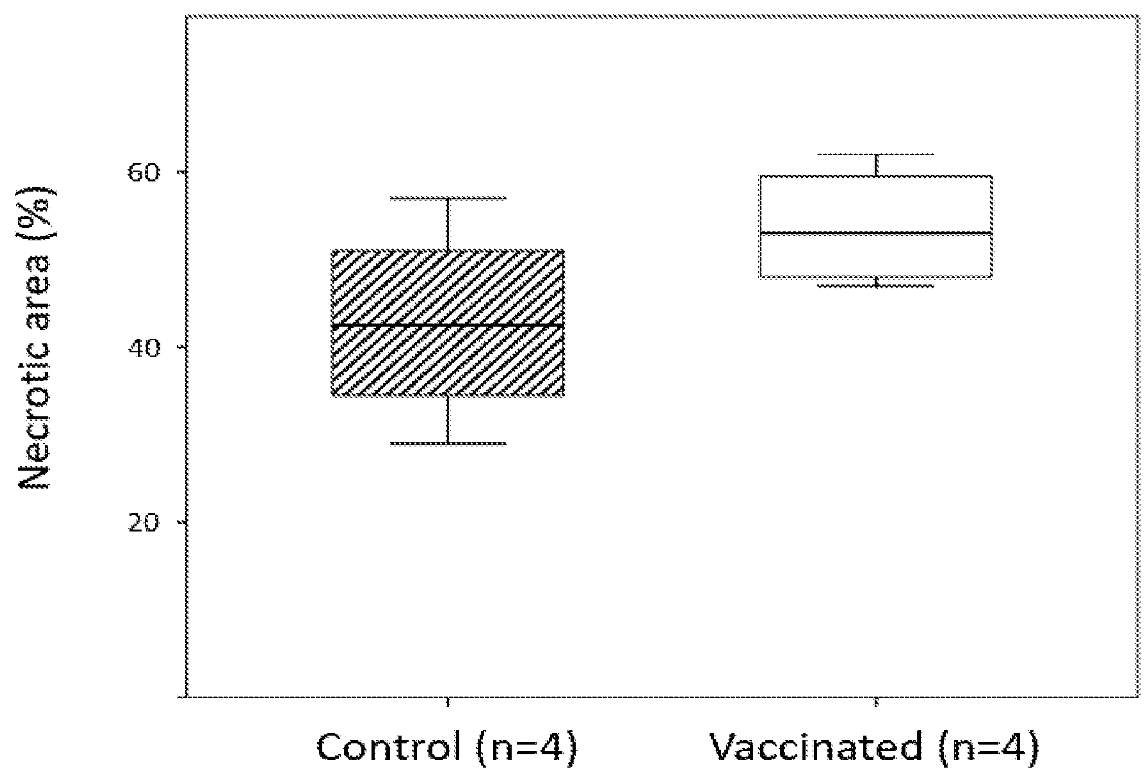
FIG. 8 show experimental results from circRNA vaccination of rats. In vaccinated rats there is an increased tumor necrosis.

Rat Experiment:

1. Total RNA was isolated from MAT-Ly-Lu (Dunning R-3327 prostate cancer animal model) cells.
2. Linear RNA was digested with RNAse R (Epicenter) to enrich for circRNA (1U RNAse R/ug total RNA). The digest total RNA was cleaned-up (Agencourt RNAClean XP), and yielded 12 vaccine doses of 30 ug circRNA per dose.
3. Vaccine was prepared for the four Copenhagen rats: One dose (30 ug) circRNA was mixed with physiological NaCl solution to a volume of 100 ul, and the prepared "vaccine" was injected intradermal, close to the inguinal lymph nodes in four Copenhagen rats. Resulting in a dose of 80 ug circRNA/kg animal.
4. To four rats in a control group, 100 ul physiological NaCl solution was injected in the same way as in the vaccination group.
5. Time plan: Vaccination took place during three weeks before injecting 10.000 MAT-Ly-Lu cells within prostate. In brief, at day 0 the first dose was administered, and the second and third was injected at day 7 and day 14. At day 21, ten thousand MAT-Ly-Lu cells was injected into the prostate, and at day 35 the animal was sacrificed.
6. Sample collected: Spleen and lymph nodes where collected, as well as prostate tumor and lung.
7. Analysis: Immune activation was measured by labelling splenocytes/lymphocytes with CFSE and exposing them to mitomycin C-treated MAT-Ly-Lu cells for 5 days. Cells were then labelled with anti-CD8 and anti-CD4 and subjected to flow cytometry. Activation and subsequent proliferation of CD4+ and CD8+ T cells were measured as a decrease in CFSE-intensity (the CFSE is diluted in cells upon cell division). The necrotic tumor areas within the tumor was also investigated and measured between the control group and the vaccinated group.
8. Results: The main mediators of tumor induced immune response are the CD8+ T-cells, the so called cytotoxic T-cells. These cells are well-known to mediate tumor cell elimination of cells expressing neoantigen epitopes on their MHC-I complexes. Interestingly there was a more than threefold induction of proliferation in 50% of the animals (2/4) of the CD8+ T-cells after in vitro exposure to MAT-Ly-Lu cells (2:1 spleenocyte/tumor cell ratio), indicative that two rats have acquired an adaptive immune response against the tumor (see FIGS. 5 and 6). In line with an increased CD8+ T-cell activity there was also a trend toward an increased tumor cell death and necrotic area in vaccinated animals (see FIG. 8). There was no difference in induced CD4 activity between vaccinated rats and a control rat group (see FIG. 7).
9. Summary: We could see an increased mobilization of the adaptive immune system toward the tumor cells after administration of a circRNA vaccination program.

Figure 9A:
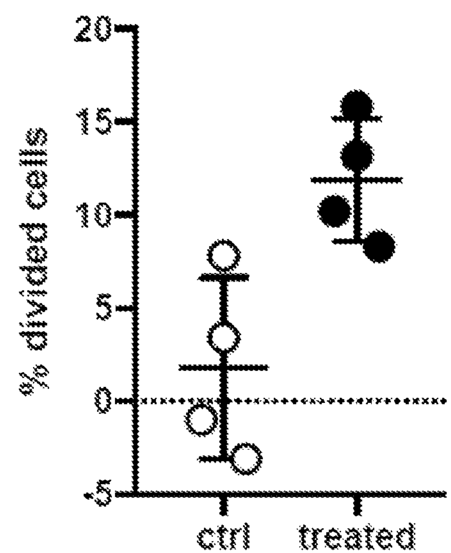
FIGS. 9*a*-9*c* show experimental results from circRNA vaccination of mice. There is increased proliferation of CD4+ T cells and B cells in vaccinated mice compared to a control mice group, FIG. 9*a* and FIG. 9*c*, respectively. There is a minimal effect on proliferation of CD8+ T-cells, FIG. 9*b*.
Figure 9B:
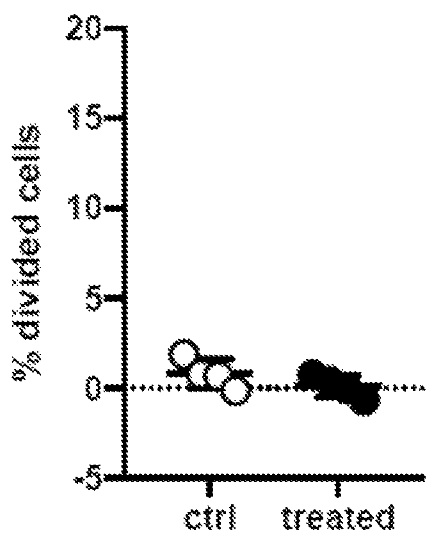
Figure 9C:
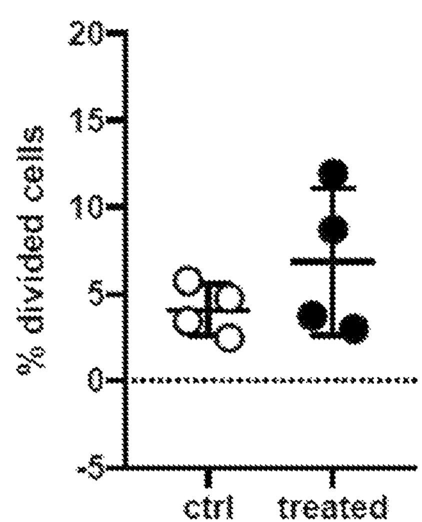

Mouse Experiment:

1. Total RNA was isolated from TRAMP-C1 (prostate cancer mouse cell line with C57BL/6 background) cells.
2. Linear RNA was digested with RNAse R (Epicenter) to enrich for circRNA (1U RNAse R/ug total RNA). The digest total RNA was cleaned-up (Agencourt RNAClean XP), and yielded RNA for eight vaccine doses of 10 ug circRNA per dose.
3. Vaccine was prepared for the four C57BL/6 mice: One dose (10 ug) circRNA was prepared as following, 5 ug circRNA was prepared with 5 ug protamine, incubated 30 min RT for complex binding and then another 5 ug of circRNA was added to the tube in a volume of 100 ul in ringers salt solution. The prepared "vaccine" was injected intradermal, on the flanks close to the groins. Resulting in a dose of ~300 ug circRNA/kg animal.
4. To four mice in a control group, 100 ul ringers salt solution containing 5 ug of protamine was injected in the same way as in the vaccination group.
5. Time plan: Animals were vaccinated day 0 and day 14, and then sacrificed on day 21.
6. Sample collected: Spleens where collected.
7. Analysis: Single cell suspension of CFSE-labelled splenocytes were co-incubated with lysate from TRAMP-C1 cells for 4-5 days. Proliferation/activation of B and T cells was measured as reduced CFSE-intensity on B220+ B cells, CD8+ T cells or CD4+ T cells by flow cytometry.
8. Results: The tumor induced immune response were a pronounced effect seen among the CD4+ T-cell (FIG. 9*a*) and the B-cells (FIG. 9*b*), with minimal effect on the CD8+ T-cells (FIG. 9*c*). In this experiment the mice had not been exposed to the tumor cells in question before analysis, contrary to in the rat experiment (discussed above) where the rats had known the tumor cells for two weeks and thereby triggering a potential immune response.
9. Summary: We could see an increased mobilization of the adaptive immune system toward the tumor cells after administration of a circRNA vaccination program.

TABLE 1

| KLK3 neo-antigen | SEQ ID NO cRNA/protein | DNA sequence | RNA sequence | Protein sequence |
|---|---|---|---|---|
| 1 | 1/300 | TTGCTAGGAAAAGAAATCAGCAGACACAGGTGTAGACCAGAGTGTTTCTTAAATGGTGTAATTTTGTCCTCTCTGTGTCCTGGGGAATACTGGCCATGCCTGGAGACATATCACTCAATTTCTCTGAGGACACAGATAGGATGGGGTGTCTGTGTTATTTGTGGGGTACAGAGATGA | UUGCUAGGAAAAGAAAUCAGCAGACACAGGUGUAGACCAGAGUGUUUCUUAAAUGGUGUAAUUUUGUCCUCUCUGUGUCCUGGGGAAUACUGGCCAUGCCUGGAGACAUAUCACUCAAUUUCUCUGAGGACACAGAUAGGAUGGGGUGUCUGUGUUAUUUGUGGGGUACAGAGAUGA | LLGKEISRHRCRPECFLNGVILSSLCPGEYWPCLETYHSISLRTQIGWGVCVICGVQR |
| 2 | 2/301 | ATGTGCCCTGCCCGAAAGGCCTTCCCTGTACACCAAGGTGGTGCATTACCGGAAGTGGATCAAGGACACCATCGTGGCCAACCCCTGAGCACCCCTATCAACCCCCTATTGTAG | AUGUGCCCUGCCCGAAAGGCCUUCCCUGUACACCAAGGUGGUGCAUUACCGGAAGUGGAUCAAGGACACCAUCGUGGCCAACCCCUGAGCACCCCUAUCAACCCCCUAUUGUAG | MCPARKAFPVHQGGALPEVDQGHHRGQPLSTPINPLL |
| 3 | 3/302 | GTGTCTGTGTTATTTGTGGGGTACAGAGATGAAAGAGGGGTGGGATCCACACTGAGAGAGTGGAGAGTGACATGTGCTGGACACTGTCCATGA | GUGUCUGUGUUAUUUGUGGGGUACAGAGAUGAAAGAGGGGUGGGAUCCACACUGAGAGAGUGGAGAGUGACAUGUGCUGGACACUGUCCAUGA | VSVLFVGYRDERGVGSTLREWRVTCAGHCP |
| 4 | 4/303 | TTGTCCTTAGGTGTGAGGTCCAGGGTTGCTAGGAAAAGAAATCAGCAGACACAGGTGTAG | UUGUCCUUAGGUGUGAGGUCCAGGGUUGCUAGGAAAAGAAAUCAGCAGACACAGGUGUAG | LSLGVRSRVARKRNQQTQV |
| 5 | 5/304 | GTGTTTCTTAAATGGTGTAATTTTGTCCTCTCTGTGTCCTGGGGAATACTGGCCATGCCTGGAGACATATCACTCAATTTCTCTGAGGACACAGATAGGATGGGGTGTCTGTGTTATTTGTGGGGTACAGAGATGAAAGAGGGGTGGGATCCACACTGA | GUGUUUCUUAAAUGGUGUAAUUUUGUCCUCUCUGUGUCCUGGGGAAUACUGGCCAUGCCUGGAGACAUAUCACUCAAUUUCUCUGAGGACACAGAUAGGAUGGGGUGUCUGUGUUAUUUGUGGGGUACAGAGAUGAAAGAGGGGUGGGAUCCACACUGA | VFLKWCNFVLSVSWGILAMPGDISLNFSEDTDRMGCLCYLWGTEMKEGWDPH |
| 6 | 6/305 | GTGCTGGACACTGTCCATGAAGCACTGAGCAGAAGCTGGAGGCACAACGCACCAGACACTCACAGCAAGGATGGAGCTGAAAACATAACCCACTCTGTCCTGGAGGCACTGGGAAGCCTAGAGAAGGCTGTGAGCCAAGGAGGGAGGGTCTTCCTTTGGCATGGGATGGGGATGAAGTAA | GUGCUGGACACUGUCCAUGAAGCACUGAGCAGAAGCUGGAGGCACAACGCACCAGACACUCACAGCAAGGAUGGAGCUGAAAACAUAACCCACUCUGUCCUGGAGGCACUGGGAAGCCUAGAGAAGGCUGUGAGCCAAGGAGGGAGGGUCUUCCUUUGGCAUGGGAUGGGGAUGAAGUAA | VLDTVHEALSRSWRHNAPDTHSKDGAENITHSVLEALGSLEKAVSQGGRVFLWHGMGMK |
| 7 (BSS) | 7/306 | TTGAGCCCCAAGCTTACCACCTGCACCCGGAGAGCTGTGTCACCATGTGGGTCCCGGTTGTCTTCCTCACCCTGTCCGTGA | UUGAGCCCCAAGCUUACCACCUGCACCCGGAGAGCUGUGUCACCAUGUGGGUCCCGGUUGUCUUCCUCACCCUGUCCGUGA | LSPKLTTCTRRAVSPCGSRLSSSPCP |
| 8 (BSS) | 8/307 | GTGCTGCACCCCTCATCCTGTCTCGGATTGTGGGAGGCTGGGAGTGCGAGAAGCATTCCCAACCCTGGCAGGTGCTTGTGGCCTCTCGTGGCAGGGCAGTCTGCGGCGGTGTTCTGGTGCACCCCCAGTGGGTCCTCACAGCTGCCCACTGCATCAGGAAGTGCTGCACCCCTCATCCTGTCTCGGATTGTGGGAGGCTGGGAGTG | GUGCUGCACCCCUCAUCCUGUCUCGGAUUGUGGGAGGCUGGGAGUGCGAGAAGCAUUCCCAACCCUGGCAGGUGCUUGUGGCCUCUCGUGGCAGGGCAGUCUGCGGCGGUGUUCUGGUGCACCCCCAGUGGGUCCUCACAGCUGCCCACUGCAUCAGGAAGUGCUGCACCCCU | VLHPSSCLGLWEAGSARSIPNPGRCLWPLVAGQSAAVFWCTPSGSSQLPTASGSAAPLILSRIVGGWECEKHSQPWQVLVASRGRAVCGGVLVHPQWVLTAAHCIR |

TABLE 1-continued

| | | | | |
|---|---|---|---|---|
| | | CGAGAAGCATTCCCAACCCTGGCAGGTGCTTGTG<br>GCCTCTCGTGGCAGGGCAGTCTGCGGCGGTGTTC<br>TGGTGCACCCCCAGTGGGTCCTCACAGCTGCCCAC<br>TGCATCAGG | CAUCCUGUCUCGGAUUGUGGGAGGCUGG<br>GAGUGCGAGAAGCAUUCCCAACCCUGGCA<br>GGUGCUUGUGGCCUCUCGUGGCAGGGCA<br>GUCUGCGGCGGUGUUCUGGUGCACCCCCA<br>GUGGGUCCUCACAGCUGCCCACUGCAUCA<br>GG | |
| 9 (BSS) | 9/308 | CTGGGAGTGCGAGAAGCATTCCCAACCCTGGCAG<br>GTGCTTGTGGCCTCTCGTGGCAGGGCAGTCTGCG<br>GCGGTGTTCTGGTGCACCCCCAGTGGGTCCTCACA<br>GCTGCCCACTGCATCAGGAAGTGCTGCACCCCTCA<br>TCCTGTCTCGGATTGTGGGAGGCTGGGAGTGCGA<br>GAAGCATTCCCAACCCTGGCAGGTGCTTGTGGCCT<br>CTCGTGGCAGGGCAGTCTGCGGCGGTGTTCTGGT<br>GCACCCCCAGTGGGTCCTCACAGCTGCCCACTGCA<br>TCAGGA | CUGGGAGUGCGAGAAGCAUUCCCAACCCU<br>GGCAGGUGCUUGUGGCCUCUCGUGGCAG<br>GGCAGUCUGCGGCGGUGUUCUGGUGCACC<br>CCCAGUGGGUCCUCACAGCUGCCCACUGCA<br>UCAGGAAGUGCUGCACCCCUCAUCCUGUC<br>UCGGAUUGUGGGAGGCUGGGAGUGCGAG<br>AAGCAUUCCCAACCCUGGCAGGUGCUUGU<br>GGCCUCUCGUGGCAGGGCAGUCUGCGGCG<br>GUGUUCUGGUGCACCCCCAGUGGGUCCUC<br>ACAGCUGCCCACUGCAUCAGGA | LGVREAFPTLAGACGLSWQGSLRRCSGA<br>PPVGPHSCPLHQEVLHPSSCLGLWEAGS<br>ARSIPNPGRCLWPLVAGQSAAVFWCTPS<br>GSSQLPTASG |
| 10 (BSS) | 10/309 | GTGCTGGACGCTGGACAGGGGGCAAAAGCACCT<br>GCTCGTCTTGACCCCAAAGAAACTTCAGTGTGTGGACC<br>ACCTCCATGTTATTTCCAATGA | GUGCUGGACGCUGGACAGGGGGCAAAAGC<br>UGCUCGUCUUGACCCCAAAGAAACUUC<br>AGUGUGUGGACCUCCAUGUUAUUUCCAAU<br>GA | VLDAGQGAKAPARLDPKETSVCGPPCYF<br>Q |
| 11 (BSS) | 11/310 | GTGTGCGCAAGTTCACCCTCAGAAGGTGACCAAG<br>TTCATGCTGTGTGCTGGACGCTGGACAGGGGGCA<br>AAAGCACCTGCTCGTCTTGACCCCAAAGAAACTTC<br>AGTGTGTGGACCTCCATGTTATTTCCAATGACGTG<br>TGTGCGCAAGTTCACCCTCAGAAGGTGACCAAGT<br>TCATGCTGTGTGCTGGACGCTGGACAGGGGGCAA<br>AAGCACCTGCTCG | GUGUGCGCAAGUUCACCCUCAGAAGGUGA<br>CCAAGUUCAUGCUGUGUGCUGGACGCUGG<br>ACAGGGGGCAAAAGCACCUGCUCGUCUUG<br>ACCCCAAAGAAACUUCAGUGUGUGGACCU<br>CCAUGUUAUUUCCAAUGACGUGUGUGCGC<br>AAGUUCACCCUCAGAAGGUGACCAAGUUC<br>AUGCUGUGUGCUGGACGCUGGACAGGGG<br>GCAAAAGCACCUGCUCG | VCASSPSEGDQVHAVCWTLDRGQKHLL<br>VLTPKKLQCVDLHVISNDVCAQVHPQKV<br>TKFMLCAGRWTGGKSTCS |
| 12 (BSS) | 12/311 | ATGTGCCCTGCCCGAAAGGCCTTCCCTGTACACCA<br>AGGTGGTGCATTACCGGAAGTGGATCAAGGACAC<br>CATCGTGGCCAACCCCTGAGCACCCCTATCAACCC<br>CCTATTGTAG | AUGUGCCCUGCCCGAAAGGCCUUCCCUGU<br>ACACCAAGGUGGUGCAUUACCGGAAGUGG<br>AUCAAGGACACCAUCGUGGCCAACCCCUGA<br>GCACCCCUAUCAACCCCCUAUUGUAG | MCPARKAFPVHQGGALPEVDQGHHRG<br>QPLSTPINPLL |
| 13 (BSS) | 13/312 | CTGATTCACTATGGGGGGAGGTGTATTGAAGTCC<br>TCCAGACAACCCTCAGATTTGATGATTTCCTAGTA<br>GAACTCACAGAAATAAAGAGCTGTTATACTGTGG<br>GTGATTCTGGGGGCCCACTTGTCTGTAATGGTGTG<br>CTTCAAGGTATCACGTCATGGGGCAGTGAACCAT<br>GTGCCCTGCCCGAAAGGCCTTCCCTGTACACCAAG<br>GTGGTGCATTACCGGAAGTGGATCAAGGACACCA<br>TCGTGGCCAACCCCTGA | CUGAUUCACUAUGGGGGGAGGUGUAUUG<br>AAGUCCUCCAGACAACCCUCAGAUUUGAU<br>GAUUUCCUAGUAGAACUCACAGAAAUAAA<br>GAGCUGUUAUACUGUGGGUGAUUCUGGG<br>GGCCCACUUGUCUGUAAUGGUGUGCUUCA<br>AGGUAUCACGUCAUGGGGCAGUGAACCAU<br>GUGCCCUGCCCGAAAGGCCUUCCCUGUACA<br>CCAAGGUGGUGCAUUACCGGAAGUGGAUC<br>AAGGACACCAUCGUGGCCAACCCCUGA | LIHYGGRCIEVLQTTLRFDDFLVELTEIKSC<br>YTVGDSGGPLVCNGVLQGITSWGSEPCA<br>LPERPSLYTKVVHYRKWIKDTIVANP |
| 14<br>(BSS + RCA) | 14/313 | GTGATCTTGCTGGGTCGGCACAGCCTGTTTCATCC<br>TGAAGACACAGGCCAGGTATTTCAGGTCAGCCAC<br>AGCTTCCCACACCCGCTCTACGATATGAGCCTCCT<br>GAAGAATCGATTCCTCAGGCCAGGTGATGACTCC<br>AGCCACGACCTCATGCTGCTCCGCCTGTCAGAGCC<br>TGCCGAGCTCACGGATGCTGTGAAGGTCATGGAC | GUGAUCUUGCUGGGUCGGCACAGCCUGUU<br>UCAUCCUGAAGACACAGGCCAGGUAUUUC<br>AGGUCAGCCACAGCUUCCCACACCCGCUCU<br>ACGAUAUGAGCCUCCUGAAGAAUCGAUUC<br>CUCAGGCCAGGUGAUGACUCCAGCCACGAC<br>CUCAUGCUGCUCCGCCUGUCAGAGCCUGC | VILLGRHSLFHPEDTGQVFQVSHSFPHPL<br>YDMSLLKNRFLRPGDDSSHDLMLLRLSEP<br>AELTDAVKVMDLPTQEPALGTTCYASG<br>WGSIEPEECAAPLILSRIVGGWECEKHSQ<br>PWQVLVASRGRAVCGGVLVHPQWVLT<br>AAHCIR |

TABLE 1-continued

| PCA3 neo-antigen | | DNA sequence | RNA sequence | Protein Sequence |
|---|---|---|---|---|
| | | CTGCCCACCCAGGAGCCAGCACTGGGGACCACCTGCTACGCCTCAGGCTGGGGCAGCATTGAACCAGAGGAGTGTGCTGCACCCCTCATCCTGTCTCGGATTGTGGGAGGCTGGGAGTGCGAGAAGCATTCCCAACCCTGGCAGGTGCTTGTGGCCTCTCGTGGCAGGGCAGTCTGCGGCGGTGTTCTGGTGCACCCCCAGTGGGTCCTCACA | CGAGCUCACGGAUGCUGUGAAGGUCAUGGACCUGCCCACCCAGGAGCCAGCACUGGGGACCACCUGCUACGCCUCAGGCUGGGGCAGCAUUGAACCAGAGGAGUGUGCUGCACCCCUCAUCCUGUCUCGGAUUGUGGGAGGCUGGGAGUGCGAGAAGCAUUCCCAACCCUGGCAGGUGCUUGUGGCCUCUCGUGGCAGGGCAGUCUGCGGCGGUGUUCUGGUGCACCCCCAGUGGGUCCUCACA | |
| 1 | 15/314 | CTGGCATCAGAAAAACAGAGGGGAGATTTGTGTGGCTGCAGCCGAGGGAGACCAGGAAGATCTGCATGGTGGGAAGGACCTGATGATACAGAGGTGAGAAATAAGAAAGGCTGCTGA | CUGGCAUCAGAAAAACAGAGGGGAGAUUUGUGUGGCUGCAGCCGAGGGAGACCAGGAAGAUCUGCAUGGUGGGAAGGACCUGAUGAUACAGAGGUGAGAAAUAAGAAAGGCUGCUGA | LASEKQRGDLCGCSRGRPGRSAWWEGPDDTEVRNKKGC |
| 2 | 16/315 | GTGCCTGGTCCCGCTTGTGAGGGAAGGACATTAGAAAATGAATTGATGTGTTCCTTAAAGGATGGGCAGGAAAACAGATCCTGTTGTGGATATTTATTTGAACGGGATTACAGATTTGAAATGAAGTCACAAAGTGAGCATTACCAATGA | GUGCCUGGUCCCGCUUGUGAGGGAAGGACAUUAGAAAAUGAAUUGAUGUGUUCCUUAAAGGAUGGGCAGGAAAACAGAUCCUGUUGUGGAUAUUUAUUUGAACGGGAUUACAGAUUUGAAAUGAAGUCACAAAGUGAGCAUUACCAAUGA | VPGPACEGRTLENELMCSLKDGQENRSCCGYLFERDYRFEMKSQSEHYQ |
| 3 | 17/316 | ATGGAATACTGTGATGACATGAGGCAGCCAAGCTGGGGAGGAGATAACCACGGGGCAGAGGGTCAGGATTCTGGCCCTGCTGCCTAA | AUGGAAUACUGUGAUGACAUGAGGCAGCCAAGCUGGGGAGGAGAUAACCACGGGGCAGAGGGUCAGGAUUCUGGCCCUGCUGCCUAA | MEYCDDMRQPSWGGDNHGAEGQDSGPAA |
| 4 | 18/317 | CTGATCTCTACGGTTCCTTCTGGGCCCAACATTCTCCATATATCCAGCCACACTCATTTTTAA | CUGAUCUCUACGGUUCCUUCUGGGCCCAACAUUCUCCAUAUAUCCAGCCACACUCAUUUUUAA | LISTVPSGPNILHISSHTHF |
| 5 | 19/318 | GTGTTCTGGCCCAGGGGATCTGTGAACAGGCTGGGAAGCATCTCAAGATCTTTCCAGGGTTATACTTACTAG | GUGUUCUGGCCCAGGGGAUCUGUGAACAGGCUGGGAAGCAUCUCAAGAUCUUUCCAGGGUUAUACUUACUAG | VFWPRGSVNRLGSISRSFQGYTY |
| 6 | 20/319 | GTGCCCATTCTCAAGACCTCAAAATGTCATTCCATTAATATCACAGGATTAACTTTTTTTTTAACCTGGAAGAATTCAATGTTACATGCAGCTATGGGAATTTAATTACATATTTTGTTTTCCAGTGCAAAGATGACTAA | GUGCCCAUUCUCAAGACCUCAAAAUGUCAUUCCAUUAAUAUCACAGGAUUAACUUUUUUUUUAACCUGGAAGAAUUCAAUGUUACAUGCAGCUAUGGGAAUUUAAUUACAUAUUUUGUUUUCCAGUGCAAAGAUGACUAA | VPILKTSKCHSINITGLTFFFNLEEFNVTCSYGNLITYFVFQCKDD |
| 7 | 21/320 | TTGAACATGTCAGGCATACATTATTCCTTCTGCCTGAGAAGCTCTTCCTTGTCTCTTAAATCTAGAATGATGTAA | UUGAACAUGUCAGGCAUACAUUAUUCCUUCUGCCUGAGAAGCUCUUCCUUGUCUCUUAAAUCUAGAAUGAUGUAA | LNMSGIHYSFCLRSSSLSLKSRMM |
| 8 | 22/321 | CTGGCAATAAAGAATTTACAAAGAGCTACTCAGGACCAGTTGTTAAGAGCTCTGTGTGTGTGTGTGTGTGTGA | CUGGCAAUAAAGAAUUUACAAAGAGCUACUCAGGACCAGUUGUUAAGAGCUCUGUGUGUGUGUGUGUGUGUGA | LAIKNLQRATQDQLLRALCVCVCV |

TABLE 1-continued

| | | | | |
|---|---|---|---|---|
| 9 | 23/322 | GTGTACATGCCAAAGTGTGCCTCTCTCTCTTTGACCCATTATTTCAGACTTAAAAACAAGCATGTTTTCAAATGGCACTATGAGCTGCCAATGATGTATCACCACCATATCTCATTATTCTCCAGTAAATGTGATAATAATGTCATCTGTTAA | GUGUACAUGCCAAAGUGUGCCUCUCUCUCUUUGACCCAUUAUUUCAGACUUAAAAACAAGCAUGUUUUCAAAUGGCACUAUGAGCUGCCAAUGAUGUAUCACCACCAUAUCUCAUUAUUCUCCAGUAAAUGUGAUAAUAAUGUCAUCUGUUAA | VYMPKCASLSLTHYFRLKNKHVFKWHYELPMMYHHHISLFSSKCDNNVIC |
| 10 | 24/323 | TTGACTTCACAAAAGCAGCTGGAAATGGACAACCACAATATGCATAAATCTAACTCCTACCATCAGCTACACACTGCTTGA | UUGACUUCACAAAAGCAGCUGGAAAUGGACAACCACAAUAUGCAUAAAUCUAACUCCUACCAUCAGCUACACACUGCUUGA | LTSQKQLEMDNHNMHKSNSYHQLHTA |
| 11 | 25/324 | CTGAGCTGTCATCGTCCCCATCTCTGTGAGCCACAACCAACAGCAGGACCCAACGCATGTCTGAGATCCTTAAATCAAGGAAACCAGTGTCATGAGTTGAATTCTCCTATTATGGATGCTAGCTTCTGGCCATCTCTGGCTCTCCTCTTGACACATATTAGCTTCTAG | CUGAGCUGUCAUCGUCCCCAUCUCUGUGAGCCACAACCAACAGCAGGACCCAACGCAUGUCUGAGAUCCUUAAAUCAAGGAAACCAGUGUCAUGAGUUGAAUUCUCCUAUUAUGGAUGCUAGCUUCUGGCCAUCUCUGGCUCUCCUCUUGACACAUAUUAGCUUCUAG | LSCHRPHLCEPQPTAGPNACLRSLNQGNQCHELNSPIMDASFWPSLALLLTHISF |
| 12 | 26/325 | TTGCTTCCACGACTTTTATCTTTTCTCCAACACATCGCTTACCAATCCTCTCTCTGCTCTGTTGCTTTGGACTTCCCCACAAGAATTTCAACGACTCTCAAGTCTTTTCTTCCATCCCCACCACTAACCTGA | UUGCUUCCACGACUUUUAUCUUUUCUCCAACACAUCGCUUACCAAUCCUCUCUCUGCUCUGUUGCUUUGGACUUCCCCACAAGAAUUUCAACGACUCUCAAGUCUUUUCUUCCAUCCCCACCACUAACCUGA | LLPRLLSFLQHIAYQSSLCSVALDFPTRISTTLKSFLPSPPLT |
| 13 | 27/326 | ATGCCTAGACCCTTATTTTTATTAATTTCCAATAGATGCTGCCTATGGGCTATATTGCTTTAG | AUGCCUAGACCCUUAUUUUUAUUAAUUUCCAAUAGAUGCUGCCUAUGGGCUAUAUUGCUUUAG | MPRPLFLLISNRCCLWAILL |
| 14 | 28/327 | ATGAACATTAGATATTTAAAGCTCAAGAGGTTCAAAATCCAACTCATTATCTTCTCTTTCTTTCACCTCCCTGCTCCTCTCCCTATATTACTGATTGCACTGAACAGCATGGTCCCCAATGTAGCCATGCAAATGAGAAACCCAGTGGCTCCTTGTGGTACATGCATGCAAGACTGCTGA | AUGAACAUUAGAUAUUUAAAGCUCAAGAGGUUCAAAAUCCAACUCAUUAUCUUCUCUUUCUUUCACCUCCCUGCUCCUCUCCCUAUAUUACUGAUUGCACUGAACAGCAUGGUCCCCAAUGUAGCCAUGCAAAUGAGAAACCCAGUGGCUCCUUGUGGUACAUGCAUGCAAGACUGCUGA | MNIRYLKLKRFKIQLIIFSFFHLPAPLPILLIALNSMVPNVAMQMRNPVAPCGTCMQDC |
| 15 | 29/328 | GTGCCGAGAAGCTGGCATCAGAAAAACAGAGGGGAGATTTGTGTGGCTGCAGCCGAGGGAGACCAGGAAGATCTGCATGGTGGGAAGGACCTGATGATACAGAGGTGA | GUGCCGAGAAGCUGGCAUCAGAAAAACAGAGGGGAGAUUUGUGUGGCUGCAGCCGAGGGAGACCAGGAAGAUCUGCAUGGUGGGAAGGACCUGAUGAUACAGAGGUGA | VPRSWHQKNRGEICVAAAEGDQEDLHGGKDLMIQR |
| 16 | 30/329 | ATGTTTTTGCACATTTCCAGCCCCTTTAAATATCCACACACACAGGAAGCACAAAAGGAAGCACAGAGATCCCTGGGAGAAATGCCCGGCCGCCATCTTGGGTCATCGATGAGCCTCGCCCTGTGCCTGGTCCCGCTTGTGAGGGAAGGACATTAG | AUGUUUUUGCACAUUUCCAGCCCCUUUAAAUAUCCACACACACAGGAAGCACAAAAGGAAGCACAGAGAUCCCUGGGAGAAAUGCCCGGCCGCCAUCUUGGGUCAUCGAUGAGCCUCGCCCUGUGCCUGGUCCCGCUUGUGAGGGAAGGACAUUAG | MFLHISSPFKYPHTQEAQKEAQRSLGEMPGRHLGSSMSLALCLVPLVREGH |
| 17 | 31/330 | ATGGGCAGGAAAACAGATCCTGTTGTGGATATTTATTTGAACGGGATTACAGATTTGAAATGA | AUGGGCAGGAAAACAGAUCCUGUUGUGGAUAUUUAUUUGAACGGGAUUACAGAUUUGAAAUGA | MGRKTDPVVDIYLNGITDLK |

TABLE 1-continued

| | | | | |
|---|---|---|---|---|
| 18 | 32/331 | GTGAGCATTACCAATGAGAGGAAAACAGACGAG<br>AAAATCTTGATGGCTTCACAAGACATGCAACAAAC<br>AAAATGGAATACTGTGATGACATGA | GUGAGCAUUACCAAUGAGAGGAAAACAGA<br>CGAGAAAAUCUUGAUGGCUUCACAAGACA<br>UGCAACAAACAAAAUGGAAUACUGUGAUG<br>ACAUGA | VSITNERKTDEKILMASQDMQQTKWNT<br>VMT |
| 19 | 33/332 | GTGAATTATCTAATCAACATCATCCTCAGTGTCTTT<br>GCCCATACTGAAATTCATTTCCCACTTTTGTGCCCA<br>TTCTCAAGACCTCAAAATGTCATTCCATTAATATCA<br>CAGGATTAA | GUGAAUUAUCUAAUCAACAUCAUCCUCAG<br>UGUCUUUGCCCAUACUGAAAUUCAUUUCC<br>CACUUUUGUGCCCAUUCUCAAGACCUCAA<br>AAUGUCAUUCCAUUAAUAUCACAGGAUUA<br>A | VNYLINIILSVFAHTEIHFPLLCPFSRPQNVI<br>PLISQD |
| 20 | 34/333 | TTGTTTTCCAGTGCAAAGATGACTAAGTCCTTTATC<br>CCTCCCCTTTGTTTGATTTTTTTTCCAGTATA | UUGUUUUCCAGUGCAAAGAUGACUAAGUC<br>CUUUAUCCCUCCCCUUUGUUUGAUUUUU<br>UUUCCAGUAUA | LFSSAKMTKSFIPPLCLIFFPV |
| 21 | 35/334 | ATGCAAGAGCCACAGAGGGAATGTTTATGGGGCA<br>CGTTTGTAAGCCTGGGATGTGAAGCAAAGGCAGG<br>GAACCTCATAGTATCTTATATAATATACTTCATTTC<br>TCTATCTCTATCACAATATCCAACAAGCTTTTCACA<br>GAATTCATGCAGTGCAAATCCCCAAAGGTAA | AUGCAAGAGCCACAGAGGGAAUGUUUAUG<br>GGGCACGUUUGUAAGCCUGGGAUGUGAA<br>GCAAAGGCAGGGAACCUCAUAGUAUCUUA<br>UAUAAUAUACUUCAUUUCUCUAUCUCUAU<br>CACAAUAUCCAACAAGCUUUUCACAGAAU<br>UCAUGCAGUGCAAAUCCCCAAAGGUAA | MQEPQRECLWGTFVSLGCEAKAGNLIVS<br>YIIYFISLSLSQYPTSFSQNSCSANPQR |
| 22 | 36/335 | GTGGGTTCTCTTAAGCAAAATACTTGCATTAGGTC<br>TCAGCTGGGGCTGTGCATCAGGCGGTTTGAGAAA<br>TATTCAATTCTCAGCAGAAGCCAGAATTTGAATTC<br>CCTCATCTTTTAG | GUGGGUUCUCUUAAGCAAAAUACUUGCAU<br>UAGGUCUCAGCUGGGGCUGUGCAUCAGGC<br>GGUUUGAGAAAUAUUCAAUUCUCAGCAGA<br>AGCCAGAAUUUGAAUUCCCUCAUCUUUUA<br>G | VGSLKQNTCIRSQLGLCIRRFEKYSILSRSQ<br>NLNSLIF |
| 23 | 37/336 | CTGTCCCTCTTTGTGTTCATGGATAGTCCAATAAAT<br>AATGTTATCTTTGAACTGATGCTCATAGGAGAGAA<br>TATAAGAACTCTGAGTGATATCAACATTAGGGATT<br>CAAAGAAATATTAG | CUGUCCCUCUUUGUGUUCAUGGAUAGUCC<br>AAUAAAUAAUGUUAUCUUUGAACUGAUGC<br>UCAUAGGAGAGAAUAUAAGAACUCUGAGU<br>GAUAUCAACAUUAGGGAUUCAAAGAAAUA<br>UUAG | LSLFVFMDSPINNVIFELMLIGENIRTLSDI<br>NIRDSKKY |
| 24 | 38/337 | CTGTTGCTTTGGACTTCCCCACAAGAATTTCAACG<br>ACTCTCAAGTCTTTTCTTCCATCCCCACCACTAA | CUGUUGCUUUGGACUUCCCCACAAGAAUU<br>UCAACGACUCUCAAGUCUUUUCUUCCAUC<br>CCCACCACUAA | LLLWTSPQEFQRLSSLFFHPHH |
| 25 | 39/338 | GTGGTACATGCATGCAAGACTGCTGAAGCCAGAA<br>GGATGACTGATTACGCCTCATGGGTGGAGGGGAC<br>CACTCCTGGGCCTTCGTGA | GUGGUACAUGCAUGCAAGACUGCUGAAGC<br>CAGAAGGAUGACUGAUUACGCCUCAUGGGS<br>UGGAGGGGACCACUCCUGGGCCUUCGUGA | VVHACKTAEARRMTDYASWVEGTTPGP |
| 26 | 40/339 | TTGTCAGGAGCAAGACCTGAGATGCTCCCTGCCTT<br>CAGTGTCCTCTGCATCTCCCCTTTCTAA | UUGUCAGGAGCAAGACCUGAGAUGCUCCC<br>UGCCUUCAGUGUCCUCUGCAUCUCCCCUU<br>UCUAA | LSGARPEMLPAFSVLCISPF |
| 27 | 41/340 | TTGGCATACTATATCAACTTTGATTCTTTGTTACAA<br>CTTTTCTTACTCTTTTATCACCAAAGTGGCTTTTATT<br>CTCTTTATTATTATTATTTTCTTTTACTACTATATTA<br>CGTTGTTATTATTTTGTTCTCTATAGTATCAATTTAT<br>TTGATTTAG | UUGGCAUACUAUAUCAACUUUGAUUCUU<br>UGUUACAACUUUUCUUACUCUUUUAUCAC<br>CAAAGUGGCUUUUAUUCUCUUUAUUAUU<br>AUUAUUUUCUUUUACUACUAUAUUACGU<br>UGUUAUUAUUUUGUUCUCUAUAGUAUCA<br>AUUUAUUUGAUUUAG | LAYYINFDSLLQLFLLFYHQSGFYSLYYYYF<br>LLLLYYVVIILFSIVSIYLI |

TABLE 1-continued

| | | | | |
|---|---|---|---|---|
| 28 | 42/341 | GTGACATGTTTTTGCACATTTCCAGCCCCTTTAAATATCCACACACACAGGAAGCACAAAAGGAAGCACAGAGATCCCTGGGAGAAATGCCCGGCCGCCATCTTGGGTCATCGATGA | GUGACAUGUUUUUGCACAUUUCCAGCCCCUUUAAAUAUCCACACACACAGGAAGCACAAAAGGAAGCACAGAGAUCCCUGGGAGAAAUGCCCGGCCGCCAUCUUGGGUCAUCGAUGA | VTCFCTFPAPLNIHTHRKHKRKHRDPWEKCPAAILGHR |
| 29 | 43/342 | GTGACCTTTCTACACTGTAGAATAACATTACTCATTTTGTTCAAAGACCCTTCGTGTTGCTGCCTAATATGTAGCTGA | GUGACCUUUCUACACUGUAGAAUAACAUUACUCAUUUUGUUCAAAGACCCUUCGUGUUGCUGCCUAAUAUGUAGCUGA | VTFLHCRITLLILFKDPSCCCLICS |
| 30 | 44/343 | CTGTTTTTCCTAAGGAGTGTTCTGGCCCAGGGGATCTGTGAACAGGCTGGGAAGCATCTCAAGATCTTTCCAGGGTTATACTTACTAGCACACAGCATGATCATTACGGAGTGA | CUGUUUUUCCUAAGGAGUGUUCUGGCCCAGGGGAUCUGUGAACAGGCUGGGAAGCAUCUCAAGAUCUUUCCAGGGUUAUACUUACUAGCACACAGCAUGAUCAUUACGGAGUGA | LFFLRSVLAQGICEQAGKHLKIFPGLYLLAHSMIITE |
| 31 | 45/344 | GTGTCTTTGCCCATACTGAAATTCATTTCCCACTTTTGTGCCCATTCTCAAGACCTCAAAATGTCATTCCATTAA | GUGUCUUUGCCCAUACUGAAAUUCAUUUCCCACUUUUGUGCCCAUUCUCAAGACCUCAAAAUGUCAUUCCAUUAA | VSLPILKFISHFCAHSQDLKMSFH |
| 32 | 46/345 | ATGCTTAGCCTTGTACTGAGGCTGTATACAGCCACAGCCTCTCCCCATCCCTCCAGCCTTATCTGTCATCACCATCAACCCCTCCCATGCACCTAA | AUGCUUAGCCUUGUACUGAGGCUGUAUACAGCCACAGCCUCUCCCCAUCCCUCCAGCCUUAUCUGUCAUCACCAUCAACCCCUCCCAUGCACCUAA | MLSLVLRLYTATASPHPSSLICHHHQPLPCT |
| 33 | 47/346 | ATGCAAAGAAGGGACACATATGAGATTCATCATCACATGAGACAGCAAATACTAAAAGTGTAA | AUGCAAAGAAGGGACACAUAUGAGAUUCAUCAUCACAUGAGACAGCAAAUACUAAAAGUGUAA | MQRRDTYEIHHHMRQQILKV |
| 34 | 48/347 | GTGCAAATCCCCAAAGGTAACCTTTATCCATTTCATGGTGAGTGCGCTTTAGAATTTTGGCAAATCATACTGGTCACTTATCTCAACTTTGAGATGTGTTTGTCCTTGTAG | GUGCAAAUCCCCAAAGGUAACCUUUAUCCAUUUCAUGGUGAGUGCGCUUUAGAAUUUUGGCAAAUCAUACUGGUCACUUAUCUCAACUUUGAGAUGUGUUUGUCCUUGUAG | VQIPKGNLYPFHGECALEFWQIILVTYLNFEMCLSL |
| 35 | 49/348 | GTGTGTGTGTGTGTGTGTGTGAGTGTACATGCCAAAGTGTGCCTCTCTCTCTTTGACCCATTATTTCAGACTTAA | GUGUGUGUGUGUGUGUGUGUGAGUGUACAUGCCAAAGUGUGCCUCUCUCUCUUUGACCCAUUAUUUCAGACUUAA | VCVCVCVSVHAKVCLSLFDPLFQT |
| 36 | 50/349 | TTGACATATATTGTTAGAAGCACCTCGCATTTGTGGGTTCTCTTAAGCAAAATACTTGCATTAGGTCTCAGCTGGGGCTGTGCATCAGGCGGTTTGAGAAATATTCAATTCTCAGCAGAAGCCAGAATTTGA | UUGACAUAUAUUGUUAGAAGCACCUCGCAUUUGUGGGUUCUCUUAAGCAAAAUACUUGCAUUAGGUCUCAGCUGGGGCUGUGCAUCAGGCGGUUUGAGAAAUAUUCAAUUCUCAGCAGAAGCCAGAAUUUGA | LTYIVRSTSHLWVLLSKILALGLSWGCASGGLRNIQFSAEARI |
| 37 | 51/350 | TTGGAGAGGATTCAGACAGCTCAGGTGCTTTCACTAATGTCTCTGAACTTCTGTCCCTCTTTGTGTTCATGGATAGTCCAATAA | UUGGAGAGGAUUCAGACAGCUCAGGUGCUUUCACUAAUGUCUCUGAACUUCUGUCCCUCUUUGUGUUCAUGGAUAGUCCAAUAA | LERIQTAQVLSLMSLNFCPSLCSWIVQ |
| 38 | 52/351 | GTGATATCAACATTAGGGATTCAAAGAAATATTAGATTTAAGCTCACACTGGTCAAAAGGAACCAAGATACAAAGAACTCTGAGCTGTCATCGTCCCCATCTCTGTGA | GUGAUAUCAACAUUAGGGAUUCAAAGAAAUAUUAGAUUUAAGCUCACACUGGUCAAAAGGAACCAAGAUACAAAGAACUCUGAGCUGUCAUCGUCCCCAUCUCUGUGA | VISTLGIQRNIRFKLTLVKRNQDTKNSELSSSPSL |

TABLE 1-continued

| | | | | |
|---|---|---|---|---|
| 39 | 53/352 | CTGCTCTGTTGCTTTGGACTTCCCCACAAGAATTTCAACGACTCTCAAGTCTTTTCTTCCATCCCCACCACTAACCTGAATGCCTAG | CUGCUCUGUUGCUUUGGACUUCCCCACAAGAAUUUCAACGACUCUCAAGUCUUUUCUUCCAUCCCCACCACUAACCUGAAUGCCUAG | LLCCFGLPHKNFNDSQVFSSIPTTNLNA |
| 40 | 54/353 | CTGATTACGCCTCATGGGTGGAGGGGACCACTCCTGGGCCTTCGTGATTGTCAGGAGCAAGACCTGAGATGCTCCCTGCCTTCAGTGTCCTCTGCATCTCCCCTTTCTAATGAAGATCCATAG | CUGAUUACGCCUCAUGGGUGGAGGGGACCACUCCUGGGCCUUCGUGAUUGUCAGGAGCAAGACCUGAGAUGCUCCCUGCCUUCAGUGUCCUCUGCAUCUCCCCUUUCUAAUGAAGAUCCAUAG | ITPHGWRGPLLGLRDCQEQDLRCSLPSVSSASPLSNEDP |
| 41 | 55/354 | TTGCTACATTTGAGAATTCCAATTAGGAACTCACATGTTTTATCTGCCCTATCAATTTTTTAA | UUGCUACAUUUGAGAAUUCCAAUUAGGAACUCACAUGUUUUAUCUGCCCUAUCAAUUUUUUAA | LLHLRIPIRNSHVLSALSIF |
| 42 | 56/355 | GTGTCTTGGCATACTATATCAACTTTGATTCTTTGTTACAACTTTTCTTACTCTTTTATCACCAAAGTGGCTTTTATTCTCTTTATTATTATTATTTTCTTTTACTACTATATTACGTTGTTATTATTTTGTTCTCTATAG | GUGUCUUGGCAUACUAUAUCAACUUUGAUUCUUUGUUACAACUUUUCUUACUCUUUUAUCACCAAAGUGGCUUUUAUUCUCUUUAUUAUUAUUAUUUUCUUUUACUACUAUAUUACGUUGUUAUUAUUUUGUUCUCUAUAG | VSWHTISTLILCYNFSYSFITKVAFILFIIIIFFYYYITLLLFCSL |
| 43 | 57/356 | TTGCTGACTTTTAAAATAAGTGATTCGGGGGGTGGGAGAACAGGGGAGGGAGAGCATTAG | UUGCUGACUUUUAAAAUAAGUGAUUCGGGGGGUGGGAGAACAGGGGAGGGAGAGCAUUAG | LLTFKISDSGGGRTGEGEH |
| 44 | 58/357 | GTGCAGCAAACCACTATGGCACACGTATACCTGTGTAACAAACCTACACATTCTGCACATGTATCCCAGAACGTAAAGTAA | GUGCAGCAAACCACUAUGGCACACGUAUACCUGUGUAACAAACCUACACAUUCUGCACAUGUAUCCCAGAACGUAAAGUAA | VQQTTMAHVYLCNKPTHSAHVSQNVK |
| 45 (BSS) | 59/358 | GTGCAGCAAAGAAAGACTACAGACATCTCAATGGCAGGGGAATTACAACACATATACTTAGTGTTTCAATGA | GUGCAGCAAAGAAAGACUACAGACAUCUCAAUGGCAGGGGAAUUACAACACAUAUACUUAGUGUUUCAAUGA | VQQRKTTDISMAGELQHIYLVFQ |
| 46 (BSS) | 60/359 | GTGAGTCTCCTCAGTGACACAGGGCTGGATCACCATCGACGGCACTTTCTGAGTACTCAGTGCAGCAAAGAAAGACTACAGACATCTCAATGGCAGGGGAATTACAACACATATACTTAG | GUGAGUCUCCUCAGUGACACAGGGCUGGAUCACCAUCGACGGCACUUUCUGAGUACUCAGUGCAGCAAAGAAAGACUACAGACAUCUCAAUGGCAGGGGAAUUACAACACAUAUACUUAG | VSLLSDTGLDHHRRHFLSTQCSKERLQTSQWQGNYNTYT |
| 47 (BSS) | 61/360 | GTGACATGTTTTTGCACATTTCCAGCCCCTTTAAATATCCACACACACACAGGAAGCACAAAAGGAAGCACAGAGGTGAGAAATAA | GUGACAUGUUUUUGCACAUUUCCAGCCCCUUUAAAUAUCCACACACACACAGGAAGCACAAAAGGAAGCACAGAGGUGAGAAAUAA | VTCFCTFPAPLNIHTHRKHKRKHRGEK |
| 48 (BSS) | 62/361 | GTGCAGCAAAGAAAGACTACAGACATCTCAATGGCAGGGGAATTACAACACATATACTTAGTGTTTCAATGA | GUGCAGCAAAGAAAGACUACAGACAUCUCAAUGGCAGGGGAAUUACAACACAUAUACUUAGUGUUUCAAUGA | VQQRKTTDISMAGELQHIYLVFQ |
| 49 (BSS) | 63/362 | ATGTTTTTGCACATTTCCAGCCCCTTTAAATATCCACACACACAGGAAGCACAAAAGGAAGCACAGAGGAATTACAACACATATACTTAG | AUGUUUUUGCACAUUUCCAGCCCCUUUAAAUAUCCACACACACAGGAAGCACAAAAGGAAGCACAGAGGAAUUACAACACAUAUACUUAG | MFLHISSPFKYPHTQEAQKEAQRNYNTYT |

TABLE 1-continued

| | | | | |
|---|---|---|---|---|
| 50 (BSS) | 64/363 | GTGACATGTTTTTGCACATTTCCAGCCCCTTTAAAT<br>ATCCACACACACAGGAAGCACAAAAGGAAGCACA<br>GAGGAATTACAACACATATACTTAGTGTTTCAATG<br>AACACCAAGATAAATAAGTGA | GUGACAUGUUUUUGCACAUUUCCAGCCCC<br>UUUAAAUAUCCACACACACAGGAAGCACAA<br>AAGGAAGCACAGAGGAAUUACAACACAUA<br>UACUUAGUGUUUCAAUGAACACCAAGAUA<br>AAUAAGUGA | VTCFCTFPAPLNIHTHRKHKRKHRGITTHI<br>LSVSMNTKINK |
| AR neo-antigen | | DNA sequence | RNA sequence | Protein sequence |
| 1 | 65/364 | CTGCCTTCCCCACCCCGAGTGCGGAGCCAGAGAT<br>CAAAAGATGAAAAGGCAGTCAGGTCTTCAGTAGC<br>CAAAAAACAAAACAAACAAAAACAAAAAAGCCGA<br>AATAAAAGAAAAAGATAA | CUGCCUUCCCCACCCCGAGUGCGGAGCCAG<br>AGAUCAAAAGAUGAAAAGGCAGUCAGGUC<br>UUCAGUAGCCAAAAAACAAAACAAACAAAA<br>ACAAAAAAGCCGAAAUAAAAGAAAAAGAUA<br>A | LPSPPRVRSQRSKDEKAVRSSVAKKQNK<br>QKQKSRNKRKR |
| 2 | 66/365 | TTGCACCTACTTCAGTGGACACTGAATTTGGAAGG<br>TGGAGGATTTTGTTTTTTTCTTTTAAGATCTGGGCA<br>TCTTTTGAATCTACCCTTCAAGTATTAA | UUGCACCUACUUCAGUGGACACUGAAUUU<br>GGAAGGUGGAGGAUUUUGUUUUUUUCUU<br>UUAAGAUCUGGGCAUCUUUUGAAUCUACC<br>CUUCAAGUAUUAA | LHLLQWTLNLEGGGFCFFLLRSGHLLNLP<br>FKY |
| 3 | 67/366 | GTGTCTTCTTCTGCACGAGACTTTGAGGCTGTCAG<br>AGCGCTTTTTGCGTGGTTGCTCCCGCAAGTTTCCTT<br>CTCTGGAGCTTCCCGCAGGTGGGCAGCTAGCTGC<br>AGCGACTACCGCATCATCACAGCCTGTTGA | GUGUCUUCUUCUGCACGAGACUUUGAGGC<br>UGUCAGAGCGCUUUUUGCGUGGUUGCUC<br>CCGCAAGUUUCCUUCUCUGGAGCUUCCCG<br>CAGGUGGGCAGCUAGCUGCAGCGACUACC<br>GCAUCAUCACAGCCUGUUGA | VSSSARDFEAVRALFAWLLPQVSFSGASR<br>RWAASCSDYRIITAC |
| 4 | 68/367 | CTGAGCAAGAGAAGGGGAGGCGGGGTAAGGGA<br>AGTAGGTGGAAGATTCAGCCAAGCTCAAGGATGG<br>AAGTGCAGTTAG | CUGAGCAAGAGAAGGGGAGGCGGGGUAAG<br>GGAAGUAGGUGGAAGAUUCAGCCAAGCUC<br>AAGGAUGGAAGUGCAGUUAG | LSKRRGGGVREVGGRFSQAQGWKCS |
| 5 | 69/368 | GTGAGGATGGTTCTCCCCAAGCCCATCGTAGAGG<br>CCCCACAGGCTACCTGGTCCTGGATGAGGAACAG<br>CAACCTTCACAGCCGCAGTCGGCCCTGGAGTGCC<br>ACCCCGAGAGAGGTTGCGTCCCAGAGCCTGGAGC<br>CGCCGTGGCCGCCAGCAAGGGGCTGCCGCAGCA<br>GCTGCCAGCACCTCCGGACGAGGATGACTCAGCT<br>GCCCCATCCACGTTGTCCCTGCTGGGCCCCACTTT<br>CCCCGGCTTAA | GUGAGGAUGGUUCUCCCCAAGCCCAUCGU<br>AGAGGCCCCACAGGCUACCUGGUCCUGGA<br>UGAGGAACAGCAACCUUCACAGCCGCAGUC<br>GGCCCUGGAGUGCCACCCCGAGAGAGGUU<br>GCGUCCCAGAGCCUGGAGCCGCCGUGGCC<br>GCCAGCAAGGGGCUGCCGCAGCAGCUGCCA<br>GCACCUCCGGACGAGGAUGACUCAGCUGC<br>CCCAUCCACGUUGUCCCUGCUGGGCCCCAC<br>UUUCCCCGGCUUAA | VRMVLPKPIVEAPQATWSWMRNSNLH<br>SRSRPWSATPREVASQSLEPPWPPARGC<br>RSSCQHLRTRMTQLPHPRCPCWAPLSPA |
| 6 | 70/369 | CTGACAACGCCAAGGAGTTGTGTAAGGCAGTGTC<br>GGTGTCCATGGGCCTGGGTGTGGAGGCGTTGGA<br>GCATCTGA | CUGACAACGCCAAGGAGUUGUGUAAGGCA<br>GUGUCGGUGUCCAUGGGCCUGGGUGUGG<br>AGGCGUUGGAGCAUCUGA | LTTPRSCVRQCRCPWAWVWRRWSI |
| 7 | 71/370 | GTGTCAAAAGCGAAATGGGCCCCTGGATGGATAG<br>CTACTCCGGACCTTACGGGGACATGCGTTTGGAG<br>ACTGCCAGGGACCATGTTTTGCCCATTGACTATTA<br>CTTTCCACCCCAGAAGACCTGCCTGA | GUGUCAAAAGCGAAAUGGGCCCCUGGAUG<br>GAUAGCUACUCCGGACCUUACGGGGACAU<br>GCGUUUGGAGACUGCCAGGGACCAUGUUU<br>UGCCCAUUGACUAUUACUUUCCACCCCAG<br>AAGACCUGCCUGA | VSKAKWAPGWIATPDLTGTCVWRLPGT<br>MFCPLTITFHPRRPA |
| 8 | 72/371 | GTGGAGATGAAGCTTCTGGGTGTCACTATGGAGC<br>TCTCACATGTGGAAGCTGCAAGGTCTTCTTCAAAA | GUGGAGAUGAAGCUUCUGGGUGUCACUA<br>UGGAGCUCUCACAUGUGGAAGCUGCAAGG | VEMKLLGVTMELSHVEAARSSSKEPLKG<br>NRSTCAPAEMIALLINSEGKIVHLVVFGN |

TABLE 1-continued

| | | | | |
|---|---|---|---|---|
| | | GAGCCGCTGAAGGGAAACAGAAGTACCTGTGCGC<br>CAGCAGAAATGATTGCACTATTGATAAATTCCGAA<br>GGAAAAATTGTCCATCTTGTCGTCTTCGGAAATGT<br>TATGAAGCAGGGATGA | UCUUCUUCAAAAGAGCCGCUGAAGGGAAA<br>CAGAAGUACCUGUGCGCCAGCAGAAAUGA<br>UUGCACUAUUGAUAAAUUCCGAAGGAAAA<br>AUUGUCCAUCUUGUCGUCUUCGGAAAUG<br>UUAUGAAGCAGGGAUGA | VMKQG |
| 9 | 73/372 | TTGCATGCAAAAGAAAAAATCCCACATCCTGCTCA<br>AGACGCTTCTACCAGCTCACCAAGCTCCTGGACTC<br>CGTGCAGCCTATTGCGAGAGAGCTGCATCAGTTC<br>ACTTTTGACCTGCTAA | UUGCAUGCAAAAGAAAAAAUCCCACAUCCU<br>GCUCAAGACGCUUCUACCAGCUCACCAAGC<br>UCCUGGACUCCGUGCAGCCUAUUGCGAGA<br>GAGCUGCAUCAGUUCACUUUUGACCUGCU<br>AA | LHAKEKIPHPAQDASTSSPSSWTPCSLLR<br>ESCISSLLTC |
| 10 | 74/373 | CTGTGCAAGTGCCCAAGATCCTTTCTGGGAAAGTC<br>AAGCCCATCTATTTCCACACCCAGTGAAGCATTGG<br>AAACCCTATTTCCCCACCCCAGCTCATGCCCCCTTT<br>CAGATGTCTTCTGCCTGTTATAA | CUGUGCAAGUGCCCAAGAUCCUUUCUGGGLC<br>AAAGUCAAGCCCAUCUAUUUCCACACCCAG<br>UGAAGCAUUGGAAACCCUAUUUCCCCACCC<br>CAGCUCAUGCCCCCUUUCAGAUGUCUUCU<br>GCCUGUUAUAA | KCPRSFLGKSSPSISTPSEALETLFPHPS<br>SCPLSDVFCLL |
| 11 | 75/374 | ATGGTGTTGTATGCCTTTAAATCTGTGATGATCCT<br>CATATGGCCCAGTGTCAAGTTGTGCTTGTTTACAG<br>CACTACTCTGTGCCAGCCACACAAACGTTTACTTA<br>TCTTATGCCACGGGAAGTTTAGAGAGCTAA | AUGGUGUUGUAUGCCUUUAAAUCUGUGA<br>UGAUCCUCAUAUGGCCCAGUGUCAAGUUG<br>UGCUUGUUUACAGCACUACUCUGUGCCAG<br>CCACACAAACGUUUACUUAUCUUAUGCCA<br>CGGGAAGUUUAGAGAGCUAA | MVLYAFKSVMILIWPSVKLCLFTALLCAS<br>HTNVYLSYATGSLES |
| 12 | 76/375 | CTGGGGAAATCAAAACAAAAACAAGCAAACAAAA<br>AAAAAAAGCAAAAACAAAACAAAAAATAA | CUGGGGAAAUCAAAACAAAAACAAGCAAAC<br>AAAAAAAAAAGCAAAAACAAAACAAAAAA<br>UAA | LGKSKQKQANKKKKQKQNKK |
| 13 | 77/376 | GTGGAGCAATTCATTATACTGAAAATGTGCTTGTT<br>GTTGAAAATTTGTCTGCATGTTAATGCCTCACCCC<br>CAAACCCTTTTCTCTCTCACTCTCTGCCTCCAACTTC<br>AGATTGA | GUGGAGCAAUUCAUUAUACUGAAAAUGU<br>GCUUGUUGUUGAAAAUUUGUCUGCAUGU<br>UAAUGCCUCACCCCCAAACCCUUUUCUCUC<br>UCACUCUCUGCCUCCAACUUCAGAUUGA | VEQFIILKMCLLLKICLHVNASPPNPFLSHS<br>LPPTSD |
| 14 | 78/377 | ATGTTCTCTTCAGCCAAAACTTGGCGACTTCCACA<br>GAAAAGTCTGACCACTGAGAAGAAGGAGAGCAG<br>AGATTTAACCCTTTGTAAGGCCCCATTTGGATCCA<br>GGTCTGCTTTCTCATGTGTGAGTCAGGGAGGAGC<br>TGGAGCCAGAGGAGAAGAAAATGATAGCTTGGCT<br>GTTCTCCTGCTTAGGACACTGACTGAATAG | AUGUUCUCUUCAGCCAAAACUUGGCGACU<br>UCCACAGAAAAGUCUGACCACUGAGAAGA<br>AGGAGAGCAGAGAUUUAACCCUUUGUAAG<br>GCCCCAUUUGGAUCCAGGUCUGCUUUCUC<br>AUGUGUGAGUCAGGGAGGAGCUGGAGCC<br>AGAGGAGAAGAAAAUGAUAGCUUGGCUG<br>UUCUCCUGCUUAGGACACUGACUGAAUAG | MFSSAKTWRLPQKSLTTEKKESRDLTLCK<br>APFGSRSAFSCVSQGGAGARGEENDSLA<br>VLLLRTLTE |
| 15 | 79/378 | CTGCCAAACTCCGTGAAGCCACAAGCACCTTATGT<br>CCTCCCTTCAGTGTTTTGTGGGCCTGAATTTCATCA<br>CACTGCATTTCAGCCATGGTCATCAAGCCTGTTTG<br>CTTCTTTTGGGCATGTTCACAGATTCTCTGTTAAGA<br>GCCCCCACCACCAAGAAGGTTAG | CUGCCAAACUCCGUGAAGCCACAAGCACCU<br>UAUGUCCUCCCUUCAGUGUUUUGUGGGCC<br>UGAAUUUCAUCACACUGCAUUUCAGCCAU<br>GGUCAUCAAGCCUGUUUGCUUCUUUUGG<br>GCAUGUUCACAGAUUCUCUGUUAAGAGCC<br>CCCACCACCAAGAAGGUUAG | LPNSVKPQAPYVLPSVFCGPEFHHTAFQP<br>WSSSLFASFGHVHRFSVKSPHHQEG |
| 16 | 80/379 | GTGGGAAGAATGAAGGCACTAGAACCAGAAACC<br>CTGCAAATGCTCTTCTTGTCACCCAGCATATCCACC<br>TGCAGAAGTCATGAGAAGAGAGAAGGAACAAAG<br>AGGAGACTCTGA | GUGGGAAGAAUGAAGGCACUAGAACCAGA<br>AACCCUGCAAAUGCUCUUCUUGUCACCCA<br>GCAUAUCCACCUGCAGAAGUCAUGAGAAG<br>AGAGAAGGAACAAAGAGGAGACUCUGA | VGRMKALEPETLQMLFLSPSISTCRSHEK<br>REGTKRRL |

TABLE 1-continued

| | | | | |
|---|---|---|---|---|
| 17 | 81/380 | CTGACATTGCCCATACTCACTCAGATTCCCCACCTT TGTTGCTGCCTCTTAGTCAGAGGGAGGCCAAACC ATTGA | CUGACAUUGCCCAUACUCACUCAGAUUCCC CACCUUUGUUGCUGCCUCUUAGUCAGAGG GAGGCCAAACCAUUGA | LTLPILTQIPHLCCCLLVRGRPNH |
| 18 | 82/381 | ATGAGTAATATGCCAATCCAAGACTGCTGGAGAA AACTAAAGCTGACAGGTTCCCTTTTTGGGGTGGG ATAG | AUGAGUAAUAUGCCAAUCCAAGACUGCUG GAGAAAACUAAAGCUGACAGGUUCCCUUU UUGGGGUGGGAUAG | MSNMPIQDCWRKLKLTGSLFGVG |
| 19 | 83/382 | ATGTACAGGATCACTTTTAGCTGTTTTAAACAGAA AAAAATATCCACCACTCTTTTCAGTTACACTAGGTT ACATTTTAATAGGTCCTTTACATCTGTTTTGGAATG A | AUGUACAGGAUCACUUUUAGCUGUUUUA AACAGAAAAAAAUAUCCACCACUCUUUUCA GUUACACUAGGUUACAUUUUAAUAGGUCC UUUACAUCUGUUUUGGAAUGA | MYRITFSCFKQKKISTTLFSYTRLHFNRSFT SVLE |
| 20 | 84/383 | GTGATACACAGATTGAATTATATCATTTTCATATCT CTCCTTGTAAATACTAGAAGCTCTCCTTTACATTTC TCTATCAAATTTTTCATCTTTATGGGTTTCCCAATT GTGACTCTTGTCTTCATGAATATATGTTTTTCATTT GCAAAAGCCAAAAATCAGTGA | GUGAUACACAGAUUGAAUUAUAUCAUUU UCAUAUCUCUCCUUGUAAAUACUAGAAGC UCUCCUUUACAUUUCUCUAUCAAAUUUUU CAUCUUUAUGGGUUUCCCAAUUGUGACUC UUGUCUUCAUGAAUAUAUGUUUUUCAUU UGCAAAAGCCAAAAAUCAGUGA | VIHRLNYIIFISLLVNTRSSPLHFSIKFFIFM GFPIVTLVFMNICFSFAKAKNQ |
| 21 | 85/384 | ATGACAAAACTAGGGAAAAATAGCCTACACAAGC CTTTAGGCCTACTCTTTCTGTGCTTGGGTTTGAGTG AACAAAGGAGATTTTAG | AUGACAAAACUAGGGAAAAAUAGCCUACA CAAGCCUUUAGGCCUACUCUUUCUGUGCU UGGGUUUGAGUGAACAAAGGAGAUUUUA G | MTKLGKNSLHKPLGLLFLCLGLSEQRRF |
| 22 | 86/385 | CTGCTCTACAAACAGAGTTGGTATGGTTGGTATAC TGTACTCACCTGTGAGGGACTGGCCACTCAGACCC ACTTAGCTGGTGAGCTAGAAGATGAGGATCACTC ACTGGAAAAGTCACAAGGACCATCTCCAAACAAG TTGGCAGTGCTCGATGTGGACGAAGAGTGA | CUGCUCUACAAACAGAGUUGGUAUGGUUG GUAUACUGUACUCACCUGUGAGGGACUGG CCACUCAGACCCACUUAGCUGGUGAGCUA GAAGAUGAGGAUCACUCACUGGAAAAGUC ACAAGGACCAUCUCCAAACAAGUUGGCAG UGCUCGAUGUGGACGAAGAGUGA | LLYKQSWYGWYTVLTCEGLATQTHLAGE LEDEDHSLEKSQGPSPNKLAVLDVDEE |
| 23 | 87/386 | CTGTGCTGGGCAGCAGACAGCTGCCAGGATCACG AACTCTGTAGTCAAAGAAAAGAGTCGTGTGGCAG TTTCAGCTCTCGTTCATTGGGCAGCTCGCCTAGGC CCAGCCTCTGA | CUGUGCUGGGCAGCAGACAGCUGCCAGGA UCACGAACUCUGUAGUCAAAGAAAAGAGU CGUGUGGCAGUUUCAGCUCUCGUUCAUU GGGCAGCUCGCCUAGGCCCAGCCUCUGA | LCWAADSCQDHELCSQRKESCGSFSSRSL GSSPRPSL |
| 24 | 88/387 | CTGAGAAAGGGATATTTTGAAGGACTGTCATATA TCTTTGAAAAAAGAAAATCTGTAATACATATATTTT TATGTATGTTCACTGGCACTAAAAAATATAGAGAG CTTCATTCTGTCCTTTGGGTAGTTGCTGAGGTAATT GTCCAGGTTGAAAAATAA | CUGAGAAAGGGAUAUUUUGAAGGACUGU CAUAUAUCUUUGAAAAAAGAAAAUCUGUA AUACAUAUAUUUUUAUGUAUGUUCACUG GCACUAAAAAAUAUAGAGAGCUUCAUUCU GUCCUUUGGGUAGUUGCUGAGGUAAUUG UCCAGGUUGAAAAAUAA | LRKGYFEGLSYIFEKRKSVIHIFLCMFTGTK KYRELHSVLWVVAEVIVQVEK |
| 25 | 89/388 | CTGCCCCTTCCCAGCCCTGCACCAAAGCTGCATTT CAGGAGACTCTCTCCAGACAGCCCAGTAACTACCC GAGCATGGCCCCTGCATAGCCCTGGAAAAATAAG AGGCTGA | CUGCCCCUUCCCAGCCCUGCACCAAAGCUG CAUUUCAGGAGACUCUCUCCAGACAGCCCA GUAACUACCCGAGCAUGGCCCCUGCAUAGC CCUGGAAAAAUAAGAGGCUGA | LPLPSPAPKLHFRRLSPDSPVTTRAWPLH SPGKIRG |
| 26 | 90/389 | CTGTCTACGAATTATCTTGTGCCAGTTGCCCAGGT GAGAGGGCACTGGGCCAAGGGAGTGGTTTTCAT GTTTGACCCACTACAAGGGGTCATGGGAATCAGG AATGCCAAAGCACCAGATCAAATCCAAAACTTAAA | CUGUCUACGAAUUAUCUUGUGCCAGUUGC CCAGGUGAGAGGGCACUGGGCCAAGGGAG UGGUUUUCAUGUUUGACCCACUACAAGGG GUCAUGGGAAUCAGGAAUGCCAAAGCACC | LSTNYLVPVAQVRGHWAKGVVFMFDPL QGVMGIRNAKAPDQIQNLKSK |

TABLE 1-continued

| | | | | |
|---|---|---|---|---|
| | | GTCAAAATAA | AGAUCAAAUCCAAAACUUAAAGUCAAAAU AA | |
| 27 | 91/390 | GTGTGTGTGTGTGTTCTGATAGCTTTAACTTTCTCT GCATCTTTATATTTGGTTCCAGATCACACCTGA | GUGUGUGUGUGUGUUCUGAUAGCUUUAA CUUUCUCUGCAUCUUUAUAUUUGGUUCC AGAUCACACCUGA | VCVCVLIALTFSASLYLVPDHT |
| 28 | 92/391 | GTGAGAGAGGATGCAGTTTTGTTTTGGAAGCTCT CTCAGAACAAACAAGACACCTGGATTGATCAGTTA ACTAAAAGTTTTCTCCCCTATTGGGTTTGA | GUGAGAGAGGAUGCAGUUUUGUUUUGGA AGCUCUCUCAGAACAAACAAGACACCUGGA UUGAUCAGUUAACUAAAAGUUUUCUCCCC UAUUGGGUUUGA | VREDAVLFWKLSQNKQDTWIDQLTKSFL PYWV |
| 29 | 93/392 | GTGAAGGAGCAGAGGGATAAAAAGAGTAGAGGA CATGATACATTGTACTTTACTAGTTCAAGACAGAT GAATGTGGAAAGCATAAAAACTCAATGGAACTGA | GUGAAGGAGCAGAGGGAUAAAAAGAGUAG AGGACAUGAUACAUUGUACUUUACUAGUU CAAGACAGAUGAAUGUGGAAAGCAUAAAA ACUCAAUGGAACUGA | VKEQRDKKSRGHDTLYFTSSRQMNVESI KTQWN |
| 30 | 94/393 | CTGAGATTTACCACAGGGAAGGCCCAAACTTGGG GCCAAAAGCCTACCCAAGTGATTGACCAGTGGCC CCCTAATGGGACCTGA | CUGAGAUUUACCACAGGGAAGGCCCAAAC UUGGGGCCAAAAGCCUACCCAAGUGAUUG ACCAGUGGCCCCCUAAUGGGACCUGA | LRFTTGKAQTWGQKPTQVIDQWPPNGT |
| 31 | 95/394 | CTGTTCCTTGGTCTTCACCATCCTTGTGAGAGAAG GGCAGTTTCCTGCATTGGAACCTGGAGCAAGCGC TCTATCTTTCACACAAATTCCCTCACCTGA | CUGUUCCUUGGUCUUCACCAUCCUUGUGA GAGAAGGGCAGUUUCCUGCAUUGGAACCULT GGAGCAAGCGCUCUAUCUUUCACACAAAU UCCCUCACCUGA | LFLGLHHPCERRAVSCIGTWSKRSIFHTNS |
| 32 | 96/395 | CTGATTCCAATTCAGTATAGCAAGGTGCTAGGTTT TTTCCTTTCCCCACCTGTCTCTTAG | CUGAUUCCAAUUCAGUAUAGCAAGGUGCU AGGUUUUUUCCUUUCCCCACCUGUCUCUU AG | LIPIQYSKVLGFFLSPPVS |
| 33 | 97/396 | CTGGTGGTTCCCTCTCTGGCTGCTGCCTCACAGTA TGGGAACCTGTACTCTGCAGAGGTGACAGGCCAG ATTTGCATTATCTCACAACCTTAG | CUGGUGGUUCCCUCUCUGGCUGCUGCCUC ACAGUAUGGGAACCUGUACUCUGCAGAGG UGACAGGCCAGAUUUGCAUUAUCUCACAA CCUUAG | LVVPSLAAASQYGNLYSAEVTGQICIISQP |
| 34 | 98/397 | TTGCTTGAAATCTCTTTAGATGGGGCTCATTTCTCA CGGTGGCACTTGGCCTCCACTGGGCAGCAGGACC AGCTCCAAGCGCTAGTGTTCTGTTCTCTTTTTGTAA TCTTGGAATCTTTTGTTGCTCTAAATACAATTAAAA ATGGCAGAAACTTGTTTGTTGGACTACATGTGTGA | UUGCUUGAAAUCUCUUUAGAUGGGGCUC AUUUCUCACGGUGGCACUUGGCCUCCACU GGGCAGCAGGACCAGCUCCAAGCGCUAGU GUUCUGUUCUCUUUUUGUAAUCUUGGAA UCUUUUGUUGCUCUAAAUACAAUUAAAAA UGGCAGAAACUUGUUUGUUGGACUACAU GUGUGA | LLEISLDGAHFSRWHLASTGQQDQLQAL VFCSLFVILESFVALNTIKNGRNLFVGLHV |
| 35 | 99/398 | GTGAGCCTAGCAGGGCAGATCTTGTCCACCGTGT GTCTTCTTCTGCACGAGACTTTGAGGCTGTCAGAG CGCTTTTTGCGTGGTTGCTCCCGCAAGTTTCCTTCT CTGGAGCTTCCCGCAGGTGGGCAGCTAGCTGCAG CGACTACCGCATCATCACAGCCTGTTGAACTCTTC TGA | GUGAGCCUAGCAGGGCAGAUCUUGUCCAC CGUGUGUCUUCUUCUGCACGAGACUUUGA GGCUGUCAGAGCGCUUUUUGCGUGGUUG CUCCCGCAAGUUUCCUUCUCUGGAGCUUC CCGCAGGUGGGCAGCUAGCUGCAGCGACU ACCGCAUCAUCACAGCCUGUUGAACUCUU CUGA | VSLAGQILSTVCLLLHETLRLSERFLRGCSR KFPSLELPAGGQLAAATTASSQPVELF |
| 36 | 100/399 | GTGGAAGATTCAGCCAAGCTCAAGGATGGAAGTG CAGTTAGGGCTGGGAAGGGTCTACCCTCGGCCGC | GUGGAAGAUUCAGCCAAGCUCAAGGAUGG AAGUGCAGUUAGGGCUGGGAAGGGUCUA | VEDSAKLKDGSAVRAGKGLPSAAVQDLP RSFPESVPERARSDPEPGPQAPRGRERST |

TABLE 1-continued

| | | | | |
|---|---|---|---|---|
| | | CGTCCAAGACCTACCGAGGAGCTTTCCAGAATCTG TTCCAGAGCGTGCGCGAAGTGATCCAGAACCCGG GCCCCAGGCACCCAGAGGCCGCGAGCGCAGCACC TCCCGGCGCCAGTTTGCTGCTGCTGCAGCAGCAG CAGCAGCAGCAGCAGCAGCAGCAGCAGCAG CAGCAGCAGCAGCAGCAGCAGCAAGAGACT AG | CCCUCGGCCGCCGUCCAAGACCUACCGAGG AGCUUUCCAGAAUCUGUUCCAGAGCGUGC GCGAAGUGAUCCAGAACCCGGGCCCCAGGC ACCCAGAGGCCGCGAGCGCAGCACCUCCCG GCGCCAGUUUGCUGCUGCUGCAGCAGCAG CAGCAGCAGCAGCAGCAGCAGCAGCAG CAGCAGCAGCAGCAGCAGCAGCAGCAA GAGACUAG | SRRQFAAAAAAAAAAAAAAAAAAAAA AAAARD |
| 37 | 101/400 | GTGCCACCCCGAGAGAGGTTGCGTCCCAGAGCCT GGAGCCGCCGTGGCCGCCAGCAAGGGGCTGCCG CAGCAGCTGCCAGCACCTCCGGACGAGGATGA | GUGCCACCCCGAGAGAGGUUGCGUCCCAG AGCCUGGAGCCGCCGUGGCCGCCAGCAAG GGGCUGCCGCAGCAGCUGCCAGCACCUCCG GACGAGGAUGA | VPPRERLRPRAWSRRGRQQGAAAAAAS TSGRG |
| 38 | 102/401 | TTGCATGTACGCCCCACTTTTGGGAGTTCCACCCG CTGTGCGTCCCACTCCTTGTGCCCCATTGGCCGAA TGCAAAGGTTCTCTGCTAGACGACAGCGCAGGCA AGAGCACTGA | UUGCAUGUACGCCCCACUUUUGGGAGUUC CACCCGCUGUGCGUCCCACUCCUUGUGCCC CAUUGGCCGAAUGCAAAGGUUCUCUGCUA GACGACAGCGCAGGCAAGAGCACUGA | LHVRPTFGSSTRCASHSLCPIGRMQRFSA RRQRRQEH |
| 39 | 103/402 | CTGGGCGGCTGCGGCGGCGCAGTGCCGCTATGG GGACCTGGCGAGCCTGCATGGCGCGGGTGCAGC GGGACCCGGTTCTGGGTCACCCTCAGCCGCCGCTT CCTCATCCTGGCACACTCTCTTCACAGCCGAAGAA GGCCAGTTGTATGGACCGTGTGGTGGTGGTGGG GGTGGTGGCGGCGGCGGCGGCGGCGGCGGCGG CGGCGGCGGCGGCGGCGGCGGCGAGGCGG GAGCTGTAGCCCCCTACGGCTACACTCGGCCCCCT CAGGGGCTGGCGGGCCAGGAAAGCGACTTCACC GCACCTGA | CUGGGCGGCUGCGGCGGCGCAGUGCCGCU AUGGGGACCUGGCGAGCCUGCAUGGCGCG GGUGCAGCGGGACCCGGUUCUGGGUCACC CUCAGCCGCCGCUUCCUCAUCCUGGCACAC UCUCUUCACAGCCGAAGAAGGCCAGUUGU AUGGACCGUGUGGUGGUGGUGGGGGUGG UGGCGGCGGCGGCGGCGGCGGCGGCG GCGGCGGCGGCGGCGGCGGCGAGGCG GGAGCUGUAGCCCCCUACGGCUACACUCG GCCCCCUCAGGGGCUGGCGGGCCAGGAAA GCGACUUCACCGCACCUGA | LGGCGGAVPLWGPGEPAWRGCSGTRF WVTLSRRFLILAHSLHSRRRPVVWTVW WWWGWWRRRRRRRRRRRRRRRRRG GSCSPLRLHSAPSGAGGPGKRLHRT |
| 40 | 104/403 | GTGGTACCCTGGCGGCATGGTGAGCAGAGTGCCC TATCCCAGTCCCACTTGTGTCAAAAGCGAAATGGG CCCCTGGATGGATAG | GUGGUACCCUGGCGGCAUGGUGAGCAGAG UGCCCUAUCCCAGUCCCACUUGUGUCAAA AGCGAAAUGGGCCCCUGGAUGGAUAG | VVPWRHGEQSALSQSHLCQKRNGPLDG |
| 41 | 105/404 | GTGTCACTATGGAGCTCTCACATGTGGAAGCTGC AAGGTCTTCTTCAAAAGAGCCGCTGA | GUGUCACUAUGGAGCUCUCACAUGUGGAA GCUGCAAGGUCUUCUUCAAAAGAGCCGCU GA | VSLWSSHMWKLQGLLQKSR |
| 42 | 106/405 | GTGGGCCAAGGCCTTGCCTGGCTTCCGCAACTTAC ACGTGGACGACCAGATGGCTGTCATTCAGTACTCC TGGATGGGGCTCATGGTGTTTGCCATGGGCTGGC GATCCTTCACCAATGTCAACTCCAGGATGCTCTAC TTCGCCCCTGA | GUGGGCCAAGGCCUUGCCUGGCUUCCGCA ACUUACACGUGGACGACCAGAUGGCUGUC AUUCAGUACUCCUGGAUGGGGCUCAUGGU GUUUGCCAUGGGCUGGCGAUCCUUCACCA AUGUCAACUCCAGGAUGCUCUACUUCGCC CCUGA | VGQGLAWLPQLTRGRPDGCHSVLLDGA HGVCHGLAILHQCQLQDALLRP |
| 43 | 107/406 | GTGTGTCCGAATGAGGCACCTCTCTCAAGAGTTTG GATGGCTCCAAATCACCCCCCAGGAATTCCTGTGC ATGAAAGCACTGCTACTCTTCAGCATTATTCCAGT GGATGGGCTGAAAAATCAAAAATTCTTTGA | GUGUGUCCGAAUGAGGCACCUCUCUCAAG AGUUUGGAUGGCUCCAAAUCACCCCCCAG GAAUUCCUGUGCAUGAAAGCACUGCUACU CUUCAGCAUUAUUCCAGUGGAUGGGCUGA AAAAUCAAAAAUUCUUUGA | VCPNEAPLSRVWMAPNHPPGIPVHEST ATLQHYSSGWAEKSKIL |

TABLE 1-continued

| | | | | |
|---|---|---|---|---|
| 44 | 108/407 | ATGCAAAAGAAAAAATCCCACATCCTGCTCAAGACGCTTCTACCAGCTCACCAAGCTCCTGGACTCCGTGCAGCCTATTGCGAGAGAGCTGCATCAGTTCACTTTTGA | AUGCAAAAGAAAAAAUCCCACAUCCUGCUCAAGACGCUUCUACCAGCUCACCAAGCUCCUGGACUCCGUGCAGCCUAUUGCGAGAGAGCUGCAUCAGUUCACUUUUGA | MQKKKSHILLKTLLPAHQAPGLRAAYCERAASVHF |
| 45 | 109/408 | GTGAAGCATTGGAAACCCTATTTCCCCACCCCAGCTCATGCCCCCTTTCAGATGTCTTCTGCCTGTTATAACTCTGCACTACTCCTCTGCAGTGCCTTGGGGAATTTCCTCTATTGA | GUGAAGCAUUGGAAACCCUAUUUCCCCACCCCAGCUCAUGCCCCCUUUCAGAUGUCUUCUGCCUGUUAUAACUCUGCACUACUCCUCUGCAGUGCCUUGGGGAAUUUCCUCUAUUGA | VKHWKPYFPTPAHAPFQMSSACYNSALLLCSALGNFLY |
| 46 | 110/409 | TTGCTGGGCTTTTTTTTTCTCTTTCTCTCCTTTCTTTTTCTTCTTCCCTCCCTATCTAACCCTCCCATGGCACCTTCAGACTTTGCTTCCCATTGTGGCTCCTATCTGTGTTTTGAATGGTGTTGTATGCCTTTAAATCTGTGA | UUGCUGGGCUUUUUUUUUCUCUUUCUCUCCUUUCUUUUUCUUCUUCCCUCCCUAUCUAACCCUCCCAUGGCACCUUCAGACUUUGCUUCCCAUUGUGGCUCCUAUCUGUGUUUUGAAUGGUGUUGUAUGCCUUUAAAUCUGUGA | LLGFFFLFLSFLFLLPSLSNPPMAPSDFASHCGSYLCFEWCCMPLNL |
| 47 | 111/410 | GTGTCAAGTTGTGCTTGTTTACAGCACTACTCTGTGCCAGCCACACAAACGTTTACTTATCTTATGCCACGGGAAGTTTAG | GUGUCAAGUUGUGCUUGUUUACAGCACUACUCUGUGCCAGCCACACAAACGUUUACUUAUCUUAUGCCACGGGAAGUUUAG | VSSCACLQHYSVPATQTFTYLMPREV |
| 48 | 112/411 | GTGAAAATTGCAGGCCCATGGGGAGTTACTGATTTTTTCATCTCCTCCCTCCACGGGAGACTTTATTTTCTGCCAATGGCTATTGCCATTAGAGGGCAGAGTGACCCCAGAGCTGAGTTGGGCAGGGGGGTGGACAGAGAGGAGAGGACAAGGAGGGCAATGGAGCATCAGTACCTGCCCACAGCCTTGGTCCCTGGGGGCTAG | GUGAAAAUUGCAGGCCCAUGGGGAGUUACUGAUUUUUUCAUCUCCUCCCUCCACGGGAGACUUUAUUUUCUGCCAAUGGCUAUUGCCAUUAGAGGGCAGAGUGACCCCAGAGCUGAGUUGGGCAGGGGGGUGGACAGAGAGGAGAGGACAAGGAGGGCAAUGGAGCAUCAGUACCUGCCCACAGCCUUGGUCCCUGGGGGCUAG | VKIAGPWGVTDFFISSLHGRLYFLPMAIAIRGQSDPRAELGRGVDREERTRRAMEHQYLPTALVPGG |
| 49 | 113/412 | ATGTTAATGCCTCACCCCCAAACCCTTTTCTCTCTCACTCTCTGCCTCCAACTTCAGATTGACTTTCAATAG | AUGUUAAUGCCUCACCCCCAAACCCUUUUCUCUCUCACUCUCUGCCUCCAACUUCAGAUUGACUUUCAAUAG | MLMPHPQTLFSLTLCLQLQIDFQ |
| 50 | 114/413 | ATGTCCTCCCTTCAGTGTTTTGTGGGCCTGAATTTCATCACACTGCATTTCAGCCATGGTCATCAAGCCTGTTTGCTTCTTTTGGGCATGTTCACAGATTCTCTGTTAAGAGCCCCCACCACCAAGAAGGTTAGCAGGCCAACAGCTCTGACATCTATCTGTAGATGCCAGTAG | AUGUCCUCCCUUCAGUGUUUUGUGGGCCUGAAUUUCAUCACACUGCAUUUCAGCCAUGGUCAUCAAGCCUGUUUGCUUCUUUUGGGCAUGUUCACAGAUUCUCUGUUAAGAGCCCCCACCACCAAGAAGGUUAGCAGGCCAACAGCUCUGACAUCUAUCUGUAGAUGCCAGUAG | MSSLQCFVGLNFITLHFSHGHQACLLLLGMFTDSLLRAPTTKKVSRPTALTSICRCQ |
| 51 | 115/414 | CTGGGCGTCTTGCCCTTGTCCCCCAGAGATGATACCCTCCCAGCAAGTGGAGAAGTTCTCACTTCCTTCTTTAGAGCAGCTAAAGGGGCTACCCAGATCAGGGTTGAAGAGAAAACTCAATTACCAGGGTGGGAAGAATGA | CUGGGCGUCUUGCCCUUGUCCCCCAGAGAUGAUACCCUCCCAGCAAGUGGAGAAGUUCUCACUUCCUUCUUUAGAGCAGCUAAAGGGGCUACCCAGAUCAGGGUUGAAGAGAAAACUCAAUUACCAGGGUGGGAAGAAUGA | LGVLPLSPRDDTLPASGEVLTSFFRAAKGATQIRVEEKTQLPGWEE |
| 52 | 116/415 | ATGGCTTCTTTCGGAAAGGTCTGGTTGGTGTGGCTCCAATACTTTGCCACCCATGAACTCAGGGTGTGCCCTGGGACACTGGTTTTATATAGTCTTTTGGCACACCTGTGTTCTGTTGACTTCGTTCTTCAAGCCCAAGTGCAAGGGAAAATGTCCACCTACTTTCTCATCTTGGC | AUGGCUUCUUUCGGAAAGGUCUGGUUGGUGUGGCUCCAAUACUUUGCCACCCAUGAACUCAGGGUGUGCCCUGGGACACUGGUUUUAUAUAGUCUUUUGGCACACCUGUGUUCUGUUGACUUCGUUCUUCAAGCCCAAGUGCA | MASFGKVWLVWLQYFATHELRVCPGTLVLYSLLAHLCSVDFVLQAQVQGKMSTYFLILASASLLSS |

TABLE 1-continued

| | | | | |
|---|---|---|---|---|
| | | CTCTGCCTCCTTACTTAGCTCTTAA | AGGGAAAAUGUCCACCUACUUUCUCAUCUUGGCCUCUGCCUCCUUACUUAGCUCUUAA | |
| 53 | 117/416 | CTGTTGAACTCAAGAAATCAAGGGCCAGTCATCAAGCTGCCCATTTTAATTGATTCACTCTGTTTGTTGAGAGGATAG | CUGUUGAACUCAAGAAAUCAAGGGCCAGUCAUCAAGCUGCCCAUUUUAAUUGAUUCACUCUGUUUGUUGAGAGGAUAG | LLNSRNQGPVIKLPILIDSLCLLRG |
| 54 | 118/417 | TTGGGGTGGGATAGACATGTTCTGGTTTTCTTTATTATTACACAATCTGGCTCATGTACAGGATCACTTTTAGCTGTTTTAAACAGAAAAAAATATCCACCACTCTTTTCAGTTACACTAGGTTACATTTTAATAGGTCCTTTACATCTGTTTTGGAATGATTTTCATCTTTTGTGA | UUGGGGUGGGAUAGACAUGUUCUGGUUUUCUUUAUUAUUACACAAUCUGGCUCAUGUACAGGAUCACUUUUAGCUGUUUUAAACAGAAAAAAAUAUCCACCACUCUUUUCAGUUACACUAGGUUACAUUUUAAUAGGUCCUUUACAUCUGUUUUGGAAUGAUUUUCAUCUUUUGUGA | LGWDRHVLVFFIITQSGSCTGSLLAVLNRKKYPPLFSVTLGYILIGPLHLFWNDFHLL |
| 55 | 119/418 | TTGGCCATTGATGTTCTAGCCAATGTAATTGACAGAAGTCTCATTTTGCATGCGCTCTGCTCTACAAACAGAGTTGGTATGGTTGGTATACTGTACTCACCTGTGAGGGACTGGCCACTCAGACCCACTTAG | UUGGCCAUUGAUGUUCUAGCCAAUGUAAUUGACAGAAGUCUCAUUUUGCAUGCGCUCUGCUCUACAAACAGAGUUGGUAUGGUUGGUAUACUGUACUCACCUGUGAGGGACUGGCCACUCAGACCCACUUAG | LAIDVLANVIDRSLILHALCSTNRVGMVGILYSPVRDWPLRPT |
| 56 | 120/419 | TTGTCCAGGTTGAAAAATAATGTGCTGATGCTAGAGTCCCTCTCTGTCCATACTCTACTTCTAAATACATATAGGCATACATAG | UUGUCCAGGUUGAAAAAUAAUGUGCUGAUGCUAGAGUCCCUCUCUGUCCAUACUCUACUUCUAAAUACAUAUAGGCAUACAUAG | LSRLKNNVLMLESLSVHTLLLNTYRHT |
| 57 | 121/420 | CTGGCAGGGCATAAAGGCCCAGGCCACTTCCTCTGCCCCTTCCCAGCCCTGCACCAAAGCTGCATTTCAGGAGACTCTCTCCAGACAGCCCAGTAA | CUGGCAGGGCAUAAAGGCCCAGGCCACUUCCUCUGCCCCUUCCCAGCCCUGCACCAAAGCUGCAUUUCAGGAGACUCUCUCCAGACAGCCCAGUAA | LAGHKGPGHFLCPFPALHQSCISGDSLQTAQ |
| 58 | 122/421 | TTGACCCACTACAAGGGGTCATGGGAATCAGGAATGCCAAAGCACCAGATCAAATCCAAAACTTAA | UUGACCCACUACAAGGGGUCAUGGGAAUCAGGAAUGCCAAAGCACCAGAUCAAAUCCAAAACUUAA | LTHYKGSWESGMPKHQIKSKT |
| 59 | 123/422 | ATGTTCAGTTTCTTGGAAAAGGAAGTTTCTACCCCTGATGCCTTTGTAGGCAGATCTGTTCTCACCATTAATCTTTTTGAAAATCTTTTAAAGCAGTTTTTAAAAAGAGAGATGAAAGCATCACATTATATAACCAAAGATTACATTGTACCTGCTAAGATACCAAAATTCATAAGGGCAGGGGGGGAGCAAGCATTAGTGCCTCTTTGA | AUGUUCAGUUUCUUGGAAAAGGAAGUUUCUACCCCUGAUGCCUUUGUAGGCAGAUCUGUUCUCACCAUUAAUCUUUUUGAAAAUCUUUUAAAGCAGUUUUUAAAAAGAGAGAUGAAAGCAUCACAUUAUAUAACCAAAGAUUACAUUGUACCUGCUAAGAUACCAAAAUUCAUAAGGGCAGGGGGGGAGCAAGCAUUAGUGCCUCUUUGA | MFSFLEKEVSTPDAFVGRSVLTINLFENLLKQFLKREMKASHYITKDYIVPAKIPKFIRAGGEQALVPL |
| 60 | 124/423 | TTGCTGAGCAAATTGTTGAAGCTCCATCATTGCATGGTTGGAAATGGAGCTGTTCTTAGCCACTGTGTTTGCTAG | UUGCUGAGCAAAUUGUUGAAGCUCCAUCAUUGCAUGGUUGGAAAUGGAGCUGUUCUUAGCCACUGUGUUUGCUAG | LLSKLLKLHHCMVGNGAVLSHCVC |
| 61 | 125/424 | TTGAAATACATTGTAAATGAATATTTGTATCCATGTTTCAAAATTGAAATATATATATATATATATATATATATATATATATATATATAG | UUGAAAUACAUUGUAAAUGAAUAUUUGUAUCCAUGUUUCAAAAUUGAAAUAUAUAUAUAUAUAUAUAUAUAUAUAUAUAUAUAUAUAUAG | LKYIVNEYLYPCFKIEIYIYIYIYIYIYI |

TABLE 1-continued

| | | | | |
|---|---|---|---|---|
| 62 | 126/425 | ATGCAGTTTTGTTTTGGAAGCTCTCTCAGAACAAACAAGACACCTGGATTGATCAGTTAA | AUGCAGUUUUGUUUUGGAAGCUCUCUCAGAACAAACAAGACACCUGGAUUGAUCAGUUAA | MQFCFGSSLRTNKTPGLIS |
| 63 | 127/426 | TTGACCAGTGGCCCCCTAATGGGACCTGAGCTGTTGGAAGAAGAGAACTGTTCCTTGGTCTTCACCATCCTTGTGAGAGAAGGGCAGTTTCCTGCATTGGAACCTGGAGCAAGCGCTCTATCTTTCACACAAATTCCCTCACCTGAGATTGAGGTGCTCTTGTTACTGGGTGTCTGTGTGCTGTAA | UUGACCAGUGGCCCCCUAAUGGGACCUGAGCUGUUGGAAGAAGAGAACUGUUCCUUGGUCUUCACCAUCCUUGUGAGAGAAGGGCAGUUUCCUGCAUUGGAACCUGGAGCAAGCGCUCUAUCUUUCACACAAAUUCCCUCACCUGAGAUUGAGGUGCUCUUGUUACUGGGUGUCUGUGUGCUGUAA | LTSGPLMGPELLEEENCSLVFTILVREGQFPALEPGASALSFTQIPSPEIEVLLLLGVCVL |
| 64 | 128/427 | TTGACAAATGAAAATGTGTTTTTCTCTGTTAAAACTTGTCAGAGTACTAGAAGTTGTATCTCTGTAGGTGCAGGTCCATTTCTGCCCACAGGTAGGGTGTTTTTCTTTGATTAA | UUGACAAAUGAAAAUGUGUUUUUCUCUGUUAAAACUUGUCAGAGUACUAGAAGUUGUAUCUCUGUAGGUGCAGGUCCAUUUCUGCCCACAGGUAGGGUGUUUUUCUUUGAUUAA | LTNENVFFSVKTCQSTRSCISVGAGPFLPTGRVFFFD |
| 65 | 129/428 | ATGAGAAGCCTTAGAATGGGTGGCCCTTGTGACCTGAAACACTTCCCACATAAGCTACTTAACAAGATTGTCATGGAGCTGCAGATTCCATTGCCCACCAAAGACTAG | AUGAGAAGCCUUAGAAUGGGUGGCCCUUGUGACCUGAAACACUUCCCACAUAAGCUACUUAACAAGAUUGUCAUGGAGCUGCAGAUUCCAUUGCCCACCAAAGACUAG | MRSLRMGGPCDLKHFPHKLLNKIVMELQIPLPTKD |
| 66 | 130/429 | ATGCTGTTTCTCTGGTGGTTCCCTCTCTGGCTGCTGCCTCACAGTATGGGAACCTGTACTCTGCAGAGGTGA | AUGCUGUUUCUCUGGUGGUUCCCUCUCUGGCUGCUGCCUCACAGUAUGGGAACCUGUACUCUGCAGAGGUGA | MLFLWWFPLWLLPHSMGTCTLQR |
| 67 | 131/430 | CTGTCCTACAGTGAAGTGCCTGGGGGGTTGTCCTATCCCATAAGCCACTTGGATGCTGACAGCAGCCACCATCAGAATGACCCACGCAAAAAAAAGAAAAAAAAAATTAAAAAGTCCCCTCACAACCCAGTGACACCTTTCTGCTTTCCTCTAGACTGGAACATTGATTAG | CUGUCCUACAGUGAAGUGCCUGGGGGGUUGUCCUAUCCCAUAAGCCACUUGGAUGCUGACAGCAGCCACCAUCAGAAUGACCCACGCAAAAAAAAGAAAAAAAAAAUUAAAAAGUCCCCUCACAACCCAGUGACACCUUUCUGCUUUCCUCUAGACUGGAACAUUGAUUAG | LSYSEVPGGLSYPISHLDADSSHHQNDPRKKKKKKIKKSPHNPVTPFCFPLDWNID |
| 68 | 132/431 | ATGGGGCTCATTTCTCACGGTGGCACTTGGCCTCCACTGGGCAGCAGGACCAGCTCCAAGCGCTAG | AUGGGGCUCAUUUCUCACGGUGGCACUUGGCCUCCACUGGGCAGCAGGACCAGCUCCAAGCGCUAG | MGLISHGGTWPPLGSRTSSKR |
| 69 | 133/432 | ATGGCAGAAACTTGTTTGTTGGACTACATGTGTGACTTTGGGTCTGTCTCTGCCTCTGCTTTCAGAAATGTCATCCATTGTGTAAAATATTGGCTTACTGGTCTGCCAGCTAAAACTTGGCCACATCCCCTGTTATGGCTGCAGGATCGAGTTATTGTTAACAAAGAGACCCAAGAAAAGCTGCTAATGTCCTCTTATCATTGTTGTTAA | AUGGCAGAAACUUGUUUGUUGGACUACAUGUGUGACUUUGGGUCUGUCUCUGCCUCUGCUUUCAGAAAUGUCAUCCAUUGUGUAAAAUAUUGGCUUACUGGUCUGCCAGCUAAAACUUGGCCACAUCCCCUGUUAUGGCUGCAGGAUCGAGUUAUUGUUAACAAAGAGACCCAAGAAAAGCUGCUAAUGUCCUCUUAUCAUUGUUGUUAA | MAETCLLDYMCDFGSVSASAFRNVIHCVKYWLTGLPAKTWPHPLLWLQDRVIVNKETQEKLLMSSYHCC |
| 70 | 134/433 | CTGTTTTCCCCCACTCTCTCTCCACCTCCTCCTGCCTTCCCCACCCCGAGTGCGGAGCCAGAGATCAAAAGATGA | CUGUUUUCCCCCACUCUCUCUCCACCUCCUCCUGCCUUCCCCACCCCGAGUGCGGAGCCAGAGAUCAAAAGAUGA | LFSPTLSPPPPAFPTPSAEPEIKR |

TABLE 1-continued

| | | | | |
|---|---|---|---|---|
| 71 | 135/434 | GTGGACACTGAATTTGGAAGGTGGAGGATTTTGTTTTTTCTTTTAAGATCTGGGCATCTTTTGAATCTACCCTTCAAGTATTAAGAGACAGACTGTGA | GUGGACACUGAAUUUGGAAGGUGGAGGAUUUUGUUUUUUUCUUUUAAGAUCUGGGCAUCUUUUGAAUCUACCCUUCAAGUAUUAAGAGACAGACUGUGA | VDTEFGRWRILFFSFKIWASFESTLQVLRDRL |
| 72 | 136/435 | ATGGCCCAGTGTCAAGTTGTGCTTGTTTACAGCACTACTCTGTGCCAGCCACACAAACGTTTACTTATCTTATGCCACGGGAAGTTTAGAGAGCTAAGATTATCTGGGGAAATCAAAACAAAAACAAGCAAACAAAAAAAAAAAGCAAAAACAAAACAAAAAATAAGCCAAAAAACCTTGCTAGTGTTTTTTCCTCAAAAATAA | AUGGCCCAGUGUCAAGUUGUGCUUGUUUACAGCACUACUCUGUGCCAGCCACACAAACGUUUACUUAUCUUAUGCCACGGGAAGUUUAGAGAGCUAAGAUUAUCUGGGGAAAUCAAAACAAAAACAAGCAAACAAAAAAAAAAAGCAAAAACAAAACAAAAAAUAAGCCAAAAAACCUUGCUAGUGUUUUUUCCUCAAAAAUAA | MAQCQVVLVYSTTLCQPHKRLLILCHGKFRELRLSGEIKTKTSKQKKKAKTKQKISQKTLLVFFPQK |
| 73 | 137/436 | TTGACTTTCAATAGTTTTTCTAAGACCTTTGAACTGAATGTTCTCTTCAGCCAAAACTTGGCGACTTCCACAGAAAAGTCTGACCACTGA | UUGACUUUCAAUAGUUUUUCUAAGACCUUUGAACUGAAUGUUCUCUUCAGCCAAAACUUGGCGACUUCCACAGAAAAGUCUGACCACUGA | LTFNSFSKTFELNVLFSQNLATSTEKSDH |
| 74 | 138/437 | ATGAAGTTTTCTGCCAAACTCCGTGAAGCCACAAGCACCTTATGTCCTCCCTTCAGTGTTTTGTGGGCCTGA | AUGAAGUUUUCUGCCAAACUCCGUGAAGCCACAAGCACCUUAUGUCCUCCCUUCAGUGUUUUGUGGGCCUGA | MKFSAKLREATSTLCPPFSVLWA |
| 75 | 139/438 | CTGCTGGAGAAAACTAAAGCTGACAGGTTCCCTTTTTGGGGTGGGATAGACATGTTCTGGTTTTCTTTATTATTACACAATCTGGCTCATGTACAGGATCACTTTTAG | CUGCUGGAGAAAACUAAAGCUGACAGGUUCCCUUUUUGGGGUGGGAUAGACAUGUUCUGGUUUUCUUUAUUAUUACACAAUCUGGCUCAUGUACAGGAUCACUUUUAG | LLEKTKADRFPFWGGIDMFWFSLLLHNLAHVQDHF |
| 76 | 140/439 | ATGATTTTCATCTTTTGTGATACACAGATTGAATTATATCATTTTCATATCTCTCCTTGTAAATACTAG | AUGAUUUUCAUCUUUUGUGAUACACAGAUUGAAUUAUAUCAUUUUCAUAUCUCUCCUUGUAAAUACUAG | MIFIFCDTQIELYHFHISPCKY |
| 77 | 141/440 | TTGACAGAAGTCTCATTTTGCATGCGCTCTGCTCTACAAACAGAGTTGGTATGGTTGGTATACTGTACTCACCTGTGA | UUGACAGAAGUCUCAUUUUGCAUGCGCUCUGCUCUACAAACAGAGUUGGUAUGGUUGGUAUACUGUACUCACCUGUGA | LTEVSFCMRSALQTELVWLVYCTHL |
| 78 | 142/441 | GTGAGGAAGAGAAAAAGAAGGAGCACCAGGGAGAAGGCTCCGTCTGTGCTGGGCAGCAGACAGCTGCCAGGATCACGAACTCTGTAG | GUGAGGAAGAGAAAAAGAAGGAGCACCAGGGAGAAGGCUCCGUCUGUGCUGGGCAGCAGACAGCUGCCAGGAUCACGAACUCUGUAG | VRKRKRRSTREKAPSVLGSRQLPGSRTL |
| 79 | 143/442 | CTGACTGTCTACGAATTATCTTGTGCCAGTTGCCCAGGTGAGAGGGCACTGGGCCAAGGGAGTGGTTTTCATGTTTGA | CUGACUGUCUACGAAUUAUCUUGUGCCAGUUGCCCAGGUGAGAGGGCACUGGGCCAAGGGAGUGGUUUUCAUGUUUGA | LTVYELSCASCPGERALGQGSGFHV |
| 80 | 144/443 | TTGTGGGTTTTTTTTTCCCTAATAATATACATGTTTAGAAGAATTGAAAATAATTTCGGGAAAATGGGATTATGGGTCCTTCACTAA | UUGUGGGUUUUUUUUUCCCUAAUAAUAUACAUGUUUAGAAGAAUUGAAAAUAAUUUCGGGAAAAUGGGAUUAUGGGUCCUUCACUAA | LWVFFSLIIYMFRRIENNFGKMGLWVLH |
| 81 | 145/444 | TTGGAAATGGAGCTGTTCTTAGCCACTGTGTTTGCTAGTGCCCATGTTAGCTTATCTGAAGATGTGAAACCCTTGCTGATAAGGGAGCATTTAAAGTACTAG | UUGGAAAUGGAGCUGUUCUUAGCCACUGUGUUUGCUAGUGCCCAUGUUAGCUUAUCUGAAGAUGUGAAACCCUUGCUGAUAAGGGAGCAUUUAAAGUACUAG | LEMELFLATVFASAHVSLSEDVKPLLIREHLKY |

TABLE 1-continued

| | | | | |
|---|---|---|---|---|
| 82 | 146/445 | ATGAATATTTGTATCCATGTTTCAAAATTGAAATAT<br>ATATATATATATATATATATATATATATATATATAT<br>AGTGTGTGTGTGTTCTGATAGCTTTAACTTTCTC<br>TGCATCTTTATATTTGGTTCCAGATCACACCTGATG<br>CCATGTACTTGTGAGAGAGGATGCAGTTTTGTTTT<br>GGAAGCTCTCTCAGAACAAACAAGACACCTGGAT<br>TGA | AUGAAUAUUUGUAUCCAUGUUUCAAAAU<br>UGAAAUAUAUAUAUAUAUAUAUAUAUAUAU<br>AUAUAUAUAUAUAUAUAGUGUGUGUGUG<br>UGUUCUGAUAGCUUUAACUUUCUCUGCA<br>UCUUUAUAUUUGGUUCCAGAUCACACCUG<br>AUGCCAUGUACUUGUGAGAGAGGAUGCAG<br>UUUUGUUUUGGAAGCUCUCUCAGAACAAA<br>CAAGACACCUGGAUUGA | MNICIHVSKLKYIYIYIYIYIYIYSVCVCSDSF<br>NFLCIFIFGSRSHLMPCTCERGCSFVLEAL<br>SEQTRHLD |
| 83 | 147/446 | ATGGAACTGACTGAGATTTACCACAGGGAAGGCC<br>CAAACTTGGGGCCAAAAGCCTACCCAAGTGATTG<br>A | AUGGAACUGACUGAGAUUUACCACAGGGA<br>AGGCCCAAACUUGGGGCCAAAAGCCUACCC<br>AAGUGAUUGA | MELTEIYHREGPNLGPKAYPSD |
| 84 | 148/447 | CTGCATTGGAACCTGGAGCAAGCGCTCTATCTTTC<br>ACACAAATTCCCTCACCTGAGATTGAGGTGCTCTT<br>GTTACTGGGTGTCTGTGTGCTGTAATTCTGGTTTT<br>GGATATGTTCTGTAA | CUGCAUUGGAACCUGGAGCAAGCGCUCUA<br>UCUUUCACACAAAUUCCCUCACCUGAGAU<br>UGAGGUGCUCUUGUUACUGGGUGUCUGU<br>GUGCUGUAAUUCUGGUUUUGGAUAUGUU<br>CUGUAA | LHWNLEQALYLSHKFPHLRLRCSCYWVS<br>VCCNSGFGYVL |
| 85 | 149/448 | ATGAAAATGTGTTTTTCTCTGTTAAAACTTGTCAG<br>AGTACTAGAAGTTGTATCTCTGTAG | AUGAAAAUGUGUUUUUCUCUGUUAAAAC<br>UUGUCAGAGUACUAGAAGUUGUAUCUCU<br>GUAG | MKMCFSLLKLVRVLEVVSL |
| 86 | 150/449 | GTGCAGGTCCATTTCTGCCCACAGGTAGGGTGTTT<br>TTCTTTGATTAAGAGATTGACACTTCTGTTGCCTAG<br>GACCTCCCAACTCAACCATTTCTAG | GUGCAGGUCCAUUUCUGCCCACAGGUAGG<br>GUGUUUUUCUUUGAUUAAGAGAUUGACA<br>CUUCUGUUGCCUAGGACCUCCCAACUCAAC<br>CAUUUCUAG | VQVHFCPQVGCFSLIKRLTLLLPRTSQLN<br>HF |
| 87 | 151/450 | TTGTCATGGAGCTGCAGATTCCATTGCCCACCAAA<br>GACTAGAACACACACATATCCATACACCAAAGGA<br>AAGACAATTCTGAAATGCTGTTTCTCTGGTGGTTC<br>CCTCTCTGGCTGCTGCCTCACAGTATGGGAACCTG<br>TACTCTGCAGAGGTGACAGGCCAGATTTGCATTAT<br>CTCACAACCTTAGCCCTTGGTGCTAACTGTCCTAC<br>AGTGAAGTGCCTGGGGGGTTGTCCTATCCCATAA | UUGUCAUGGAGCUGCAGAUUCCAUUGCCC<br>ACCAAAGACUAGAACACACACAUAUCCAUA<br>CACCAAAGGAAAGACAAUUCUGAAAUGCU<br>GUUUCUCUGGUGGUUCCCUCUCUGGCUGC<br>UGCCUCACAGUAUGGGAACCUGUACUCUG<br>CAGAGGUGACAGGCCAGAUUUGCAUUAUC<br>UCACAACCUUAGCCCUUGGUGCUAACUGU<br>CCUACAGUGAAGUGCCUGGGGGGUUGUCC<br>UAUCCCAUAA | LSWSCRFHCPPKTRTHTYPYTKGKTILKCC<br>FSGGSLSGCCLTVWEPVLCRGDRPDLHYL<br>TTLALGANCPTVKCLGGCPIP |
| 88 | 152/451 | ATGCTGACAGCAGCCACCATCAGAATGACCCACG<br>CAAAAAAAAGAAAAAAAAAATTAAAAAGTCCCCT<br>CACAACCCAGTGA | AUGCUGACAGCAGCCACCAUCAGAAUGACC<br>CACGCAAAAAAAAGAAAAAAAAAAAUUAAAA<br>AGUCCCCUCACAACCCAGUGA | MLTAATIRMTHAKKRKKKLKSPLTTQ |
| 89 | 153/452 | TTGATTAGGGAGTGCCTCAGACATGACATTCTTGT<br>GCTGTCCTTGGAATTAATCTGGCAGCAGGAGGGA<br>GCAGACTATGTAAACAGAGATAAAAATTAA | UUGAUUAGGGAGUGCCUCAGACAUGACAU<br>UCUUGUGCUGUCCUUGGAAUUAAUCUGG<br>CAGCAGGAGGGAGCAGACUAUGUAAACAG<br>AGAUAAAAAUUAA | LIRECLRHDILVLSLELIWQQEGADYVNR<br>DKN |
| 90 | 154/453 | TTGAAGGAAAAAAGAAATAAGAAGAGAGAGAGA<br>AAGAAAGCATCACACAAAGATTTTCTTAAAAGAA<br>ACAATTTTGCTTGA | UUGAAGGAAAAAAGAAAUAAGAAGAGAGA<br>GAGAAAGAAAGCAUCACACAAAGAUUUUC<br>UUAAAAGAAACAAUUUUGCUUGA | LKEKRNKKRERKKASHKDFLKRNNFA |

TABLE 1-continued

| | | | | |
|---|---|---|---|---|
| 91 | 155/454 | GTGGCACTTGGCCTCCACTGGGCAGCAGGACCAG CTCCAAGCGCTAGTGTTCTGTTCTCTTTTTGTAATC TTGGAATCTTTTGTTGCTCTAAATACAATTAA | GUGGCACUUGGCCUCCACUGGGCAGCAGG ACCAGCUCCAAGCGCUAGUGUUCUGUUCU CUUUUUGUAAUCUUGGAAUCUUUUGUUG CUCUAAAUACAAUUAA | VALGLHWAAGPAPSASVLFSFCNLGIFCC SKYN |
| 92 | 156/455 | CTGGTCTGCCAGCTAAAACTTGGCCACATCCCCTG TTATGGCTGCAGGATCGAGTTATTGTTAACAAAGA GACCCAAGAAAAGCTGCTAA | CUGGUCUGCCAGCUAAAACUUGGCCACAU CCCCUGUUAUGGCUGCAGGAUCGAGUUAU UGUUAACAAAGAGACCCAAGAAAAGCUGC UAA | LVCQLKLGHIPCYGCRIELLLTKRPKKSC |
| 93 | 157/456 | GTGTCACTATGGAGCTCTCACATGTGGAAGCTGC AAGGTCTTCTTCAAAAGAGCCGCTGA | GUGUCACUAUGGAGCUCUCACAUGUGGAA GCUGCAAGGUCUUCUUCAAAAGAGCCGCU GA | VSLWSSHMWKLQGLLQKSR |
| 94 | 158/457 | CTGCCAGGGACCATGTTTTGCCCATTGACTATTAC TTTCCACCCCAGAAGACCTGCCTGA | CUGCCAGGGACCAUGUUUUGCCCAUUGAC UAUUACUUUCCACCCCAGAAGACCUGCCU GA | LPGTMFCPLTITFHPRRPA |
| 95 | 159/458 | GTGGAGATGAAGCTTCTGGGTGTCACTATGGAGC TCTCACATGTGGAAGCTGCAAGGTCTTCTTCAAAA GAGCCGCTGAAG | GUGGAGAUGAAGCUUCUGGGUGUCACUA UGGAGCUCUCACAUGUGGAAGCUGCAAGG UCUUCUUCAAAAGAGCCGCUGAAG | VEMKLLGVTMELSHVEAARSSSKEPLK |
| 96 | 160/459 | TTGGAGACTGCCAGGGACCATGTTTTGCCCATTGA CTATTACTTTCCACCCCAGAAGACCTGCCTGATCT GTGGAGATGAAGCTTCTGGGTGTCACTATGGAGC TCTCACATGTGGAAGCTGCAAGGTCTTCTTCAAAA GAGCCGCTGAAGTTTGGAGACTGCCAGGGACCAT GTTTTGCCCATTGACTATTACTTTCCACCCCAGAAG ACCTGCCTGA | UUGGAGACUGCCAGGGACCAUGUUUUGCC CAUUGACUAUUACUUUCCACCCCAGAAGA CCUGCCUGAUCUGUGGAGAUGAAGCUUCU GGGUGUCACUAUGGAGCUCUCACAUGUGG AAGCUGCAAGGUCUUCUUCAAAAGAGCCG CUGAAGUUUGGAGACUGCCAGGGACCAUG UUUUGCCCAUUGACUAUUACUUUCCACCC CAGAAGACCUGCCUGA | LETARDHVLPIDYYFPPQKTCLICGDEASG CHYGALTCGSCKVFFKRAAEVWRLPGT MFCPLTITFHPRRPA |
| 97 | 161/460 | GTGGAGATGAAGCTTCTGGGTGTCACTATGGAGC TCTCACATGTGGAAGCTGCAAGGTCTTCTTCAAAA GAGCCGCTGAAGTTTGGAGACTGCCAGGGACCAT GTTTTGCCCATTGA | GUGGAGAUGAAGCUUCUGGGUGUCACUA UGGAGCUCUCACAUGUGGAAGCUGCAAGG UCUUCUUCAAAAGAGCCGCUGAAGUUUGG AGACUGCCAGGGACCAUGUUUUGCCCAUU GA | VEMKLLGVTMELSHVEAARSSSKEPLKFG DCQGPCFAH |
| 98 (BSS) | 162/461 | CTGTGCGCCAGCAGAAATGATTGCACTATTGATAA ATTCCGAAGGAAAAATTGTCCATCTTGTCGTCTTC GGAAATGTTATGAAGCAGGGATGACTCTGGGAGT TTGGAGACTGCCAGGGACCATGTTTTGCCCATTGA CTATTACTTTCCACCCCAGAAGACCTGCCTGA | CUGUGCGCCAGCAGAAAUGAUUGCACUAU UGAUAAAUUCCGAAGGAAAAAUUGUCCAU CUUGUCGUCUUCGGAAAUGUUAUGAAGCA GGGAUGACUCUGGGAGUUUGGAGACUGC CAGGGACCAUGUUUUGCCCAUUGACUAUU ACUUUCCACCCCAGAAGACCUGCCUGA | LCASRNDCTIDKFRRKNCPSCRLRKCYEA GMTLGVWRLPGTMFCPLTITFHPRRPA |
| 99 (BSS) | 163/462 | ATGCACAAGTCCCGGATGTACAGCCAGTGTGTCC GAATGAGGCACCTCTCTCAAGAGTTTGGATGGCT CCAAATCACCCCCAGGAATTCCTGTGCATGAAAG CACTGCTACTCTTCAGCATTAGCTTCCGCAACTTAC ACGTGGACGACCAGATGGCTGTCATTCAGTACTCC TGGATGGGGCTCATGGTGTTTGCCATGGGCTGGC GATCCTTCACCAATGTCAACTCCAGGATGCTCTAC TTCGCCCCTGATCTGGTTTTCAAT | AUGCACAAGUCCCGGAUGUACAGCCAGUG UGUCCGAAUGAGGCACCUCUCUCAAGAGU UUGGAUGGCUCCAAAUCACCCCCAGGAA UUCCUGUGCAUGAAAGCACUGCUACUCUU CAGCAUUAGCUUCCGCAACUUACACGUGG ACGACCAGAUGGCUGUCAUUCAGUACUCC UGGAUGGGGCUCAUGGUGUUUGCCAUGG GCUGGCGAUCCUUCACCAAUGUCAACUCCA | MHKSRMYSQCVRMRHLSQEFGWLQITP QEFLCMKALLLFSISFRNLHVDDQMAVIQ YSWMGLMVFAMGWRSFTNVNSRMLY FAPDLVFN |

TABLE 1-continued

| | | | | |
|---|---|---|---|---|
| | | | GGAUGCUCUACUUCGCCCCUGAUCUGGUU<br>UUCAAU | |
| 100 (BSS) | 164/463 | TTGCATGCAAAAGAAAAAATCCCACATCCTGCTCA<br>AGACGCTTCTACCAGCTCACCAAGCTCCTGGACTC<br>CGTGCAGCCTGCTTCCGCAACTTACACGTGGACGA<br>CCAGATGGCTGTCATTCAGTACTCCTGGATGGGG<br>CTCATGGTGTTTGCCATGGGCTGGCGATCCTTCAC<br>CAATGTCAACTCCAGGATGCTCTACTTCGCCCCTG<br>A | UUGCAUGCAAAAGAAAAAAUCCCACAUCCU<br>GCUCAAGACGCUUCUACCAGCUCACCAAGC<br>UCCUGGACUCCGUGCAGCCUGCUUCCGCA<br>ACUUACACGUGGACGACCAGAUGGCUGUC<br>AUUCAGUACUCCUGGAUGGGGCUCAUGGU<br>GUUUGCCAUGGGCUGGCGAUCCUUCACCA<br>AUGUCAACUCCAGGAUGCUCUACUUCGCC<br>CCUGA | LHAKEKIPHPAQDASTSSPSSWTPCSLLP<br>QLTRGRPDGCHSVLLDGAHGVCHGLAIL<br>HQCQLQDALLRP |
| 101 (BSS) | 165/464 | ATGCAAAAGAAAAAATCCCACATCCTGCTCAAGAC<br>GCTTCTACCAGCTCACCAAGCTCCTGGACTCCGTG<br>CAGCCTGCTTCCGCAACTTACACGTGGACGACCAG<br>ATGGCTGTCATTCAGTACTCCTGGATGGGGCTCAT<br>GGTGTTTGCCATGGGCTGGCGATCCTTCACCAATG<br>TCAACTCCAGGATGCTCTACTTCGCCCCTGATCTG<br>GTTTTCAAT | AUGCAAAAGAAAAAAUCCCACAUCCUGCUC<br>AAGACGCUUCUACCAGCUCACCAAGCUCCU<br>GGACUCCGUGCAGCCUGCUUCCGCAACUU<br>ACACGUGGACGACCAGAUGGCUGUCAUUC<br>AGUACUCCUGGAUGGGGCUCAUGGUGUU<br>UGCCAUGGGCUGGCGAUCCUUCACCAAUG<br>UCAACUCCAGGAUGCUCUACUUCGCCCCU<br>GAUCUGGUUUUCAAU | MQKKKSHILLKTLLPAHQAPGLRAACFRN<br>LHVDDQMAVIQYSWMGLMVFAMGW<br>RSFTNVNSRMLYFAPDLVFN |
| 102 (BSS) | 166/465 | GTGGATGGGCTGAAAAATCAAAAATTCTTTGATG<br>AACTTCGAATGAACTACATCAAGGAACTCGATCGT<br>ATCATTGCATGCAAAAGAAAAAATCCCACATCCTG<br>CTCAAGACGCTTCTACCAGCTCACCAAGCTCCTGG<br>ACTCCGTGCAGCCTGCTTCCGCAACTTACACGTGG<br>ACGACCAGATGGCTGTCATTCAGTACTCCTGGATG<br>GGGCTCATGGTGTTTGCCATGGGCTGGCGATCCTT<br>CACCAATGTCAACTCCAGGATGCTCTACTTCGCCC<br>CTGATCTGGTTTTCAATG | GUGGAUGGGCUGAAAAAUCAAAAAUUCUU<br>UGAUGAACUUCGAAUGAACUACAUCAAGG<br>AACUCGAUCGUAUCAUUGCAUGCAAAAGA<br>AAAAAUCCCACAUCCUGCUCAAGACGCUUC<br>UACCAGCUCACCAAGCUCCUGGACUCCGUG<br>CAGCCUGCUUCCGCAACUUACACGUGGAC<br>GACCAGAUGGCUGUCAUUCAGUACUCCUG<br>GAUGGGGCUCAUGGUGUUUGCCAUGGGC<br>UGGCGAUCCUUCACCAAUGUCAACUCCAG<br>GAUGCUCUACUUCGCCCCUGAUCUGGUUU<br>UCAAUG | VDGLKNQKFFDELRMNYIKELDRIIACKR<br>KNPTSCSRRFYQLTKLLDSVQPASATYTW<br>TTRWLSFSTPGWGSWCLPWAGDPSPM<br>STPGCSTSPLIWFSM |

| FOLH1 neo-antigen | | DNA sequence | RNA sequence | Protein Sequence |
|---|---|---|---|---|
| 1 | 167/466 | GTGGTATGTCACTCAGAAAGAATCGTAATGGGTA<br>TATTGATAAATTTTAAAATTGGTATATTTGAAATAA<br>AGTTGAATATTATATATAGTTATGTGAGTGTTTAT<br>ATATGTGTGTGTTTATATTGTTTATCTTCTCCCTAT<br>GGATTAAAACTGAATTTCATAATTATAAGAGGTTA<br>TTCTGAAGTGGAAAAATTTAACTCAGTATTAAATC<br>TAAGGAGAATGGCCTAA | GUGGUAUGUCACUCAGAAAGAAUCGUAAU<br>GGGUAUAUUGAUAAAUUUUAAAAUUGGU<br>AUAUUUGAAAUAAAGUUGAAUAUUAUAU<br>AUAGUUAUGUGAGUGUUUAUAUAUGUGU<br>GUGUUUAUAUUGUUUAUCUUCUCCCUAU<br>GGAUUAAAACUGAAUUUCAUAAUUAUAAG<br>AGGUUAUUCUGAAGUGGAAAAAUUUAAC<br>UCAGUAUUAAAUCUAAGGAGAAUGGCCUA<br>A | VVCHSERIVMGILINFKIGIFEIKLNIIYSYVS<br>VYICVCLYCLSSPYGLKLNFIIIRGYSEVEKF<br>NSVLNLRRMA |
| 2 | 168/467 | ATGTCACTTCACACAGAAGAAAACATCAGTATGTC<br>AGAGAGCACACTGGGGAATATGCACAAGATTATC<br>CCAAGCCAGAGGCCTCACGGCCTACCTGGCCAGC<br>CTGGGCTGAGAGGATCACTATCTCAGCACACTATT<br>TGGGAAATGGATCAAATCACACTTTTAGTAAATGT | AUGUCACUUCACACAGAAGAAAACAUCAG<br>UAUGUCAGAGAGCACACUGGGGAAUAUGC<br>ACAAGAUUAUCCCAAGCCAGAGGCCUCACG<br>GCCUACCUGGCCAGCCUGGGCUGAGAGGA<br>UCACUAUCUCAGCACACUAUUUGGGAAAU | MSLHTEENISMSESTLGNMHKIIPSQRPH<br>GLPGQPGLRGSLSQHTIWEMDQITLLVN<br>VITL |

TABLE 1-continued

| | | | | |
|---|---|---|---|---|
| | | TATCACTCTATAG | GGAUCAAAUCACACUUUUAGUAAAUGUUAUCACUCUAUAG | |
| 3 | 169/468 | ATGAACACTTGTGAACCTAATAGCCATATGAAGAAAATAACATTTCTAATATCTTTGGATGCCCCATGTACTAATGACAGTTATGCTTTTGCATTTTCTTGA | AUGAACACUUGUGAACCUAAUAGCCAUAUGAAGAAAAUAACAUUUCUAAUAUCUUUGGAUGCCCCAUGUACUAAUGACAGUUAUGCUUUUGCAUUUUCUUGA | MNTCEPNSHMKKITFLISLDAPCTNDSYAFAFS |
| 4 | 170/469 | CTGTCATTATTTATAATTTTATCACACATGGCTGTATCCTTTACATGTTTTGGCATTATGTATTTTTGA | CUGUCAUUAUUUAUAAUUUUAUCACACAUGGCUGUAUCCUUUACAUGUUUUGGCAUUAUGUAUUUUUGA | LSLFIILSHMAVSFTCFGIMYF |
| 5 | 171/470 | TTGACACTTCAGAACTCCCCAGAAACTTGTCTTCTGGGCCAATGTGTAAAGCTGTTTATGAAGAAATGTCAAGCCAGAGGGGCTCTACTACAAATTTGGCAAAGGACAATTTCAGGAGAAGCTCTTGGCCGCTGGGTTCTCCTGGCCACCATGAACTTCAGGAAGTGGGTGCCATAG | UUGACACUUCAGAACUCCCCAGAAACUUGUCUUCUGGGCCAAUGUGUAAAGCUGUUUAUGAAGAAAUGUCAAGCCAGAGGGGCUCUACUACAAAUUUGGCAAAGGACAAUUUCAGGAGAAGCUCUUGGCCGCUGGGUUCUCCUGGCCACCAUGAACUUCAGGAAGUGGGUGCCAUAG | LTLQNSPETCLLGQCVKLFMKKCQARGALLQIWQRTISGEALGRWVLLATMNFRKWVP |
| 6 | 172/471 | CTGGGCACTGGTGTAGCTCTGTATGCCCTCCGTGTCAGATGCTGGAGATGTCATTTGCATTGCCAGAGTTTGCCAAGGGTGCACACAGAAAGCAGATTGAAAAGCACCCTCTTGGAACATCTCTCCAATGCCTTCTACTCACAAAGTTTAACATCATTAACACGTGACAAAGAAGAACTATTTAATGGGCCCAGATCTATTTATGAAGACAATCAAGTGGGAGTTTGGAGTGGATAA | CUGGGCACUGGUGUAGCUCUGUAUGCCCUCCGUGUCAGAUGCUGGAGAUGUCAUUUGCAUUGCCAGAGUUUGCCAAGGGUGCACACAGAAAGCAGAUUGAAAAGCACCCUCUUGGAACAUCUCUCCAAUGCCUUCUACUCACAAAGUUUAACAUCAUUAACACGUGACAAAGAAGAACUAUUUAAUGGGCCCAGAUCUAUUUAUGAAGACAAUCAAGUGGGAGUUUGGAGUGGAUAA | LGTGVALYALRVRCWRCHLHCQSLPRVHTESRLKSTLLEHLSNAFYSQSLTSLTRDKEELFNGPRSIYEDNQVGVWSG |
| 7 | 173/472 | ATGCCCCATGTACTAATGACAGTTATGCTTTTGCATTTTCTTGAATTTTATGTTTATTTATCTTTCCTCTGTCATTATTTATAA | AUGCCCCAUGUACUAAUGACAGUUAUGCUUUUGCAUUUUCUUGAAUUUUAUGUUUAUUUAUCUUUCCUCUGUCAUUAUUUAUAA | MPHVLMTVMLLHFLEFYVYLSFLCHYL |
| 8 | 174/473 | CTGTATCCTTTACATGTTTTGGCATTATGTATTTTTGAACTTTTTGTAAAGACAATCATACCATGTGTAATTTTCAGGGACTTGATTTTTTTCATTGACTTTTAA | CUGUAUCCUUUACAUGUUUUGGCAUUAUGUAUUUUUGAACUUUUUGUAAAGACAAUCAUACCAUGUGUAAUUUUCAGGGACUUGAUUUUUUUCAUUGACUUUUAA | LYPLHVLALCIFELFVKTIIPCVIFRDLIFFIDF |
| 9 | 175/474 | ATGGTGAATTTGGAGCAGCCAATGAAGAGTCCCCTCACATTGTGGCCTCGCTCAAAGTTAAGAAGTCGCTGTAGTGTTGCCCTTGAAGAATCTGCTTCAAATTGA | AUGGUGAAUUUGGAGCAGCCAAUGAAGAGUCCCCUCACAUUGUGGCCUCGCUCAAAGUUAAGAAGUCGCUGUAGUGUUGCCCUUGAAGAAUCUGCUUCAAAUUGA | MVNLEQPMKSPLTLWPRSKLRSRCSVALEESASN |
| 10 | 176/475 | ATGCCCTCCGTGTCAGATGCTGGAGATGTCATTTGCATTGCCAGAGTTTGCCAAGGGTGCACACAGAAAGCAGATTGA | AUGCCCUCCGUGUCAGAUGCUGGAGAUGUCAUUUGCAUUGCCAGAGUUUGCCAAGGGUGCACACAGAAAGCAGAUUGA | MPSVSDAGDVICIARVCQGCTQKAD |
| 11 | 177/476 | GTGACAAAGAAGAACTATTTAATGGGCCCAGATCTATTTATGAAGACAATCAAGTGGGAGTTTGGAGTGGATAACCCAAATTTGGATAACTGGTGA | GUGACAAAGAAGAACUAUUUAAUGGGCCCAGAUCUAUUUAUGAAGACAAUCAAGUGGGAGUUUGGAGUGGAUAACCCAAAUUUGGAUAACUGGUGA | VTKKNYLMGPDLFMKTIKWEFGVDNPNLDNW |

TABLE 1-continued

| | | | | |
|---|---|---|---|---|
| 12 | 178/477 | TTGAATTTGTGTGGTATGTCACTCAGAAAGAATCGTAATGGGTATATTGATAAATTTTAA | UUGAAUUUGUGUGGUAUGUCACUCAGAAAGAAUCGUAAUGGGUAUAUUGAUAAAUUUUAA | LNLCGMSLRKNRNGYIDKF |
| 13 | 179/478 | ATGTGTGTGTTTATATTGTTTATCTTCTCCCTATGGATTAAAACTGAATTTCATAATTATAAGAGGTTATTCTGA | AUGUGUGUGUUUAUAUUGUUUAUCUUCUCCCUAUGGAUUAAAACUGAAUUUCAUAAUUAUAAGAGGUUAUUCUGA | MCVFILFIFSLWIKTEFHNYKRLF |
| 14 | 180/479 | TTGAATTTTATGTTTATTTATCTTTCCTCTGTCATTATTTATAATTTTATCACACATGGCTGTATCCTTTACATGTTTTGGCATTATGTATTTTTGAACTTTTTGTAA | UUGAAUUUUAUGUUUAUUUAUCUUUCCUCUGUCAUUAUUUAUAAUUUUAUCACACAUGGCUGUAUCCUUUACAUGUUUUGGCAUUAUGUAUUUUUGAACUUUUUGUAA | LNFMFIYLSSVIIYNFITHGCILYMFWHYVFLNFL |
| 15 | 181/480 | ATGAAATATTGTCTAGTAATATGTAAAGAGAAGTCTCAAGAATATGTGATGAGCAGATGTAAGGAATTGCTCTTGTCTCCATGGTGA | AUGAAAUAUUGUCUAGUAAUAUGUAAAGAGAAGUCUCAAGAAUAUGUGAUGAGCAGAUGUAAGGAAUUGCUCUUGUCUCCAUGGUGA | MKYCLVICKEKSQEYVMSRCKELLLSPW |
| 16 | 182/481 | GTGTTGCCCTTGAAGAATCTGCTTCAAATTGACACTTCAGAACTCCCCAGAAACTTGTCTTCTGGGCCAATGTGTAAAGCTGTTTATGAAGAAATGTCAAGCCAGAGGGGCTCTACTACAAATTTGGCAAAGGACAATTTCAGGAGAAGCTCTTGGCCGCTGGGTTCTCCTGGCCACCATGAACTTCAGGAAGTGGGTGCCATAGCAGCAGCCTGA | GUGUUGCCCUUGAAGAAUCUGCUUCAAAUUGACACUUCAGAACUCCCCAGAAACUUGUCUUCUGGGCCAAUGUGUAAAGCUGUUUAUGAAGAAAUGUCAAGCCAGAGGGGCUCUACUACAAAUUUGGCAAAGGACAAUUUCAGGAGAAGCUCUUGGCCGCUGGGUUCUCCUGGCCACCAUGAACUUCAGGAAGUGGGUGCCAUAGCAGCAGCCUGA | VLPLKNLLQIDTSELPRNLSSGPMCKAVYEEMSSQRGSTTNLAKDNFRRSSWPLGSPGHHELQEVGAIAAA |
| 17 | 183/482 | ATGCTGGAGATGTCATTTGCATTGCCAGAGTTTGCCAAGGGTGCACACAGAAAGCAGATTGAAAAGCACCCTCTTGGAACATCTCTCCAATGCCTTCTACTCACAAAGTTTAACATCATTAACACGTGA | AUGCUGGAGAUGUCAUUUGCAUUGCCAGAGUUUGCCAAGGGUGCACACAGAAAGCAGAUUGAAAAGCACCCUCUUGGAACAUCUCUCCAAUGCCUUCUACUCACAAAGUUUAACAUCAUUAACACGUGA | MLEMSFALPEFAKGAHRKQIEKHPLGTSLQCLLLTKFNIINT |
| 18 | 184/483 | CTGAATGGTGCAGGAGACCCTCTCACACCAGGTTACCCAGCAAATGAATATGCTTATAGGCGTGGAATTGCAGAGGCTGTTGGTCTTCCAAGTATTCCTGTTCATCCAATTGGATACTATGATGCACAGAAGCTCCTAGAGGTGGTTTATAAAATCCTCCAATGA | CUGAAUGGUGCAGGAGACCCUCUCACACCAGGUUACCCAGCAAAUGAAUAUGCUUAUAGGCGUGGAAUUGCAGAGGCUGUUGGUCUUCCAAGUAUUCCUGUUCAUCCAAUUGGAUACUAUGAUGCACAGAAGCUCCUAGAGGUGGUUUAUAAAAUCCUCCAAUGA | LNGAGDPLTPGYPANEYAYRRGIAEAVGLPSIPVHPIGYYDAQKLLEVVYKILQ |
| 19 (BSS) | 185/484 | CTGAGAACATCAAGAAGTTCTTATAGGTGGTTTATAAAATCCTCCAATGAAGCTACTAACATTACTCCAAAGCATAATATGAAAGCATTTTTGGATGAATTGAAAGCTGAGAACATCAAGAAGTTCTTA | CUGAGAACAUCAAGAAGUUCUUAUAGGUGGUUUAUAAAAUCCUCCAAUGAAGCUACUAACAUUACUCCAAAGCAUAAUAUGAAAGCAUUUUUGGAUGAAUUGAAAGCUGAGAACAUCAAGAAGUUCUUA | LRTSRSSYRWFIKSSNEATNITPKHNMKAFLDELKAENIKKFL |
| 20 (BSS) | 186/485 | TTGAACCACCTCCTCCAGGATATGAAAATGTTTCGGATATTGTACCACCTTTCAGTGCTTTCTCTCCTCAAGGAATGCCAGAGATTTTCAACACATCATTATTTGAACCACCTCCTCCAGGATATGAAAATGTTTCGGATA | UUGAACCACCUCCUCCAGGAUAUGAAAAUGUUUCGGAUAUUGUACCACCUUUCAGUGCUUUCUCUCCUCAAGGAAUGCCAGAGAUUUUCAACACAUCAUUAUUUGAACCACCUCCUC | LNHLLQDMKMFRILYHLSVLSLLKECQRFSTHHYLNHLLQDMKMFRILYHLSVLSLLKECQ |

TABLE 1-continued

| Nkx3.1 neo-antigen | | DNA sequence | RNA sequence | Protein Sequence |
|---|---|---|---|---|
| | | TTGTACCACCTTTCAGTGCTTTCTCTCCTCAAGGAATGCCAG | CAGGAUAUGAAAAUGUUUCGGAUAUUGUACCACCUUUCAGUGCUUUCUCUCCUCAAGGAAUGCCAG | |
| 1 | 187/486 | GTGTGCACACCAAAGCTATTGGAGATTTGCGTGGAAATCTCAGATTCTTCACTGGTGAGACAATGA | GUGUGCACACCAAAGCUAUUGGAGAUUUGCGUGGAAAUCUCAGAUUCUUCACUGGUGAGACAAUGA | VCTPKLLEICVEISDSSLVRQ |
| 2 | 188/487 | ATGGTATGCCAACTTAAGTATTTACAGGGTGGCCCAAATAGAACAAGATGCACTCGCTGTGATTTTAAGACAAGCTGTATAAACAGAACTCCACTGCAAGAGGGGGGGCCGGGCCAGGAGAATCTCCGCTTGTCCAAGACAGGGGCCTAA | AUGGUAUGCCAACUUAAGUAUUUACAGGGUGGCCCAAAUAGAACAAGAUGCACUCGCUGUGAUUUUAAGACAAGCUGUAUAAACAGAACUCCACUGCAAGAGGGGGGGCCGGGCCAGGAGAAUCUCCGCUUGUCCAAGACAGGGGCCUAA | MVCQLKYLQGGPNRTRCTRCDFKTSCINRTPLQEGGPGQENLRLSKTGA |
| 3 | 189/488 | ATGAGCAGAGAGCAAAGGAGAAATCTGGCTGTCCTTCCATTTTCATTCTGTTATCTCAGGTGA | AUGAGCAGAGAGCAAAGGAGAAAUCUGGCUGUCCUUCCAUUUUCAUUCUGUUAUCUCAGGUGA | MSREQRRNLAVLPFSFCYLR |
| 4 | 190/489 | TTGGGCTCCACATTGCAATGTTCAATGCCACGTGCTGCTGACACCGACCGGAGTACTAGCCAGCACAAAAGGCAGGGTAGCCTGAATTGCTTTCTGCTCTTTACATTTCTTTTAAAATAA | UUGGGCUCCACAUUGCAAUGUUCAAUGCCACGUGCUGCUGACACCGACCGGAGUACUAGCCAGCACAAAAGGCAGGGUAGCCUGAAUUGCUUUCUGCUCUUUACAUUUCUUUUAAAAUAA | LGSTLQCSMPRAADTDRSTSQHKRQGSLNCFLLFTFLLK |
| 5 | 191/490 | CTGAGTACTCTTTCTCTCCCCTCCTCTGAATTTAATTCTTTCAACTTGCAATTTGCAAGGATTACACATTTCACTGTGATGTATATTGTGTTGCAAAAAAAAAAAAAAAGTGTCTTTGTTTAA | CUGAGUACUCUUUCUCUCCCCUCCUCUGAAUUUAAUUCUUUCAACUUGCAAUUUGCAAGGAUUACACAUUUCACUGUGAUGUAUAUUGUGUUGCAAAAAAAAAAAAAAAGUGUCUUUGUUUAA | LSTLSLPSSEFNSFNLQFARITHFTVMYIVLQKKKKSVFV |
| 6 | 192/491 | CTGACAGGTGAATTGGATGGTTCTCAGAACCATTTCACCCAGACAGCCTGTTTCTATCCTGTTTAA | CUGACAGGUGAAUUGGAUGGUUCUCAGAACCAUUUCACCCAGACAGCCUGUUUCUAUCCUGUUUAA | LTGELDGSQNHFTQTACFYPV |
| 7 | 193/492 | CTGAAAACACTTCAGGCGCCCTTCCAAGGCTTCCCCAAACCCCTAAGCAGCCGCAGAAGCGCTCCCGAGCTGCCTTCTCCCACACTCAGGTGA | CUGAAAACACUUCAGGCGCCCUUCCAAGGCUUCCCCAAACCCCUAAGCAGCCGCAGAAGCGCUCCCGAGCUGCCUUCUCCCACACUCAGGUGA | LKTLQAPFQGFPKPLSSRRSAPELPSPTLR |
| 8 | 194/493 | CTGCCTTCCCCAGGGTGTCTCTATGAAAAGCACAAGGGGCCAAGGTCAGGGAGCAAGAGGTGTGCACACCAAAGCTATTGGAGATTTGCGTGGAAATCTCAGATTCTTCACTGGTGA | CUGCCUUCCCCAGGGUGUCUCUAUGAAAAGCACAAGGGGCCAAGGUCAGGGAGCAAGAGGUGUGCACACCAAAGCUAUUGGAGAUUUGCGUGGAAAUCUCAGAUUCUUCACUGGUGA | LPSPGCLYEKHKGPRSGSKRCAHQSYWRFAWKSQILHW |
| 9 | 195/494 | CTGTTTGAAGGGGAGAGAGGGAAAATCAAGTGGTATTTTCCAGCACTTTGTATGATTTTGGATGAGTTGTACACCCAAGGATTCTGTTCTGCAACTCCATCCTCC | CUGUUUGAAGGGGAGAGAGGGAAAAUCAAGUGGUAUUUUCCAGCACUUUGUAUGAUUUUGGAUGAGUUGUACACCCAAGGAUUCU | LFEGERGKIKWYFPALCMILDELYTQGFCSATPSSCVTEYQL |

TABLE 1-continued

| | | | | |
|---|---|---|---|---|
| | | TGTGTCACTGAATATCAACTCTGA | GUUCUGCAACUCCAUCCUCCUGUGUCACUGAAUAUCAACUCUGA | |
| 10 | 196/495 | CTGTTGGCCTTGGAATATGGCCAAGGCTCTCTCTGTCCCTGTAAAAGAGAGGGGCAAATAGAGAGTCTCCAAGAGAACGCCCTCATGCTCAGCACATATTTGCATGGGAGGGGGAGATGGGTGGGAGGAGATGAAAATATCAGCTTTTCTTATTCCTTTTTATTCCTTTTAAAATGGTATGCCAACTTAAGTATTTACAGGGTGGCCCAAATAGAACAAGATGCACTCGCTGTGATTTTAAGACAAGCTGTATAA | CUGUUGGCCUUGGAAUAUGGCCAAGGCUCUCUCUGUCCCUGUAAAAGAGAGGGGCAAAUAGAGAGUCUCCAAGAGAACGCCCUCAUGCUCAGCACAUAUUUGCAUGGGAGGGGGAGAUGGGUGGGAGGAGAUGAAAAUAUCAGCUUUUCUUAUUCCUUUUUAUUCCUUUUAAAAUGGUAUGCCAACUUAAGUAUUUACAGGGUGGCCCAAAUAGAACAAGAUGCACUCGCUGUGAUUUUAAGACAAGCUGUAUAA | LLALEYGQGSLCPCKREGQIESLQENALMLSTYLHGRGRWVGGDENISFSYSFLFLLKWYANLSIYRVAQIEQDALAVILRQAV |
| 11 | 197/496 | CTGGAGAATTTAGAATCAGAAGTTTCCTGGAGTTTTCAGGCTATCATATATACTGTATCCTGA | CUGGAGAAUUUAGAAUCAGAAGUUUCCUGGAGUUUUCAGGCUAUCAUAUAUACUGUAUCCUGA | LENLESEVSWSFQAIIYTVS |
| 12 | 198/497 | TTGGGGGCAGATTCTGAATTGGCTAAAAGACATGCATTTTTAAAACTAGCAACTCTTATTTCTTTCCTTTAA | UUGGGGGCAGAUUCUGAAUUGGCUAAAAGACAUGCAUUUUUAAAACUAGCAACUCUUAUUUCUUUCCUUUAA | LGADSELAKRHAFLKLATLISFL |
| 13 | 199/498 | TTGAGAATCTTTGCATGCAGAGGAGGTAAGAGGTATTGGATTTTCACAGAGGAAGAACACAGCGCAGAATGA | UUGAGAAUCUUUGCAUGCAGAGGAGGUAAGAGGUAUUGGAUUUUCACAGAGGAAGAACACAGCGCAGAAUGA | LRIFACRGGKRYWIFTEEEHSAE |
| 14 | 200/499 | CTGTCCAGTGGAGGGCTCATGGGTGGGACATGGAAAAGAAGGCAGCCTAGGCCCTGGGGAGCCCAGTCCACTGAGCAAGCAAGGGACTGA | CUGUCCAGUGGAGGGCUCAUGGGUGGGACAUGGAAAAGAAGGCAGCCUAGGCCCUGGGGAGCCCAGUCCACUGAGCAAGCAAGGGACUGA | LSSGGLMGGTWKRRQPRPWGAQSTEQARD |
| 15 | 201/500 | GTGAGCCTTTTGCAGGAAAAGGCTAAGAAAAAGGAAAACCATTCTAAAACACAACAAGAAACTGTCCAAATGCTTTGGGAACTGTGTTTATTGCCTATAATGGGTCCCCAAAATGGGTAA | GUGAGCCUUUUGCAGGAAAAGGCUAAGAAAAAGGAAAACCAUUCUAAAACACAACAAGAAACUGUCCAAAUGCUUUGGGAACUGUGUUUAUUGCCUAUAAUGGGUCCCCAAAAUGGGUAA | VSLLQEKAKKKENHSKTQQETVQMLWELCLLPIMGPQNG |
| 16 | 202/501 | TTGGCCAATTTCACCCCATTTTCTGTGGTTTGGGCTCCACATTGCAATGTTCAATGCCACGTGCTGCTGACACCGACCGGAGTACTAGCCAGCACAAAAGGCAGGGTAGCCTGA | UUGGCCAAUUUCACCCCAUUUUCUGUGGUUUGGGCUCCACAUUGCAAUGUUCAAUGCCACGUGCUGCUGACACCGACCGGAGUACUAGCCAGCACAAAAGGCAGGGUAGCCUGA | LANFTPFSVVWAPHCNVQCHVLLTPTGVLASTKGRVA |
| 17 | 203/502 | TTGTGTTGCAAAAAAAAAAAAAAGTGTCTTTGTTTAAAATTACTTGGTTTGTGAATCCATCTTGCTTTTTCCCCATTGGAACTAGTCATTAA | UUGUGUUGCAAAAAAAAAAAAAAGUGUCUUUGUUUAAAAUUACUUGGUUUGUGAAUCCAUCUUGCUUUUUCCCCAUUGGAACUAGUCAUUAA | LCCKKKKKVSLFKITWFVNPSCFFPIGTSH |
| 18 | 204/503 | GTGAATTGGATGGTTCTCAGAACCATTTCACCCAGACAGCCTGTTTCTATCCTGTTTAATAAATTAGTTTGGGTTCTCTACATGCATAACAAACCCTGCTCCAATCTGTCACATAAAAGTCTGTGA | GUGAAUUGGAUGGUUCUCAGAACCAUUUCACCCAGACAGCCUGUUUCUAUCCUGUUUAAUAAAUUAGUUUGGGUUCUCUACAUGCAUAACAAACCCUGCUCCAAUCUGUCACAUAAAAGUCUGUGA | VNWMVLRTISPRQPVSILFNKLVWVLYMHNKPCSNLSHKSL |

TABLE 1-continued

| | | | | |
|---|---|---|---|---|
| 19 | 205/504 | CTGCGTGGGCAGCTGGAGCCCAGCTTTTTGGTAA TGCCAGCTCAGGTGACAACCATTATGATCAAAAAC TGCCTTCCCCAGGGTGTCTCTATGAAAAGCACAAG GGGCCAAGGTCAGGGAGCAAGAGGTGTGCACAC CAAAGCTATTGGAGATTTGCGTGGAAATCTCAGA TTCTTCACTGGTGAGACAATGAAACAACAGAGAC AGTGA | CUGCGUGGGCAGCUGGAGCCCAGCUUUUU GGUAAUGCCAGCUCAGGUGACAACCAUUA UGAUCAAAAACUGCCUUCCCCAGGGUGUC UCUAUGAAAAGCACAAGGGGCCAAGGUCA GGGAGCAAGAGGUGUGCACACCAAAGCUA UUGGAGAUUUGCGUGGAAAUCUCAGAUU CUUCACUGGUGAGACAAUGAAACAACAGA GACAGUGA | LRGQLEPSFLVMPAQVTTIMIKNCLPQG VSMKSTRGQGQGARGVHTKAIGDLRGN LRFFTGETMKQQRQ |
| 20 | 206/505 | TTGCTTCTGGCTACCTGTTTGAAGGGGAGAGAGG GAAAATCAAGTGGTATTTTCCAGCACTTTGTATGA | UUGCUUCUGGCUACCUGUUUGAAGGGGA GAGAGGGAAAAUCAAGUGGUAUUUUCCAG CACUUUGUAUGA | LLLATCLKGREGKSSGIFQHFV |
| 21 | 207/506 | ATGGGAGGGGGAGATGGGTGGGAGGAGATGAA AATATCAGCTTTTCTTATTCCTTTTTATTCCTTTTAA | AUGGGAGGGGGAGAUGGGUGGGAGGAGA UGAAAAUAUCAGCUUUUCUUAUUCCUUU UUAUUCCUUUUAA | MGGGDGWEEMKISAFLIPFYSF |
| 22 | 208/507 | CTGTATAAACAGAACTCCACTGCAAGAGGGGGGG CCGGGCCAGGAGAATCTCCGCTTGTCCAAGACAG GGGCCTAAGGAGGGTCTCCACACTGCTGCTAGGG GCTGTTGCATTTTTTTATTAG | CUGUAUAAACAGAACUCCACUGCAAGAGG GGGGGCCGGGCCAGGAGAAUCUCCGCUUG UCCAAGACAGGGGCCUAAGGAGGGUCUCC ACACUGCUGCUAGGGGCUGUUGCAUUUU UUUAUUAG | LYKQNSTARGGAGPGESPLVQDRGLRRV STLLLGAVAFFY |
| 23 | 209/508 | CTGTATCCTGAAAGGCAACATAATTCTTCCTTCCCT CCTTTTAAAATTTTGTGTTCCTTTTTGCAGCAATTA CTCACTAAAGGGCTTCATTTTAGTCCAGATTTTTAG | CUGUAUCCUGAAAGGCAACAUAAUUCUUC CUUCCCUCCUUUUAAAAUUUUGUGUUCCU UUUUGCAGCAAUUACUCACUAAAGGGCUU CAUUUUAGUCCAGAUUUUUAG | LYPERQHNSSFPPFKILCSFLQQLLTKGLH FSPDF |
| 24 | 210/509 | ATGCCTCGCTTATTTAGCCCGAGATCTGGTCTTTTT TTTTTTTTTTTTTTTTTTTTTTCCGTCTCCCCAAAGCT TTATCTGTCTTGA | AUGCCUCGCUUAUUUAGCCCGAGAUCUGG UCUUUUUUUUUUUUUUUUUUUUUUUUU UUCCGUCUCCCCAAAGCUUUAUCUGUCUU GA | MPRLFSPRSGLFFFFFFFFSVSPKLYLS |
| 25 | 211/510 | TTGCATGCAGAGGAGGTAAGAGGTATTGGATTTT CACAGAGGAAGAACACAGCGCAGAATGAAGGGC CAGGCTTACTGAGCTGTCCAGTGGAGGGCTCATG GGTGGGACATGGAAAAGAAGGCAGCCTAGGCCC TGGGGAGCCCAGTCCACTGAGCAAGCAAGGGACT GAGTGA | UUGCAUGCAGAGGAGGUAAGAGGUAUUG GAUUUUCACAGAGGAAGAACACAGCGCAG AAUGAAGGGCCAGGCUUACUGAGCUGUCC AGUGGAGGGCUCAUGGGUGGGACAUGGA AAAGAAGGCAGCCUAGGCCCUGGGGAGCC CAGUCCACUGAGCAAGCAAGGGACUGAGU GA | LHAEEVRGIGFSQRKNTAQNEGPGLLSCP VEGSWVGHGKEGSLGPGEPSPLSKQGTE |
| 26 | 212/511 | ATGGGTAACCTAGACTTCAGAGAGAATGAGCAGA GAGCAAAGGAGAAATCTGGCTGTCCTTCCATTTTC ATTCTGTTATCTCAGGTGAGCTGGTAG | AUGGGUAACCUAGACUUCAGAGAGAAUGA GCAGAGAGCAAAGGAGAAAUCUGGCUGUC CUUCCAUUUUCAUUCUGUUAUCUCAGGUG AGCUGGUAG | MGNLDFRENEQRAKEKSGCPSIFILLSQV SW |
| 27 | 213/512 | TTGAAGTTTAGTCAGCACCCCCACCAAACTTTATTT TTCTATGTGTTTTTTGCAACATATGAGTGTTTTGAA AATAAAGTACCCATGTCTTTATTAGATTTA | UUGAAGUUUAGUCAGCACCCCCACCAAACU UUAUUUUUCUAUGUGUUUUUUGCAACAU AUGAGUGUUUUGAAAAUAAAGUACCCAUG UCUUUAUUAGAUUUA | LKFSQHPHQTLFFYVFFATYECFENKVPM SLLDL |

TABLE 1-continued

| | | | | |
|---|---|---|---|---|
| 28 (BSS) | 214/513 | GTGCGGGCCGGGCGGGTGCATTCAGGCCAAGGC<br>GGGGCCGCCGGGATGCTCAGGGTTCCGGAGCCG<br>CGGCCCGGGGAGGCGAAAGCGGAGGGGGCCGC<br>GCCGCCGACCCCGTCCAAGCCGCTCACGTCCTTCC<br>TCATCCAGGACATCCTGCGGGACGGCGCGCAGCG<br>GCAAGGCGGCCGCACGAGCAGCCAGAGACAGCG<br>CGACCCGGAGCCGGAGCCAGAGCCAGAGCCAGA<br>GGGAGGACGCAGCCGCGCCGGGGCGCAGAACGA<br>CCAGCTGAGCACCGGGCCCCGCGCCGCGCCGGAG<br>GAGGCCGAGACGCTGGCAGAGACCGAGCCAGGC<br>GGTGCGGGCCGGGCGGGTGCATTCAGGCCAAGG<br>CGGGGCCGCCGGGATGCTCAGGGTTCCGGAGCC<br>GCGGCCCGGGGAGGCGAAAGCGGAGGGGGCCG<br>CGCCGCCGACCCCGTCCAAGCCGCTCACGTCCTTC<br>CTCATCCAGGACATCCTGCGGGACGGCGCGCAGC<br>GGCAAGGCGGCCGCACGAGCAGCCAGAGACAGC<br>GCGACCCGGAGCCGGAGCCAGAGCCAGAGCCAG<br>AGGGAGGACGCAGCCGCGCCGGGGCGCAGAACG<br>ACCAGCTGAGCACCGGGCCCCGCGCCGCGCCGGA<br>GGAGGCCGAGACGCTGGCAGAGACCGAGCC | GUGCGGGCCGGGCGGGUGCAUUCAGGCCA<br>AGGCGGGGCCGCCGGGAUGCUCAGGGUUC<br>CGGAGCCGCGGCCCGGGGAGGCGAAAGCG<br>GAGGGGGCCGCGCCGCCGACCCCGUCCAAG<br>CCGCUCACGUCCUUCCUCAUCCAGGACAUC<br>CUGCGGGACGGCGCGCAGCGGCAAGGCGG<br>CCGCACGAGCAGCCAGAGACAGCGCGACCC<br>GGAGCCGGAGCCAGAGCCAGAGCCAGAGG<br>GAGGACGCAGCCGCGCCGGGGCGCAGAAC<br>GACCAGCUGAGCACCGGGCCCCGCGCCGCG<br>CCGGAGGAGGCCGAGACGCUGGCAGAGAC<br>CGAGCCAGGCGGUGCGGGCCGGGCGGGUG<br>CAUUCAGGCCAAGGCGGGGCCGCCGGGAU<br>GCUCAGGGUUCCGGAGCCGCGGCCCGGGG<br>AGGCGAAAGCGGAGGGGGCCGCGCCGCCG<br>ACCCCGUCCAAGCCGCUCACGUCCUUCCUC<br>AUCCAGGACAUCCUGCGGGACGGCGCGCA<br>GCGGCAAGGCGGCCGCACGAGCAGCCAGA<br>GACAGCGCGACCCGGAGCCGGAGCCAGAGC<br>CAGAGCCAGAGGGAGGACGCAGCCGCGCC<br>GGGGCGCAGAACGACCAGCUGAGCACCGG<br>GCCCCGCGCCGCGCCGGAGGAGGCCGAGAC<br>GCUGGCAGAGACCGAGCC | VRAGRVHSGQGGAAGMLRVPEPRPGEA<br>KAEGAAPPTPSKPLTSFLIQDILRDGAQR<br>QGGRTSSQRQRDPEPEPEPEPEGGRSRA<br>GAQNDQLSTGPRAAPEEAETLAETEPGG<br>AGRAGAFRPRRGRRDAQGSGAAARGGE<br>SGGGRAADPVQAAHVLPHPGHPAGRRA<br>AARRPHEQPETARPGAGARARARGRTQ<br>PRRGAERPAEHRAPRRAGGGRDAGRDR<br>A |
| NPY neo-<br>antigen | | DNA sequence | RNA sequence | Protein sequence |
| 1 | 215/514 | CTGGCTCTCACCCCTCGGAGACGCTCGCCCGACAG<br>CATAGTACTTGCCGCCCAGCCACGCCCGCGCGCCA<br>GCCACCATGCTAGGTAA | CUGGCUCUCACCCCUCGGAGACGCUCGCCC<br>GACAGCAUAGUACUUGCCGCCCAGCCACGC<br>CCGCGCGCCAGCCACCAUGCUAGGUAA | LALTPRRRSPDSIVLAAQPRPRASHHAR |
| 2 | 216/515 | GTGCCTGGGTGCGCTGGCCGAGGCGTACCCCTCC<br>AAGCCGGACAACCCGGGCGAGGACGCACCAGCG<br>GAGGACATGGCCAGATACTACTCGGCGCTGCGAC<br>ACTACATCAACCTCATCACCAGGCAGAGATATGGA<br>AAACGATCCAGCCCAGAGACACTGATTTCAGACCT<br>CTTGATGAGAGAAAGCACAGAAAATGTTCCCAGA<br>ACTCGGCTTGA | GUGCCUGGGUGCGCUGGCCGAGGCGUACC<br>CCUCCAAGCCGGACAACCCGGGCGAGGACG<br>CACCAGCGGAGGACAUGGCCAGAUACUAC<br>UCGGCGCUGCGACACUACAUCAACCUCAUC<br>ACCAGGCAGAGAUAUGGAAAACGAUCCAG<br>CCCAGAGACACUGAUUUCAGACCUCUUGA<br>UGAGAGAAAGCACAGAAAAUGUUCCCAGA<br>ACUCGGCUUGA | VPGCAGRGVPLQAGQPGRGRTSGGHG<br>QILLGAATLHQPHHQAEIWKTIQPRDTD<br>FRPLDERKHRKCSQNSA |
| 3 | 217/516 | GTGGTGATGGGAAATGAGACTTGCTCTCTGGCCT<br>TTTCCTATTTTCAGCCCATATTTCATCGTGTAAAAC<br>GAGAATCCACCCATCCTACCAATGCATGCAGCCAC<br>TGTGCTGAATTCTGCAATGTTTTCCTTTGTCATCAT<br>TGTATATATGTGTGTTTAAATAAAGTATCATGCAT<br>TCAAAAGTGA | GUGGUGAUGGGAAAUGAGACUUGCUCUC<br>UGGCCUUUUCCUAUUUUCAGCCCAUAUUU<br>CAUCGUGUAAAACGAGAAUCCACCCAUCCU<br>ACCAAUGCAUGCAGCCACUGUGCUGAAUU<br>CUGCAAUGUUUUCCUUUGUCAUCAUUGU<br>AUAUAUGUGUGUUUAAAUAAAGUAUCAU<br>GCAUUCAAAAGUGA | VVMGNETCSLAFSYFQPIFHRVKRESTHP<br>TNACSHCAEFCNVFLCHHCIYVCLNKVSC<br>IQK |
| 4 | 218/517 | ATGCATGCAGCCACTGTGCTGAATTCTGCAATGTT<br>TTCCTTTGTCATCATTGTATATATGTGTGTTTAA | AUGCAUGCAGCCACUGUGCUGAAUUCUGC<br>AAUGUUUUCCUUUGUCAUCAUUGUAUAU<br>AUGUGUGUUUAA | MHAATVLNSAMFSFVIIVYMCV |

TABLE 1-continued

| | | | | |
|---|---|---|---|---|
| 5 | 219/518 | GTGCGCTGGCCGAGGCGTACCCCTCCAAGCCGGA<br>CAACCCGGGCGAGGACGCACCAGCGGAGGACAT<br>GGCCAGATACTACTCGGCGCTGCGACACTACATCA<br>ACCTCATCACCAGGCAGAGATATGGAAAACGATC<br>CAGCCCAGAGACACTGA | GUGCGCUGGCCGAGGCGUACCCCUCCAAG<br>CCGGACAACCCGGGCGAGGACGCACCAGCG<br>GAGGACAUGGCCAGAUACUACUCGGCGCU<br>GCGACACUACAUCAACCUCAUCACCAGGCA<br>GAGAUAUGGAAAACGAUCCAGCCCAGAGA<br>CACUGA | VRWPRRTPPSRTTRARTHQRRTWPDTT<br>RRCDTTSTSSPGRDMENDPAQRH |
| 6 | 220/519 | TTGCTCTCTGGCCTTTTCCTATTTTCAGCCCATATTT<br>CATCGTGTAAAACGAGAATCCACCCATCCTACCAA<br>TGCATGCAGCCACTGTGCTGA | UUGCUCUCUGGCCUUUUCCUAUUUUCAGC<br>CCAUAUUUCAUCGUGUAAAACGAGAAUCC<br>ACCCAUCCUACCAAUGCAUGCAGCCACUGU<br>GCUGA | LLSGLFLFSAHISSCKTRIHPSYQCMQPLC |
| 7 (BSS) | 221/520 | CTGATTTCAGACCTCTTGATGAGAGAAAGCACAG<br>AAAATGTTCCCAGAACTCGATATGGAAAACGATCC<br>AGCCCAGAGACACTGATTTCAGACCTCTTGATGAG<br>AGAAAGCACAGAAAATGTTCCCAGAACT | CUGAUUUCAGACCUCUUGAUGAGAGAAAG<br>CACAGAAAAUGUUCCCAGAACUCGAUAUG<br>GAAAACGAUCCAGCCCAGAGACACUGAUU<br>UCAGACCUCUUGAUGAGAGAAAGCACAGA<br>AAAUGUUCCCAGAACU | LISDLLMRESTENVPRTRYGKRSSPETLIS<br>DLLMRESTENVPRT |
| 8 (BSS) | 222/521 | GTGCCTGGGTGCGCTGGCCGAGGCGTACCCCTCC<br>AAGCCGGACAACCCGGGCGAGGACGCACCAGCG<br>GAGGACATGGCCAGATACTACTCGGCGCTGCGAC<br>ACTACATCAACCTCATCACCAGGCAGAGATGCTAG<br>GTAACAAGCGACTGGGGCTGTCCGGACTGACCCT<br>CGCCCTGTCCCTGCTCGTGTGCCTGGGTGCGCTGG<br>CCGAGGCGTACCCCTCCAAGCCGGACAACCCGGG<br>CGAGGACGCACCAGCGGAGGACATGGCCAGATA<br>CTACTCGGCGCTGCGACACTACATCAACCTCATCA<br>CCAGGCAG | GUGCCUGGGUGCGCUGGCCGAGGCGUACC<br>CCUCCAAGCCGGACAACCCGGGCGAGGACG<br>CACCAGCGGAGGACAUGGCCAGAUACUAC<br>UCGGCGCUGCGACACUACAUCAACCUCAUC<br>ACCAGGCAGAGAUGCUAGGUAACAAGCGA<br>CUGGGGCUGUCCGGACUGACCCUCGCCCU<br>GUCCCUGCUCGUGUGCCUGGGUGCGCUGG<br>CCGAGGCGUACCCCUCCAAGCCGGACAACC<br>CGGGCGAGGACGCACCAGCGGAGGACAUG<br>GCCAGAUACUACUCGGCGCUGCGACACUAC<br>AUCAACCUCAUCACCAGGCAG | VPGCAGRGVPLQAGQPGRGRTSGGHG<br>QILLGAATLHQPHHQAEMLGNKRLGLSG<br>LTLALSLLVCLGAEAYPSKPDNPGEDAPA<br>EDMARYYSALRHYINLITRQ |

| SPDEF neo-antigen | | DNA sequence | RNA sequence | Protein sequence |
|---|---|---|---|---|
| 1 | 223/522 | CTGACTTCCTCCCAGCACATTCCTGCACTCTGCCGT<br>GTCCACACTGCCCCACAGACCCAGTCCTCCAAGCC<br>TGCTGCCAGCTCCCTGCAAGCCCCTCAGGTTGGGC<br>CTTGCCACGGTGCCAGCAGGCAGCCCTGGGCTGG<br>GGGTAGGGGACTCCCTACAGGCACGCAGCCCTGA | CUGACUUCCUCCCAGCACAUUCCUGCACUC<br>UGCCGUGUCCACACUGCCCCACAGACCCAG<br>UCCUCCAAGCCUGCUGCCAGCUCCCUGCAA<br>GCCCCUCAGGUUGGGCCUUGCCACGGUGC<br>CAGCAGGCAGCCCUGGGCUGGGGGUAGGG<br>GACUCCCUACAGGCACGCAGCCCUGA | LTSSQHIPALCRVHTAPQTQSSKPAASSL<br>QAPQVGPCHGASRQPWAGGRGLPTGT<br>QP |
| 2 | 224/523 | GTGGCCTCAGCTGCCCACACCTCTTCCCGGCCCCT<br>GAAGTTGGCACTGCAGCAGACAGCTCCCTGGGCA<br>CCAGGCAGCTAA | GUGGCCUCAGCUGCCCACACCUCUUCCCGG<br>CCCCUGAAGUUGGCACUGCAGCAGACAGC<br>UCCCUGGGCACCAGGCAGCUAA | VASAAHTSSRPLKLALQQTAPWAPGS |
| 3 | 225/524 | TTGACATGCTGTACCCTGAGGACAGCAGCTGGGC<br>AGCCAAGGCCCCTGGGGCCAGCAGTCGGGAGGA<br>GCCACCTGAGGAGCCTGAGCAGTGCCCGGTCATT<br>GACAGCCAAGCCCCAGCGGGCAGCCTGGACTTGG<br>TGCCCGGCGGGCTGA | UUGACAUGCUGUACCCUGAGGACAGCAGC<br>UGGGCAGCCAAGGCCCCUGGGGCCAGCAG<br>UCGGGAGGAGCCACCUGAGGAGCCUGAGC<br>AGUGCCCGGUCAUUGACAGCCAAGCCCCAG<br>CGGGCAGCCUGGACUUGGUGCCCGGCGGG<br>CUGA | LTCCTLRTAAGQPRPLGPAVGRSHLRSLS<br>SARSLTAKPQRAAWTWCPAG |
| 4 | 226/525 | ATGTGCAGAAGTGGCTCCTGTGGACAGAGCACCA<br>ATACCGGCTGCCCCCCATGGGCAAGGCCTTCCAG | AUGUGCAGAAGUGGCUCCUGUGGACAGAG<br>CACCAAUACCGGCUGCCCCCCAUGGGCAAG | MCRSGSCGQSTNTGCPPWARPSRSWR<br>ARSCAPCRRSSSASARPWVGMCCTPTW |

TABLE 1-continued

| | | | | |
|---|---|---|---|---|
| | | GAGCTGGCGGGCAAGGAGCTGTGCGCCATGTCG<br>GAGGAGCAGTTCCGCCAGCGCTCGCCCCTGGGTG<br>GGGATGTGCTGCACGCCCACCTGGACATCTGGAA<br>GTCAGCGGCCTGGATGA | GCCUUCCAGGAGCUGGCGGGCAAGGAGCU<br>GUGCGCCAUGUCGGAGGAGCAGUUCCGCC<br>AGCGCUCGCCCCUGGGUGGGGAUGUGCUG<br>CACGCCCACCUGGACAUCUGGAAGUCAGCG<br>GCCUGGAUGA | TSGSQRPG |
| 5 | 227/526 | CTGGGGCGATTCACTACTGTGCCTCGACCAGTGA<br>GGAGAGCTGGACCGACAGCGAGGTGGACTCATC<br>ATGCTCCGGGCAGCCCATCCACCTGTGGCAGTTCC<br>TCAAGGAGTTGCTACTCAAGCCCCACAGCTATGGC<br>CGCTTCATTAGGTGGCTCAACAAGGAGAAGGGCA<br>TCTTCAAAATTGAGGACTCAGCCCAGGTGGCCCG<br>GCTGTGGGGCATCCGCAAGAACCGTCCCGCCATG<br>A | CUGGGGCGAUUCACUACUGUGCCUCGACC<br>AGUGAGGAGAGCUGGACCGACAGCGAGGU<br>GGACUCAUCAUGCUCCGGGCAGCCCAUCCA<br>CCUGUGGCAGUUCCUCAAGGAGUUGCUAC<br>UCAAGCCCCACAGCUAUGGCCGCUUCAUUA<br>GGUGGCUCAACAAGGAGAAGGGCAUCUUC<br>AAAAUUGAGGACUCAGCCCAGGUGGCCCG<br>GCUGUGGGGCAUCCGCAAGAACCGUCCCG<br>CCAUGA | LGRFTTVPRPVRRAGPTARWTHHAPGSP<br>STCGSSSRSCYSSPTAMAASLGGSTRRRA<br>SSKLRTQPRWPGCGASARTVPP |
| 6 | 228/527 | CTGGCCCAGGGCCTGAAACCCGCCCTCAGGGGCC<br>TCTCTCCTGCCTGCCCTGCCTCAGCCAGGCCCTGA | CUGGCCCAGGGCCUGAAACCCGCCCUCAGG<br>GGCCUCUCUCCUGCCUGCCCUGCCUCAGCC<br>AGGCCCUGA | LAQGLKPALRGLSPACPASARP |
| 7 | 229/528 | CTGACCTTCCAGAGCCCAAGGTCAGGGAGGGGCA<br>ACCAACTGCCCCAGGGGGATATGGGTCCTCTGGG<br>GCCTTCGGGACCCTGGGGCAGGGGTGCTTCCTCC<br>TCAGGCCCAGCTGCTCCCCTGGAGGACAGAGGGA<br>GACAGGGCTGCTCCCCAACACCTGCCTCTGACCCC<br>AGCATTTCCAGAGCAGAGCCTACAGAAGGGCAGT<br>GA | CUGACCUUCCAGAGCCCAAGGUCAGGGAG<br>GGGCAACCAACUGCCCCAGGGGGAUAUGG<br>GUCCUCUGGGGCCUUCGGGACCCUGGGGC<br>AGGGGUGCUUCCUCCUCAGGCCCAGCUGC<br>UCCCCUGGAGGACAGAGGGAGACAGGGCU<br>GCUCCCCAACACCUGCCUCUGACCCCAGCA<br>UUUCCAGAGCAGAGCCUACAGAAGGGCAG<br>UGA | LTFQSPRSGRGNQLPQGDMGPLGPSGP<br>WGRGASSSGPAAPLEDRGRQGCSPTPA<br>SDPSISRAEPTEGQ |
| 8 | 230/529 | ATGGTGCAGGGAGACATCTGCACCCCTGAGTTGG<br>GCAGCCAGGAGTGCCCCCGGGAATGGATAATAAA<br>GATACTAGAGAACTGA | AUGGUGCAGGGAGACAUCUGCACCCCUGA<br>GUUGGGCAGCCAGGAGUGCCCCCGGGAAU<br>GGAUAAUAAAGAUACUAGAGAACUGA | MVQGDICTPELGSQECPREWIIKILEN |
| 9 | 231/530 | CTGCACTCTGCCGTGTCCACACTGCCCCACAGACC<br>CAGTCCTCCAAGCCTGCTGCCAGCTCCCTGCAAGC<br>CCCTCAGGTTGGGCCTTGCCACGGTGCCAGCAGG<br>CAGCCCTGGGCTGGGGTAGGGGACTCCCTACAG<br>GCACGCAGCCCTGAGACCTCAGAGGGCCACCCCT<br>TGAGGGTGGCCAGGCCCCCAGTGGCCAACCTGAG<br>TGCTGCCTCTGCCACCAGCCCTGCTGGCCCCTGGT<br>TCCGCTGGCCCCCCAGATGCCTGGCTGAGACACG<br>CCAGTGGCCTCAGCTGCCCACACCTCTTCCCGGCC<br>CCTGA | CUGCACUCUGCCGUGUCCACACUGCCCCAC<br>AGACCCAGUCCUCCAAGCCUGCUGCCAGCU<br>CCCUGCAAGCCCCUCAGGUUGGGCCUUGC<br>CACGGUGCCAGCAGGCAGCCCUGGGCUGG<br>GGGUAGGGGACUCCCUACAGGCACGCAGC<br>CCUGAGACCUCAGAGGGCCACCCCUUGAG<br>GGUGGCCAGGCCCCCAGUGGCCAACCUGA<br>GUGCUGCCUCUGCCACCAGCCCUGCUGGCC<br>CCUGGUUCCGCUGGCCCCCCAGAUGCCUG<br>GCUGAGACACGCCAGUGGCCUCAGCUGCCC<br>ACACCUCUUCCCGGCCCCUGA | LHSAVSTLPHRPSPPSLLPAPCKPLRLGLA<br>TVPAGSPGLGVGDSLQARSPETSEGHPL<br>RVARPPVANLSAASATSPAGPWFRWPP<br>RCLAETRQWPQLPTPLPGP |
| 10 | 232/531 | CTGGAGTCCCAGTCCACCCGCCACGCCCGAGCAG<br>GGCCTGTCCGCCTTCTACCTCTCCTACTTTGA | CUGGAGUCCCAGUCCACCCGCCACGCCCGA<br>GCAGGGCCUGUCCGCCUUCUACCUCUCCU<br>ACUUUGA | LESQSTRHARAGPVRLLPLLL |
| 11 | 233/532 | CTGCAAGCTGCTCAACATCACCGCAGATCCCATGG<br>ACTGGAGCCCCAGCAATGTGCAGAAGTGGCTCCT<br>GTGGACAGAGCACCAATACCGGCTGCCCCCCATG<br>GGCAAGGCCTTCCAGGAGCTGGCGGGCAAGGAG | CUGCAAGCUGCUCAACAUCACCGCAGAUCC<br>CAUGGACUGGAGCCCCAGCAAUGUGCAGA<br>AGUGGCUCCUGUGGACAGAGCACCAAUAC<br>CGGCUGCCCCCCAUGGGCAAGGCCUUCCAG | LQAAQHHRRSHGLEPQQCAEVAPVDRA<br>PIPAAPHGQGLPGAGGQGAVRHVGGAV<br>PPALAPGWGCAARPPGHLEVSGLDERA<br>DFTWGDSLLCLDQ |

TABLE 1-continued

| | | | | |
|---|---|---|---|---|
| | | CTGTGCGCCATGTCGGAGGAGCAGTTCCGCCAGC<br>GCTCGCCCCTGGGTGGGGATGTGCTGCACGCCCA<br>CCTGGACATCTGGAAGTCAGCGGCCTGGATGAAA<br>GAGCGGACTTCACCTGGGGCGATTCACTACTGTG<br>CCTCGACCAGTGA | GAGCUGGCGGGCAAGGAGCUGUGCGCCAU<br>GUCGGAGGAGCAGUUCCGCCAGCGCUCGC<br>CCCUGGGUGGGGAUGUGCUGCACGCCCAC<br>CUGGACAUCUGGAAGUCAGCGGCCUGGAU<br>GAAAGAGCGGACUUCACCUGGGGCGAUUC<br>ACUACUGUGCCUCGACCAGUGA | |
| 12 | 234/533 | CTGGACCGACAGCGAGGTGGACTCATCATGCTCC<br>GGGCAGCCCATCCACCTGTGGCAGTTCCTCAAGG<br>AGTTGCTACTCAAGCCCCACAGCTATGGCCGCTTC<br>ATTAG | CUGGACCGACAGCGAGGUGGACUCAUCAU<br>GCUCCGGGCAGCCCAUCCACCUGUGGCAG<br>UUCCUCAAGGAGUUGCUACUCAAGCCCCAC<br>AGCUAUGGCCGCUUCAUUAG | LDRQRGGLIMLRAAHPPVAVPQGVATQ<br>APQLWPLH |
| 13 | 235/534 | GTGGGGCATCCGCAAGAACCGTCCCGCCATGAAC<br>TACGACAAGCTGAGCCGCTCCATCCGCCAGTATTA<br>CAAGAAGGGCATCATCCGGAAGCCAGACATCTCC<br>CAGCGCCTCGTCTACCAGTTCGTGCACCCCATCTG<br>AGTGCCTGGCCCAGGGCCTGA | GUGGGGCAUCCGCAAGAACCGUCCCGCCA<br>UGAACUACGACAAGCUGAGCCGCUCCAUCC<br>GCCAGUAUUACAAGAAGGGCAUCAUCCGG<br>AAGCCAGACAUCUCCCAGCGCCUCGUCUAC<br>CAGUUCGUGCACCCCAUCUGAGUGCCUGG<br>CCCAGGGCCUGA | VGHPQEPSRHELRQAEPLHPPVLQEGHH<br>PEARHLPAPRLPVRAPHLSAWPRA |
| 14 | 236/535 | CTGCCTGCCCTGCCTCAGCCAGGCCCTGAGATGG<br>GGGAAAACGGGCAGTCTGCTCTGCTGCTCTGA | CUGCCUGCCCUGCCUCAGCCAGGCCCUGAG<br>AUGGGGGAAAACGGGCAGUCUGCUCUGCU<br>GCUCUGA | LPALPQPGPEMGENGQSALLL |
| 15 | 237/536 | GTGCTTCCTCCTCAGGCCCAGCTGCTCCCCTGGAG<br>GACAGAGGGAGACAGGGCTGCTCCCCAACACCTG<br>CCTCTGACCCCAGCATTTCCAGAGCAGAGCCTACA<br>GAAGGGCAGTGACTCGACAAAGGCCACAGGCAG<br>TCCAGGCCTCTCTCTGCTCCATCCCCCTGCCTCCCA<br>TTCTGCACCACACCTGGCATGGTGCAGGGAGACA<br>TCTGCACCCCTGAGTTGGGCAGCCAGGAGTGCCC<br>CCGGGAATGGATAA | GUGCUUCCUCCUCAGGCCCAGCUGCUCCCC<br>UGGAGGACAGAGGGAGACAGGGCUGCUCC<br>CCAACACCUGCCUCUGACCCCAGCAUUUCC<br>AGAGCAGAGCCUACAGAAGGGCAGUGACU<br>CGACAAAGGCCACAGGCAGUCCAGGCCUCU<br>CUCUGCUCCAUCCCCCUGCCUCCCAUUCUG<br>CACCACACCUGGCAUGGUGCAGGGAGACA<br>UCUGCACCCCUGAGUUGGGCAGCCAGGAG<br>UGCCCCCGGGAAUGGAUAA | VLPPQAQLLPWRTEGDRAAPQHLPLTPA<br>FPEQSLQKGSDSTKATGSPGLSLLHPPAS<br>HSAPHLAWCRETSAPLSWAARSAPGNG |
| 16 | 238/537 | CTGTCTGACTTCCTCCCAGCACATTCCTGCACTCTG<br>CCGTGTCCACACTGCCCCACAGACCCAGTCCTCCA<br>AGCCTGCTGCCAGCTCCCTGCAAGCCCCTCAGGTT<br>GGGCCTTGCCACGGTGCCAGCAGGCAGCCCTGGG<br>CTGGGGGTAG | CUGUCUGACUUCCUCCCAGCACAUUCCUGC<br>ACUCUGCCGUGUCCACACUGCCCCACAGAC<br>CCAGUCCUCCAAGCCUGCUGCCAGCUCCCU<br>GCAAGCCCCUCAGGUUGGGCCUUGCCACG<br>GUGCCAGCAGGCAGCCCUGGGCUGGGGGU<br>AG | LSDFLPAHSCTLPCPHCPTDPVLQACCQL<br>PASPSGWALPRCQQAALGWG |
| 17 | 239/538 | GTGCCTGGCCCAGGGCCTGAAACCCGCCCTCAGG<br>GGCCTCTCTCCTGCCTGCCCTGCCTCAGCCAGGCC<br>CTGAGATGGGGGAAAACGGGCAGTCTGCTCTGCT<br>GCTCTGACCTTCCAGAGCCCAAGGTCAGGGAGGG<br>GCAACCAACTGCCCCAGGGGGATATGGGTCCTCT<br>GGGGCCTTCGGGACCCTGGGGCAGGGGTGCTTCC<br>TCCTCAGGCCCAGCTGCTCCCCTGGAGGACAGAG<br>GGAGACAGGGCTGCTCCCCAACACCTGCCTCTGA | GUGCCUGGCCCAGGGCCUGAAACCCGCCCU<br>CAGGGGCCUCUCUCCUGCCUGCCCUGCCUC<br>AGCCAGGCCCUGAGAUGGGGGAAAACGGG<br>CAGUCUGCUCUGCUGCUCUGACCUUCCAG<br>AGCCCAAGGUCAGGGAGGGGCAACCAACU<br>GCCCCAGGGGGAUAUGGGUCCUCUGGGGC<br>CUUCGGGACCCUGGGGCAGGGGUGCUUCC<br>UCCUCAGGCCCAGCUGCUCCCCUGGAGGAC<br>AGAGGGAGACAGGGCUGCUCCCCAACACC<br>UGCCUCUGA | VPGPGPETRPQGPLSCLPCLSQALRWGK<br>TGSLLCCSDLPEPKVREGQPTAPGGYGSS<br>GAFGTLGQGCFLLRPSCSPGGQRETGLLP<br>NTCL |
| 18 | 240/539 | GTGACTCGACAAAGGCCACAGGCAGTCCAGGCCT<br>CTCTCTGCTCCATCCCCCTGCCTCCCATTCTGCACC | GUGACUCGACAAAGGCCACAGGCAGUCCA<br>GGCCUCUCUCUGCUCCAUCCCCCUGCCUCC | VTRQRPQAVQASLCSIPLPPILHHTWHG<br>AGRHLHP |

TABLE 1-continued

| TP53 neo-antigen | | DNA sequence | RNA sequence | Protein sequence |
|---|---|---|---|---|
| | | ACACCTGGCATGGTGCAGGGAGACATCTGCACCC CTGA | CAUUCUGCACCACACCUGGCAUGGUGCAG GGAGACAUCUGCACCCCUGA | |
| 1 | 241/540 | CTGACATTCTCCACTTCTTGTTCCCCACTGACAGCC TCCCACCCCCATCTCTCCCTCCCCTGCCATTTTGGG TTTTGGGTCTTTGAACCCTTGCTTGCAATAGGTGT GCGTCAGAAGCACCCAGGACTTCCATTTGCTTTGT CCCGGGGCTCCACTGAACAAGTTGGCCTGCACTG GTGTTTTGTTGTGGGGAGGAGGATGGGGAGTAG GACATACCAGCTTAGATTTTAA | CUGACAUUCUCCACUUCUUGUUCCCCACU GACAGCCUCCCACCCCCAUCUCUCCCUCCCC UGCCAUUUUGGGUUUUGGGUCUUUGAAC CCUUGCUUGCAAUAGGUGUGCGUCAGAAG CACCCAGGACUUCCAUUUGCUUUGUCCCG GGGCUCCACUGAACAAGUUGGCCUGCACU GGUGUUUUGUUGUGGGGAGGAGGAUGG GGAGUAGGACAUACCAGCUUAGAUUUUAA | LTFSTSCSPLTASHPHLSLPCHFGFWVFEP LLAIGVRQKHPGLPFALSRGSTEQVGLH WCFVVGRRMGSRTYQLRF |
| 2 | 242/541 | TTGGGCAGCTGGTTAGGTAGAGGGAGTTGTCAAG TCTCTGCTGGCCCAGCCAAACCCTGTCTGACAACC TCTTGGTGA | UUGGGCAGCUGGUUAGGUAGAGGGAGUU GUCAAGUCUCUGCUGGCCCAGCCAAACCCU GUCUGACAACCUCUUGGUGA | LGSWLGRGSCQVSAGPAKPCLTTSW |
| 3 | 243/542 | ATGGGATTGGGGTTTTCCCCTCCCATGTGCTCAAG ACTGGCGCTAAAAGTTTTGAGCTTCTCAAAAGTCT AG | AUGGGAUUGGGGUUUUCCCCUCCCAUGU GCUCAAGACUGGCGCUAAAAGUUUUGAGC UUCUCAAAAGUCUAG | MGLGFSPPMCSRLALKVLSFSKV |
| 4 | 244/543 | TTGTTCCCTCTCCCTGTTGGTCGGTGGGTTGGTAG TTTCTACAGTTGGGCAGCTGGTTAG | UUGUUCCCUCUCCCUGUUGGUCGGUGGG UUGGUAGUUUCUACAGUUGGGCAGCUGG UUAG | LFPLPVGRWVGSFYSWAAG |
| 5 | 245/544 | CTGACTCAGACTGACATTCTCCACTTCTTGTTCCCC ACTGACAGCCTCCCACCCCCATCTCTCCCTCCCCTG CCATTTTGGGTTTTGGGTCTTTGA | CUGACUCAGACUGACAUUCUCCACUUCUU GUUCCCCACUGACAGCCUCCCACCCCCAUC UCUCCCUCCCCUGCCAUUUUGGGUUUUGG GUCUUUGA | LTQTDILHFLFPTDSLPPPSLPPLPFWVLG L |
| 6 | 246/545 | CTGTCCCTCACTGTTGAATTTTCTCTAACTTCAAGG CCCATATCTGTGAAATGCTGGCATTTGCACCTACC TCACAGAGTGCATTGTGAGGGTTAA | CUGUCCCUCACUGUUGAAUUUUCUCUAAC UUCAAGGCCCAUAUCUGUGAAAUGCUGGC AUUUGCACCUACCUCACAGAGUGCAUUGU GAGGGUUAA | LSLTVEFSLTSRPISVKCWHLHLPHRVHCE G |
| 7 | 247/546 | CTGGCCTTGAAACCACCTTTTATTACATGGGGTCT AGAACTTGACCCCCTTGAGGGTGCTTGTTCCCTCT CCCTGTTGGTCGGTGGGTTGGTAGTTTCTACAGTT GGGCAGCTGGTTAGGTAG | CUGGCCUUGAAACCACCUUUUAUUACAUG GGGUCUAGAACUUGACCCCCUUGAGGGUG CUUGUUCCCUCUCCCUGUUGGUCGGUGGG UUGGUAGUUUCUACAGUUGGGCAGCUGG UUAGGUAG | LALKPPFITWGLELDPLEGACSLSLLVGGL VVSTVGQLVR |
| 8 | 248/547 | TTGTCAAGTCTCTGCTGGCCCAGCCAAACCCTGTC TGACAACCTCTTGGTGAACCTTAGTACCTAA | UUGUCAAGUCUCUGCUGGCCCAGCCAAAC CCUGUCUGACAACCUCUUGGUGAACCUUA GUACCUAA | LSSLCWPSQTLSDNLLVNLST |
| 9 | 249/548 | CTGGATCCACCAAGACTTGTTTTATGCTCAGGGTC AATTTCTTTTTTCTTTTTTTTTTTTTTTTTCTTTTTCT TTGA | CUGGAUCCACCAAGACUUGUUUUAUGCUC AGGGUCAAUUUCUUUUUUCUUUUUUUUU UUUUUUUUUCUUUUUCUUUGA | LDPPRLVLCSGSISFFFFFFFFLFL |
| 10 | 250/549 | GTGTTGCCCAGGCTGGTCTCAAACTCCTGGGCTCA GGCGATCCACCTGTCTCAGCCTCCCAGAGTGCTGG | GUGUUGCCCAGGCUGGUCUCAAACUCCU GGCUCAGGCGAUCCACCUGUCUCAGCCUCC | GVLPRLVSNSWAQAIHLSQPPRVLGLQL |

TABLE 1-continued

| | | GATTACAATTGTGA | CAGAGUGCUGGGAUUACAAUUGUGA | |
|---|---|---|---|---|
| ERG neo-antigen | | DNA sequences | RNA sequences | Protein sequences |
| 1 | 251/550 | CTGGACCGGTCACGGCCACCCCACGCCCCAGTCGAAAGCTGCTCAACCATCTCCTTCCACAGTGCCCAAAACTGA | CUGGACCGGUCACGGCCACCCCACGCCCCAGUCGAAAGCUGCUCAACCAUCUCCUUCCACAGUGCCCAAAACUGA | LDRSRPPHAPVESCSTISFHSAQN |
| 2 | 252/551 | TTGGCAGTTCCTCCTGGAGCTCCTGTCGGACAGCTCCAACTCCAGCTGCATCACCTGGGAAGGCACCAACGGGGAGTTCAAGATGACGGATCCCGACGAGGTGGCCCGGCGCTGGGGAGAGCGGAAGAGCAAACCCAACATGAACTACGATAA | UUGGCAGUUCCUCCUGGAGCUCCUGUCGGACAGCUCCAACUCCAGCUGCAUCACCUGGGAAGGCACCAACGGGGAGUUCAAGAUGACGGAUCCCGACGAGGUGGCCCGGCGCUGGGGAGAGCGGAAGAGCAAACCCAACAUGAACUACGAUAA | LAVPPGAPVGQLQLQLHHLGRHQRGVQDDGSRRGGPALGRAEEQTQHELR |
| 3 | 253/552 | GTGGCCCATCAACAGACGTTGATATGCAACTGCATGGCATGTGCTGTTTTGGTTGAAATCAAATACATTCCGTTTGATGGACAGCTGTCAGCTTTCTCAAACTGTGAAGATGACCCAAAGTTTCCAACTCCTTTACAGTATTACCGGGACTATGAACTAAAAGGTGGGACTGAGGATGTGTATAGAGTGAGCGTGTGA | GUGGCCCAUCAACAGACGUUGAUAUGCAACUGCAUGGCAUGUGCUGUUUUGGUUGAAAUCAAAUACAUUCCGUUUGAUGGACAGCUGUCAGCUUUCUCAAACUGUGAAGAUGACCCAAAGUUUCCAACUCCUUUACAGUAUUACCGGGACUAUGAACUAAAAGGUGGGACUGAGGAUGUGUAUAGAGUGAGCGUGUGA | VAHQQTLICNCMACAVLVEIKYIPFDGQLSAFSNCEDDPKFPTPLQYYRDYELKGGTEDVYRVSV |
| 4 | 254/553 | CTGGACTCAGGACATTTGGGGACTGTGTACAATGAGTTATGGAGACTCGAGGGTTCATGCAGTCAGTGTTATACCAAACCCAGTGTTAGGAGAAAGGACACAGCGTAA | CUGGACUCAGGACAUUUGGGGACUGUGUACAAUGAGUUAUGGAGACUCGAGGGUUCAUGCAGUCAGUGUUAUACCAAACCCAGUGUUAGGAGAAAGGACACAGCGUAA | LDSGHLGTVYNELWRLEGSCSQCYTKPSVRRKDTA |
| 5 | 255/554 | ATGGCCTTCTTGGCTGCCACAATCAGAAATCACGCAGGCATTTTGGGTAGGCGGCCTCCAGTTTTCCTTTGA | AUGGCCUUCUUGGCUGCCACAAUCAGAAAUCACGCAGGCAUUUUGGGUAGGCGGCCUCCAGUUUUCCUUUGA | MAFLAATIRNHAGILGRRPPVFL |
| 6 | 256/555 | ATGCTTAATGTTTACAATATGAAGTTATTAGTTCTTAGAATGCAGAATGTATGTAATAAAATAAGCTTGGCCTAG | AUGCUUAAUGUUUACAAUAUGAAGUUAUUAGUUCUUAGAAUGCAGAAUGUAUGUAAUAAAAUAAGCUUGGCCUAG | MLNVYNMKLLVLRMQNVCNKISLA |
| 7 | 257/556 | TTGGGATTCACTAGCCCTGAGCCTGATGTTGCTGGCTATCCCTTGAAGACAATGTTTATTTCCATAATCTAG | UUGGGAUUCACUAGCCCUGAGCCUGAUGUUGCUGGCUAUCCCUUGAAGACAAUGUUUAUUUCCAUAAUCUAG | LGFTSPEPDVAGYPLKTMFISII |
| 8 | 258/557 | ATGTTTTCCATTAGATCCCTCAACCCTCCACCCCCAGTCCAGGTTATTAGCAAGTCTTATGAGCAACTGGGATAA | AUGUUUUCCAUUAGAUCCCUCAACCCUCCACCCCCAGUCCAGGUUAUUAGCAAGUCUUAUGAGCAACUGGGAUAA | MFSIRSLNPPPPVQVISKSYEQLG |
| 9 | 259/558 | GTGGCACCTGCAACCCAGGAGCAGGAGCCGGAGGAGCTGCCCTCTGACAGCAGGTGCAGCAGAGATGGCTACAGCTCAGGAGCTGGGAAGGTGATGGGGCACAGGGAAAGCACAGATGTTCTGCAGCGCCCCAAAGTGACCCATTGCCTGGAGAAAGAGAAGAAAATATTTTTTAAAAAGCTAGTTTATTTAGCTTCTCATTAA | GUGGCACCUGCAACCCAGGAGCAGGAGCCGGAGGAGCUGCCCUCUGACAGCAGGUGCAGCAGAGAUGGCUACAGCUCAGGAGCUGGGAAGGUGAUGGGGCACAGGGAAAGCACAGAUGUUCUGCAGCGCCCCAAAGUGACCCAUUGCCUGGAGAAAGAGAAGAAAAUAUUUUUUAAAAAGCUAGUUUAUUUAGCUUCUCAUUAA | VAPATQEQEPEELPSDSRCSRDGYSSGAGKVMGHRESTDVLQRPKVTHCLEKEKKIFFKKLVYLASH |

TABLE 1-continued

| | | | | |
|---|---|---|---|---|
| 10 | 260/559 | ATGAATCAAAAGTGCCTCAAGAGGAATGAAAAAA GCTTTACTGGGGCTGGGGAAGGAAGCCGGGGAA GAGATCCAAAGACTCTTGGGAGGGAGTTACTGAA GTCTTACTACAGAAATGAGGAGGATGCTAAAAAT GTCACGAATATGGACATATCATCTGTGGACTGA | AUGAAUCAAAAGUGCCUCAAGAGGAAUGA AAAAAGCUUUACUGGGGCUGGGGAAGGAA GCCGGGGAAGAGAUCCAAAGACUCUUGGG AGGGAGUUACUGAAGUCUUACUACAGAAA UGAGGAGGAUGCUAAAAAUGUCACGAAUA UGGACAUAUCAUCUGUGGACUGA | MNQKCLKRNEKSFTGAGEGSRGRDPKTL GRELLKSYYRNEEDAKNVTNMDISSVD |
| 11 | 261/560 | GTGCTGTTTTGGTTGAAATCAAATACATTCCGTTT GATGGACAGCTGTCAGCTTTCTCAAACTGTGAAG ATGACCCAAAGTTTCCAACTCCTTTACAGTATTACC GGGACTATGAACTAA | GUGCUGUUUUGGUUGAAAUCAAAUACAU UCCGUUUGAUGGACAGCUGUCAGCUUUCU CAAACUGUGAAGAUGACCCAAAGUUUCCA ACUCCUUUACAGUAUUACCGGGACUAUGA ACUAA | VLFWLKSNTFRLMDSCQLSQTVKMTQSF QLLYSITGTMN |
| 12 | 262/561 | CTGTGTACAATGAGTTATGGAGACTCGAGGGTTC ATGCAGTCAGTGTTATACCAAACCCAGTGTTAGGA GAAAGGACACAGCGTAATGGAGAAAGGGGAAGT AGTAGAATTCAGAAACAAAAATGCGCATCTCTTTC TTTGTTTGTCAAATGA | CUGUGUACAAUGAGUUAUGGAGACUCGA GGGUUCAUGCAGUCAGUGUUAUACCAAAC CCAGUGUUAGGAGAAAGGACACAGCGUAA UGGAGAAAGGGGAAGUAGUAGAAUUCAG AAACAAAAAUGCGCAUCUCUUUCUUUGUU UGUCAAAUGA | LCTMSYGDSRVHAVSVIPNPVLGERTQR NGERGSSRIQKQKCASLSLFVK |
| 13 | 263/562 | GTGGGGGCTTTGTTCTCCACAGGGTCAGGTAAGA GATGGCCTTCTTGGCTGCCACAATCAGAAATCACG CAGGCATTTTGGGTAGGCGGCCTCCAGTTTTCCTT TGAGTCGCGAACGCTGTGCGTTTGTCAGAATGAA GTATACAAGTCAATGTTTTTCCCCCTTTTTATATAA | GUGGGGGCUUUGUUCUCCACAGGGUCAG GUAAGAGAUGGCCUUCUUGGCUGCCACAA UCAGAAAUCACGCAGGCAUUUUGGGUAGG CGGCCUCCAGUUUUCCUUUGAGUCGCGAA CGCUGUGCGUUUGUCAGAAUGAAGUAUAC AAGUCAAUGUUUUUCCCCCUUUUUAUAUA A | VGALFSTGSGKRWPSWLPQSEITQAFW VGGLQFSFESRTLCVCQNEVYKSMFFPLF I |
| 14 | 264/563 | ATGAAAACATGTGCTGAATGTTGTGGATTTTGTGT TATAATTTACTTTGTCCAGGAACTTGTGCAAGGGA GAGCCAAGGAAATAGGATGTTTGGCACCCAAATG GCGTCAGCCTCTCCAGGTCCTTCTTGCCTCCCCTCC TGTCTTTTATTTCTAG | AUGAAAACAUGUGCUGAAUGUUGUGGAU UUUGUGUUAUAAUUUACUUUGUCCAGGA ACUUGUGCAAGGGAGAGCCAAGGAAAUAG GAUGUUUGGCACCCAAAUGGCGUCAGCCU CUCCAGGUCCUUCUUGCCUCCCCUCCUGUC UUUUAUUUCUAG | MKTCAECCGFCVIIYFVQELVQGRAKEIG CLAPKWRQPLQVLLASPPVFYF |
| 15 | 265/564 | TTGGAACAGAAGGACCCCGGGTTTCACATTGGAG CCTCCATATTTATGCCTGGAATGGAAAGAGGCCTA TGA | UUGGAACAGAAGGACCCCGGGUUUCACAU UGGAGCCUCCAUAUUUAUGCCUGGAAUGG AAAGAGGCCUAUGA | LEQKDPGFHIGASIFMPGMERGL |
| 16 | 266/565 | GTGAACAAGCTACCACTCGTAAGGCAAACTGTATT ATTACTGGCAAATAAAGCGTCATGGATAGCTGCA ATTTCTCACTTTACAGAAACAAGGGATAACGTCTA G | GUGAACAAGCUACCACUCGUAAGGCAAAC UGUAUUAUUACUGGCAAAUAAAGCGUCAU GGAUAGCUGCAAUUUCUCACUUUACAGAA ACAAGGGAUAACGUCUAG | VNKLPLVRQTVLLLANKASWIAAISHFTET RDNV |
| 17 | 267/566 | CTGCTACATCAGAGTTACCTGGGCACTGTGGCTTG GGATTCACTAGCCCTGAGCCTGATGTTGCTGGCTA TCCCTTGA | CUGCUACAUCAGAGUUACCUGGGCACUGU GGCUUGGGAUUCACUAGCCCUGAGCCUGA UGUUGCUGGCUAUCCCUUGA | LLHQSYLGTVAWDSLALSLMLLAIP |
| 18 | 268/567 | ATGCTGCCAACCTTGGTCCAGGTGAAGGCAACTC AAAAGGTGAAAATACAAGGTGACCGTGCGAAGG CGCTAGCCGAAACATCTTAG | AUGCUGCCAACCUUGGUCCAGGUGAAGGC AACUCAAAAGGUGAAAAUACAAGGUGACC GUGCGAAGGCGCUAGCCGAAACAUCUUAG | MLPTLVQVKATQKVKIQGDRAKALAETS |

TABLE 1-continued

| | | | | |
|---|---|---|---|---|
| 19 | 269/568 | GTGCTGTGGATGTTTTGGCAGTGGGCTTTGAAGT CGGCAGGACACGATTACCAATGCTCCTGA | GUGCUGUGGAUGUUUUGGCAGUGGGCUU UGAAGUCGGCAGGACACGAUUACCAAUGC UCCUGA | VLWMFWQWALKSAGHDYQCS |
| 20 | 270/569 | GTGTCATTTGGATTAGACGGAGCCCAACCATCCAT CATTTTGCAGCAGCCTGGGAAGGCCCACAAAGTG CCCGTATCTCCTTAG | GUGUCAUUUGGAUUAGACGGAGCCCAACC AUCCAUCAUUUUGCAGCAGCCUGGGAAGG CCCACAAAGUGCCCGUAUCUCCUUAG | VSFGLDGAQPSIILQQPGKAHKVPVSP |
| 21 | 271/570 | ATGATTATCATATTCAATTTTAACAGATGTTTTCCA TTAGATCCCTCAACCCTCCACCCCCAGTCCAGGTT ATTAGCAAGTCTTATGAGCAACTGGGATAATTTTG GATAA | AUGAUUAUCAUAUUCAAUUUUAACAGAUG UUUUCCAUUAGAUCCCUCAACCCUCCACCC CCAGUCCAGGUUAUUAGCAAGUCUUAUGA GCAACUGGGAUAAUUUUGGAUAA | MIIIFNFNRCFPLDPSTLHPQSRLLASLMS NWDNFG |
| 22 | 272/571 | CTGTACAATCTTACTCCTGCTGGCAAGAGATTTGT CTTCTTTTCTTGTCTTCAATTGGCTTTCGGGCCTTG TATGTGGTAA | CUGUACAAUCUUACUCCUGCUGGCAAGAG AUUUGUCUUCUUUUCUUGUCUUCAAUUG GCUUUCGGGCCUUGUAUGUGGUAA | LYNLTPAGKRFVFFSCLQLAFGPCMW |
| 23 | 273/572 | ATGTGGCACCTGCAACCCAGGAGCAGGAGCCGGA GGAGCTGCCCTCTGACAGCAGGTGCAGCAGAGAT GGCTACAGCTCAGGAGCTGGGAAGGTGA | AUGUGGCACCUGCAACCCAGGAGCAGGAG CCGGAGGAGCUGCCCUCUGACAGCAGGUG CAGCAGAGAUGGCUACAGCUCAGGAGCUG GGAAGGUGA | MWHLQPRSRSRRSCPLTAGAAEMATAQ ELGR |
| 24 | 274/573 | GTGAGGACCAGTCGTTGTTTGAGTGTGCCTACGG AACGCCACACCTGGCTAAGACAGAGATGA | GUGAGGACCAGUCGUUGUUUGAGUGUGC CUACGGAACGCCACACCUGGCUAAGACAGA GAUGA | VRTSRCLSVPTERHTWLRQR |
| 25 | 275/574 | ATGGCTCAAGGAACTCTCCTGATGAATGCAGTGT GGCCAAAGGCGGGAAGATGGTGGGCAGCCCAGA CACCGTTGGGATGA | AUGGCUCAAGGAACUCUCCUGAUGAAUGC AGUGUGGCCAAAGGCGGGAAGAUGGUGG GCAGCCCAGACACCGUUGGGAUGA | MAQGTLLMNAVWPKAGRWWAAQTPL G |
| 26 | 276/575 | ATGGCCTTCCAGACGTCAACATCTTGTTATTCCAG AACATCGATGGGAAGGAACTGTGCAAGATGA | AUGGCCUUCCAGACGUCAACAUCUUGUUA UUCCAGAACAUCGAUGGGAAGGAACUGUG CAAGAUGA | MAFQTSTSCYSRTSMGRNCAR |
| 27 | 277/576 | ATGCTAGAAACACAGGGGGTGCAGCTTTTATTTTC CCAAATACTTCAGTATATCCTGAAGCTACGCAAAG AATTACAACTAGGCCAGATTTACCATATGAGCCCC CCAGGAGATCAGCCTGGACCGGTCACGGCCACCC CACGCCCCAGTCGAAAGCTGCTCAACCATCTCCTT CCACAGTGCCCAAAACTGAAGACCAGCGTCCTCA GTTAG | AUGCUAGAAACACAGGGGGUGCAGCUUUU AUUUUCCCAAAUACUUCAGUAUAUCCUGA AGCUACGCAAAGAAUUACAACUAGGCCAG AUUUACCAUAUGAGCCCCCCAGGAGAUCA GCCUGGACCGGUCACGGCCACCCCACGCCC CAGUCGAAAGCUGCUCAACCAUCUCCUUCC ACAGUGCCCAAAACUGAAGACCAGCGUCCU CAGUUAG | MLETQGVQLLFSQ1LQYILKLRKELQLGQI YHMSPPGDQPGPVTATPRPSRKLLNHLL PQCPKLKTSVLS |
| 28 | 278/577 | TTGGACCAACAAGTAGCCGCCTTGCAAATCCAGG CAGTGGCCAGATCCAGCTTTGGCAGTTCCTCCTGG AGCTCCTGTCGGACAGCTCCAACTCCAGCTGCATC ACCTGGGAAGGCACCAACGGGGAGTTCAAGATG A | UUGGACCAACAAGUAGCCGCCUUGCAAAU CCAGGCAGUGGCCAGAUCCAGCUUUGGCA GUUCCUCCUGGAGCUCCUGUCGGACAGCU CCAACUCCAGCUGCAUCACCUGGGAAGGCA CCAACGGGGAGUUCAAGAUGA | LDQQVAALQIQAVARSSFGSSSWSSCRT APTPAASPGKAPTGSSR |
| 29 | 279/578 | ATGGGAAGCGCTACGCCTACAAGTTCGACTTCCAC GGGATCGCCCAGGCCCTCCAGCCCCACCCCCCGG AGTCATCTCTGTACAAGTACCCCTCAGACCTCCCG | AUGGGAAGCGCUACGCCUACAAGUUCGAC UUCCACGGGAUCGCCCAGGCCCUCCAGCCC CACCCCCCGGAGUCAUCUCUGUACAAGUAC | MGSATPTSSTSTGSPRPSSPTPRSHLCTST PQTSRTWAPITPTHRR |

TABLE 1-continued

| | | | | |
|---|---|---|---|---|
| | | TACATGGGCTCCTATCACGCCCACCCACAGAAGAT<br>GA | CCCUCAGACCUCCCGUACAUGGGCUCCUAU<br>CACGCCCACCCACAGAAGAUGA | |
| 30 | 280/579 | TTGCTGCCCCAAACCCATACTGGAATTCACCAACT<br>GGGGGTATATACCCCAACACTAGGCTCCCCACCA<br>GCCATATGCCTTCTCATCTGGGCACTTACTACTAA<br>AGACCTGGCGGAGGCTTTTCCCATCAGCGTGCATT<br>CACCAGCCCATCGCCACAAACTCTATCGGAGAACA<br>TGA | UUGCUGCCCCAAACCCAUACUGGAAUUCAC<br>CAACUGGGGGUAUAUACCCCAACACUAGG<br>CUCCCCACCAGCCAUAUGCCUUCUCAUCUG<br>GGCACUUACUACUAAAGACCUGGCGGAGG<br>CUUUUCCCAUCAGCGUGCAUUCACCAGCCC<br>AUCGCCACAAACUCUAUCGGAGAACAUGA | LLPQTHTGIHQLGVYTPTLGSPPAICLLIW<br>ALTTKDLAEAFPISVHSPAHRHKLYRRT |
| 31 | 281/580 | ATGAAAAAAGCTTTACTGGGGCTGGGGAAGGAA<br>GCCGGGGAAGAGATCCAAAGACTCTTGGGAGGG<br>AGTTACTGA | AUGAAAAAAGCUUUACUGGGGCUGGGGAA<br>GGAAGCCGGGGAAGAGAUCCAAAGACUCU<br>UGGGAGGGAGUUACUGA | MKKALLGLGKEAGEEIQRLLGGSY |
| 32 | 282/581 | ATGAGGAGGATGCTAAAAATGTCACGAATATGGA<br>CATATCATCTGTGGACTGACCTTGTAAAAGACAGT<br>GTATGTAGAAGCATGAAGTCTTAA | AUGAGGAGGAUGCUAAAAAUGUCACGAAU<br>AUGGACAUAUCAUCUGUGGACUGACCUUG<br>UAAAAGACAGUGUAUGUAGAAGCAUGAAG<br>UCUUAA | MRRMLKMSRIWTYHLWTDLVKDSVCRS<br>MKS |
| 33 | 283/582 | CTGTATTTAAAAATAGAAACATATCAAAAACAAGA<br>GAAAAGACACGAGAGACTGTGGCCCATCAACA<br>GACGTTGATATGCAACTGCATGGCATGTGCTGTTT<br>TGGTTGA | CUGUAUUUAAAAAUAGAAACAUAUCAAAA<br>ACAAGAGAAAAGACACGAGAGAGACUGUG<br>GCCCAUCAACAGACGUUGAUAUGCAACUG<br>CAUGGCAUGUGCUGUUUUGGUUGA | LYLKIETYQKQEKRHERDCGPSTDVDMQ<br>LHGMCCFG |
| 34 | 284/583 | GTGATTGTAGACAGAGGGGTGAAGAAGGAGGAG<br>GAAGAGGCAGAGAAGGAGGAGACCAGGGCTGG<br>GAAAGAAACTTCTCAAGCAATGAAGACTGGACTC<br>AGGACATTTGGGGACTGTGTACAATGA | GUGAUUGUAGACAGAGGGGUGAAGAAGG<br>AGGAGGAAGAGGCAGAGAAGGAGGAGACC<br>AGGGCUGGGAAAGAAACUUCUCAAGCAAU<br>GAAGACUGGACUCAGGACAUUUGGGGACU<br>GUGUACAAUGA | VIVDRGVKKEEEEAEKEETRAGKETSQA<br>MKTGLRTFGDCVQ |
| 35 | 285/584 | ATGGAGAAAGGGGAAGTAGTAGAATTCAGAAAC<br>AAAAATGCGCATCTCTTTCTTTGTTTGTCAAATGAA<br>AATTTTAACTGGAATTGTCTGATATTTAAGAGAAA<br>CATTCAGGACCTCATCATTATGTGGGGGCTTTGTT<br>CTCCACAGGGTCAGGTAAGAGATGGCCTTCTTGG<br>CTGCCACAATCAGAAATCACGCAGGCATTTTGGGT<br>AG | AUGGAGAAAGGGGAAGUAGUAGAAUUCA<br>GAAACAAAAAUGCGCAUCUCUUUCUUUGU<br>UUGUCAAAUGAAAAUUUUAACUGGAAUU<br>GUCUGAUAUUUAAGAGAAACAUUCAGGAC<br>CUCAUCAUUAUGUGGGGGCUUUGUUCUC<br>CACAGGGUCAGGUAAGAGAUGGCCUUCUU<br>GGCUGCCACAAUCAGAAAUCACGCAGGCA<br>UUUUGGGUAG | MEKGEVVEFRNKNAHLFLCLSNENFNW<br>NCLIFKRNIQDLIIMWGLCSPQGQVRDG<br>LLGCHNQKSRRHFG |
| 36 | 286/585 | TTGAGTCGCGAACGCTGTGCGTTTGTCAGAATGA<br>AGTATACAAGTCAATGTTTTTCCCCCTTTTTATATA<br>ATAATTATATAACTTATGCATTTATACACTACGAGT<br>TGATCTCGGCCAGCCAAAGACACACGACAAAAGA<br>GACAATCGATATAATGTGGCCTTGA | UUGAGUCGCGAACGCUGUGCGUUUGUCA<br>GAAUGAAGUAUACAAGUCAAUGUUUUUCC<br>CCCUUUUUAUAUAAUAAUUAUAUAACUUA<br>UGCAUUUAUACACUACGAGUUGAUCUCGG<br>CCAGCCAAAGACACACGACAAAAGAGACAA<br>UCGAUAUAAUGUGGCCUUGA | LSRERCAFVRMKYTSQCFSPFLYNNYITY<br>AFIHYELISASQRHTTKETIDIMWP |
| 37 | 287/586 | TTGCCTCCCCTCCTGTCTTTTATTTCTAGCCCCTTTT<br>GGAACAGAAGGACCCCGGGTTTCACATTGGAGCC<br>TCCATATTTATGCCTGGAATGGAAAGAGGCCTATG<br>AAGCTGGGGTTGTCATTGAGAAATTCTAG | UUGCCUCCCCUCCUGUCUUUUAUUUCUAG<br>CCCCUUUUGGAACAGAAGGACCCCGGGUU<br>UCACAUUGGAGCCUCCAUAUUUAUGCCUG<br>GAAUGGAAAGAGGCCUAUGAAGCUGGGG<br>UUGUCAUUGAGAAAUUCUAG | LPPLLSFISSPFWNRRTPGFTLEPPYLCLE<br>WKEAYEAGVVIEKF |

TABLE 1-continued

| | | | | |
|---|---|---|---|---|
| 38 | 288/587 | CTGCAATTTCTCACTTTACAGAAACAAGGGATAAC<br>GTCTAGATTTGCTGCGGGGTTTCTCTTTCAGGAGC<br>TCTCACTAGGTAGACAGCTTTAG | CUGCAAUUUCUCACUUUACAGAAACAAGG<br>GAUAACGUCUAGAUUUGCUGCGGGGUUU<br>CUCUUUCAGGAGCUCUCACUAGGUAGACA<br>GCUUUAG | LQFLTLQKQGITSRFAAGFLFQELSLGRQL |
| 39 | 289/588 | CTGGCAGTTAGGCTGACCCAAACTGTGCTAATGG<br>AAAAGATCAGTCATTTTTATTTTGGAATGCAAAGT<br>CAAGACACACCTACATTCTTCATAGAAATACACAT<br>TTACTTGGATAATCACTCAGTTCTCTCTTCAAGACT<br>GTCTCATGAGCAAGATCATAAAAACAAGACATGA | CUGGCAGUUAGGCUGACCCAAACUGUGCU<br>AAUGGAAAAGAUCAGUCAUUUUUAUUUU<br>GGAAUGCAAAGUCAAGACACACCUACAUU<br>CUUCAUAGAAAUACACAUUUACUUGGAUA<br>AUCACUCAGUUCUCUCUUCAAGACUGUCU<br>CAUGAGCAAGAUCAUAAAAACAAGACAUG<br>A | LAVRLTQTVLMEKISHFYFGMQSQDTPT<br>FFIEIHIYLDNHSVLSSRLSHEQDHKNKT |
| 40 | 290/589 | TTGGATAACATGATAATACTGAGTTCCTTCAAATA<br>CATAATTCTTAAATTGTTTCAAAATGGCATTAACTC<br>TCTGTTACTGTTGTAA | UUGGAUAACAUGAUAAUACUGAGUUCCUU<br>CAAAUACAUAAUUCUUAAAUUGUUUCAAA<br>AUGGCAUUAACUCUCUGUUACUGUUGUA<br>A | LDNMIILSSFKYIILKLFQNGINSLLLL |
| 41 | 291/590 | TTGCATGAACCTTTTCTCTCTGTTTGTCCCTGTCTCT<br>TGGCTTGCCCTGATGTATACTCAGACTCCTGTACA<br>ATCTTACTCCTGCTGGCAAGAGATTTGTCTTCTTTT<br>CTTGTCTTCAATTGGCTTTCGGGCCTTGTATGTGGT<br>AAAATCACCAAATCACAGTCAAGACTGTGTTTTTG<br>TTCCTAG | UUGCAUGAACCUUUUCUCUCUGUUUGUCC<br>CUGUCUCUUGGCUUGCCCUGAUGUAUACU<br>CAGACUCCUGUACAAUCUUACUCCUGCUG<br>GCAAGAGAUUUGUCUUCUUUUCUUGUCU<br>UCAAUUGGCUUUCGGGCCUUGUAUGUGG<br>UAAAAUCACCAAAUCACAGUCAAGACUGU<br>GUUUUUGUUCCUAG | LHEPFLSVCPCLLACPDVYSDSCTILLLLAR<br>DLSSFLVFNWLSGLVCGKITKSQSRLCFCS |
| 42 | 292/591 | ATGTCCCGGAGGGGTTCACAAAGTGCTTTGTCAG<br>GACTGCTGCAGTTAGAAGGCTCACTGCTTCTCCTA<br>AGCCTTCTGCACAGATGTGGCACCTGCAACCCAG<br>GAGCAGGAGCCGGAGGAGCTGCCCTCTGA | AUGUCCCGGAGGGGUUCACAAAGUGCUUU<br>GUCAGGACUGCUGCAGUUAGAAGGCUCAC<br>UGCUUCUCCUAAGCCUUCUGCACAGAUGU<br>GGCACCUGCAACCCAGGAGCAGGAGCCGGA<br>GGAGCUGCCCUCUGA | MSRRGSQSALSGLLQLEGSLLLLSLLHRC<br>GTCNPGAGAGGAAL |
| 43 | 293/592 | GTGCAGCAGAGATGGCTACAGCTCAGGAGCTGG<br>GAAGGTGATGGGGCACAGGGAAAGCACAGATGT<br>TCTGCAGCGCCCCAAAGTGACCCATTGCCTGGAG<br>AAAGAGAAGAAAATATTTTTTAA | GUGCAGCAGAGAUGGCUACAGCUCAGGAG<br>CUGGGAAGGUGAUGGGGCACAGGGAAAGC<br>ACAGAUGUUCUGCAGCGCCCCAAAGUGAC<br>CCAUUGCCUGGAGAAAGAGAAGAAAAUAU<br>UUUUUAA | VQQRWLQLRSWEGDGAQGKHRCSAAP<br>QSDPLPGEREENIF |
| 44 (BSS) | 294/593 | ATGCAGTGTGGCCAAAGGCGGGAAGATGGTGGG<br>CAGCCCAGACACCGTTGGGATGAACTACGGCAGC<br>TACATGGAGGAGAAGCACATGCCACCCCCAAACA<br>TGACCACGAACGAGCGCAGAGTTATCGTGCCAGC<br>AGGAACTCTCCTGATGAATGCAGTGTGGCCAAAG<br>GCGGGAAGATGGTGGGCAGCCCAGACACCGTTG<br>GGATGAACTACGGCAGCTACATGGAGGAGAAGC<br>ACATGCCACCCCCAAACATGACCACGAACGAGCG<br>CAGAGTTATCGTGCCAGCA | AUGCAGUGUGGCCAAAGGCGGGAAGAUGG<br>UGGGCAGCCCAGACACCGUUGGGAUGAAC<br>UACGGCAGCUACAUGGAGGAGAAGCACAU<br>GCCACCCCCAAACAUGACCACGAACGAGCG<br>CAGAGUUAUCGUGCCAGCAGGAACUCUCC<br>UGAUGAAUGCAGUGUGGCCAAAGGCGGGA<br>AGAUGGUGGGCAGCCCAGACACCGUUGGG<br>AUGAACUACGGCAGCUACAUGGAGGAGAA<br>GCACAUGCCACCCCCAAACAUGACCACGAA<br>CGAGCGCAGAGUUAUCGUGCCAGCA | MQCGQRREDGGQPRHRWDELRQLHG<br>GEAHATPKHDHERAQSYRASRNSPDECS<br>VAKGGKMVGSPDTVGMNYGSYMEEKH<br>MPPPNMTTNERRVIVPA |
| 45 (BSS) | 295/594 | GTGGCCAAAGGCGGGAAGATGGTGGGCAGCCCA<br>GACACCGTTGGGATGAACTACGGCAGCTACATGG<br>AGGAGAAGCACATGCCACCCCCAAACATGACCAC | GUGGCCAAAGGCGGGAAGAUGGUGGGCA<br>GCCCAGACACCGUUGGGAUGAACUACGGC<br>AGCUACAUGGAGGAGAAGCACAUGCCACCC | VAKGGKMVGSPDTVGMNYGSYMEEKH<br>MPPPNMTTNERRVIVPAGTLLMNAVW<br>PKAGRWWAAQTPLG |

TABLE 1-continued

| | | | | |
|---|---|---|---|---|
| | | GAACGAGCGCAGAGTTATCGTGCCAGCAGGAACT<br>CTCCTGATGAATGCAGTGTGGCCAAAGGCGGGAA<br>GATGGTGGGCAGCCCAGACACCGTTGGGATGA | CCAAACAUGACCACGAACGAGCGCAGAGUU<br>AUCGUGCCAGCAGGAACUCUCCUGAUGAA<br>UGCAGUGUGGCCAAAGGCGGGAAGAUGG<br>UGGGCAGCCCAGACACCGUUGGGAUGA | |
| 46<br>(BSS + RCA) | 296/595 | ATGGAGTACAGACCATGTGCGGCAGTGGCTGGA<br>GTGGGCGGTGAAAGAATATGGCCTTCCAGACGTC<br>AACATCTTGTTATTCCAGAACATCGATGGGAAGGA<br>ACTGTGCAAGATGACCAAGGACGACTTCCAGAGG<br>CTCACCCCCAGCTACAACGCCGACATCCTTCTCTCA<br>CATCTCCACTACCTCAGAGAGAATCCTACGCTATG<br>GAGTACAGACCATGTGCGGCAGTGGCTGGAGTG<br>GGCGGTGAAAGAATATGGCCTTCCAGACGTCAAC<br>ATCTTGTTATTCCAGAACATCGATGGGAAGGAACT<br>GTGCAAGATGACCAAGGACGACTTCCAGAGGCTC<br>ACCCCCAGCTACAACGCCGACATCCTTCTCTCACAT<br>CTCCACTACCTCAGAGA | AUGGAGUACAGACCAUGUGCGGCAGUGGC<br>UGGAGUGGGCGGUGAAAGAAUAUGGCCU<br>UCCAGACGUCAACAUCUUGUUAUUCCAGA<br>ACAUCGAUGGGAAGGAACUGUGCAAGAUG<br>ACCAAGGACGACUUCCAGAGGCUCACCCCC<br>AGCUACAACGCCGACAUCCUUCUCUCACAU<br>CUCCACUACCUCAGAGAGAAUCCUACGCUA<br>UGGAGUACAGACCAUGUGCGGCAGUGGCU<br>GGAGUGGGCGGUGAAAGAAUAUGGCCUU<br>CCAGACGUCAACAUCUUGUUAUUCCAGAA<br>CAUCGAUGGGAAGGAACUGUGCAAGAUGA<br>CCAAGGACGACUUCCAGAGGCUCACCCCCA<br>GCUACAACGCCGACAUCCUUCUCUCACAUC<br>UCCACUACCUCAGAGA | MEYRPCAAVAGVGGERIWPSRRQHLVIP<br>EHRWEGTVQDDQGRLPEAHPQLQRRH<br>PSLTSPLPQRESYAMEYRPCAAVAGVGG<br>ERIWPSRRQHLVIPEHRWEGTVQDDQG<br>RLPEAHPQLQRRHPSLTSPLPQR |
| 47<br>(BSS + RCA) | 297/596 | GTGCGGCAGTGGCTGGAGTGGGCGGTGAAAGAA<br>TATGGCCTTCCAGACGTCAACATCTTGTTATTCCA<br>GAACATCGATGGGAAGGAACTGTGCAAGATGACC<br>AAGGACGACTTCCAGAGGCTCACCCCCAGCTACA<br>ACGCCGACATCCTTCTCTCACATCTCCACTACCTCA<br>GAGAGAATCCTACGCTATGGAGTACAGACCATGT<br>GCGGCAGTGGCTGGAGTGGGCGGTGAAAGAATA<br>TGGCCTTCCAGACGTCAACATCTTGTTATTCCAGA<br>ACATCGATGGGAAGGAACTGTGCAAGATGACCAA<br>GGACGACTTCCAGAGGCTCACCCCCAGCTACAAC<br>GCCGACATCCTTCTCTCACATCTCCACTACCTCAGA<br>GAG | GUGCGGCAGUGGCUGGAGUGGGCGGUGA<br>AAGAAUAUGGCCUUCCAGACGUCAACAUC<br>UUGUUAUUCCAGAACAUCGAUGGGAAGGA<br>ACUGUGCAAGAUGACCAAGGACGACUUCC<br>AGAGGCUCACCCCCAGCUACAACGCCGACA<br>UCCUUCUCUCACAUCUCCACUACCUCAGAG<br>AGAAUCCUACGCUAUGGAGUACAGACCAU<br>GUGCGGCAGUGGCUGGAGUGGGCGGUGA<br>AAGAAUAUGGCCUUCCAGACGUCAACAUC<br>UUGUUAUUCCAGAACAUCGAUGGGAAGGA<br>ACUGUGCAAGAUGACCAAGGACGACUUCC<br>AGAGGCUCACCCCCAGCUACAACGCCGACA<br>UCCUUCUCUCACAUCUCCACUACCUCAGAG<br>AG | VRQWLEWAVKEYGLPDVNILLFQNIDGK<br>ELCKMTKDDFQRLTPSYNADILLSHLHYL<br>RENPTLWSTDHVRQWLEWAVKEYGLPD<br>VNILLFQNIDGKELCKMTKDDFQRLTPSY<br>NADILLSHLHYLRE |
| 48<br>(BSS + RCA) | 298/597 | TTGACTTCAGATGATGTTGATAAAGCCTTACAAAA<br>CTCTCCACGGTTAATGCATGCTAGAAACACAGCTC<br>CTCTTCCACATTTGACTTCAGATGATGTTGATAAA<br>GCCTTACAAAACTCTCCACGGTTAATGCATGCTAG<br>AAACACA | UUGACUUCAGAUGAUGUUGAUAAAGCCU<br>UACAAAACUCUCCACGGUUAAUGCAUGCU<br>AGAAACACAGCUCCUCUUCCACAUUUGAC<br>UUCAGAUGAUGUUGAUAAAGCCUUACAAA<br>ACUCUCCACGGUUAAUGCAUGCUAGAAAC<br>ACA | LTSDDVDKALQNSPRLMHARNTAPLPHL<br>TSDDVDKALQNSPRLMHARNT |
| 49<br>(BSS + RCA) | 299/598 | GTGCAGCTTTTATTTTCCCAAATACTTCAGTATATC<br>CTGAAGCTACGCAAAGAATTACAACTAGGCCAGG<br>GGGTGCAGCTTTTATTTTCCCAAATACTTCAGTATA<br>TCCTGAAGCTACGCAAAGAATTACAACTAGGCCA<br>G | GUGCAGCUUUUAUUUUCCCAAAUACUUCA<br>GUAUAUCCUGAAGCUACGCAAAGAAUUAC<br>AACUAGGCCAGGGGGUGCAGCUUUUAUU<br>UUCCCAAAUACUUCAGUAUAUCCUGAAGC<br>UACGCAAAGAAUUACAACUAGGCCAG | VQLLFSQILQYILKLRKELQLGQGVQLLFS<br>QILQYILKLRKELQLGQ |

REFERENCES 1. http://www.who.int/cancer/en/
2. Ott P A, et al., An immunogenic personal neoantigen vaccine for patients with melanoma. Nature 2017; 547(7662):217-221.
3. Sahin U, et al., Personalized RNA mutanome vaccines mobilize poly-specific therapeutic immunity against cancer. Nature 2017; 547(7662):222-226.
4. Guarnerio J, et al., Oncogenic Role of Fusion-circRNAs Derived from Cancer-Associated Chromosomal Translocations. Cell 2016; 165(2):289-302.
5. Capel B, et al., Circular transcripts of the testis-determining gene Sry in adult mouse testis. Cell 1993; 73(5):1019-1030.
6. Salzman J, et al., Circular RNAs are the predominant transcript isoform from hundreds of human genes in diverse cell types. PLoS One 2012; 7(2):e30733.
7. Abe N, et al., Rolling Circle Translation of Circular RNA in Living Human Cells. Sci Rep 2015; 5:16435.
8. Legnini I, et al., Circ-ZNF609 Is a Circular RNA that Can Be Translated and Functions in Myogenesis. Mol Cell 2017; 66(1):22-37 e29.
9. Rowe R C et al., Handbook of Pharmaceutical Excipients. Pharmaceutical Press, 2012
10. Wen E P et al., Vaccine Development and Manufacturing, John Wiley & Sons, 17 Nov. 2014
11. http://en.wikipedia.org/wiki/Peptide_synthesis
12. http://en.wikipedia.org/wiki/Expression_vector
13. Creighton T E, Proteins—Structures and Molecular properties—Second edition. WH Freeman and Company.

The invention claimed is:

1. A pharmaceutical composition comprising endogenous tumor circRNA, and a pharmaceutically acceptable excipient comprising a preservative, an adjuvant, a stabilizer, a buffer, or any combination thereof, formulated as a vaccine effective in the treatment of cancer, wherein the circRNA is the total circRNA content from the tumor cells.

2. A pharmaceutical composition comprising protein derived from endogenous tumor circRNA, and a pharmaceutically acceptable excipient comprising a preservative, an adjuvant, a stabilizer, a buffer, or any combination thereof, formulated as a therapeutic vaccine effective in the treatment of cancer, wherein the circRNA from which the protein is derived is the total circRNA content from the tumor cells.

3. A method of preparing an endogenous tumor circRNA to be formulated as a vaccine in the treatment of cancer, wherein the method comprises the steps of:

a. extracting total RNA content from tumor cells;

b. enriching circRNA by enzyme digestion of linear RNA, wherein the enriched circRNA is the total circRNA content from the tumor cells, and c. mixing the enriched circRNA with at least one pharmaceutically acceptable excipient comprising a preservative, an adjuvant, a stabilizer, a buffer, or any combination thereof.

4. A method of preparing an endogenous tumor circRNA vaccine, comprising the steps of:

a. extracting total RNA content from tumor cells of a patient;

b. enriching circRNA from the extracted total RNA by enzyme digestion of linear RNA, wherein the enriched circRNA is the total circRNA content from the tumor cells; and c. mixing the enriched circRNA with at least one pharmaceutically acceptable excipient suitable for the vaccine.

5. A method of preparing a protein derived from endogenous tumor circRNA for use as a vaccine, comprising the steps of:

a. extracting total RNA content from tumor cells of a patient;

b. enriching circRNA from the extracted total RNA by enzyme digestion of linear RNA, wherein the enriched circRNA is the total circRNA content from the tumor cells;

c. identifying neoantigen protein expressed by the enriched circRNA; and d. detecting personalized/general potential of the protein as immunogen.

6. A method of preparing an endogenous tumor circRNA, comprising:

a. extracting total RNA content from tumor cells of a patient;

b. enriching circRNA from the extracted total RNA by enzyme digestion of linear RNA, wherein the enriched circRNA is the total circRNA content from the tumor cells; and c. returning the enriched circRNA to antigen presenting cells ex vivo;

wherein the antigen presenting cells generate an immune response.

7. A personalized method of treating a prostate cancer patient comprising:

a. extracting total RNA content from tumor cells of a patient;

b. enriching circRNA from the extracted total RNA by enzyme digestion of linear RNA, wherein the enriched circRNA is the total circRNA content from the tumor cells;

c. mixing the enriched circRNA with at least one pharmaceutically acceptable excipient to form a mixture; and d. administering an effective amount of the mixture to the patient.

8. A method of treating a prostate cancer patient comprising:

a. extracting total RNA content from tumor cells of a patient;

b. enriching circRNA from the extracted total RNA by enzyme digestion of linear RNA, wherein the enriched circRNA is the total circRNA content from the tumor cells;

c. identifying an immunogenic potential of neoantigen protein from the circRNA; and d. administering an effective amount of the neoantigen protein to the patient.

9. The pharmaceutical composition according to claim 1, wherein the cancer is prostate cancer, breast cancer, colon cancer, lung cancer and/or pancreatic cancer.

10. The pharmaceutical composition according to claim 2, wherein the cancer is prostate cancer, breast cancer, colon cancer, lung cancer and/or pancreatic cancer.

11. The pharmaceutical composition according to claim 1, wherein the cancer is prostate cancer.

12. The pharmaceutical composition according to claim 2, wherein the cancer is prostate cancer.

13. The pharmaceutical composition according to claim 1, wherein the pharmaceutically acceptable comprises an adjuvant comprising an aluminum salt or an oil-based compound, or a stabilizer comprising a sugar, amino acid, human serum albumin or gelatin, or any combination thereof.

14. The pharmaceutical composition according to claim 2, wherein the pharmaceutically acceptable comprises an adjuvant comprising an aluminum salt or an oil-based compound, or a stabilizer comprising a sugar, amino acid, human serum albumin or gelatin, or any combination thereof.

15. The pharmaceutical composition according to claim 1, wherein the endogenous tumor circRNA is prepared by a method comprising:

a. extracting total RNA content from tumor cells of a patient; and b. enriching circRNA from the extracted total RNA by enzyme digestion of linear RNA.

* * * * *